US012603571B2

(12) United States Patent
Liu et al.

(10) Patent No.: US 12,603,571 B2
(45) Date of Patent: Apr. 14, 2026

(54) SWITCHED CAPACITOR CONVERTER AND CONTROL METHOD

(71) Applicant: Halo Microelectronics International, Campbell, CA (US)

(72) Inventors: Rui Liu, Fremont, CA (US); Songnan Yang, Frisco, TX (US); Shuang Han, Foshan City (CN); Rong Shu, Foshan City (CN); Wenrui Bai, Foshan City (CN); Qing Cui, Foshan City (CN)

(73) Assignee: Halo Microelectronics International, Campbell, CA (US)

( * ) Notice: Subject to any disclaimer, the term of this patent is extended or adjusted under 35 U.S.C. 154(b) by 217 days.

(21) Appl. No.: 18/607,408

(22) Filed: Mar. 15, 2024

(65) Prior Publication Data

US 2024/0275279 A1 Aug. 15, 2024

Related U.S. Application Data

(63) Continuation-in-part of application No. 17/455,860, filed on Nov. 19, 2021, now Pat. No. 11,936,290.

(Continued)

(51) Int. Cl.
| | |
|---|---|
| *H02M 3/07* | (2006.01) |
| *H02M 1/00* | (2006.01) |
| *H02M 3/158* | (2006.01) |

(52) U.S. Cl.
CPC ........... *H02M 3/07* (2013.01); *H02M 1/0025* (2021.05); *H02M 3/158* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217;

(Continued)

(56) References Cited

U.S. PATENT DOCUMENTS

2021/0099085 A1* 4/2021 Lau ........................ H02M 3/07

* cited by examiner

*Primary Examiner* — Jeffrey A Gblende
(74) *Attorney, Agent, or Firm* — AP3 Law Firm PLLC

(57) ABSTRACT

A switched capacitor converter includes a first energy storage branch, a second energy storage branch, a third energy storage branch comprising a third capacitor, a seventh switch, an eighth switch, a ninth switch and a tenth switch, and a control branch connected to a first terminal of each switch in the first energy storage branch, the second energy storage branch and the third energy storage branch respectively, wherein the control branch is configured to control each switch to alternately turn on and off periodically in two phases, so that a ratio of a voltage at the input terminal to a voltage at an output terminal is 2N:1, wherein in each operating cycle, the tenth switch is turned on later than at least one switch in the third energy storage branch, and wherein the at least one switch and the tenth switch are in a same phase.

22 Claims, 51 Drawing Sheets

Related U.S. Application Data

(60) Provisional application No. 63/274,150, filed on Nov. 1, 2021.

(58) Field of Classification Search
CPC ............. H02M 1/0025; H02M 1/0045; H02M 1/0009; H02M 1/08; H02M 1/0048; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069
See application file for complete search history.

650

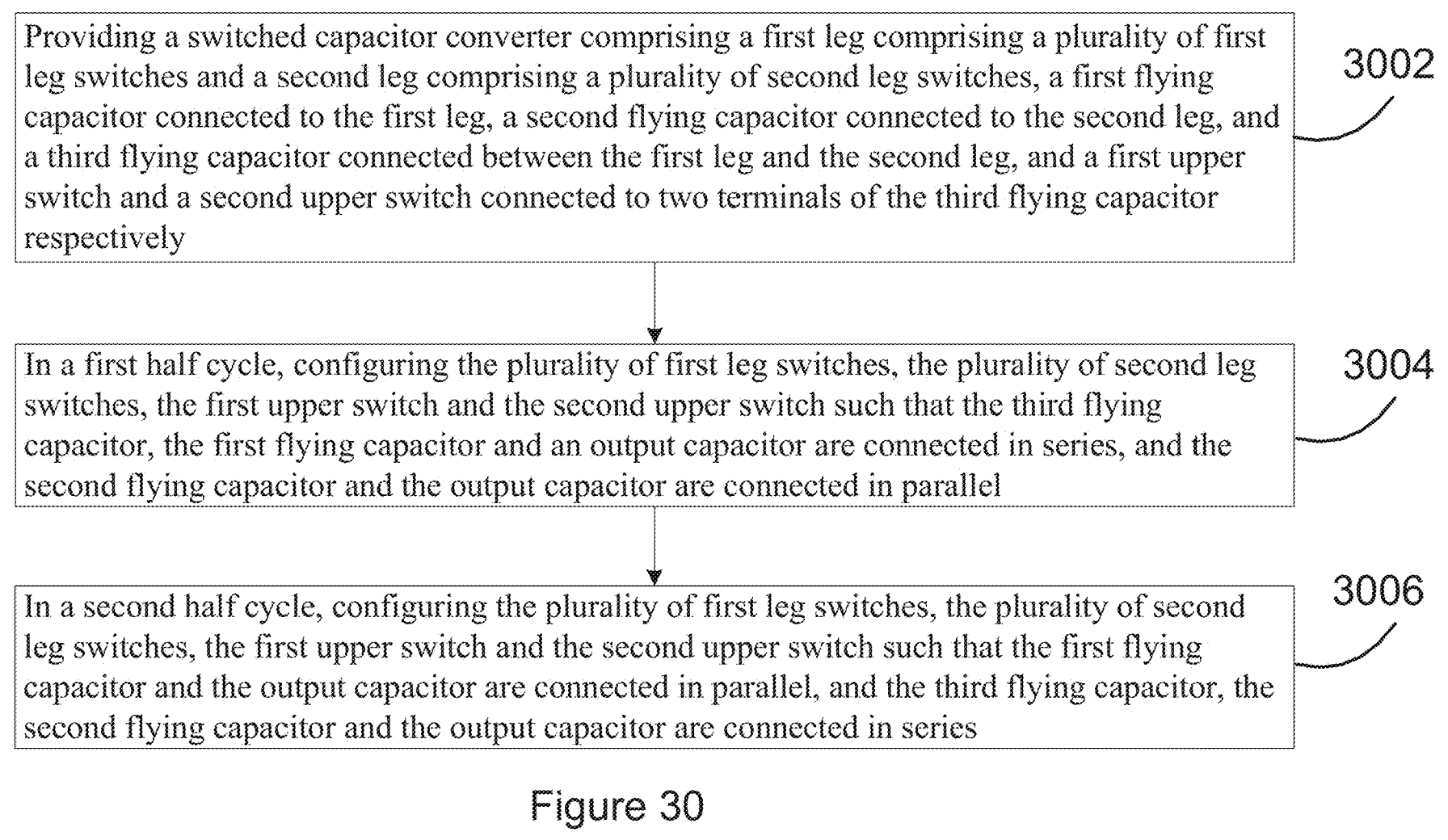

3002

Providing a switched capacitor converter comprising a first leg comprising a plurality of first leg switches and a second leg comprising a plurality of second leg switches, a first flying capacitor connected to the first leg, a second flying capacitor connected to the second leg, and a third flying capacitor connected between the first leg and the second leg, and a first upper switch and a second upper switch connected to two terminals of the third flying capacitor respectively

3004

In a first half cycle, configuring the plurality of first leg switches, the plurality of second leg switches, the first upper switch and the second upper switch such that the third flying capacitor, the first flying capacitor and an output capacitor are connected in series, and the second flying capacitor and the output capacitor are connected in parallel

3006

In a second half cycle, configuring the plurality of first leg switches, the plurality of second leg switches, the first upper switch and the second upper switch such that the first flying capacitor and the output capacitor are connected in parallel, and the third flying capacitor, the second flying capacitor and the output capacitor are connected in series

Figure 30

SWITCHED CAPACITOR CONVERTER AND CONTROL METHOD

PRIORITY CLAIM

This application is a continuation-in-part of U.S. patent application Ser. No. 17/455,860, filed Nov. 19, 2021, and entitled "Switched Capacitor Converter and Control Method," which claims the benefit of U.S. Provisional Application No. 63/274,150, filed on Nov. 1, 2021, entitled "Switched Capacitor Converter and Control Method," which application is hereby incorporated herein by reference.

TECHNICAL FIELD

The present invention relates to a switched capacitor converter, and, in particular embodiments, to a high efficiency switched capacitor converter.

BACKGROUND

With the popularization of fast charging of mobile phones, charge pump voltage conversion circuits are gradually being used more and more widely due to their high power conversion efficiency. The fast charging power of a single battery has also been increased from the initial low power (e.g., 25 W) to today's high power (e.g., 65 W). The output voltage of the corresponding USB adapter has also been increased from the initial lower voltage (e.g., 10 V) to today's high voltage (e.g., 20V). The most basic 2:1 charge pump can no longer meet the needs of a single battery with a 20V USB adapter input voltage. The 2:1 charge pump has been gradually replaced by the 4:1 charge pump. The functions of the 4:1 charge pump are compatible with the functions of the 2:1 charge pump. The 4:1 charge pump is used in applications having a high voltage conversion ratio (e.g., from 20V to 5V). There are several 4:1 charge pump circuits. The commonly used 4:1 charge pump is the Dickson charge pump as shown in FIG. 1. The Dickson charge pump has the highest efficiency among 4:1 charge pumps.

FIG. 1 illustrates a schematic diagram of a 4:1 Dickson dual-phase switched capacitor converter. The 4:1 Dickson dual-phase switched capacitor converter 100 comprises a first phase 110 and a second phase 130. The first phase 110 comprises eight switches 111, 112, 113, 114, 115, 116, 117, 118. Switches 111-116 are connected in series between an input power source VIN and the ground GND. Switches 117 and 118 are connected in series, and further in parallel with the series connected switches 115, 116. A flying capacitor 121 is connected between a common node of switches 111, 112, and a common node of switches 115, 116. A flying capacitor 120 is connected between a common node of switches 112, 113, and a common node of switches 117, 118. A flying capacitor 119 is connected between a common node of switches 113, 114, and a common node of switches 115, 116.

The second phase 130 comprises eight switches 131, 132, 133, 134, 135, 136, 137, 138. Switches 131-136 are connected in series between the input power source VIN and the ground GND. Switches 137 and 138 are connected in series, and further in parallel with the series connected switches 135, 136. A flying capacitor 141 is connected between a common node of switches 131, 132, and a common node of switches 135, 136. A flying capacitor 140 is connected between a common node of switches 132, 133, and a common node of switches 137, 138. A flying capacitor 139 is connected between a common node of switches 133, 134, and a common node of switches 135, 136.

An input capacitor 101 is connected between VIN and ground to filter the input voltage. An output capacitor 102 is connected between VOUT and ground to filter the output voltage.

In operation, all switches alternately switch at a specific operating frequency with a 50% duty cycle. In a first half cycle, the switches 111, 113, 115 and 117 are turned on, and the switches 112, 114, 116, and 118 are turned off. The flying capacitor 121 and the output capacitor 102 are connected in series. VIN charges the series connected capacitor 121 and 102. In addition, VIN supplies power to the output terminal VOUT. The flying capacitor 120 charges the flying capacitor 119 and the output capacitor 102 through the turned on switches 113, 115 and 117. In addition, the flying capacitor 120 supplies power to the output terminal VOUT.

In a second half cycle, the switches 112, 114, 116, and 118 are turned on and the switches 111, 113, 115, and 117 are turned off. The flying capacitor 120 and the output capacitor 102 are connected in series. The flying capacitor 121 charges the flying capacitor 120 and the output capacitor 102 through the switches 112, 116 and 118. In addition, the flying capacitor 121 supplies power to the output terminal VOUT. At the same time, the flying capacitor 119 charges the output capacitor 102 through switches 114 and 116. In addition, the flying capacitor 119 supplies power to the output terminal VOUT.

Also, in the first half cycle, the switches 132, 134, 136, and 138 are turned on and the switches 131, 133, 135, and 137 are turned off. The flying capacitor 140 and the output capacitor 102 are connected in series. The flying capacitor 141 charges the flying capacitor 140 and the output capacitor 102 through the switches 132, 136 and 138. In addition, the flying capacitor 141 supplies power to the output terminal VOUT. At the same time, the flying capacitor 139 charges the output capacitor 102 through switches 134 and 136. In addition, the flying capacitor 139 supplies power to the output terminal VOUT.

Also, in the second half cycle, the switches 131, 133, 135 and 137 are turned on, and the switches 132, 134, 136, and 138 are turned off. The flying capacitor 141 and the output capacitor 102 are connected in series. VIN charges the series connected capacitor 141 and 102 through switches 131 and 135. In addition, VIN supplies power to the output terminal VOUT. The flying capacitor 140 charges the flying capacitor 139 and the output capacitor 102 through the turned on switches 133, 135 and 137. In addition, the flying capacitor 139 supplies power to the output terminal VOUT.

In operation, when the switching frequency is fast enough, the voltage on the flying capacitors 119, 120, 121, 139, 140, 141 and VOUT on the output capacitor 102 fluctuate around a constant value (DC bias voltage) with each switching state. The DC bias voltage of the voltages on the flying capacitors 119, 139, and the output capacitor 102 is equal to one quarter of the input voltage VIN (VIN/4). The DC bias voltage of the voltages on the flying capacitors 120 and 140 is equal to one half of the input voltage VIN (VIN/2). The DC bias voltage of the voltages on the flying capacitors 121 and 141 is equal to three-quarters of the input voltage VIN (3×VIN/4). The power conversion ratio of the Dickson dual-phase switched capacitor converter shown in FIG. 1 is equal to 4:1.

According to the foregoing description, the Dickson dual-phase switched capacitor converter is highly efficient. When the flying capacitors 121 and 141 are charged, only two switches are connected in series. When the flying capacitors 121 and 141 are discharged, only three switches are connected in series. When the flying capacitors 120 and 140 are charged and discharged, only three switches are connected in series. When the flying capacitors 119 and 139 are charged, three switches are connected in series. When the flying capacitors 119 and 139 are discharged, only two switches are connected in series. Moreover, the effective current flowing through all flying capacitors in the Dickson dual-phase switched capacitor converter are the same. At the same time, in order to improve the efficiency of the Dickson dual-phase switched capacitor converter, the on-resistance of the switches 115, 116, 135 and 136 is half of the other switches. This is because the current of these switches is twice the current flowing through the flying capacitors.

The Dickson dual-phase switched capacitor converter shown in FIG. 1 may be of a 2:1 power conversion ratio. In operation, the switches 112, 113, 132, and 133 may be configured to operate in an always-on state during normal operation. The remaining switches alternately switch at a specific operating frequency with a 50% duty cycle. In a first half cycle, the switches 111, 115, and 118 of the first phase 110 are turned on, and the switches 114, 116, and 117 of the first phase 110 are turned off. The flying capacitors 121, 120, 119 are connected in parallel, and further connected in series with the output capacitor 102. VIN charges the flying capacitors 121, 120, 119 and the output capacitor 102 through the switches 111, 112, 113, 115 and 118. In addition, VIN supplies power to the output terminal VOUT.

In a second half cycle, the switches 114, 116, and 117 are turned on, and the switches 111, 115, and 118 are turned off. The flying capacitors 121, 120, and 119 charge the output capacitor 102 and supply power to VOUT through the switches 112, 113, 114, 116 and 117.

Also, in the first half cycle, the switches 134, 136, and 137 of the second phase 130 are turned on, and the switches 131, 135, and 138 of the second phase 130 are turned off. The flying capacitors 141, 140 and 139 charge the output capacitor 102 through switches 132, 133, 134, 136 and 137. In addition, and the flying capacitors 141, 140, 139 supply power to the output terminal VOUT.

Also, in the second half cycle, the switches 131, 135, and 138 are turned on, and the switches 134, 136, and 137 are turned off. The flying capacitors 141, 140 and 139 are connected in parallel, and further connected in series with the output capacitor 102. VIN charges the flying capacitors 141, 140, and 139 and the output capacitor 102 through switches 131, 132, 133, 135 and 138. In addition, VIN supplies power to the output terminal VOUT.

In operation, when the switching frequency is fast enough, the voltages on the flying capacitors 119, 120, 121, 139, 140, 141, and VOUT on the output capacitor 102 fluctuate around a constant value with each switching state. Among them, the voltages on the flying capacitors 119, 120, 121, 139, 140, 141, and output capacitor 102 are equal to one half of the input voltage VIN (VIN/2). The power conversion ratio of the Dickson dual-phase switched capacitor converter shown in FIG. 1 is equal to 2:1.

The Dickson dual-phase switched capacitor converter shown in FIG. 1 can achieve high efficiency. However, the circuit is complicated. There are sixteen switches and six flying capacitors. The largest DC voltage on the flying capacitor is three-quarters of VIN. Due to the DC piezoelectric effect of ceramic capacitors (the capacitance value decreases exponentially with the increase of DC piezoelectricity) FIG. 2 shows the capacitance value variation in response to different DC bias voltages. In order to achieve the required capacitance value, a larger capacitor is needed.

Such a larger capacitor increases the cost and area of the Printed Circuit Board (PCB) on which the Dickson dual-phase switched capacitor converter is mounted.

As power consumption has become more important, there may be a need for further improving the performance of the Dickson dual-phase switched capacitor converter shown in FIG. 1. It is desirable to have a simplified structure so as to achieve a cost-effective power solution.

SUMMARY

These and other problems are generally solved or circumvented, and technical advantages are generally achieved, by preferred embodiments of the present disclosure which provide a high efficiency switched capacitor converter.

In accordance with an embodiment, a switched capacitor converter comprises a first leg comprising a plurality of first leg switches connected in series between ground and a first voltage node, a second leg comprising a plurality of second leg switches connected in series between ground and a second voltage node, a first flying capacitor connected between a first switch common node and a third switch common node of the first leg, wherein the first switch common node is a common node of a first switch and a second switch of the first leg, and the third switch common node is a common node of a third switch and a fourth switch of the first leg, a second flying capacitor connected between a first switch common node and a third switch common node of the second leg, wherein the first switch common node is a common node of a first switch and a second switch of the second leg, and the third switch common node is a common node of a third switch and a fourth switch of the second leg, a third flying capacitor connected between the first voltage node and the second voltage node, a first upper switch connected between the first voltage node and ground, a second upper switch coupled between the second voltage node and an input terminal, and an output terminal coupled to a second switch common node of the first leg and a second switch common node of the second leg, and wherein the second switch common node of the first leg is a common node of the second switch and the third switch of the first leg, and the second switch common node of the second leg is a common node of the second switch and the third switch of the second leg.

The switched capacitor converter further comprises a fourth flying capacitor connected between a third voltage node and a fourth voltage node, a third upper switch connected between the third voltage node and ground, a fourth upper switch connected between the fourth voltage node and the input terminal, a fifth upper switch connected between an uppermost switch common node of the first leg and the fourth voltage node, and a sixth upper switch connected between an uppermost switch common node of the second leg and the third voltage node.

In accordance with yet another embodiment, a method comprises providing a switched capacitor converter comprising a first leg comprising a plurality of first leg switches and a second leg comprising a plurality of second leg switches, a first flying capacitor connected to the first leg, a second flying capacitor connected to the second leg, and a third flying capacitor connected between the first leg and the second leg, and a first upper switch and a second upper switch connected to two terminals of the third flying capacitor respectively, in a first half cycle, configuring the plurality of first leg switches, the plurality of second leg switches, the first upper switch and the second upper switch such that the third flying capacitor, the first flying capacitor and an output capacitor are connected in series, and the second flying capacitor and the output capacitor are connected in parallel, and in a second half cycle, configuring the plurality of first leg switches, the plurality of second leg switches, the first upper switch and the second upper switch such that the first flying capacitor and the output capacitor are connected in parallel, and the third flying capacitor, the second flying capacitor and the output capacitor are connected in series.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 30 illustrates a flow chart of a method for controlling the switched capacitor converter shown in FIGS. 3 and 13 in accordance with various embodiments of the present disclosure;

Figure 36:
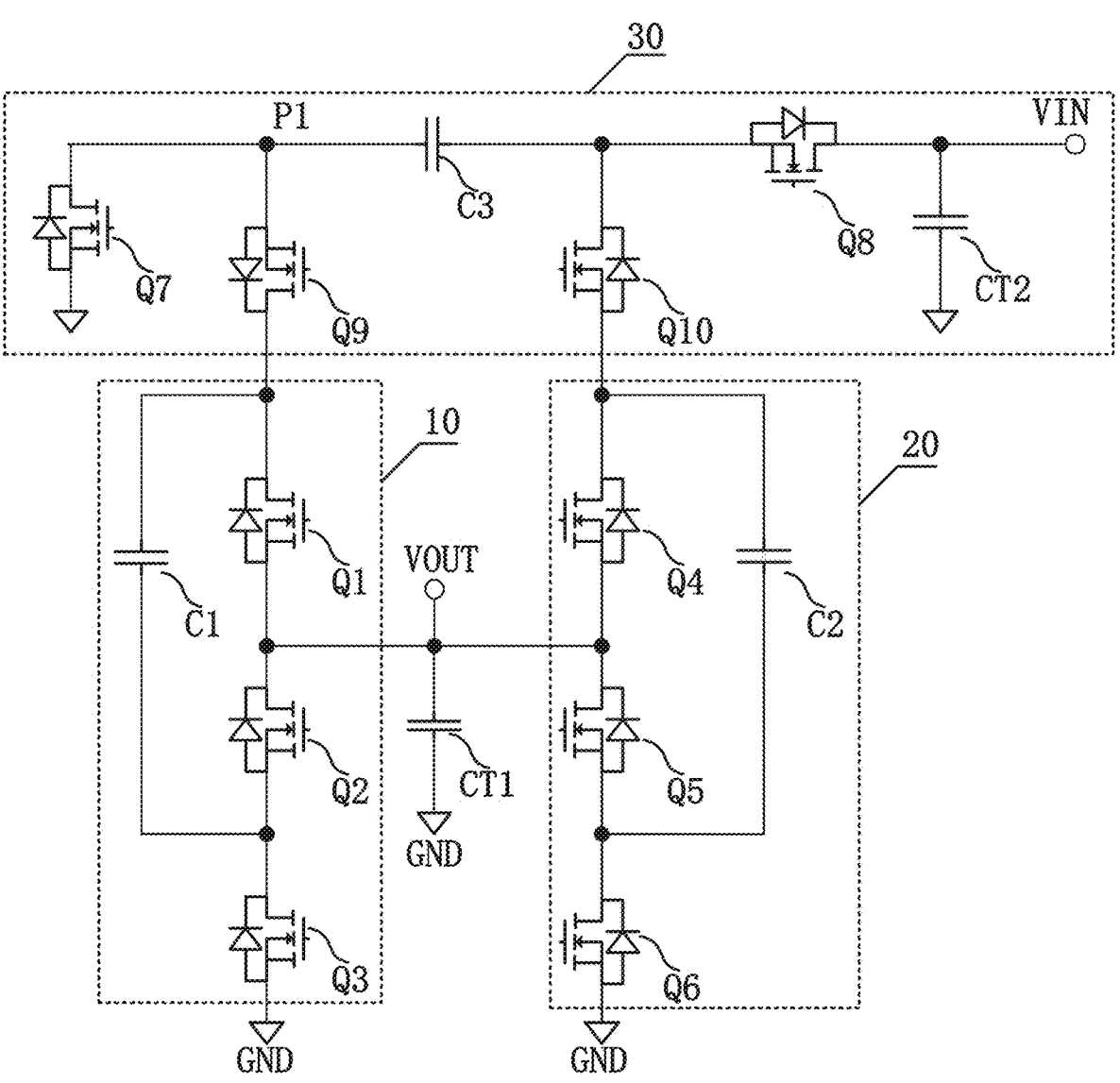
Figure 37:
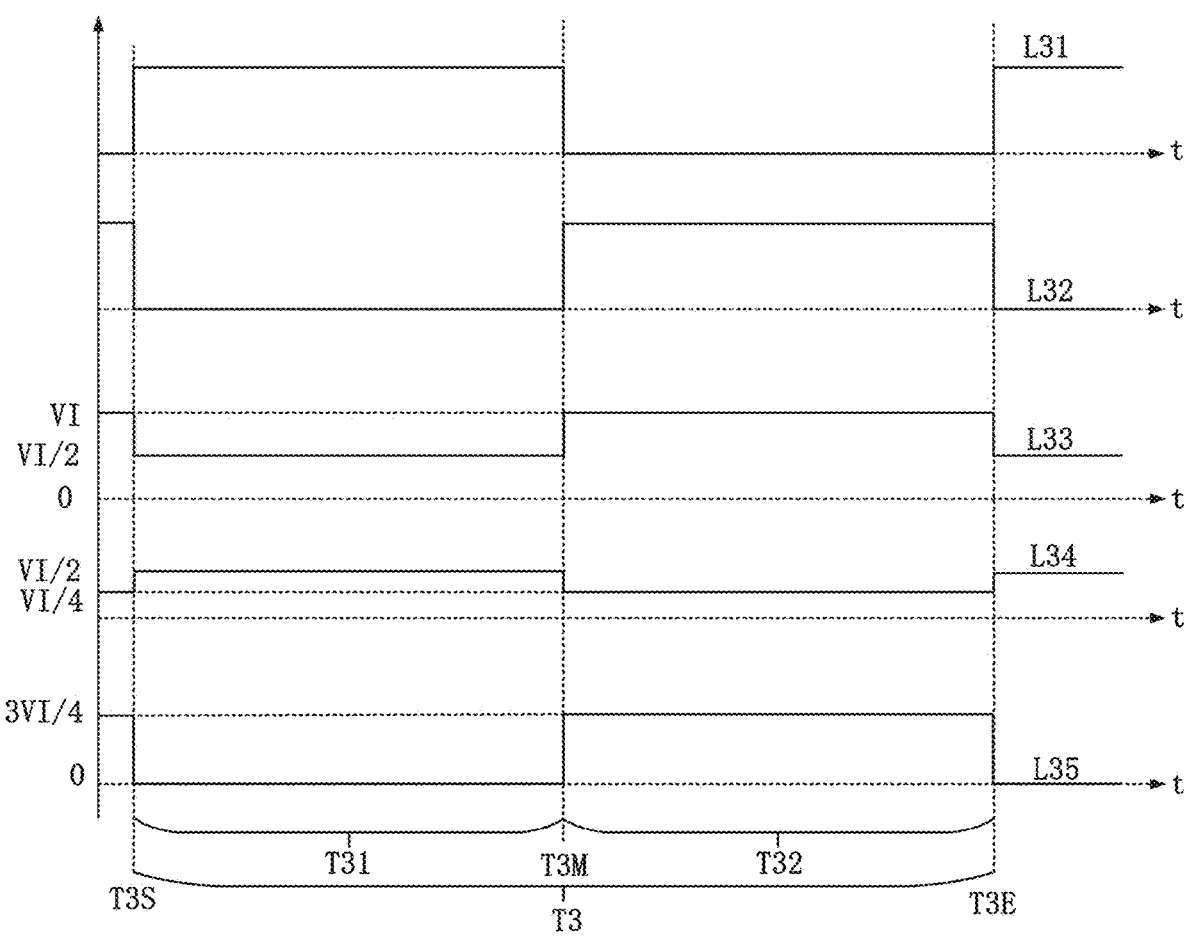
Figure 38:
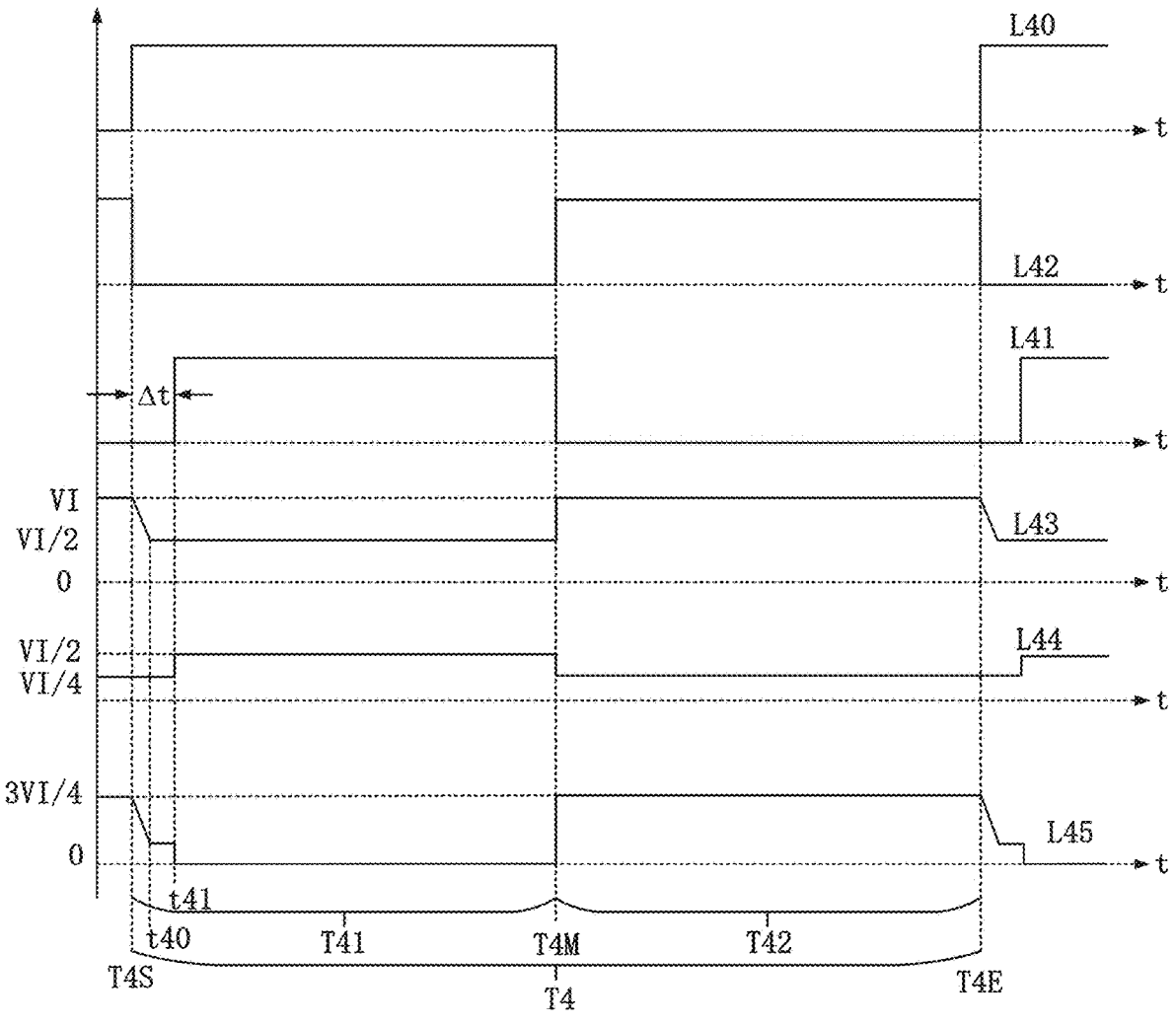
Figure 39:
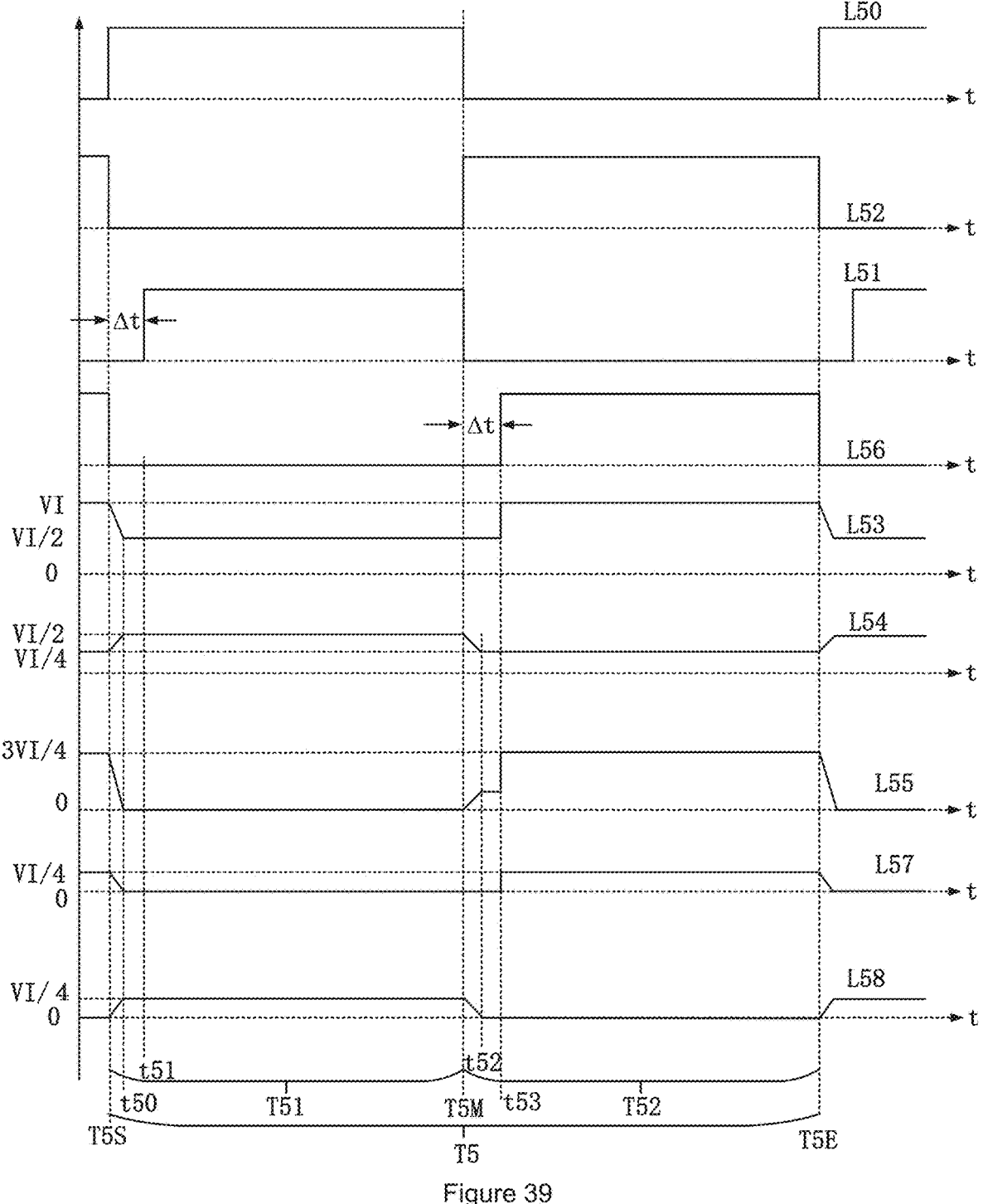
Figure 40:
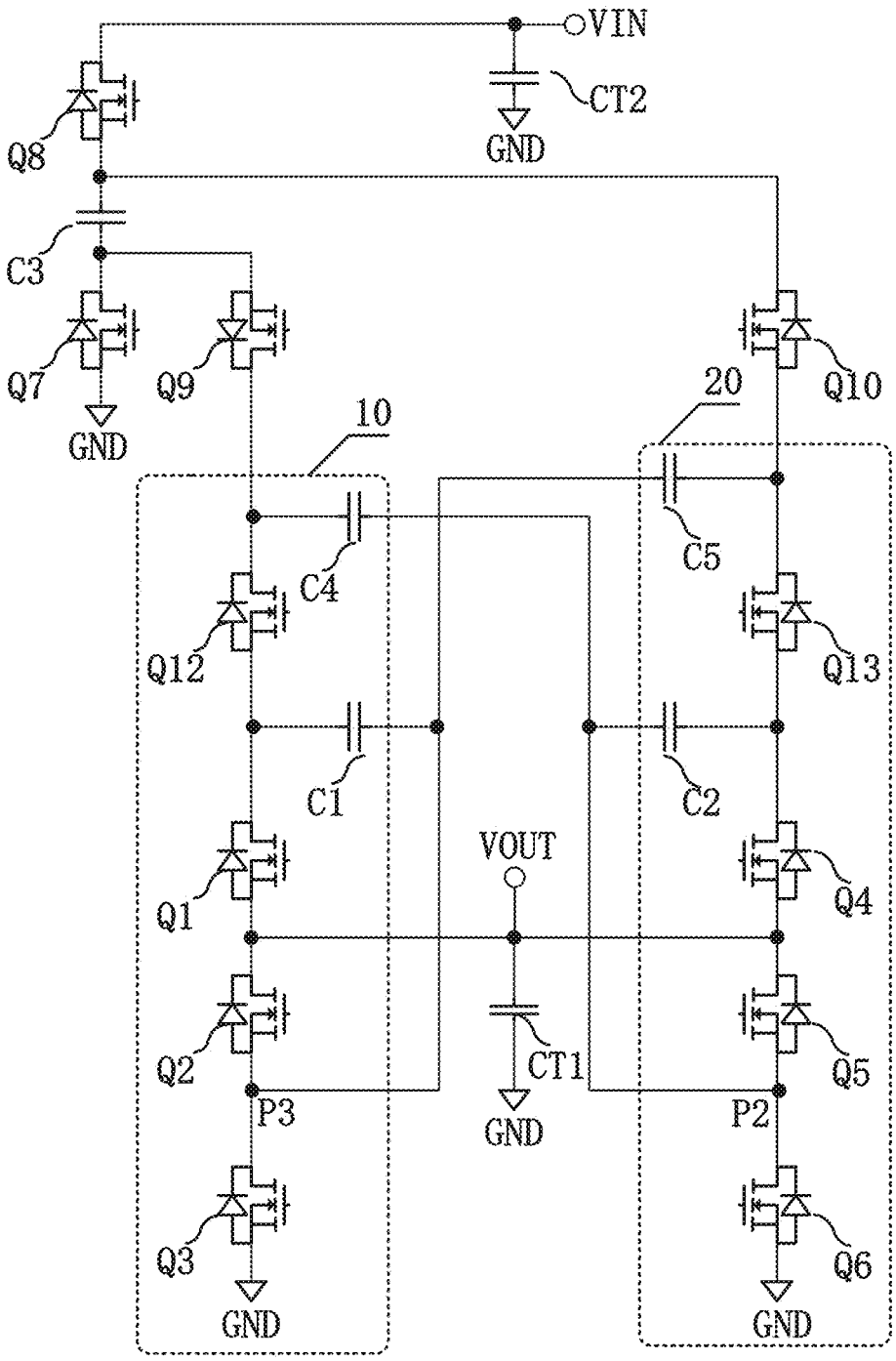
Figure 40A:
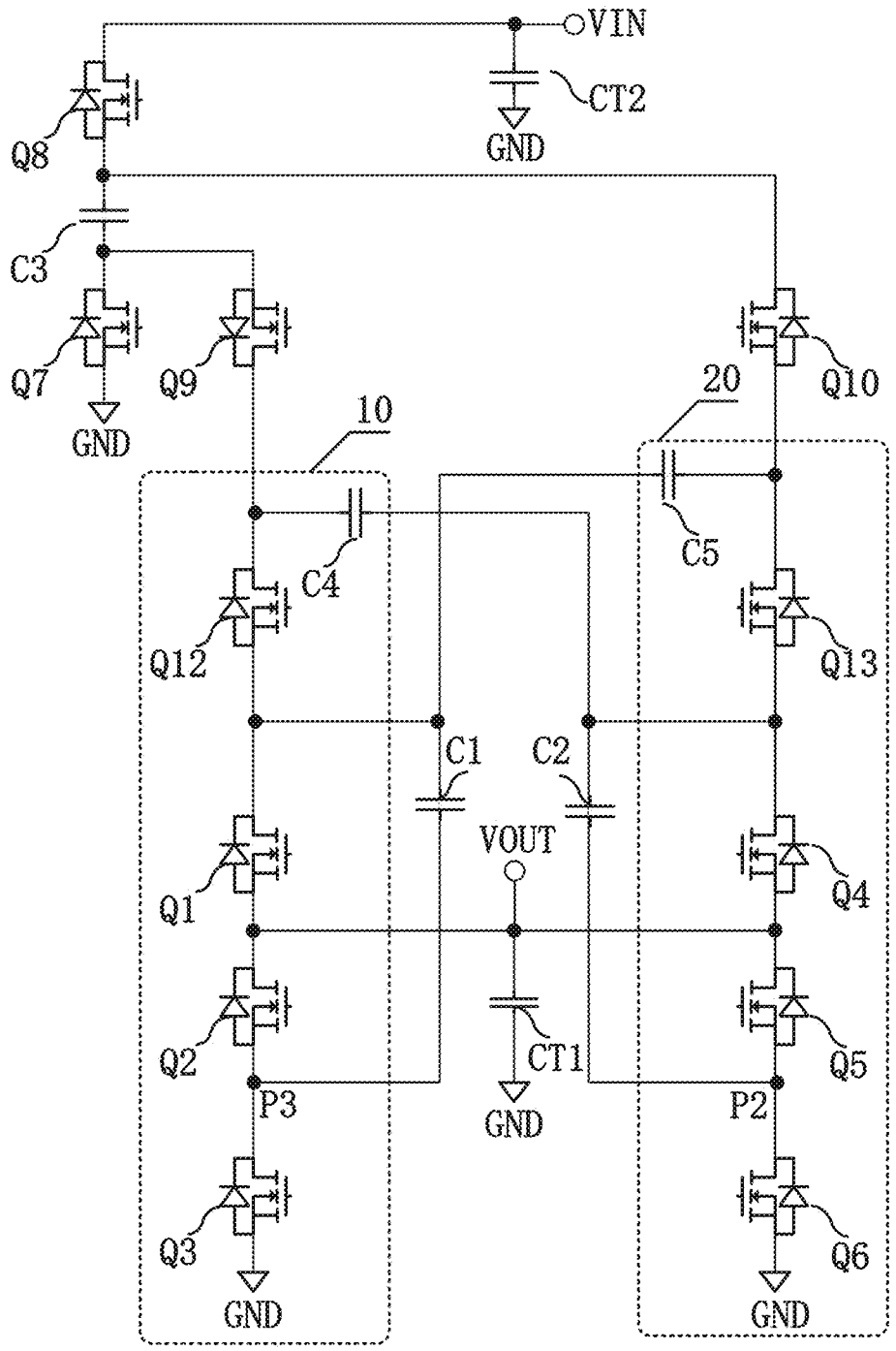
Figure 41:
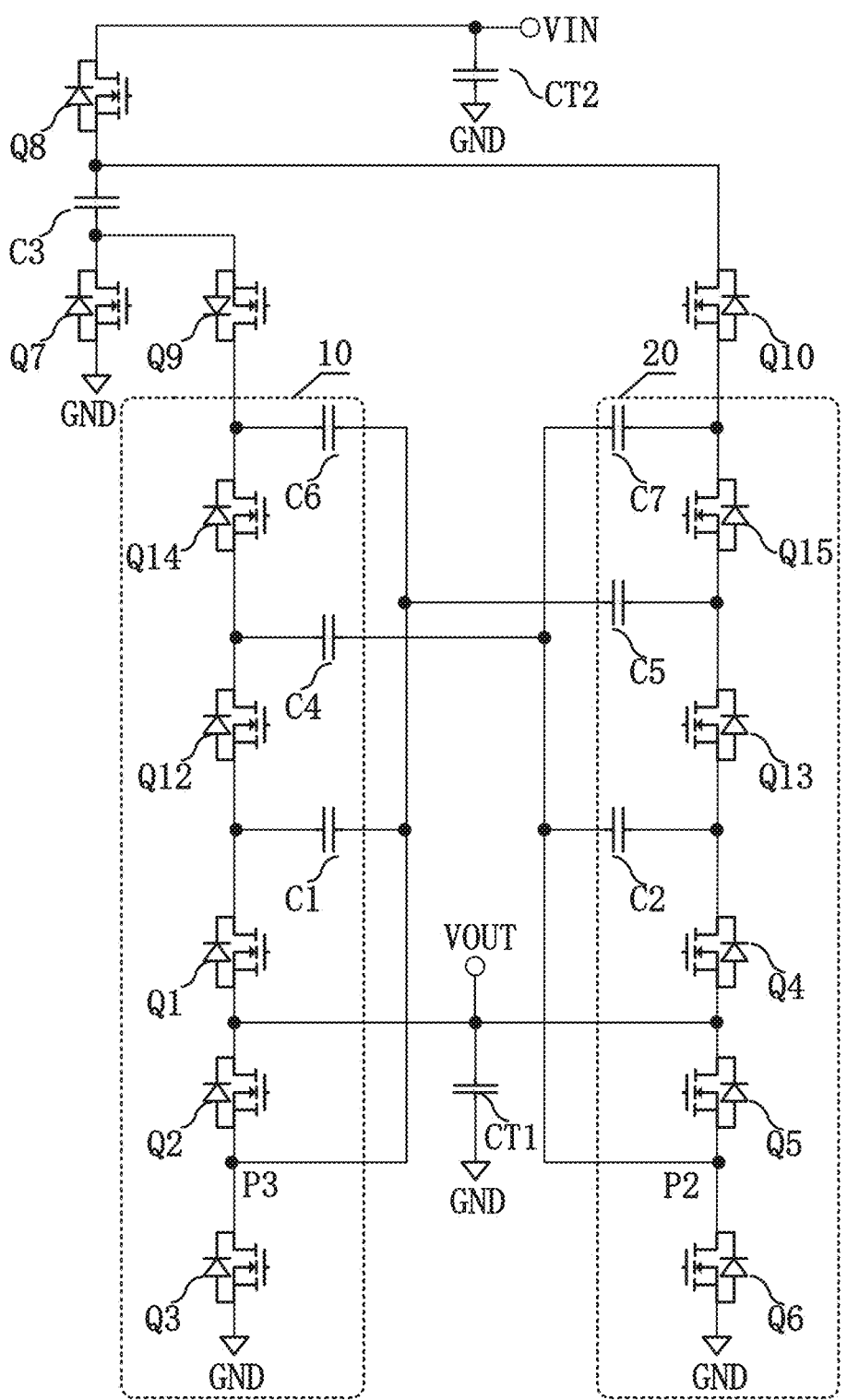
Figure 41A:
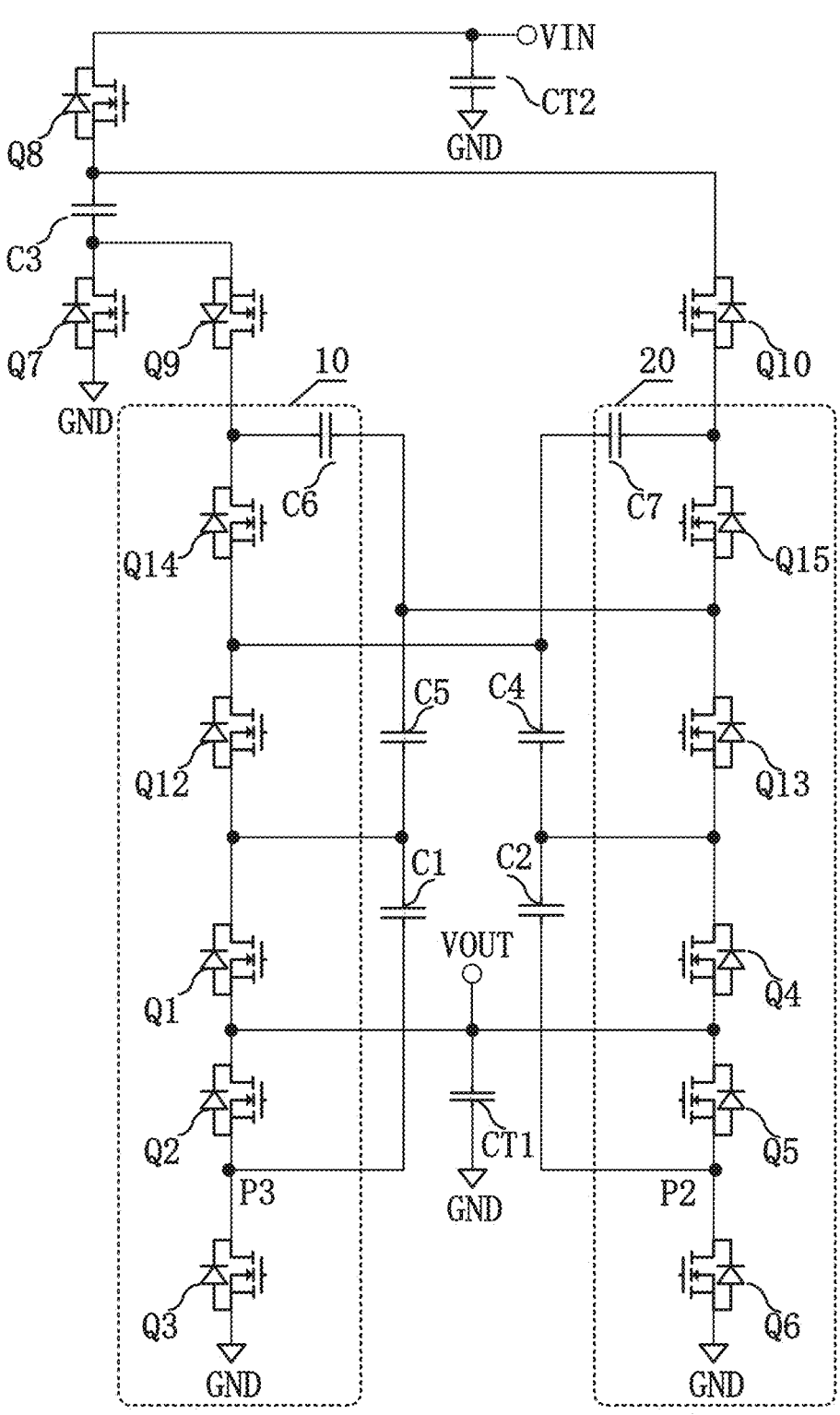
Figure 42:
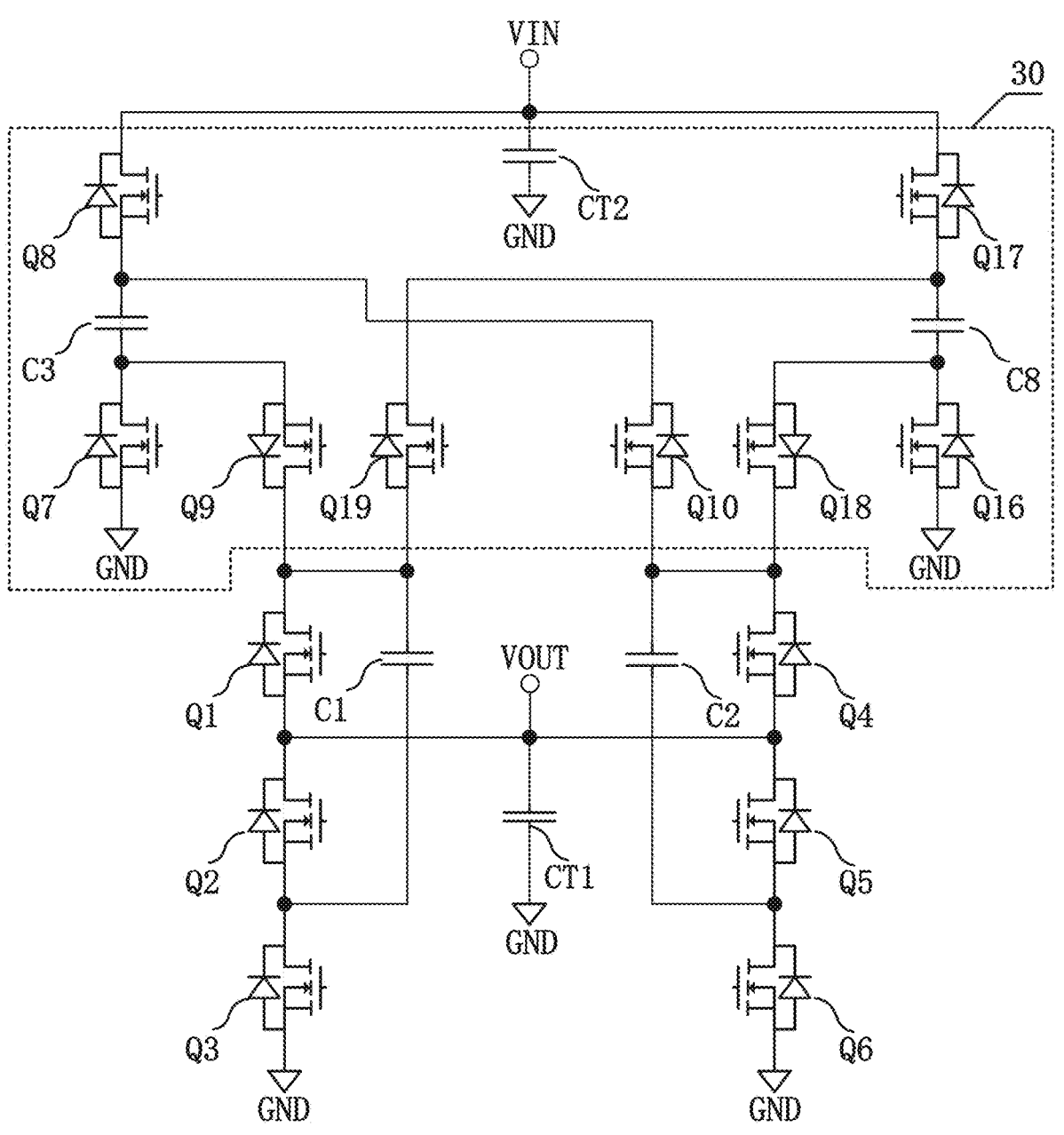
Figure 43:
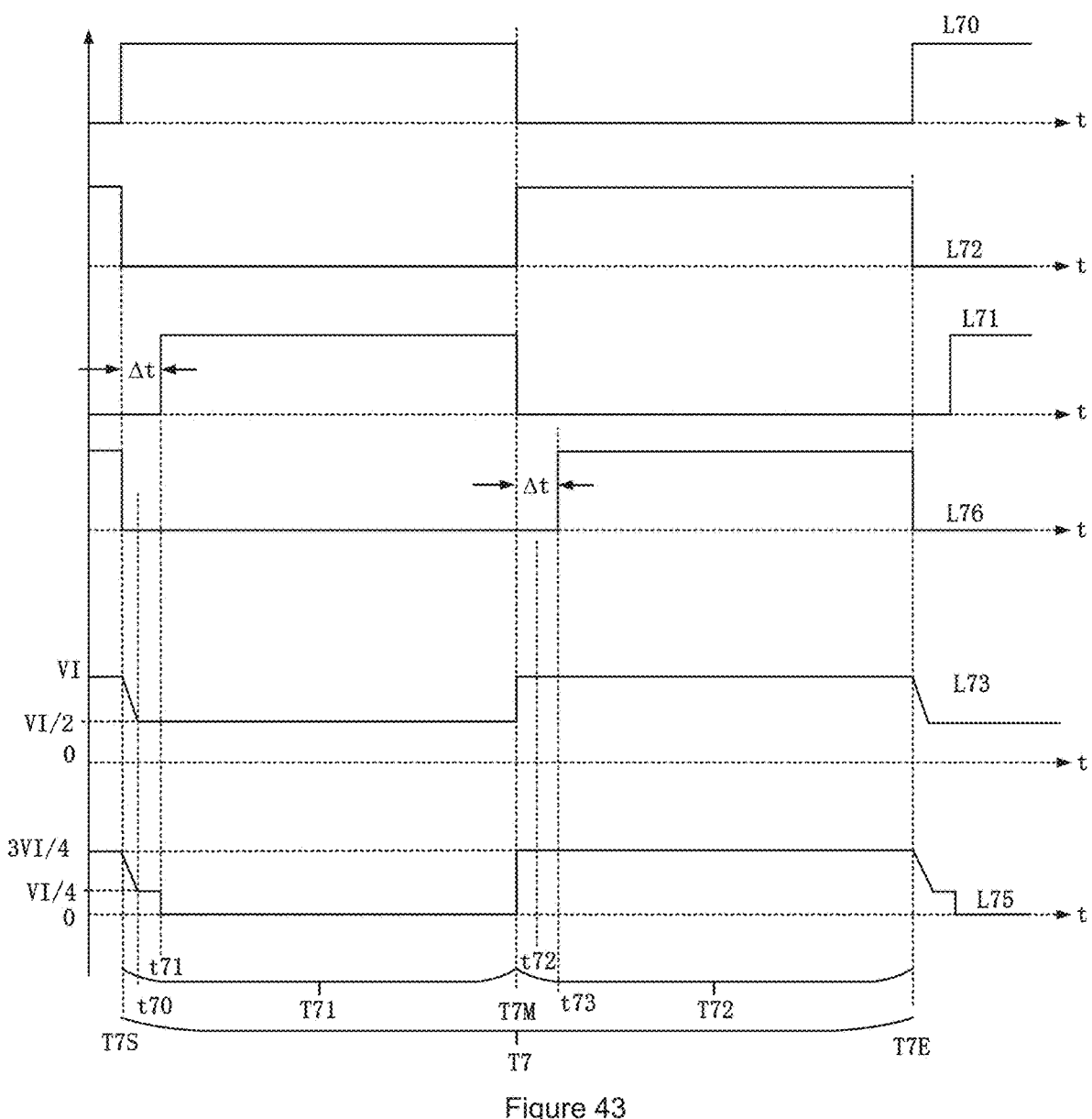
Figure 44:
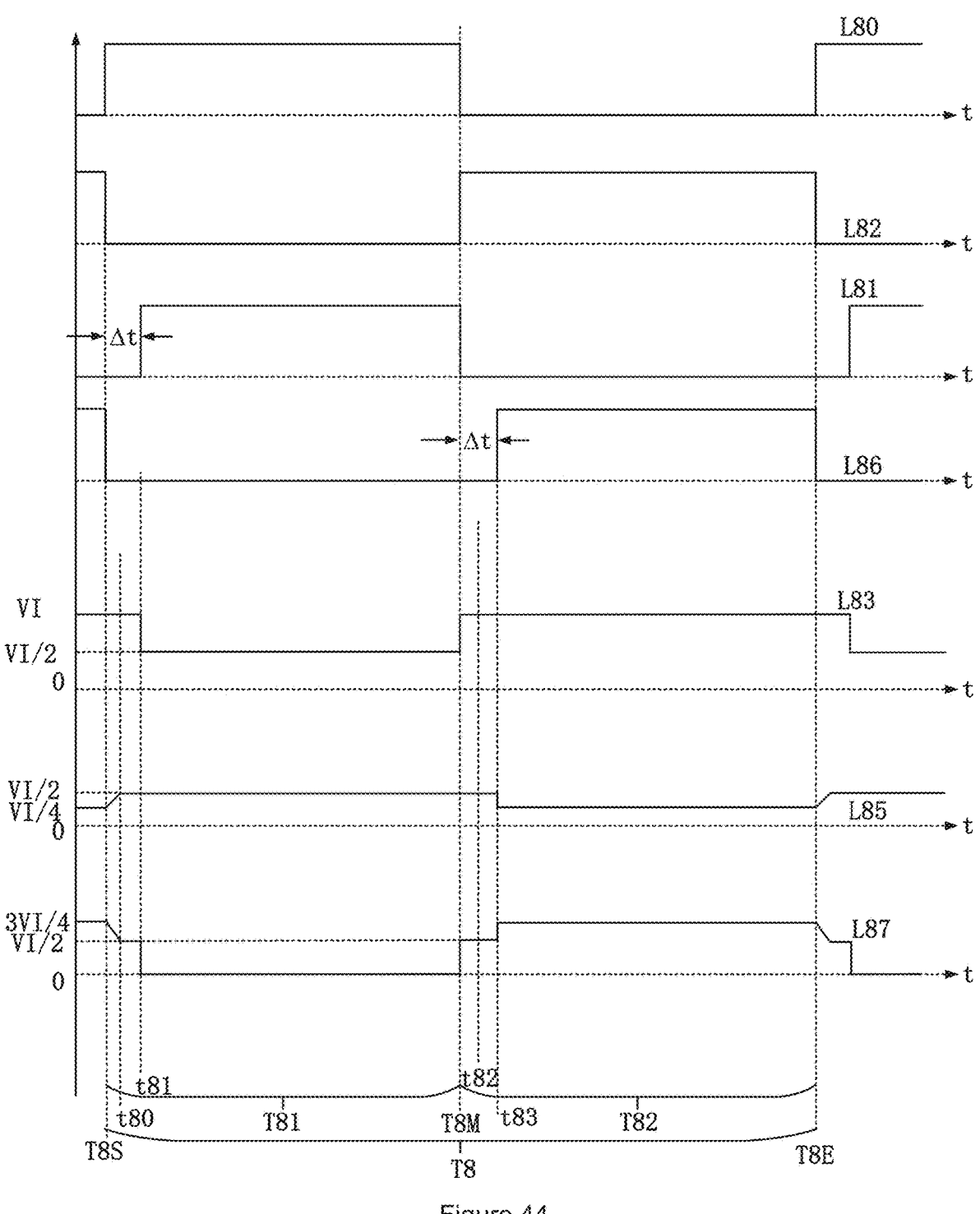
Figure 45:
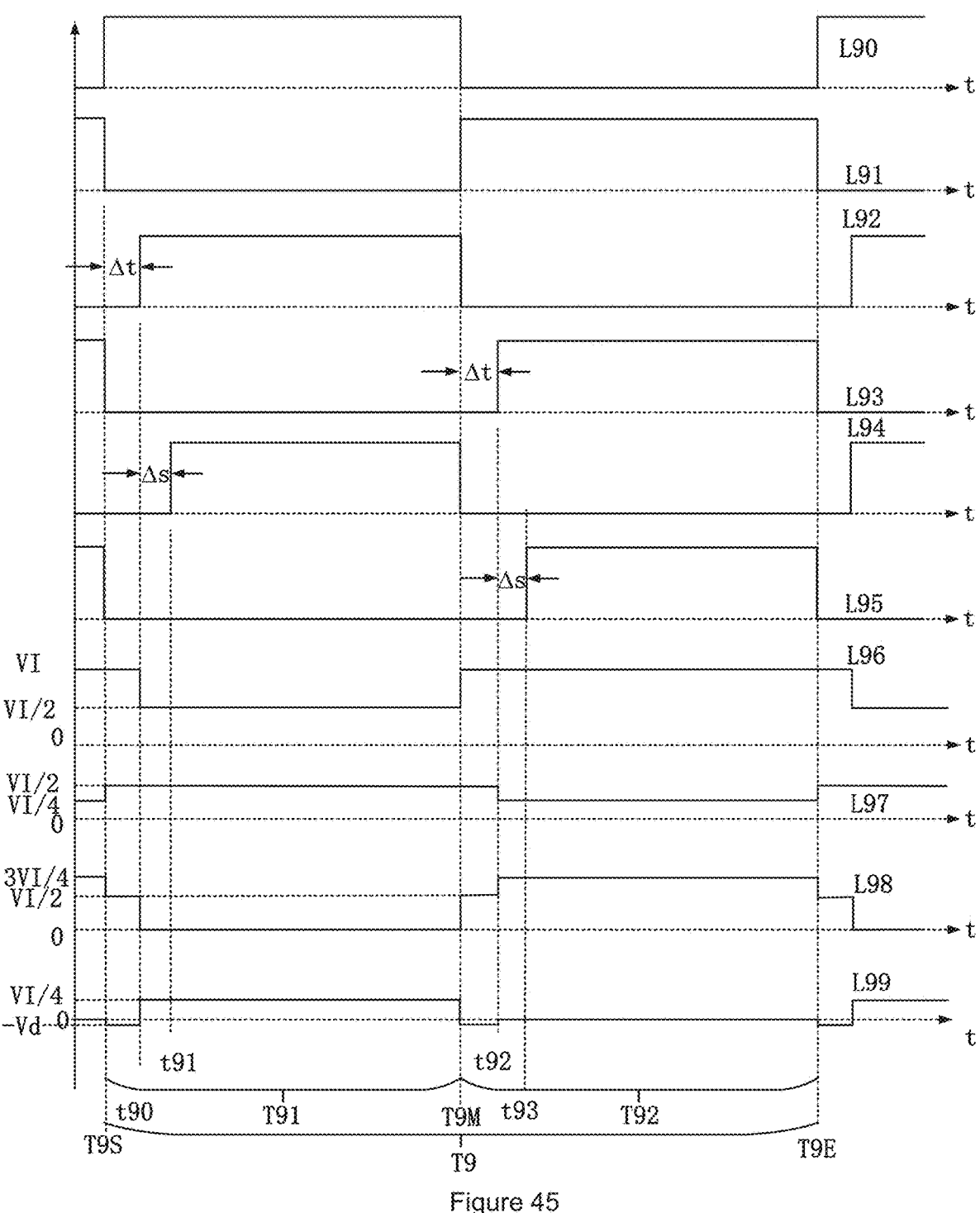
Figure 46:
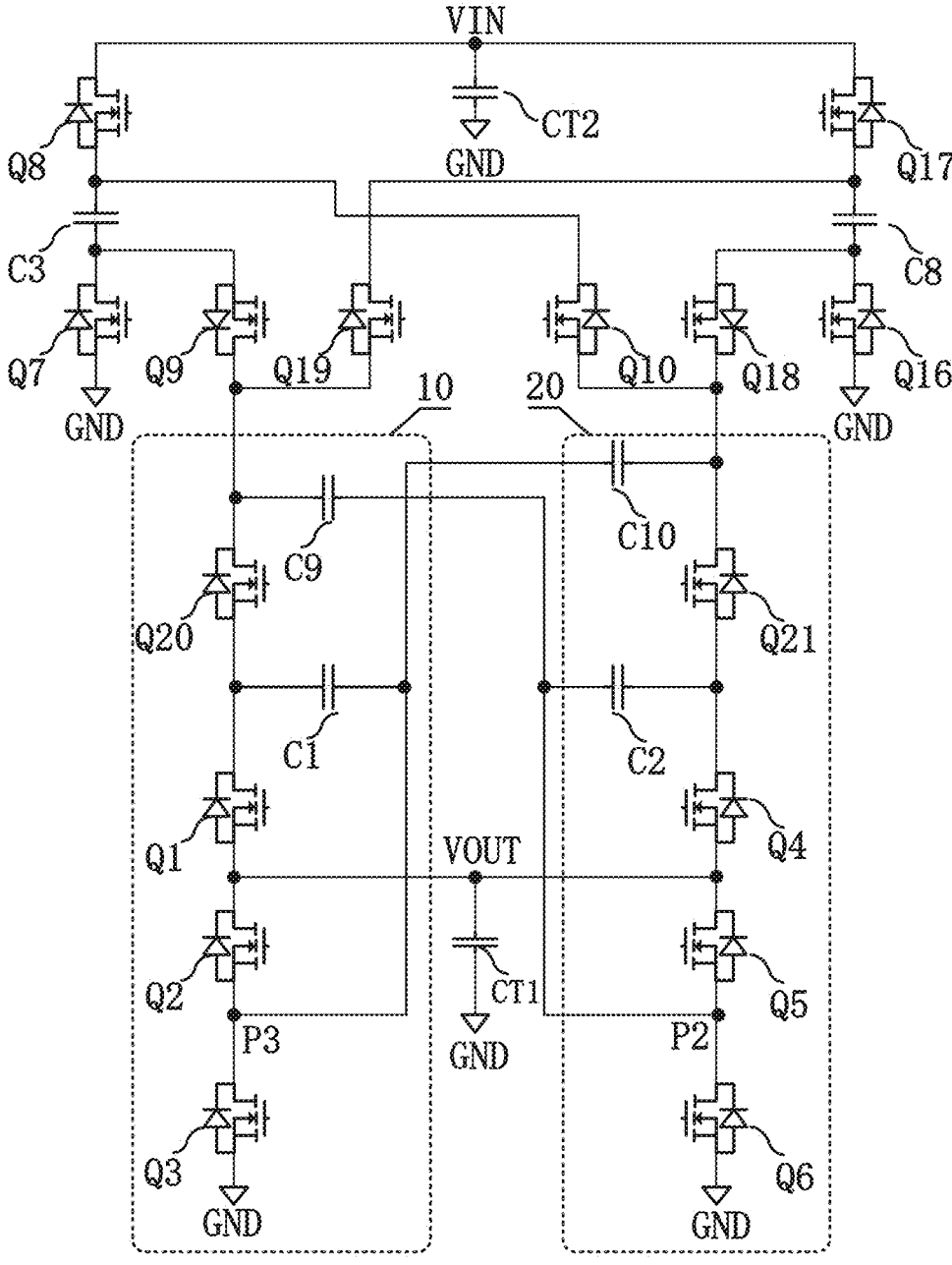
Figure 47:
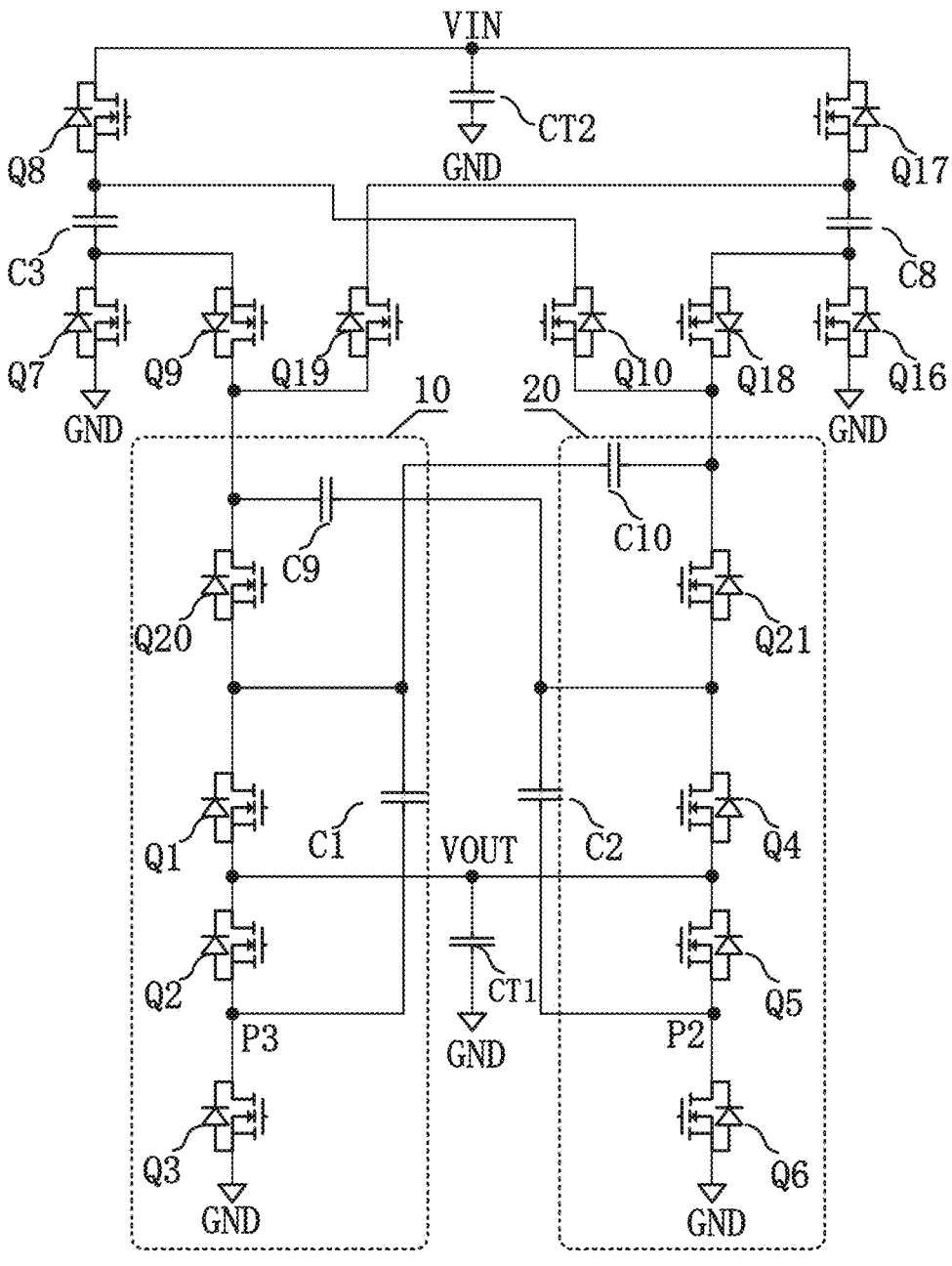
Figure 48:
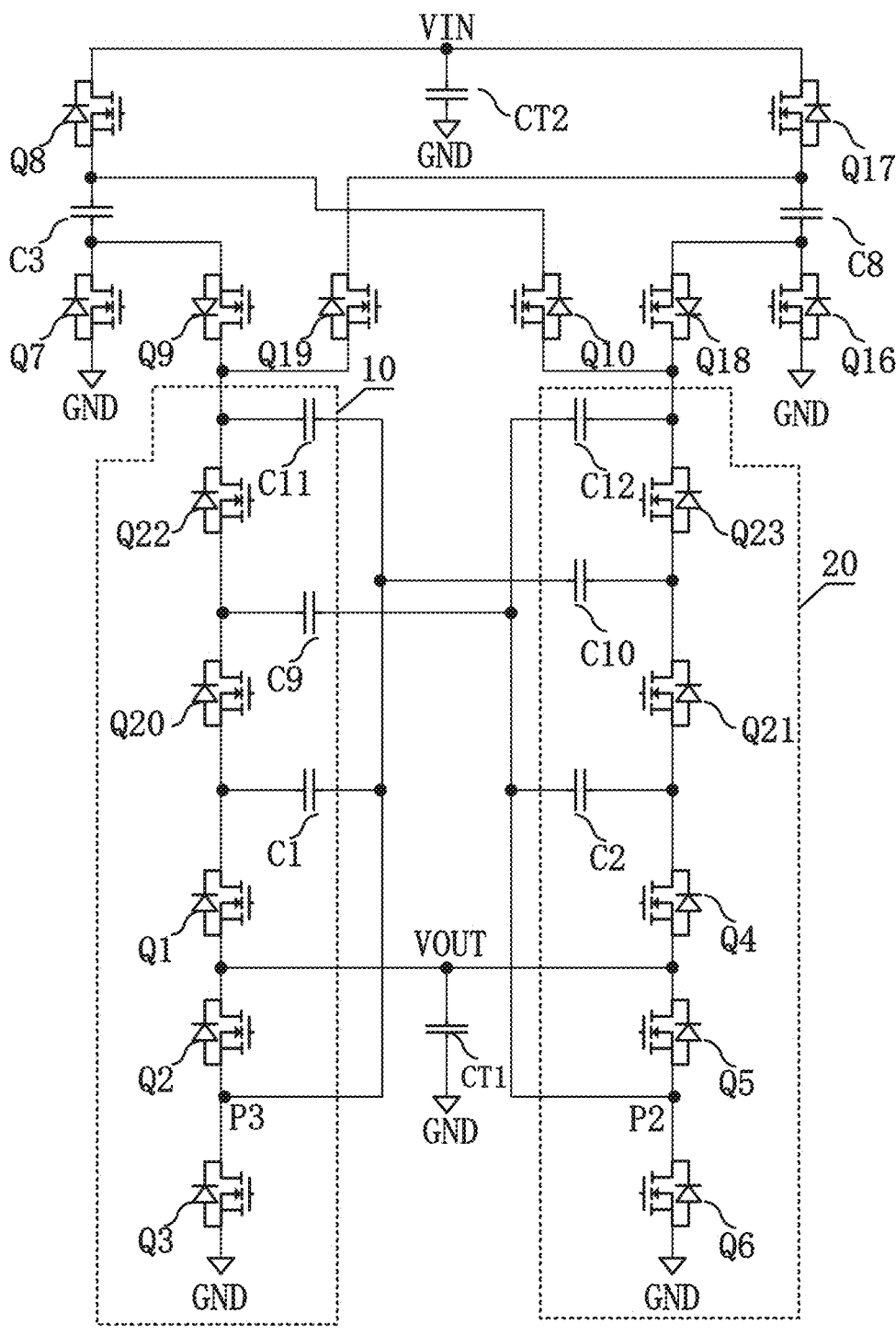
Figure 49:
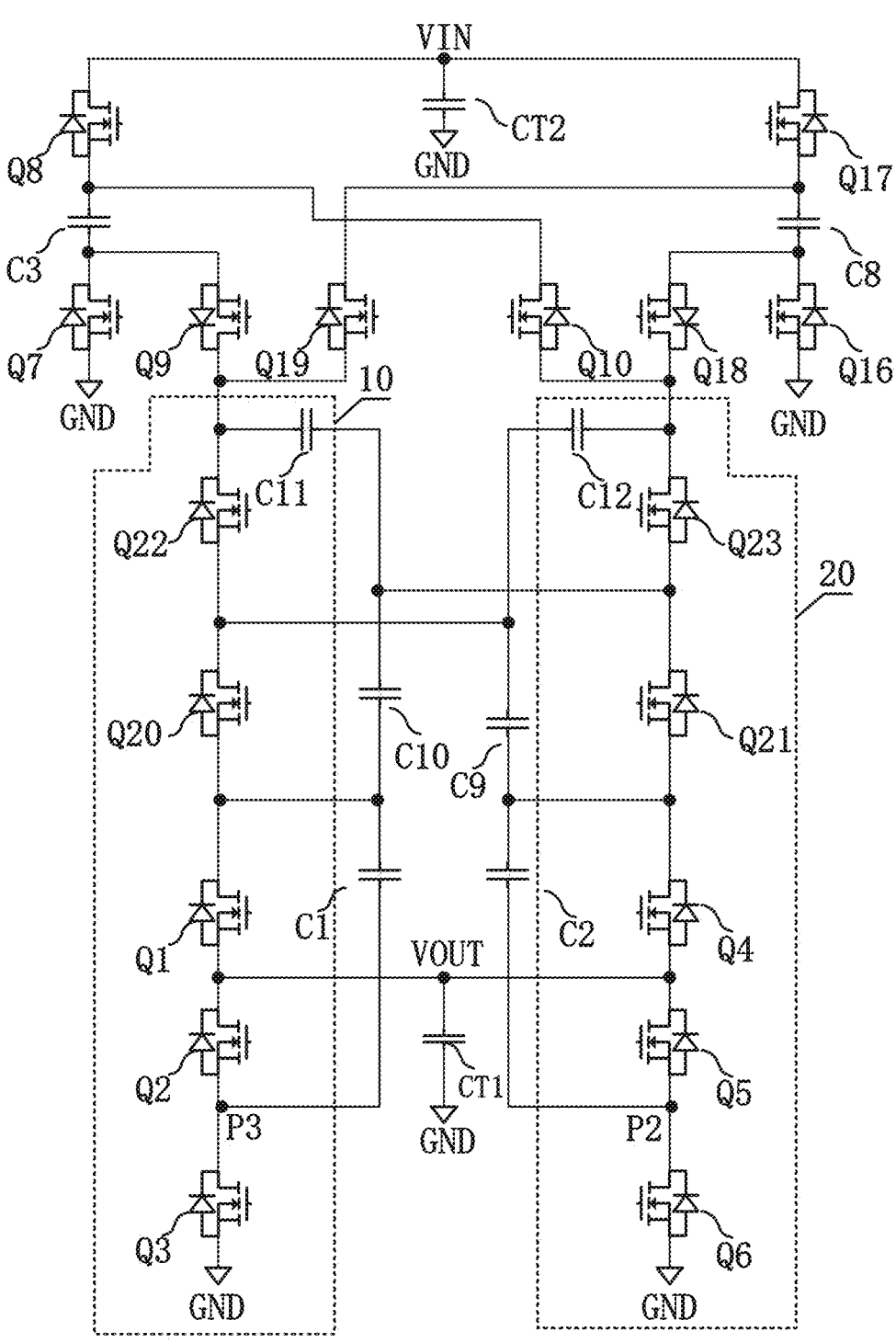

7 single-phase switched capacitor converters in accordance with various embodiments of the present disclosure;

FIG. 36 illustrates a schematic diagram of a 4:1 single-phase switched capacitor converter in accordance with various embodiments of the present disclosure;

FIG. 37 illustrates a first control method applicable to the 4:1 single-phase switched capacitor converter shown in FIG. 36 in accordance with various embodiments of the present disclosure;

FIG. 38 illustrates a second control method applicable to the 4:1 single-phase switched capacitor converter shown in FIG. 36 in accordance with various embodiments of the present disclosure;

FIG. 39 illustrates a third control method applicable to the 4:1 single-phase switched capacitor converter shown in FIG. 36 in accordance with various embodiments of the present disclosure;

FIG. 40 illustrates a schematic diagram of a first implementation of a 6:1 single-phase switched capacitor converter in accordance with various embodiments of the present disclosure;

FIG. 40(A) illustrates a schematic diagram of a second implementation of a 6:1 single-phase switched capacitor converter in accordance with various embodiments of the present disclosure;

FIG. 41 illustrates a schematic diagram of a first implementation of an 8:1 single-phase switched capacitor converter in accordance with various embodiments of the present disclosure;

FIG. 41(A) illustrates a schematic diagram of a second implementation of an 8:1 single-phase switched capacitor converter in accordance with various embodiments of the present disclosure;

FIG. 42 illustrates a schematic diagram of a 4:1 dual-phase switched capacitor converter in accordance with various embodiments of the present disclosure;

FIG. 43 illustrates a first control method applicable to the 4:1 dual-phase switched capacitor converter shown in FIG. 42 in accordance with various embodiments of the present disclosure;

FIG. 44 illustrates a second control method applicable to the 4:1 dual-phase switched capacitor converter shown in FIG. 42 in accordance with various embodiments of the present disclosure;

FIG. 45 illustrates a third control method applicable to the 4:1 dual-phase switched capacitor converter shown in FIG. 42 in accordance with various embodiments of the present disclosure;

FIG. 46 illustrates a schematic diagram of a first implementation of a 6:1 dual-phase switched capacitor converter in accordance with various embodiments of the present disclosure;

FIG. 47 illustrates a schematic diagram of a second implementation of a 6:1 dual-phase switched capacitor converter in accordance with various embodiments of the present disclosure;

FIG. 48 illustrates a schematic diagram of a first implementation of an 8:1 dual-phase switched capacitor converter in accordance with various embodiments of the present disclosure;

FIG. 49 illustrates a schematic diagram of a second implementation of an 8:1 dual-phase switched capacitor converter in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely to a high efficiency switched capacitor converter. The invention may also be applied, however, to a variety of power systems. Hereinafter, various embodiments will be explained in detail with reference to the accompanying drawings.

Figure 3:
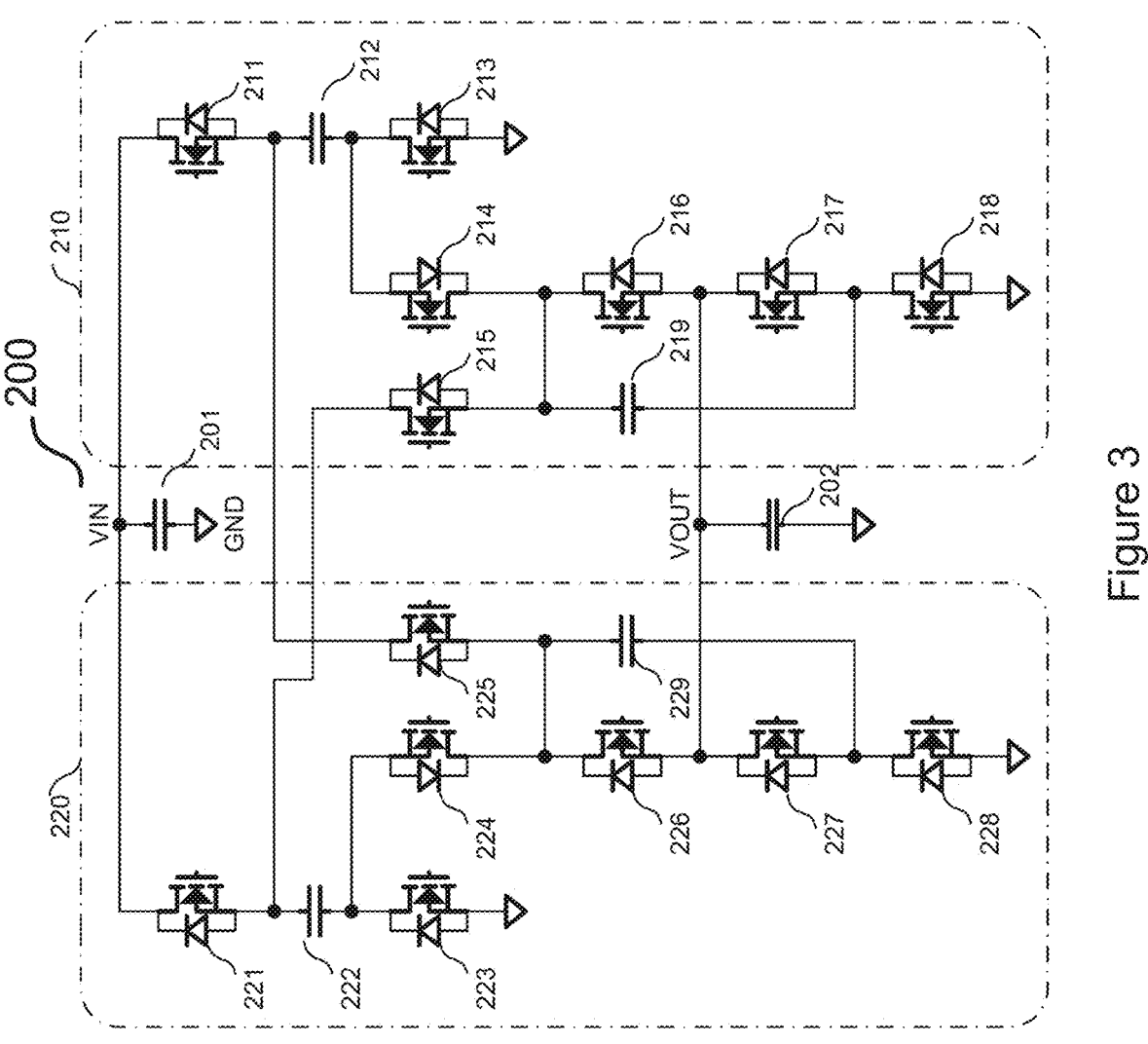
FIG. 3 illustrates a schematic diagram of a 4:1 dual-phase switched capacitor converter in accordance with various embodiments of the present disclosure.

FIG. 3 illustrates a schematic diagram of a 4:1 dual-phase switched capacitor converter in accordance with various embodiments of the present disclosure. The 4:1 dual-phase switched capacitor converter 200 comprises fourteen switches, four flying capacitors, one input capacitor and one output capacitor. A first phase 210 of the 4:1 dual-phase switched capacitor converter includes seven switches 211, 213, 214, 215, 216, 217, and 218 coupled between a power source VIN and the ground GND. A flying capacitor 212 is connected in series with switches 211 and 213 between VIN and ground. A flying capacitor 219 is connected between a common node of switches 214, 216 and a common node of switches 217, 218.

A second phase 220 of the 4:1 dual-phase switched capacitor converter includes seven switches 221, 223, 224, 225, 226, 227, and 228 coupled between the power source VIN and the ground GND. A flying capacitor 222 is connected in series with switches 221 and 223 between VIN and ground. A flying capacitor 229 is connected between a common node of switches 224, 226 and a common node of switches 227, 228. An input capacitor 201 is connected between VIN and ground to filter the input voltage. An output capacitor 202 is connected between VOUT and ground to filter the output voltage. Throughout the description, a first leg of the 4:1 dual-phase switched capacitor converter is a switch leg comprising switches 224, 226, 227 and 228. A second leg of the 4:1 dual-phase switched capacitor converter is a switch leg comprising switches 215, 216, 217 and 218. Switch 223 may be referred to as a first upper switch. Switch 221 may be referred to as a second upper switch. Switch 213 may be referred to as a third upper switch. Switch 211 may be referred to as a fourth upper switch. Switch 225 may be referred to as a fifth upper switch. Switch 214 may be referred to as a sixth upper switch.

In operation, the 4:1 dual-phase switched capacitor converter 200 functions as a 4:1 step-down charge pump. All switches switch alternately with a 50% duty cycle at a specific operating frequency.

Figure 4:
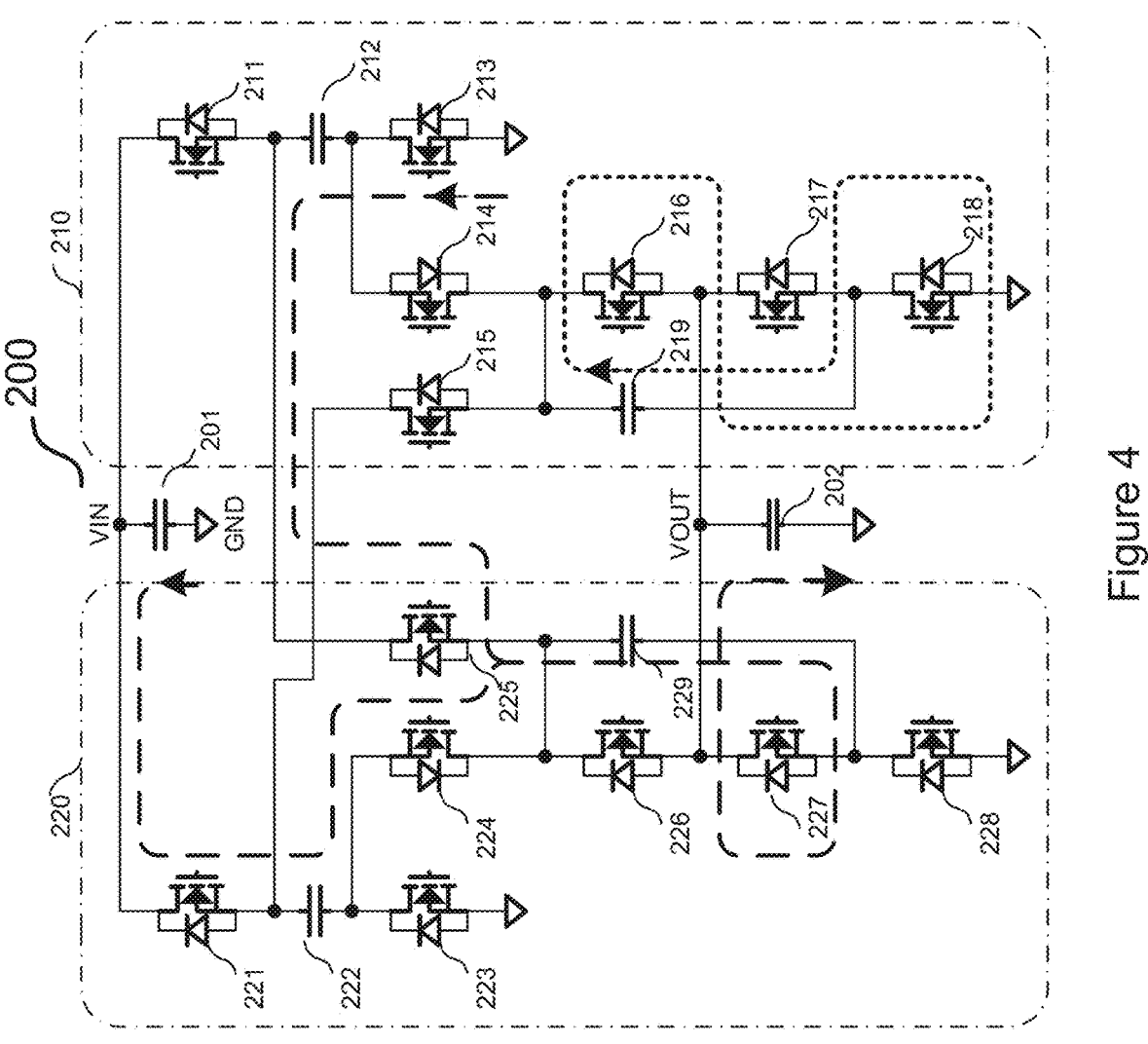
FIG. 4 illustrates the 4:1 dual-phase switched capacitor converter configured to operate in a first half cycle in accordance with various embodiments of the present disclosure.

FIG. 4 illustrates the 4:1 dual-phase switched capacitor converter configured to operate in a first half cycle in accordance with various embodiments of the present disclosure. The switches 213, 216, and 218 are turned on, and the switches 211, 214, 215, and 217 are turned off. The flying capacitor 219 charges the output capacitor 202 through switches 216 and 218. In addition, the flying capacitor 219 supplies power to the output terminal VOUT (the current path is indicated by the dotted line in FIG. 4). Since the flying capacitor 219 and the output capacitor 202 are connected in parallel, the average voltage on the flying capacitor 219 is equal to the output voltage VOUT.

In the first half cycle, the switches 221, 224, 225, and 227 are also turned on, and the switches 223, 226, and 228 are turned off. The flying capacitors 222, 229 and the output capacitor 202 are connected in series. VIN charges the flying capacitors 222, 229 and the output capacitor 202 through switches 221, 224 and 227. In addition, VIN supplies power to the output terminal VOUT (the current path is indicated by the dashed line in FIG. 4). The flying capacitors 222 and 229 and the output capacitor 202 are connected in series. The sum of the average voltages on the three capacitors is equal to the input voltage VIN. At the same time, the flying capacitor 229 and the output capacitor 202 are connected in series. The flying capacitor 212 charges the flying capacitor 229 and the output capacitor 202 through switches 213, 225 and 227 (the current path is indicated by the dashed line in FIG. 4). In addition, the flying capacitor 212 supplies power to the output terminal VOUT. The flying capacitor 229 and the output capacitor 202 are connected in series. The flying capacitor 212 is connected in parallel with the series-connected capacitors 229 and 202. Therefore, the average voltage on the flying capacitor 212 is equal to the sum of the average voltages on the flying capacitor 229 and the output capacitor 202.

Figure 5:
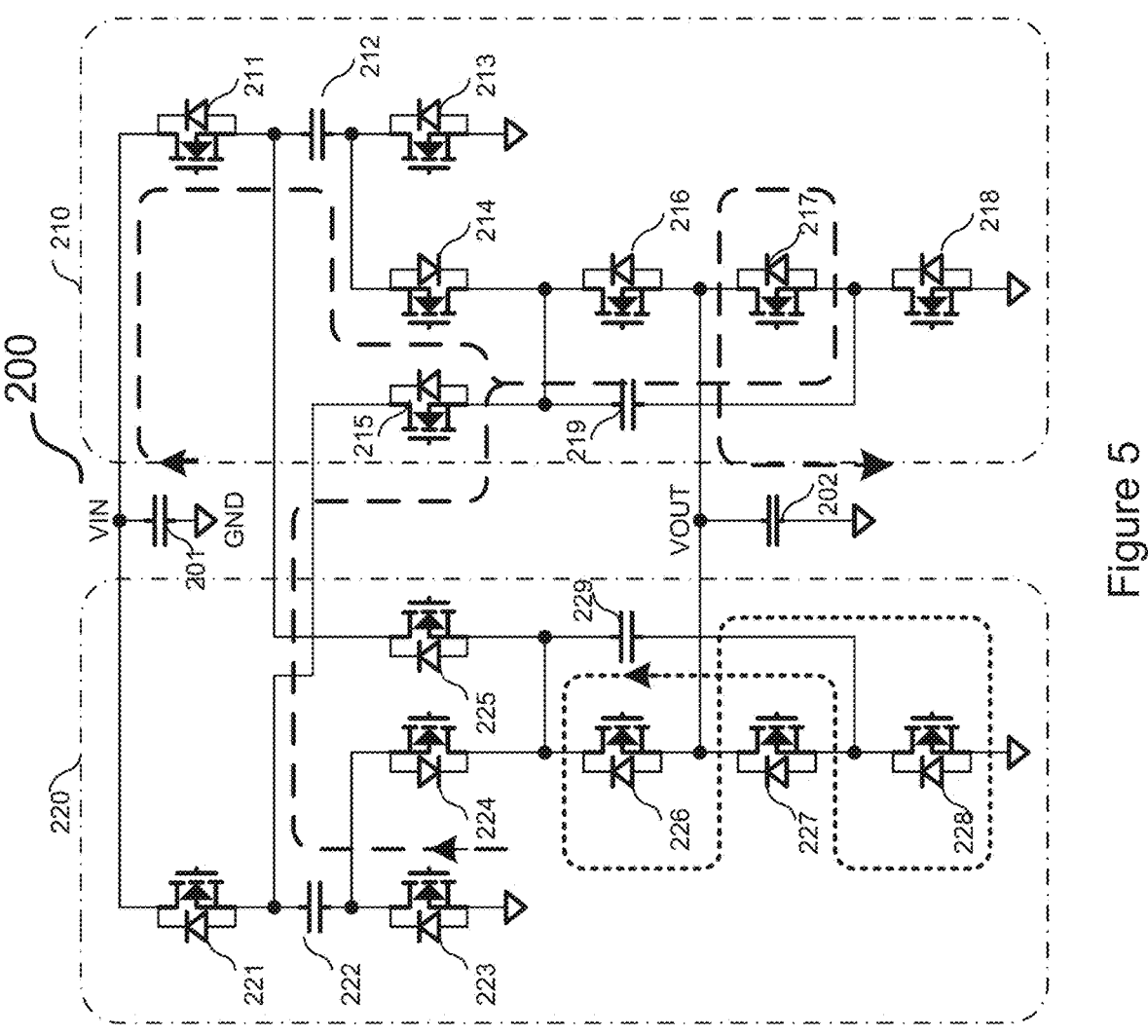
FIG. 5 illustrates the 4:1 dual-phase switched capacitor converter configured to operate in a second half cycle in accordance with various embodiments of the present disclosure.

FIG. 5 illustrates the 4:1 dual-phase switched capacitor converter configured to operate in a second half cycle in accordance with various embodiments of the present disclosure. The switches 211, 214, 215, and 217 are turned on, and the switches 213, 216, and 218 are turned off. The flying capacitors 212, 219 and the output capacitor 202 are connected in series. VIN charges the flying capacitors 212, 219 and the output capacitor 202 through switches 211, 214, and 217 (the current path is indicated by the dashed line in FIG. 5). In addition, VIN supplies power to the output terminal VOUT. The flying capacitors 212, 219 and the output capacitor 202 are connected in series. The sum of the average voltages on the three capacitors is equal to the input voltage VIN. As described in the first half cycle, the average voltage across the flying capacitor 219 is equal to the output voltage VOUT. Therefore, the average voltage on the flying capacitor 212 is equal to twice the output voltage VOUT. The sum of the voltages on the flying capacitors 212, 219 and the output capacitor 202 is equal to the input voltage VIN. Therefore, the voltage on the flying capacitor 212 is equal to one half of the input voltage VIN.

Also, in the second half cycle, the switches 223, 226, and 228 are turned on, and the switches 221, 224, 225, and 227 are turned off. The flying capacitor 229 charges the output capacitor 202 through the switches 226 and 228 (the current path is indicated by the dotted line in FIG. 5). In addition, the flying capacitor 229 supplies power to the output terminal VOUT. At this time, the flying capacitor 229 and the output capacitor 202 are connected in parallel. Therefore, the average voltage on the flying capacitor 229 is equal to the output voltage VOUT. At the same time, the flying capacitor 219 and the output capacitor 202 are connected in series. The flying capacitor 222 charges the flying capacitor 219 and the output capacitor 202 through switches 223, 215, and 217 (the current path is indicated by the dashed line in FIG. 5). In addition, the flying capacitor 222 supplies power to the output terminal VOUT.

The flying capacitor 219 and the output capacitor 202 are connected in series and further connected in parallel with the flying capacitor 222. Therefore, the average voltage on the flying capacitor 222 is equal to the sum of the average voltage on the flying capacitor 219 and the output capacitor 202. As mentioned above, the average voltage on the flying capacitor 219 is equal to the output voltage VOUT. As such, the average voltage on the flying capacitor 212 is equal to twice the output voltage VOUT. In other words, the average voltage on the flying capacitor 212 is equal to one half of the input voltage VIN.

In operation, when the switching frequency is fast enough, the voltages on the flying capacitors 212 and 222 fluctuate around one half (VIN/2) of the input voltage VIN with the change of each switching state. The voltage on the flying capacitors 219 and 229 and the output capacitor 202 fluctuates around a quarter (VIN/4) of the input voltage VIN with each change of the switching state. The constant value of the output capacitor 202 is one-fourth (VIN/4) of the input voltage VIN. The power conversion ratio of the dual-phase switched capacitor converter shown in FIGS. 4-5 is equal to 4:1.

Referring back to FIG. 3, if the switches 211, 213, 221, and 223 are configured to operate in an always-on mode during normal operation, and the switches 214, 224 are configured to operate in an always-off mode, the remaining switches configured to operate at a specific operating frequency with a 50% duty cycle is switched alternately. In this configuration, flying capacitors 212 and 222 are connected between VIN and GND. The voltages across the flying capacitors 212 and 222 are equal to the input voltage VIN.

In a first half cycle, the switches 216 and 218 are turned on, and the switches 215 and 217 are turned off. The switches 225 and 227 are turned on, and the switches 226 and 228 are turned off. The flying capacitor 229 and the output capacitor 202 connected in series. VIN charges the flying capacitor 229 and the output capacitor 202 through switches 211, 225 and 227. In addition, VIN supplies power to the output terminal VOUT. At this time, the flying capacitor 229 and the output capacitor 202 are connected in series. The sum of the average voltages on the flying capacitor 229 and the output capacitor 202 is equal to the input voltage VIN.

Also, in the first half cycle, the flying capacitor 219 charges the output capacitor 202 through switches 216 and 218. In addition, the flying capacitor 219 supplies power to the output terminal VOUT. Because the flying capacitor 219 is connected in parallel with the output capacitor 202, the average voltage on the flying capacitor 219 is equal to the output voltage VOUT.

In a second half cycle, the switches 215 and 217 are turned on and the switches 216 and 218 are turned off. The switches 226 and 228 are turned on, and the switches 225 and 227 are turned off. The flying capacitor 219 and the output capacitor 202 connected in series. VIN charges the flying capacitor 219 and the output capacitor 202 through switches 221, 215 and 217. In addition, VIN supplies power to the output terminal VOUT. At this time, the flying capacitor 219 and the output capacitor 202 are connected in series. The sum of the average voltages on the flying capacitor 219 and the output capacitor 202 is equal to the input voltage VIN. As mentioned above, the average voltage of the flying capacitor 219 is equal to the output voltage VOUT. Therefore, the average voltages on the flying capacitor 219 and the output capacitor 202 are equal to one half of the input voltage (VIN/2).

Also, in the second half cycle, the flying capacitor 229 charges the output capacitor 202 through switches 226 and 228. In addition, the flying capacitor 229 supplies power to the output terminal VOUT. Because the flying capacitor 229 is connected in parallel with the output capacitor 202, the average voltage on the flying capacitor 229 is equal to the output voltage VOUT. The output voltage is equal to one half of the input voltage (VIN/2).

In operation, when the switching frequency is fast enough, the voltages on the flying capacitors 219, 229, and the output capacitor 202 fluctuate around a constant value (VIN/2) with each switching state. The power conversion ratio of the dual-phase switched capacitor converter is equal to 2:1.

From the previous analysis, the following conclusions can be drawn: the power converter in the present disclosure only needs fourteen switches, four flying capacitors, one input capacitor and one output capacitor. At the same time, the maximum voltage on the flying capacitors is one half of the input voltage (VIN/2) instead of three-quarters of the input voltage (3×VIN/4).

Through the foregoing description, various embodiments of the present disclosure show that during the charging and discharging processes of the flying capacitors 212 and 222, three switches are connected in series to establish the charging and discharging paths. It is the same as the flying capacitors 120 and 140 in the Dickson dual-phase switched capacitor converter. The effective value of the current flowing through the flying capacitors in the present disclosure is the same as that in the Dickson dual-phase switched capacitor converter. As such, the power consumption of the present disclosure is the same as that in the Dickson dual-phase switched capacitor converter.

Figure 1:
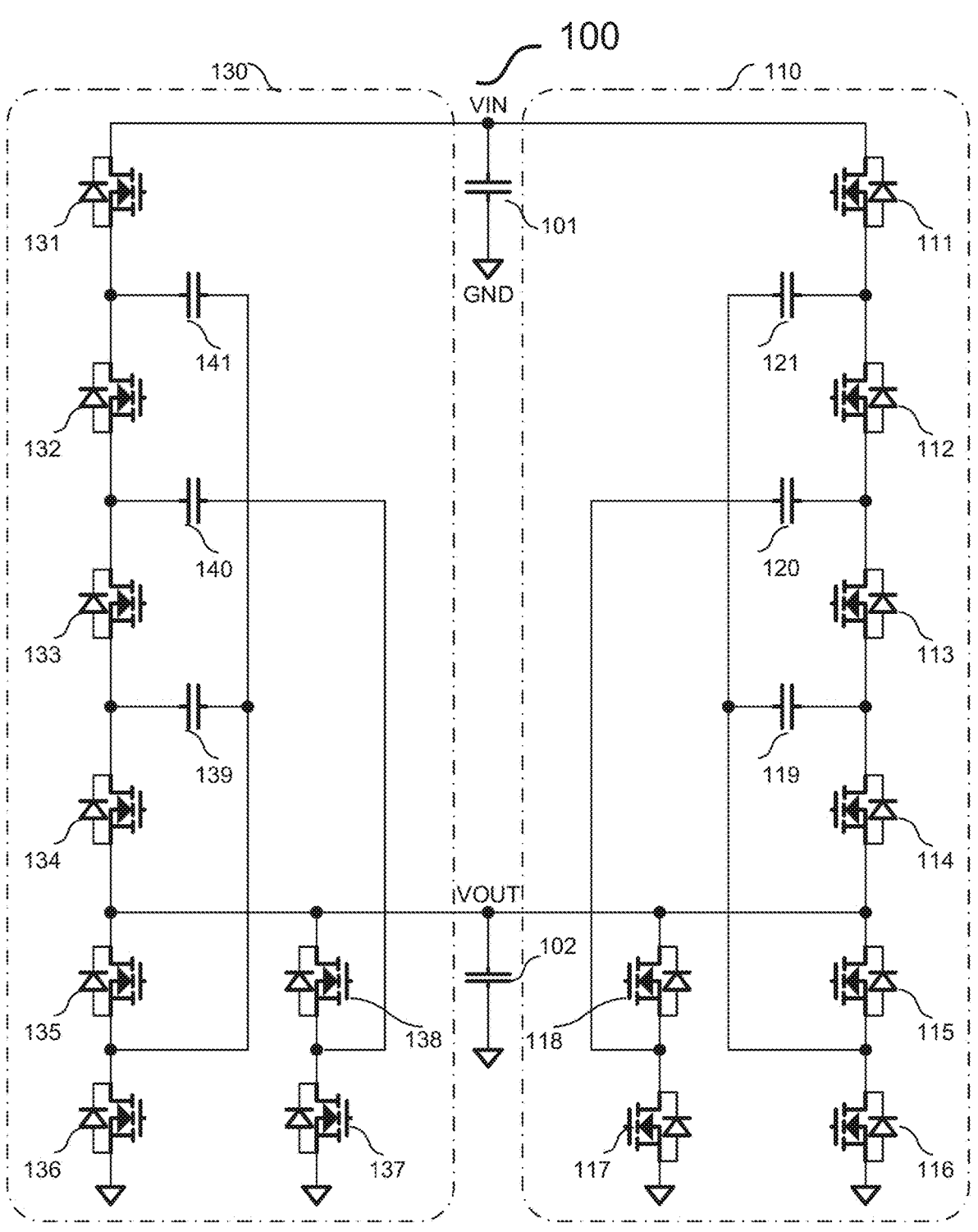
FIG. 1 illustrates a schematic diagram of a 4:1 Dickson dual-phase switched capacitor converter.
Figure 2:
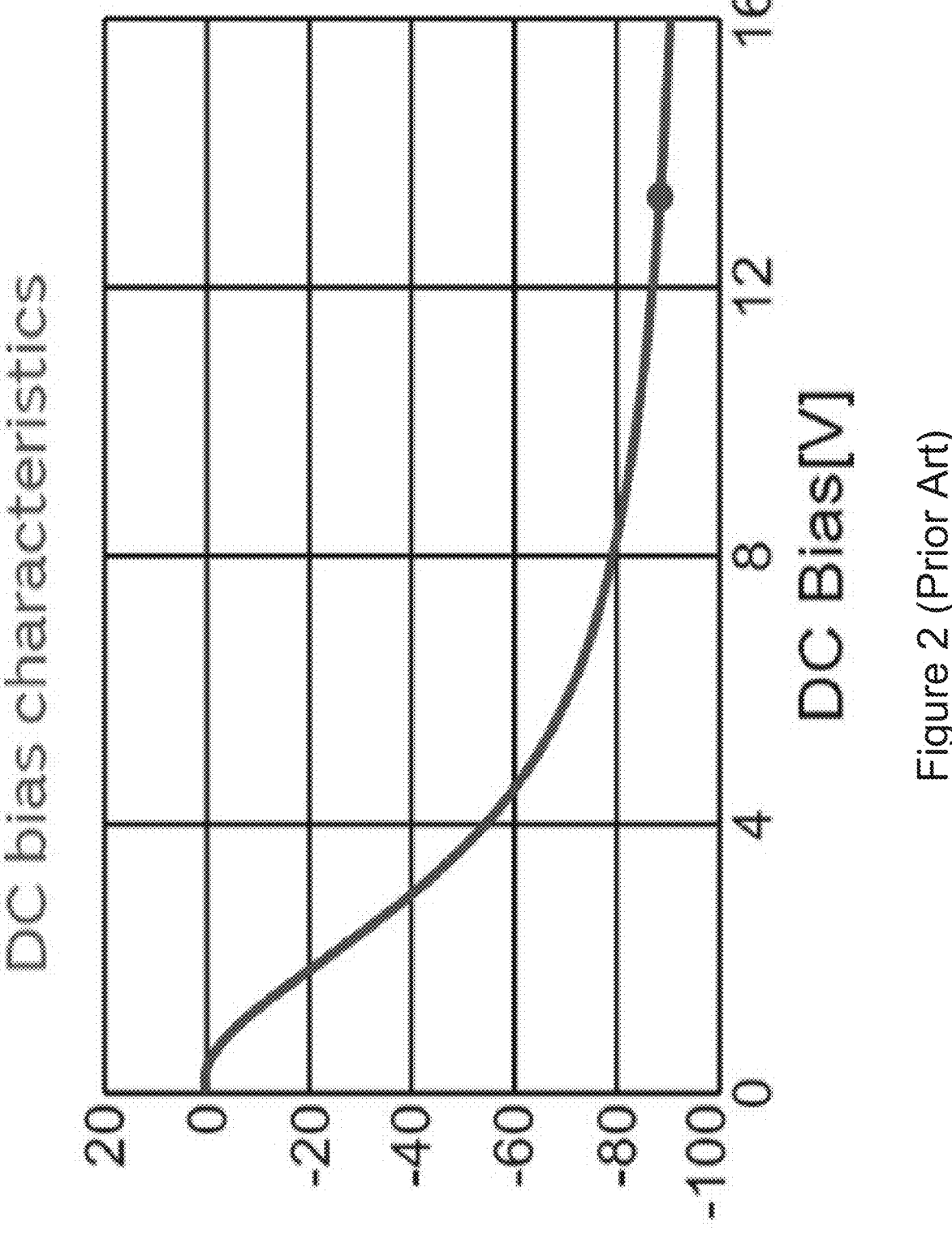
FIG. 2 shows the capacitance value variation in response to different DC bias voltages.

Through the foregoing description, various embodiments of the present disclosure show that during the charging process of the flying capacitors 219 and 229, three switches are connected in series to establish the charging paths. During the discharging process of the flying capacitors 219 and 229, two switches are connected in series to establish the discharging paths. It is the same as the flying capacitors 119 and 139 of the Dickson dual-phase switched capacitor converter. The effective value of the current flowing through the flying capacitors in the present disclosure is twice that in the Dickson dual-phase switched capacitor converter. This requires the on-resistance of the switches 216, 217, 218, 226, 227, and 228 to be the same as the switches 115, 116, 135, and 136 of the Dickson dual-phase switched capacitor converter. Since the present disclosure uses two less switches than the Dickson dual-phase switched capacitor converter, the four switches 117, 118, 137, and 138 in the Dickson dual-phase switched capacitor converter can be made into two switches under the same chip area. These two switches have the same on-resistance as switches 115, 116, 135, 136 so as to meet the on-resistance requirements of the six switches 216, 217, 218, 226, 227, and 228 in the present disclosure. Under this on-resistance arrangement, the dual-phase switched capacitor converter shown in FIG. 3 has the same efficiency as the Dickson dual-phase switched capacitor converter shown in FIG. 1. Because the present disclosure uses less two flying capacitors, and these two flying capacitors are the capacitors with the highest DC voltage bias in the Dickson dual-phase switched capacitor converter shown in FIG. 1, the dual-phase switched capacitor converter shown in FIG. 3 greatly reduces the requirements on the electrical characteristics and quantity of the flying capacitors, thereby reducing the circuit cost and PCB area.

Figure 6:
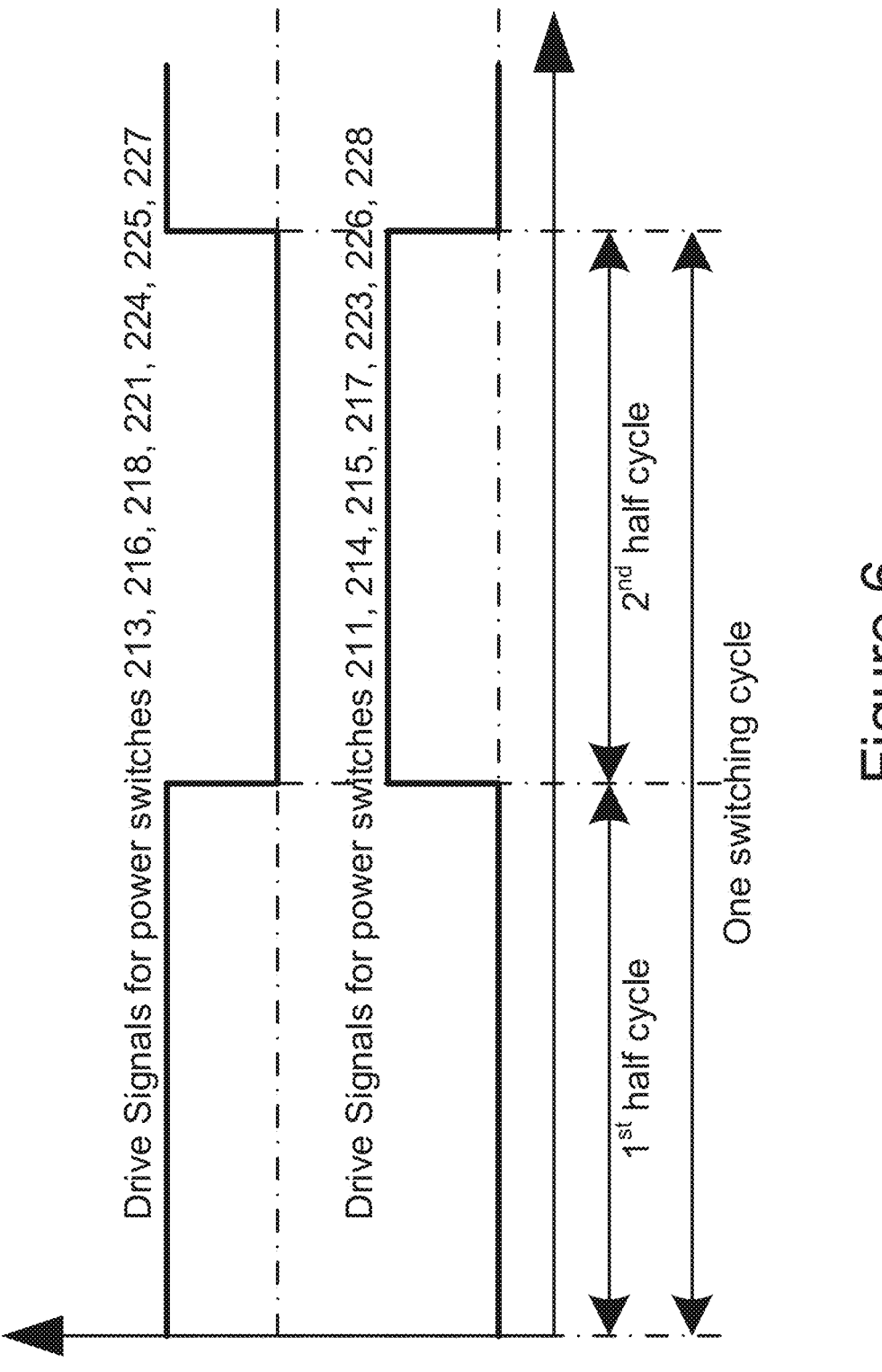
FIG. 6 illustrates the gate drive signals of the 4:1 dual-phase switched capacitor converter shown in FIG. 3 in accordance with various embodiments of the present disclosure.

FIG. 6 illustrates the gate drive signals of the 4:1 dual-phase switched capacitor converter shown in FIG. 3 in accordance with various embodiments of the present disclosure. As shown in FIG. 6, in a first half cycle, the switches 213, 216, 218, 221, 224, 225 and 227 are turned on, and the switches 211, 214, 215, 217, 223, 226 and 228 are turned off. In a second half cycle, the switches 213, 216, 218, 221, 224, 225 and 227 are turned off, and the switches 211, 214, 215, 217, 223, 226 and 228 are turned on.

Figure 7:
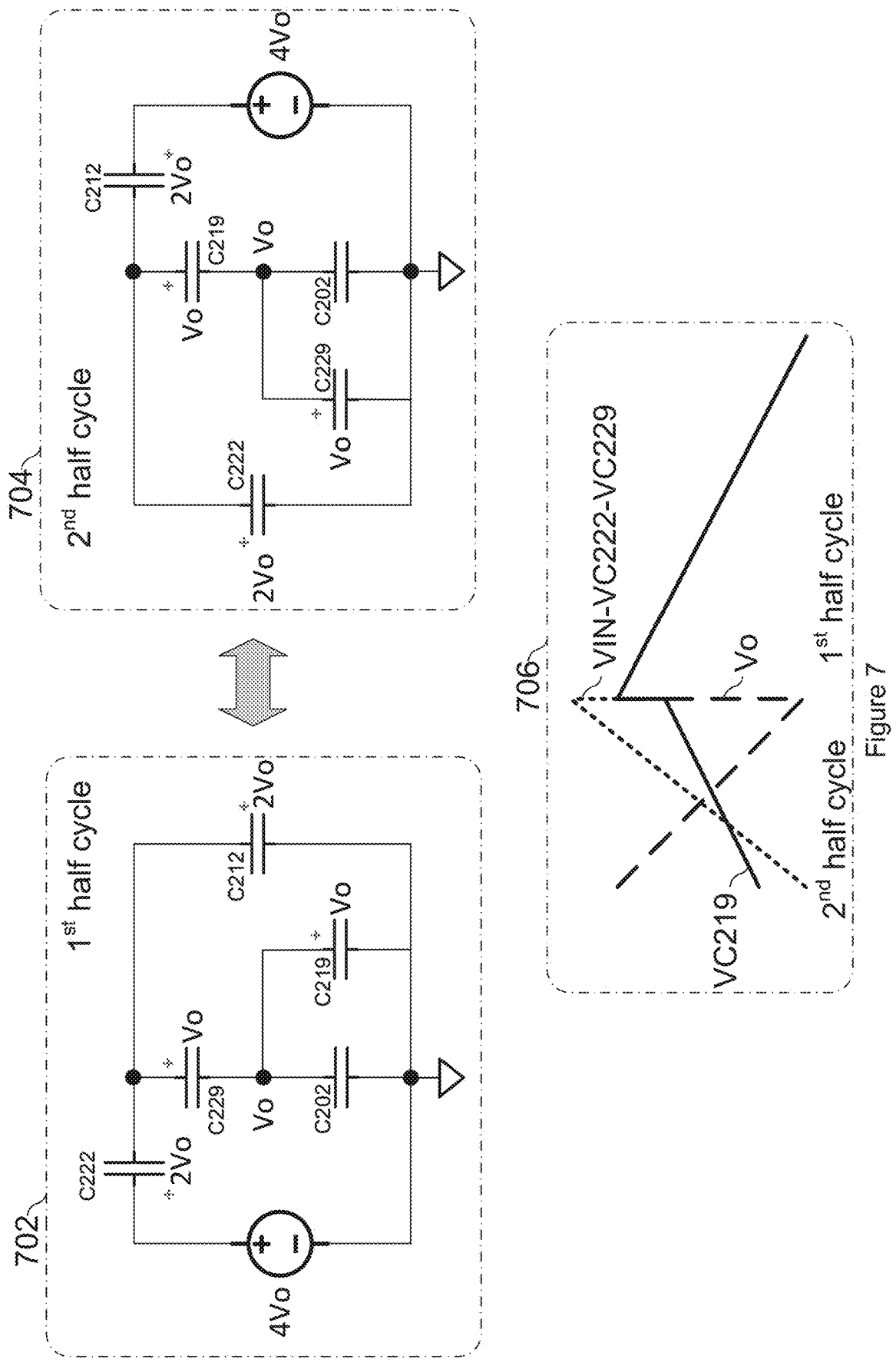
FIG. 7 illustrates two equivalent circuit diagrams for operating in two different half cycles in accordance with various embodiments of the present disclosure.

FIG. 7 illustrates two equivalent circuit diagrams for operating in two different half cycles in accordance with various embodiments of the present disclosure. Circuit 702 is the equivalent circuit of the dual-phase switched capacitor converter shown in FIG. 3 configured to operate in the first half cycle. Circuit 704 is the equivalent circuit of the dual-phase switched capacitor converter shown in FIG. 3 configured to operate in the second half cycle.

In the first half cycle, as indicated by circuit 702, VIN (4×Vo) charges C202 through a conductive path formed by C222 and C229. Through this conductive path, VIN also provides power to a load coupled to Vo. The flying capacitor C212 charges C202 through C229. C212 also provides power to the load coupled to Vo. The flying capacitor C219 and C202 are connected in parallel. The flying capacitor C219 charges C202 and provides power to the load coupled to Vo.

In the second half cycle, as indicated by circuit 704, VIN (4×Vo) charges C202 through a conductive path formed by C212 and C219. Through this conductive path, VIN also provides power to a load coupled to Vo. The flying capacitor C222 charges C202 through C219. C222 also provides power to the load coupled to Vo. The flying capacitor C229 and C202 are connected in parallel. The flying capacitor C229 charges C202 and provides power to the load coupled to Vo.

As indicated by the two equivalent circuits, the charging and discharging paths of the flying capacitor in the two half cycles are not symmetrical. This leads to the fact that when the input power supply Vin charges C202 through the flying capacitors C222 and C229, C202 is in parallel with the flying capacitor C219. At the same time, VIN and C219 provide power for the load. Due to the voltage difference between these two current supplying paths, charge transferring may occur between the flying capacitors on the two current supplying paths, thereby causing unnecessary charge sharing losses.

As shown in the voltage waveforms in the dashed rectangle 706, in the most part of the first half cycle, the voltage across C219 (VC219) and the voltage on Vo (Vin-VC222-VC229) are equal. In the second half cycle, due to the asymmetrical charging and discharging paths, the total voltage change rates of the two paths are not the same. As shown in the dashed rectangle 706, at the moment of entering the first half cycle, the voltage of the path connecting the power supply Vin (that is, Vin charges Vo through C222 and C229) is significantly higher than that of the path connecting C219 and Vo. This voltage difference causes Vin to supply power to the output capacitor and load through C222, C229. However, part of the current is used to charge C219 so as to reach the same voltage as the output capacitor C202. This charge transfer between flying capacitors (increasing the voltage of C219 to a higher level) is unnecessary, and causes significant power losses. The power losses can be avoided through using control mechanisms described below with respect to FIGS. 8-10.

Figure 8:
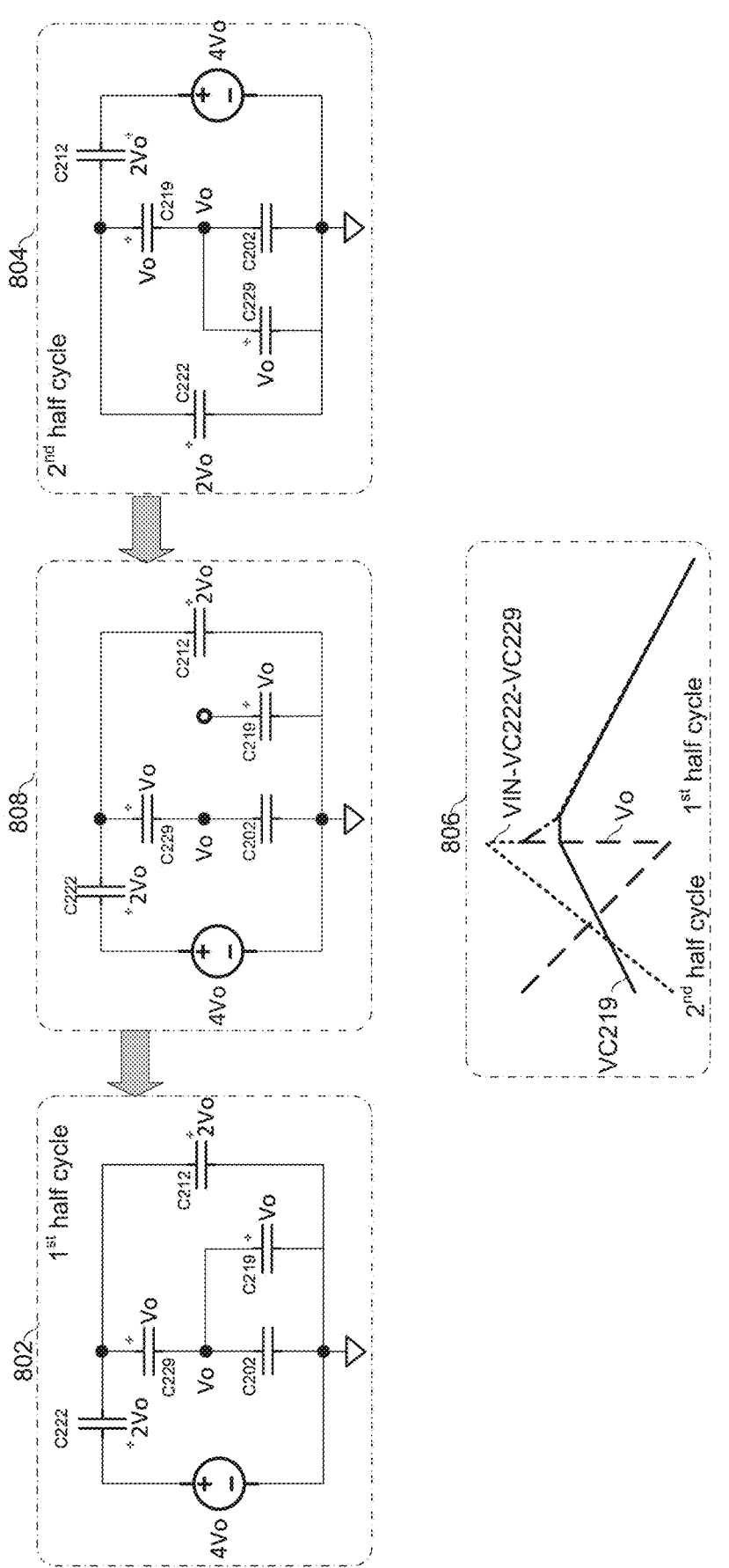
FIG. 8 illustrates three equivalent circuit diagrams for operating in two different half cycles in accordance with various embodiments of the present disclosure.

FIG. 8 illustrates three equivalent circuit diagrams for operating in two different half cycles in accordance with various embodiments of the present disclosure. The operating principle shown in FIG. 8 is similar to that shown in FIG. 7 except that a third equivalent circuit 808 is added to avoid the power loss caused by charge transferring between flying capacitors. As shown in FIG. 8, a transition period can be added between the first half cycle and the second half cycle. In the transition period, C219 is disconnected from C202. The voltage across C219 is maintained until the voltage of the path (Vin-VC222-VC229) is equal to the voltage on C219. Once the voltage (Vin-VC222-VC229) is equal to that on C219, C219 is connected in parallel with C202 to supply power to the output capacitor C202 and the load. The delayed connection of C219 can effectively reduce or eliminate the charge transferring, thereby reducing the power loss between the flying capacitors.

Figure 9:
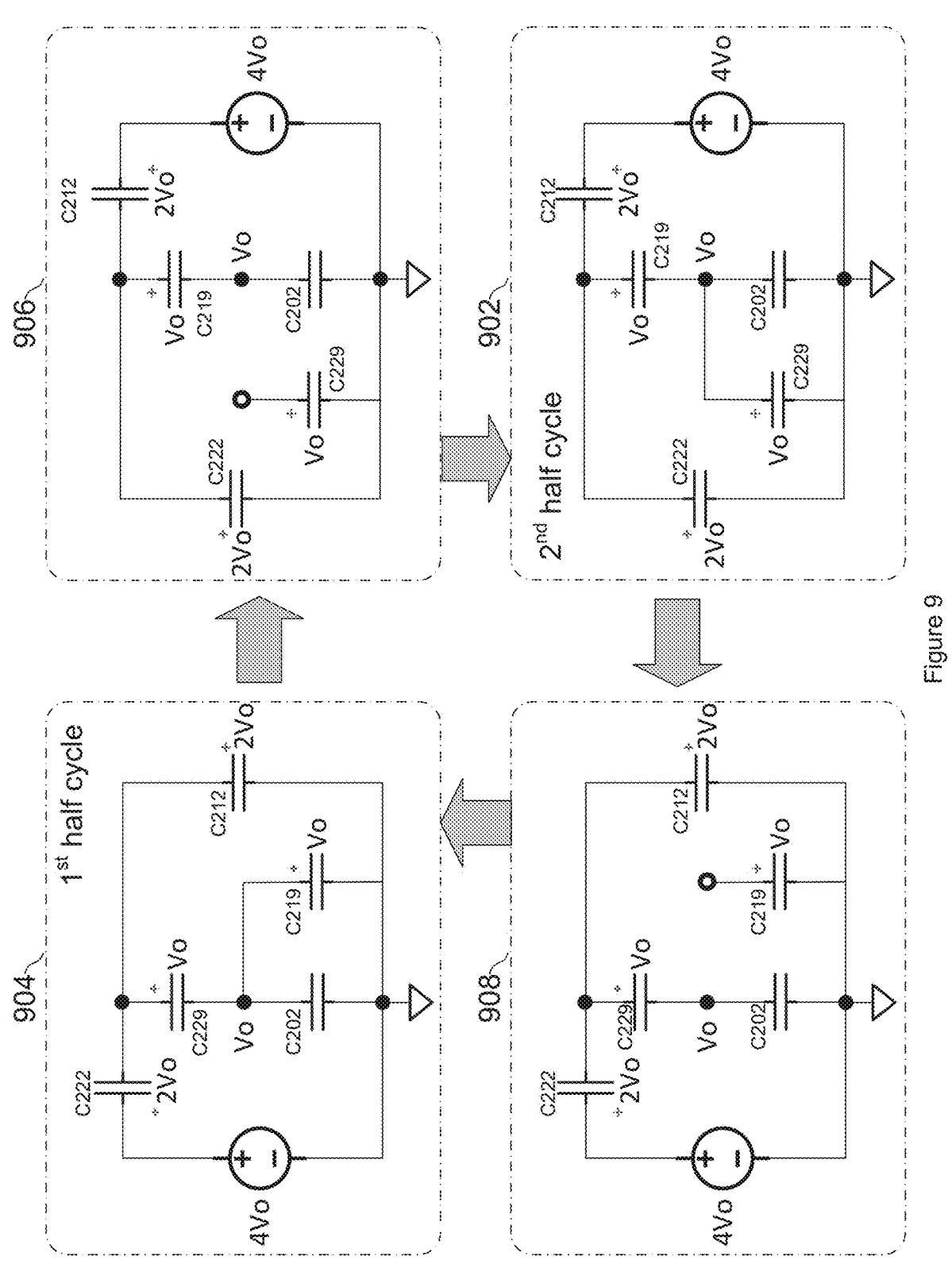
FIG. 9 illustrates four equivalent circuit diagrams for operating in two different operating modes in accordance with various embodiments of the present disclosure.

FIG. 9 illustrates four equivalent circuit diagrams for operating in two different operating modes in accordance with various embodiments of the present disclosure. The operating principle shown in FIG. 9 is similar to that shown in FIG. 8 except that a fourth equivalent circuit 906 is added to avoid the power loss caused by charge transferring. A first transition period shown in the dashed rectangle 908 is added during the transition from the second half cycle to the first half cycle. A second transition period shown in the dashed rectangle 906 is added during the transition from the first half cycle to the second half cycle.

Figure 10:
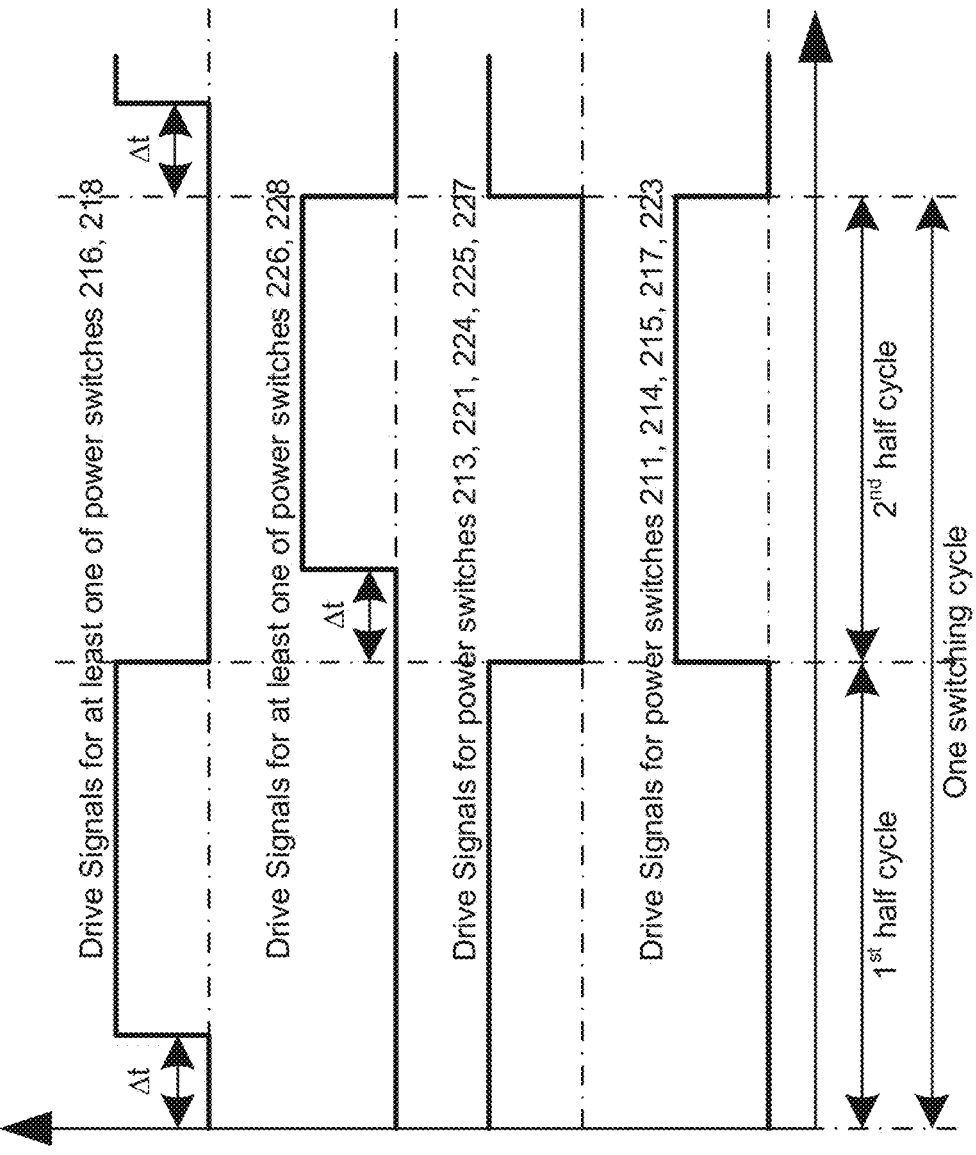
FIG. 10 illustrates the gate drive signals of the 4:1 dual-phase switched capacitor converter shown in FIG. 3 in accordance with various embodiments of the present disclosure.

FIG. 10 illustrates the gate drive signals of the 4:1 dual-phase switched capacitor converter shown in FIG. 3 in accordance with various embodiments of the present disclosure. As shown in FIG. 10, in a first half cycle, the switches 213, 221, 224, 225 and 227 are turned on, and the switches 211, 214, 215, 217, 223, 226 and 228 are turned off. The switches 216 and 218 are turned on after a first delay. The first delay is added according to the operating principle shown in the dashed rectangle 908 in FIG. 9. In a second half cycle, the switches 213, 216, 218, 221, 224, 225 and 227 are turned off, and the switches 211, 214, 215, 217 and 223 are turned on. The switches 226 and 228 are turned on after a second delay. The second delay is added according to the operating principle shown in the dashed rectangle 906 in FIG. 9.

It should be noted that the control mechanisms shown in FIGS. 8-10 is also applicable to the implementation of the higher step-down ratio power converters. For example, the control mechanisms are applicable to a 2×N:1 dual-phase switched capacitor converter described below with respect to FIG. 19.

According to the operating principle shown in FIG. 7, a large charge transfer current occurs between the capacitors at the moment of the transition between two different half cycles. After adding the first delay time and the second delay time shown in FIG. 10, the peak current can be effectively eliminated and the charge transfer loss can be reduced.

It should be noted the control mechanism described above with respect to FIG. 10 is applied to the 4:1 dual-phase switched capacitor converter, but it is understood that the control mechanism may be implemented using other types of switched capacitor converters described in the present disclosure.

Figure 11:
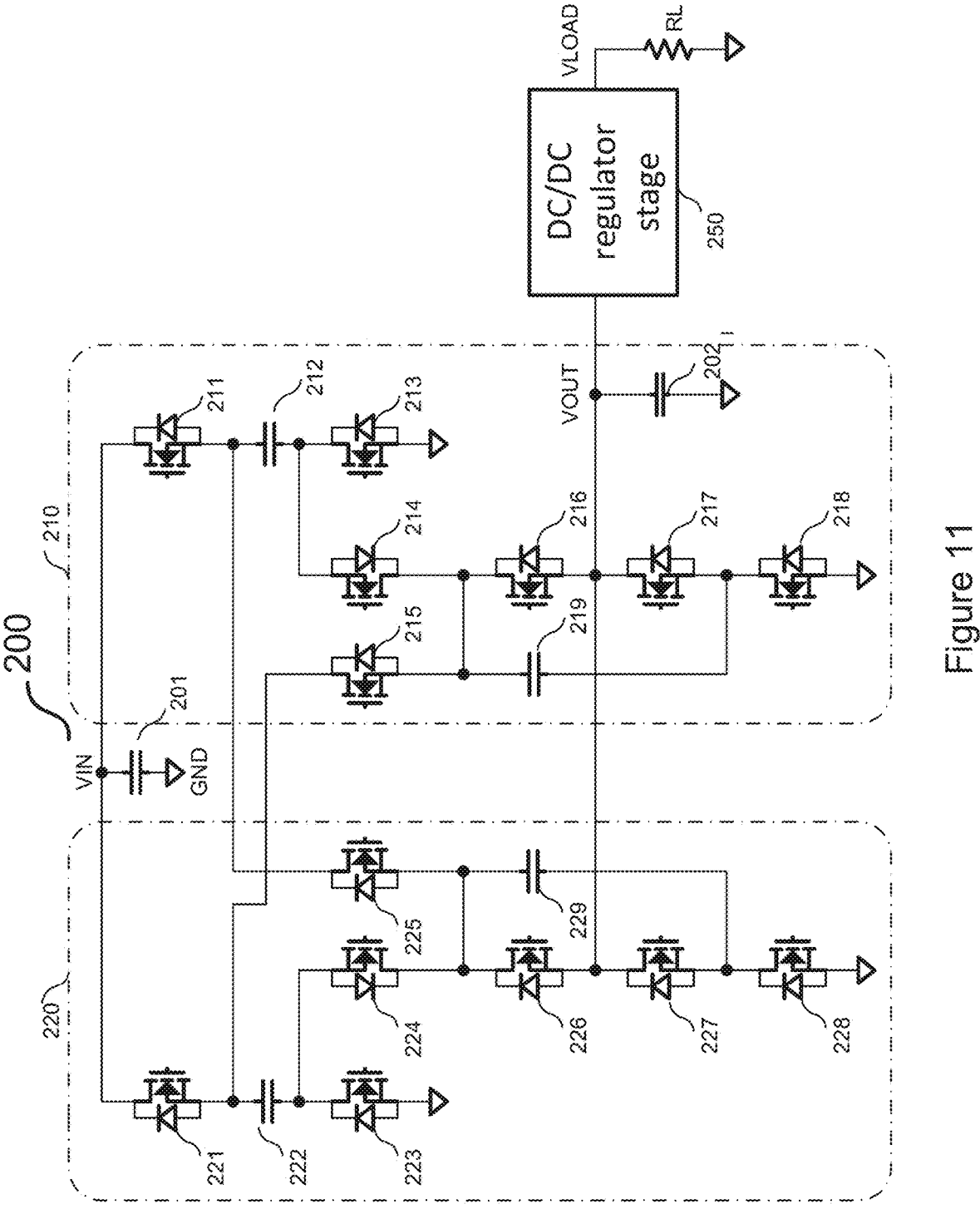
FIG. 11 illustrates a power conversion system including the 4:1 dual-phase switched capacitor converter and a DC/DC regulator stage connected in cascade in accordance with various embodiments of the present disclosure.

FIG. 11 illustrates a power conversion system including the 4:1 dual-phase switched capacitor converter and a DC/DC regulator stage connected in cascade in accordance with various embodiments of the present disclosure. Depending on different applications and design needs, the 4:1 dual-phase switched capacitor converter (e.g., converter 200) can be used as a front stage in a multi-level DC/DC conversion system to achieve a high-efficiency fixed-ratio voltage conversion. The 4:1 dual-phase switched capacitor converter and a DC/DC regulator stage 250 are connected in cascade between VIN and VLOAD. The DC/DC regulator stage 250 is employed to achieve dynamic voltage regulation. In this system, the output capacitor for the 4:1 dual-phase switched capacitor converter 200 can be very small, or the output capacitor can be removed. The small output capacitor is used only to filter out very high frequency components of VOUT, while allowing VOUT to vary in a frequency approximately equal to twice the switching frequency. The variations of VOUT allow soft charging and discharging of flying capacitors, which reduces the charge sharing loss caused by current spikes when charge transferring occurs between capacitors.

Figure 12:
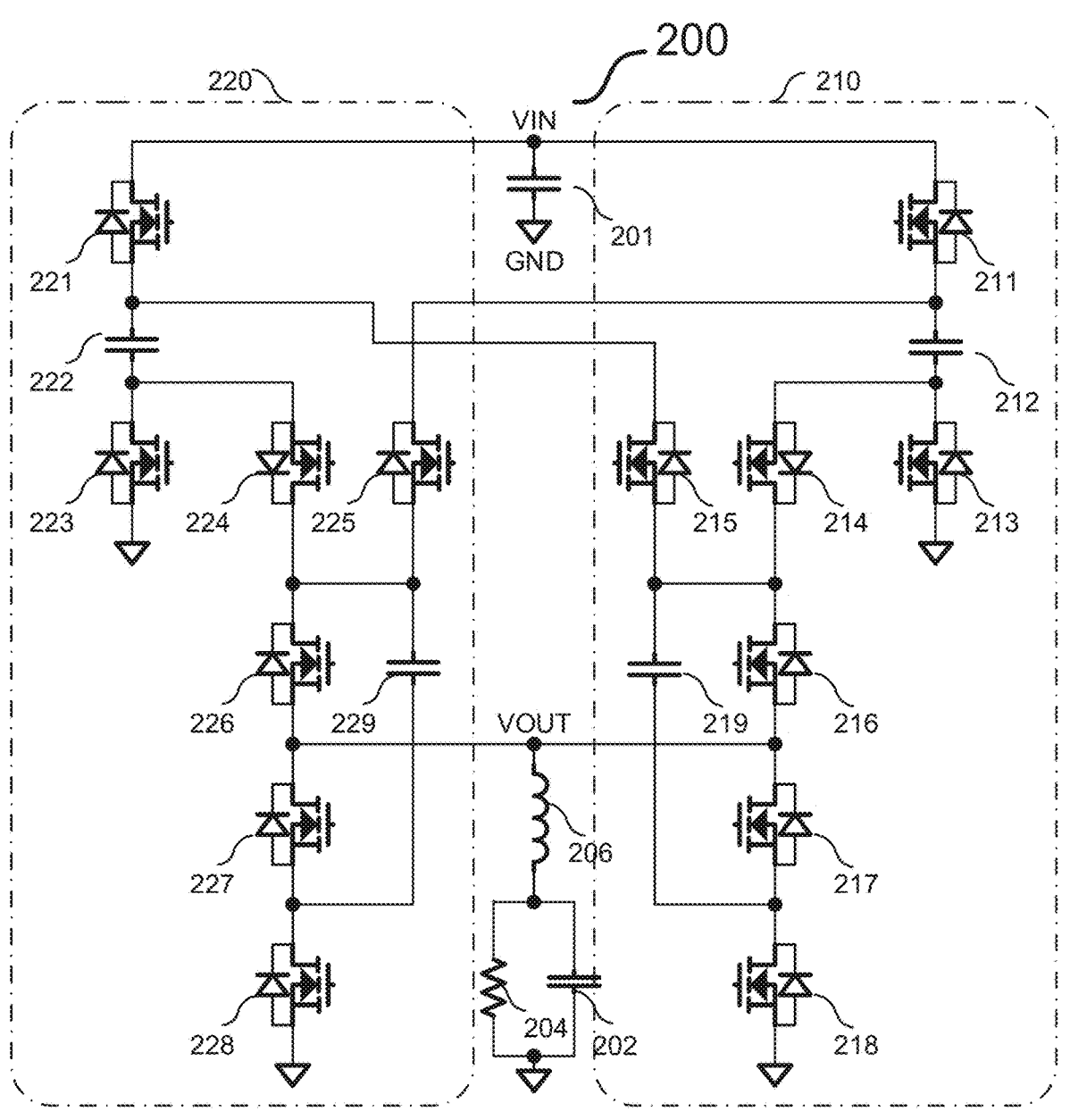
FIG. 12 illustrates a power conversion system including the 4:1 dual-phase switched capacitor converter and an output filter in accordance with various embodiments of the present disclosure.

FIG. 12 illustrates a power conversion system including the 4:1 dual-phase switched capacitor converter and an output filter in accordance with various embodiments of the present disclosure. The 4:1 dual-phase switched capacitor converter shown in FIG. 12 similar to that shown in FIG. 3 except that an LC filter is connected to VOUT. The LC filter comprises an inductor 206 and a capacitor 202. The capacitor 202 is connected in parallel with a load resistor 204. Similar to the circuit configuration illustrated in FIG. 11, the inductor at the output of the 4:1 dual-phase switched capacitor converter allows the voltage at VOUT to vary and limits the current spike when the output capacitor 202 is charged, which in turn allows soft charging and discharging of flying capacitors, which reduces the charge sharing loss caused by current spikes when charge transferring occurs between capacitors.

In some applications, the output current may be small. In order to further reduce the cost of chips and circuits and PCB area, the circuit in FIG. 3 can be simplified from a dual-phase converter to a single-phase converter shown in FIG. 13.

Figure 13:
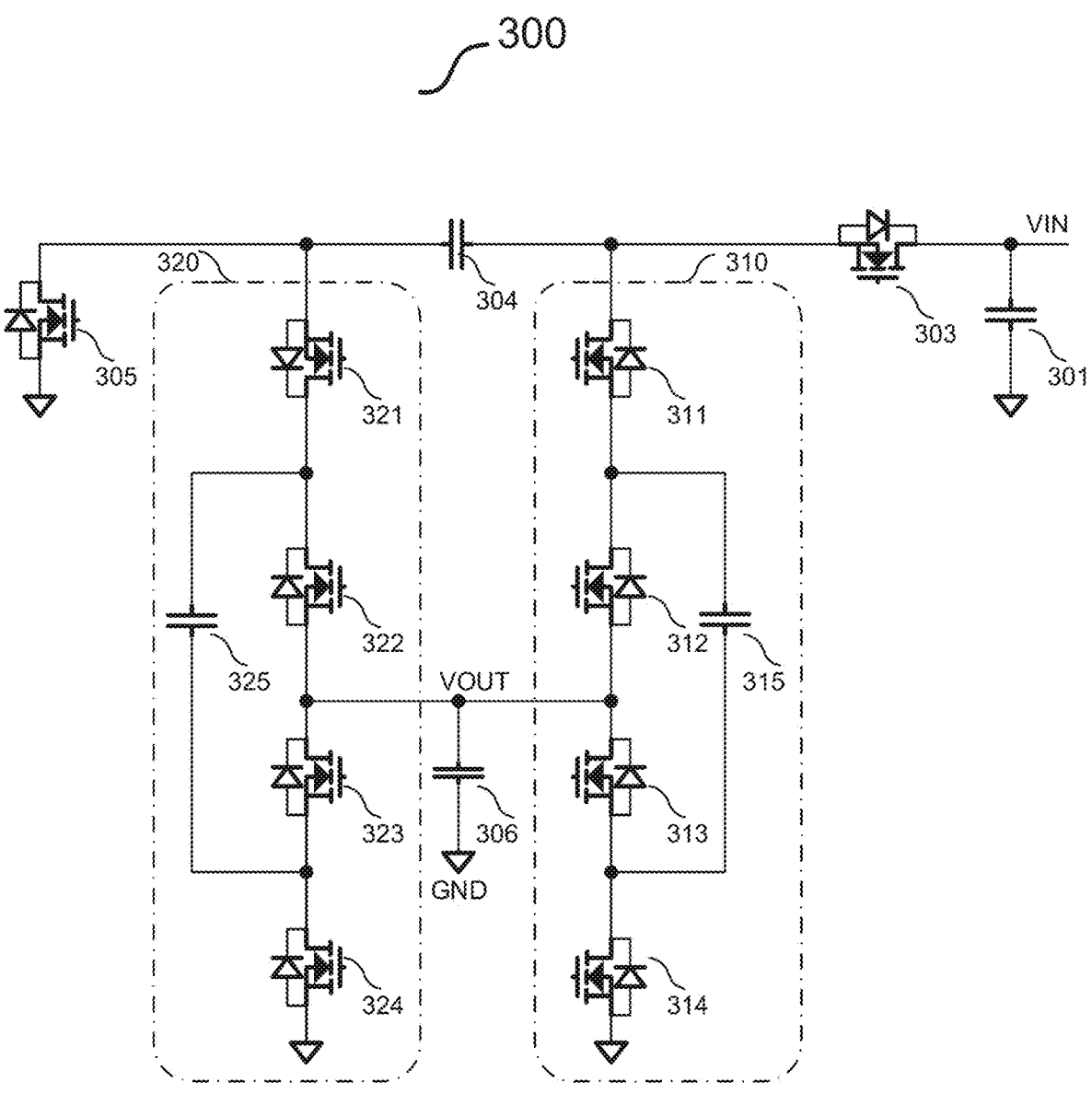
FIG. 13 illustrates a schematic diagram of a 4:1 single-phase switched capacitor converter in accordance with various embodiments of the present disclosure.

FIG. 13 illustrates a schematic diagram of a 4:1 single-phase switched capacitor converter in accordance with various embodiments of the present disclosure. The 4:1 single-phase switched capacitor converter 300 comprises switches 303, 305, a flying capacitor 304, a first phase 310, a second phase 320, an input capacitor 304, and an output capacitor 306.

The flying capacitor 304 is connected between the switches 303 and 305. The switch 303 is connected between the input terminal VIN and the flying capacitor 304. The switch 305 is connected between the flying capacitor 304 and the ground GND. The first phase 310 comprises four switches 311, 312, 313, 314 connected in series between a common node of the switch 303 and the flying capacitor 304, and the ground GND. A flying capacitor 315 is connected between a common node of switches 311 and 312, and a common node of switches 313 and 314.

The second phase 320 comprises four switches 321, 322, 323, 324 connected in series between a common node of the switch 305 and the flying capacitor 304, and the ground GND. A flying capacitor 325 is connected between a common node of switches 321 and 322, and a common node of switches 323 and 324. Throughout the description, a first leg of the 4:1 single-phase switched capacitor converter is a switch leg comprising switches 321, 322, 323 and 324. A second leg of the 4:1 single-phase switched capacitor converter is a switch leg comprising switches 311, 312, 313 and 314. Switch 305 may be referred to as a first upper switch. Switch 303 may be referred to as a second upper switch.

In operation, when the 4:1 single-phase switched capacitor converter 300 is configured as a 4:1 step-down converter, all the switches are switched on and off alternately at a specific operating frequency with a 50% duty cycle.

In operation, in a first half cycle, the switch 303 is turned on, and the switch 305 is turned off. The switches 312 and 314 of the first phase 310 are turned on, and the switches 311 and 313 are turned off. The switches 321 and 323 of the second phase 320 are turned on, and the switches 322 and 324 are turned off. The flying capacitors 304, 325 and the output capacitor 306 are connected in series. VIN charges the flying capacitors 304, 325 and the output capacitor 306 through switches 303, 321, and 323. In addition, VIN supplies power to the output terminal VOUT. At this time, the flying capacitors 304 and 325 are connected in series with the output capacitor 306. The sum of the average voltages on the flying capacitors 304, 325 and the output capacitor 306 is equal to the input voltage VIN.

Also, in the first half cycle, the flying capacitor 315 charges the output capacitor 306 through switches 312 and 314. In addition, the flying capacitor 315 supplies power to the output terminal VOUT. Because the flying capacitor 315 is connected in parallel with the output capacitor 306, the average voltage on the flying capacitor 315 is equal to the output voltage VOUT.

In a second half period, the switch 305 is turned on. The switch 303 is turned off. The switches 311 and 313 of the first phase 310 are turned on, and the switches 312 and 314 are turned off. The switches 322 and 324 of the second phase 320 are turned on, and the switches 321 and 323 are turned off. The flying capacitor 315 and the output capacitor 306 are connected in series. The flying capacitor 304 charges the flying capacitor 315 and the output capacitor 306 through the switches 305, 311, and 313. In addition, the flying capacitor 304 supplies power to the output terminal VOUT. At this time, the flying capacitor 315 and the output capacitor 306 are connected in series, and further connected in parallel with the flying capacitor 304. Therefore, the average voltage on the flying capacitor 304 is equal to the sum of the average voltages on the flying capacitor 315 and the output capacitor 306. In other words, the average voltage on the flying capacitor 304 is twice the output voltage VOUT.

Also, in the second half period, the flying capacitor 325 charges the output capacitor 306 through the switches 322 and 324. In addition, the flying capacitor 325 supplies power to the output terminal VOUT. Because the flying capacitor 325 is connected in parallel with the output capacitor 306, the average voltage on the flying capacitor 325 is equal to the output voltage VOUT.

As mentioned above, the sum of the average voltages on the flying capacitors 304, 325 and the output capacitor 306 is equal to the input voltage VIN, and the average voltage on the flying capacitor 304 is equal to one half of the input voltage (VIN/2). In this way, when the switching frequency is fast enough, the voltages of the flying capacitors 304, 315, 325 and the output capacitor 306 fluctuate around an average value with each switching state. The average voltage on the flying capacitor 304 is equal to one half of the input voltage (VIN/2). The average voltages on the flying capacitors 315, 325 and the output capacitor 306 are equal to the output voltage VOUT. The power conversion ratio of the single-phase switched capacitor converter shown in FIG. 13 is equal to 4:1.

Figure 14:
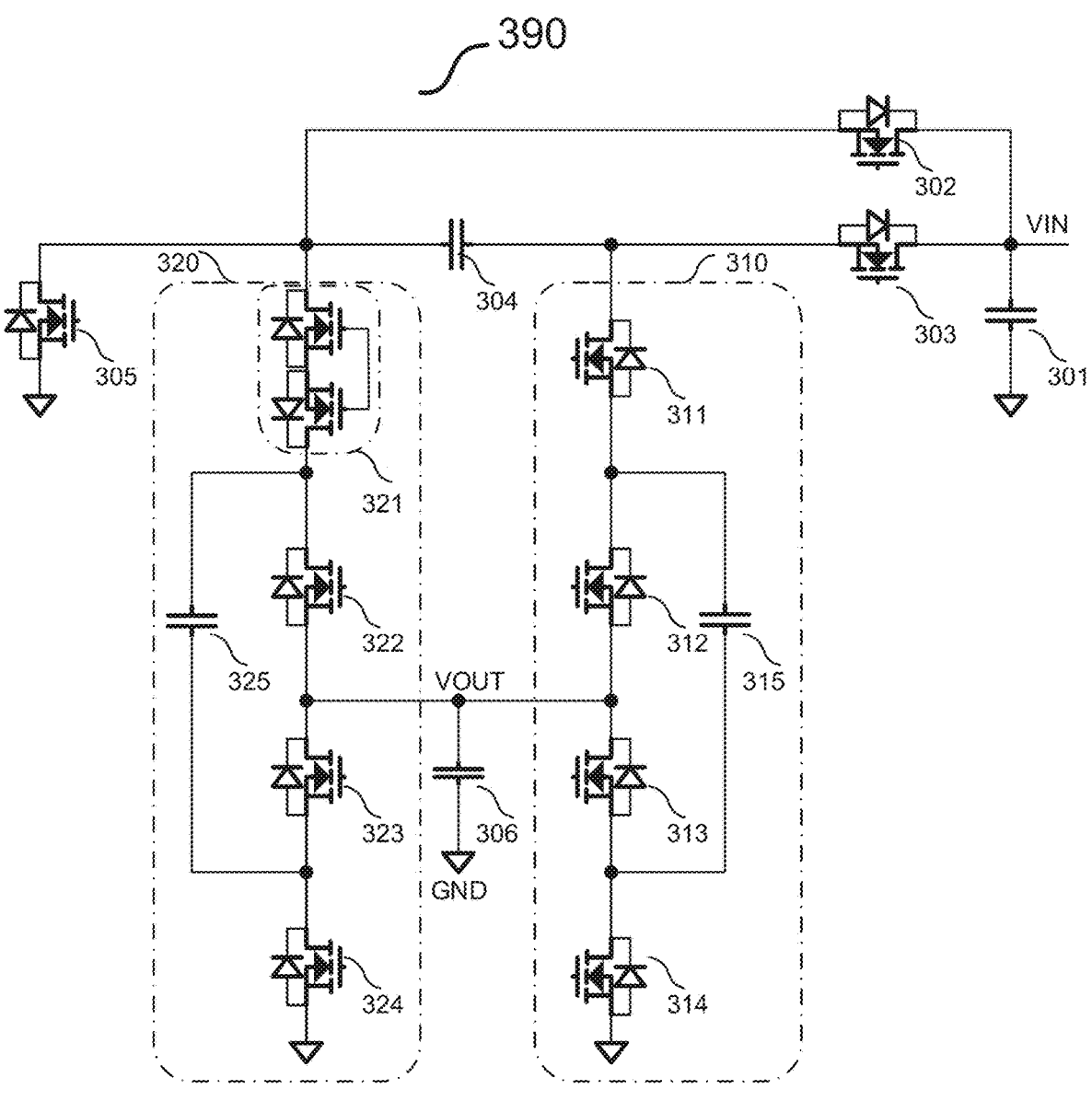
FIG. 14 illustrates a schematic diagram of a 2:1 or a 4:1 single-phase switched capacitor converter in accordance with various embodiments of the present disclosure.

FIG. 14 illustrates a schematic diagram of a 2:1 single-phase switched capacitor converter in accordance with various embodiments of the present disclosure. The structure of the single-phase switched capacitor converter shown in FIG. 14 is similar to that shown in FIG. 13 except that a switch 302 added to achieve a 2:1 conversion ratio.

In operation, the switches 302 and 303 are always in the on state, and the switch 305 is always in the off state. In addition, switch 321 comprises two back-to-back connected MOSFET switches as shown in FIG. 14. The remaining switches alternately switch at a specific operating frequency with a 50% duty cycle. In this configuration, the flying capacitor 304 is short-circuited by the switches 302 and 303. The voltage across the flying capacitor 304 is equal to zero.

In a first half cycle, the switches 311 and 313 of the first phase 310 are turned on, and the switches 312 and 315 are turned off. The switches 322 and 324 of the second phase 320 are turned on, and the switches 321 and 323 are turned off. The flying capacitor 315 and the output capacitor 306 are connected in series. VIN charges the flying capacitor 315 and the output capacitor 306 through switches 311 and 313. In addition, VIN supplies power to the output terminal VOUT. The sum of the average voltage on the flying capacitor 315 and the output capacitor 306 is equal to the input voltage VIN.

Also, in the first half cycle, the flying capacitor 325 charges the output capacitor 306 through the switches 322 and 324. In addition, the flying capacitor 325 supplies power to the output terminal VOUT. Because the flying capacitor 325 is connected in parallel with the output capacitor 306, the average voltage on the flying capacitor 325 is equal to the output voltage VOUT.

In a second half cycle, the switches 312 and 314 of the first phase 310 are turned on, and the switches 311 and 313 are turned off. The switches 321 and 323 of the second phase 320 are turned on, and the switches 322 and 324 are turned off. The flying capacitor 325 and the output capacitor 306 are connected in series. VIN charges the flying capacitor 325 and the output capacitor 306 through switches 302, 321 and 323. In addition, VIN supplies power to the output terminal VOUT.

Also, in the second half cycle, the flying capacitor 325 and the output capacitor 306 are connected in series. The sum of the average voltage on the flying capacitor 325 and the output capacitor 306 is equal to the input voltage VIN. As mentioned earlier, the average voltage of the flying capacitor 325 is equal to the output voltage VOUT. Therefore, the average voltage on the flying capacitor 325 and the output capacitor 306 is equal to one half of the input voltage (VIN/2). At the same time, the flying capacitor 315 charges the output capacitor 306 through the switches 312 and 314 and supplies power to the output terminal VOUT. Because the flying capacitor 315 is connected in parallel with the output capacitor 306, the average voltage on the flying capacitor 315 is equal to the output voltage VOUT. VOUT is equal to one half of the input voltage (VIN/2).

In this configuration, when the switching frequency is fast enough, the voltages on the flying capacitors 315, 325, and the output capacitor 306 fluctuate around a constant value (VIN/2) with each switching state. The power conversion ratio of the single-phase switched capacitor converter shown in FIG. 14 is equal to 2:1.

In some embodiments, the dual-phase switched capacitor converter shown in FIG. 3 and the single-phase switched capacitor converter shown in FIG. 13 can also be extended to a 2N:1 step-down ratio, where N is an integer. When N is equal to three, the switched capacitor converter is a 6:1 dual-phase switched capacitor converter or a 6:1 single-phase switched capacitor converter, which are discussed below with respect to FIGS. 17 and 18, respectively. When N is equal to four, the switched capacitor converter is an 8:1 dual-phase switched capacitor converter or an 8:1 single-phase switched capacitor converter, which are discussed below with respect to FIGS. 15 and 16, respectively. Moreover, a 2×N:1 dual-phase switched capacitor converter or a 2×N:1 single-phase switched capacitor converter, which are discussed below with respect to FIGS. 19 and 20.

Figure 15:
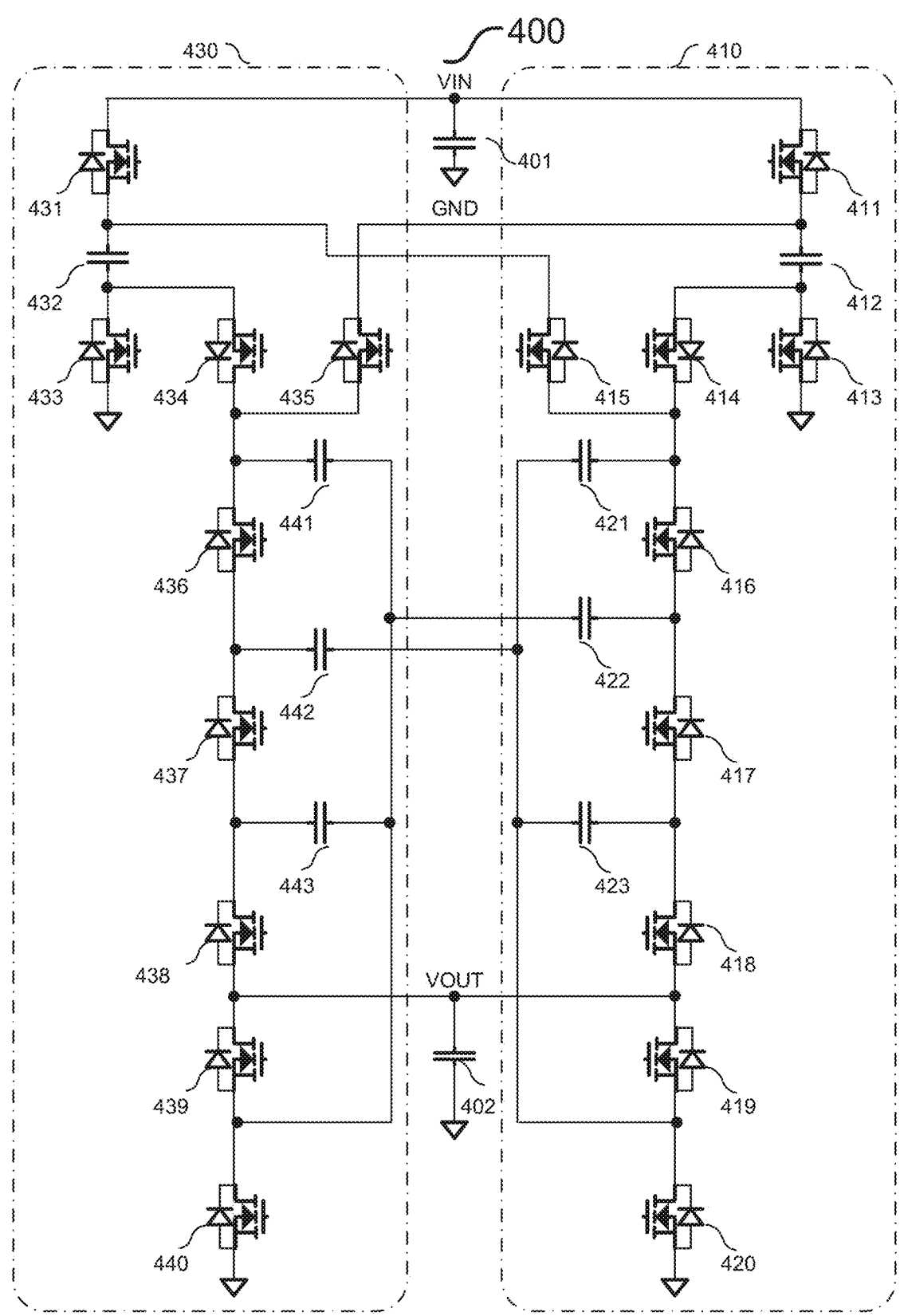
FIG. 15 illustrates a schematic diagram of an 8:1 dual-phase switched capacitor converter in accordance with various embodiments of the present disclosure.

FIG. 15 illustrates a schematic diagram of an 8:1 dual-phase switched capacitor converter in accordance with various embodiments of the present disclosure. The 8:1 dual-phase switched capacitor converter 400 comprises eighteen switches, eight flying capacitors, one input capacitor and one output capacitor. A first phase 410 includes switches 411, 413, 414, 415, 416, 417, 418, 419, and 420, and flying capacitors 412, 421, 422, and 423. A second phase 430 includes switches 431, 433, 434, 435, 436, 437, 438, 439, and 440, and flying capacitors 432, 441, 442, and 443. The two phases share the input capacitor 401, which is connected between the input terminal VIN and the ground GND. The two phases share the output capacitor 402, which is connected between the input and output terminals VOUT and the ground GND. Throughout the description, a first leg of the 8:1 dual-phase switched capacitor converter is a switch leg comprising switches 434, 436, 437, 438, 439, and 440. A second leg of the 8:1 dual-phase switched capacitor converter is a switch leg comprising switches 415, 416, 417, 418, 419, and 420. Switch 433 may be referred to as a first upper switch. Switch 431 may be referred to as a second upper switch. Switch 413 may be referred to as a third upper switch. Switch 411 may be referred to as a fourth upper switch. Switch 435 may be referred to as a fifth upper switch. Switch 414 may be referred to as a sixth upper switch.

In operation, all the switches switch alternately with a 50% duty cycle at a specific operating frequency. Among them, the operating principle of the circuit formed by the switches 411, 413, 414, 415, 431, 433, 434, 435, flying capacitors 412, 432 and the input capacitor 401 is the same as that of the corresponding parts in FIG. 3. Therefore, the average voltages across the flying capacitors 412 and 432 are equal to one half of the input voltage (VIN/2). The operating principle of the circuit formed by the switches 418, 419, 420, 438, 439, 440, flying capacitors 423, 443, and output capacitor 402 is the same as the corresponding parts in FIG. 3. Therefore, the average voltages across the flying capacitors 423 and 443 are equal to the output voltage VOUT.

In a first half cycle, the switches 411, 414, 415, 417, and 419 of the first phase 410 are turned on, and the switches 413, 416, 418, and 420 are turned off. The switches 433, 436, 438, and 440 of the second phase 430 are turned on, and the switches 431, 434, 435, 437, and 439 are turned off. The flying capacitors 412, 421 and the output capacitor 402 are connected in series. VIN charges the flying capacitors 412, 421 and the output capacitor 402 through the switches 411, 414, and 419. In addition, VIN supplies power to the output terminal VOUT. At this time, the flying capacitors 412 and 421 are connected in series with the output capacitor 402. The sum of the average voltages on the flying capacitors 412, 421 and the output capacitor 402 is equal to the input voltage VIN. Because the voltage on the flying capacitor 412 is equal to one half of the input voltage, the sum of the voltage on the flying capacitor 421 and the output capacitor 402 is equal to one half of the input voltage VIN.

Also, in the first half cycle, the flying capacitor 423 and the output capacitor 402 are connected in series. The flying capacitor 422 charges the flying capacitor 423 and the output capacitor 402 through the switches 417, 419, and 440. In addition, the flying capacitor 422 supplies power to the output terminal VOUT. Because the voltage on the flying capacitor 423 is equal to the output voltage VOUT, the average voltage on the flying capacitor 422 is equal to twice the output voltage (2×VOUT).

Also, in the first half cycle, the flying capacitor 421 and the output capacitor 402 are connected in series. The flying capacitor 432 charges the flying capacitor 421 and the output capacitor 402 through the switches 433, 415, and 419. In addition, the flying capacitor 432 supplies power to the output terminal VOUT. The flying capacitor 442 and the output capacitor 402 are connected in series. The flying capacitor 441 charges the flying capacitor 442 and the output capacitor 402 through the switches 436, 419, and 440. In addition, the flying capacitor 441 supplies power to the output terminal VOUT. The voltage on the flying capacitor 441 is equal to the sum of the average voltages on the flying capacitor 442 and the output capacitor 402. The flying capacitor 443 charges the output capacitor 402 through the switches 438 and 440, and supplies power to the output terminal VOUT.

In a second half cycle, the switches 413, 416, 418, and 420 of the first phase 410 are turned on, and the switches 411, 414, 415, 417, and 419 are turned off. The switches 431, 434, 435, 437, and 439 of the second phase 430 are turned on, and the switches 433, 436, 438, and 440 are turned off. The flying capacitors 432, 441 and the output capacitor 402 are connected in series. VIN charges the flying capacitors 432, 441 and the output capacitor 402 through the switches 431, 434, and 440, and supplies power to the output terminal VOUT. Because the voltage on the flying capacitor 432 is equal to one half of the input voltage VIN, the sum of the average voltages on the flying capacitor 441 and the output capacitor 402 is equal to one half of the input voltage (VIN/2).

Also, in the second half cycle, the flying capacitor 443 and the output capacitor 402 are connected in series. The flying capacitor 442 charges the flying capacitor 443 and the output capacitor 402 through the switches 437, 439, and 420. In addition, the flying capacitor 442 supplies power to the output terminal VOUT. Because the voltage on the flying capacitor 443 is equal to the output voltage VOUT, the average voltage on the flying capacitor 442 is equal to twice the output voltage (2×VOUT).

Also, in the second half cycle, the flying capacitor 441 and the output capacitor 402 are connected in series. The flying capacitor 412 charges the flying capacitor 441 and the output capacitor 402 through the switches 413, 435, and 439 and supplies power to the output terminal VOUT. Also, in the second half cycle, the flying capacitor 443 and the output capacitor 402 are connected in series. The flying capacitor 442 charges the flying capacitor 443 and the output capacitor 402 through the switches 437, 439, and 420, and supplies power to the output terminal VOUT. The average voltage on the flying capacitor 442 is equal to the sum of the average voltages on the flying capacitor 443 and the output capacitor 402. Therefore, the average voltage on the flying capacitor 442 is equal to twice the output voltage (2×VOUT).

As mentioned above, the voltage on the flying capacitor 441 is equal to the sum of the average voltages on the flying capacitor 442 and the output capacitor 402. Therefore, the voltage on the flying capacitor 441 is equal to three times the output voltage (3×VOUT). Similarly, it can be concluded that the voltage on the flying capacitor 421 is three times the output voltage (3×VOUT). Because the sum of the average voltages on the flying capacitors 421, 441 and the output capacitor 402 is equal to the voltages on the flying capacitors 412 and 432, and the voltages on the flying capacitors 412 and 432 are equal to one half of the input voltage, the output voltage VOUT is equal to one-eighth of the voltage (VIN/8).

In this configuration, when the switching frequency is fast enough, the voltages on the flying capacitors 412, 432, 421, 441, 422, 442, 423, 443 and the output capacitor 402 fluctuate around a constant value with each switching state. The power conversion ratio of the dual-phase switched capacitor converter shown in FIG. 15 is equal to 8:1.

In some embodiments, the voltages on the flying capacitors 412 and 432 are equal to one half of the input voltage or four times the output voltage (VIN/2 or 4×VOUT). The voltages on the flying capacitors 421 and 441 are equal to three times the output voltage (3×VOUT). The voltages on the flying capacitors 422 and 442 are equal to twice the output voltage (2×VOUT). The voltages on the flying capacitors 423 and 443 are equal to the output voltage (VOUT). Switches 416, 417, 418, 419, 420, 436, 437, 438, 439, and 440, as well as capacitors 421, 422, 423, 441, 442, 443, and output capacitor 402 forms a cross-coupled two-phase switched capacitor converter.

Figure 16:
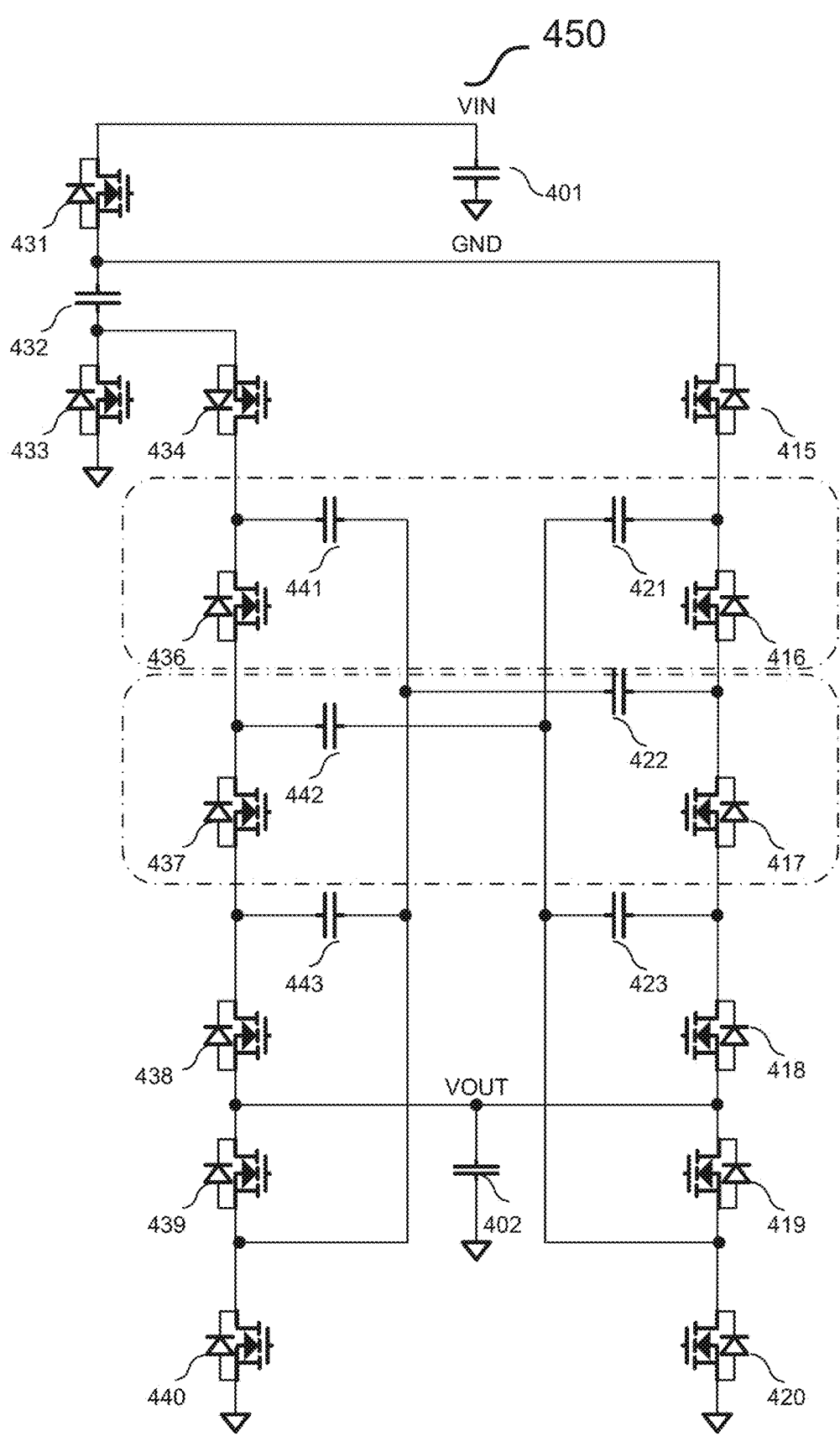
FIG. 16 illustrates a schematic diagram of an 8:1 single-phase switched capacitor converter in accordance with various embodiments of the present disclosure.

FIG. 16 illustrates a schematic diagram of an 8:1 single-phase switched capacitor converter in accordance with various embodiments of the present disclosure. The operating principle of the single-phase switched capacitor converter has been described above with respect to FIG. 13, and hence is not discussed again herein.

As shown in FIG. 16, a first switch 440, a second switch 439, a third switch 438, a fourth switch 437, a fifth switch 436 and a sixth switch 434 of the first leg are connected in series between ground and a first voltage node (a common node of 433 and 432). A first switch 420, a second switch 419, a third switch 418, a fourth switch 417, a fifth switch 416 and a sixth switch 415 of the second leg are connected in series between ground and a second voltage node (a common node of 432 and 431).

The first flying capacitor 443 is connected between the common node of the first switch 440 and the second switch 439 of the first leg, and the common node of the third switch 438 and the fourth switch 437 of the first leg. The second flying capacitor 423 is connected between the common node of the first switch 420 and the second switch 419 of the second leg, and the common node of the third switch 418 and the fourth switch 417 of the second leg.

The third flying capacitor 432 is connected between the first voltage node and the second voltage node. The fourth flying capacitor 442 is connected between a common node of the fourth switch 437 and the fifth switch 436 of the first leg, and the common node of the first switch 440 and the second switch 439 of the second leg. The fifth flying capacitor 422 is connected between a common node of the fourth switch 417 and the fifth switch 416 of the second leg, and the common node of the first switch 420 and the second switch 419 of the first leg.

The sixth flying capacitor 441 is connected between a common node of the fifth switch 436 and the sixth switch 434 of the first leg, and the common node of the first switch 440 and the second switch 439 of the first leg. The seventh flying capacitor 421 is connected between a common node of the fifth switch 416 and the sixth switch 415 of the second leg, and the common node of the first switch 420 and the second switch 419 of the second leg. The first upper switch 433 is connected between the first voltage node and ground. The second upper switch 431 connected between the second voltage node and the input terminal.

Referring back to FIG. 15, the 8:1 dual-phase switched capacitor converter further comprises an eighth flying capacitor 412 connected between a third voltage node (a common node of 413 and 412) and a fourth voltage node (a common node of 412 and 411), a third upper switch 413 connected between the third voltage node and ground, a fourth upper switch 411 connected between the fourth voltage node and the input terminal, a fifth upper switch 435 connected between the common node of the fifth switch 436 and the sixth switch 434 of the first leg, and the fourth voltage node, and a sixth upper switch 414 connected between the common node of the fifth switch 416 and the sixth switch 415 of the second leg, and the third voltage node.

Figure 17:
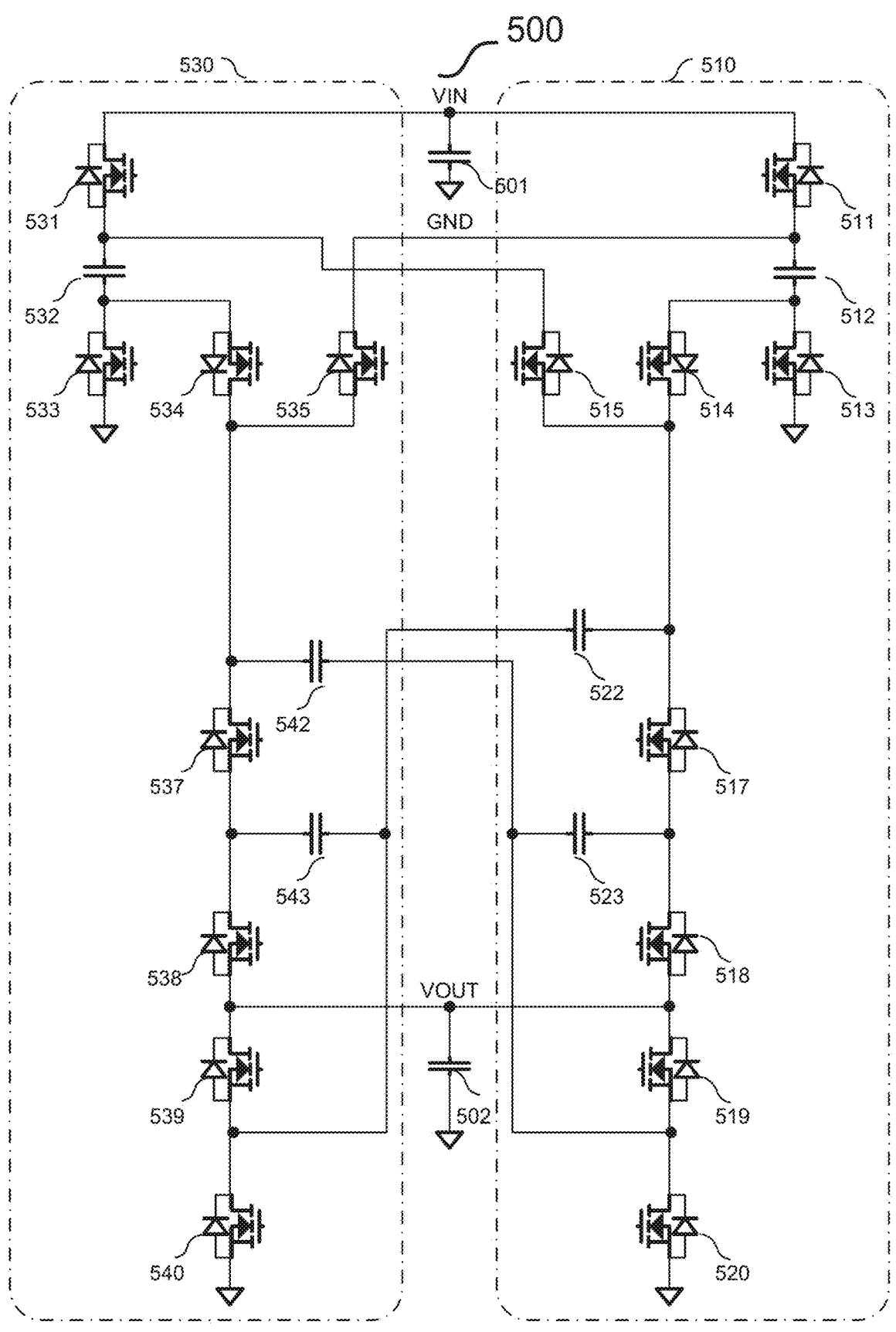
FIG. 17 illustrates a schematic diagram of a 6:1 dual-phase switched capacitor converter in accordance with various embodiments of the present disclosure.

FIG. 17 illustrates a schematic diagram of a 6:1 dual-phase switched capacitor converter in accordance with various embodiments of the present disclosure. The 6:1 dual-phase switched capacitor converter 500 comprises sixteen switches, six flying capacitors, one input capacitor and one output capacitor. A first phase 510 includes switches 511, 513, 514, 515, 517, 518, 519, and 520, and flying capacitors 512, 522, and 523. A second phase 530 includes switches 531, 533, 534, 535, 537, 538, 539, and 540, and flying capacitors 532, 542, and 543. The two phases share the input capacitor 501, which is connected between the input terminal VIN and the ground GND. The two phases share the output capacitor 502, which is connected between the input and output terminals VOUT and the ground GND. Throughout the description, a first leg of the 6:1 dual-phase switched capacitor converter is a switch leg comprising switches 534, 537, 538, 539, and 540. A second leg of the 6:1 dual-phase switched capacitor converter is a switch leg comprising switches 515, 517, 518, 519, and 520. Switch 533 may be referred to as a first upper switch. Switch 531 may be referred to as a second upper switch. Switch 513 may be referred to as a third upper switch. Switch 511 may be referred to as a fourth upper switch. Switch 535 may be referred to as a fifth upper switch. Switch 514 may be referred to as a sixth upper switch.

The operating principle of the 6:1 dual-phase switched capacitor converter is similar to that of the 8:1 dual-phase switched capacitor converter FIG. 15, and hence is not discussed again herein.

Figure 18:
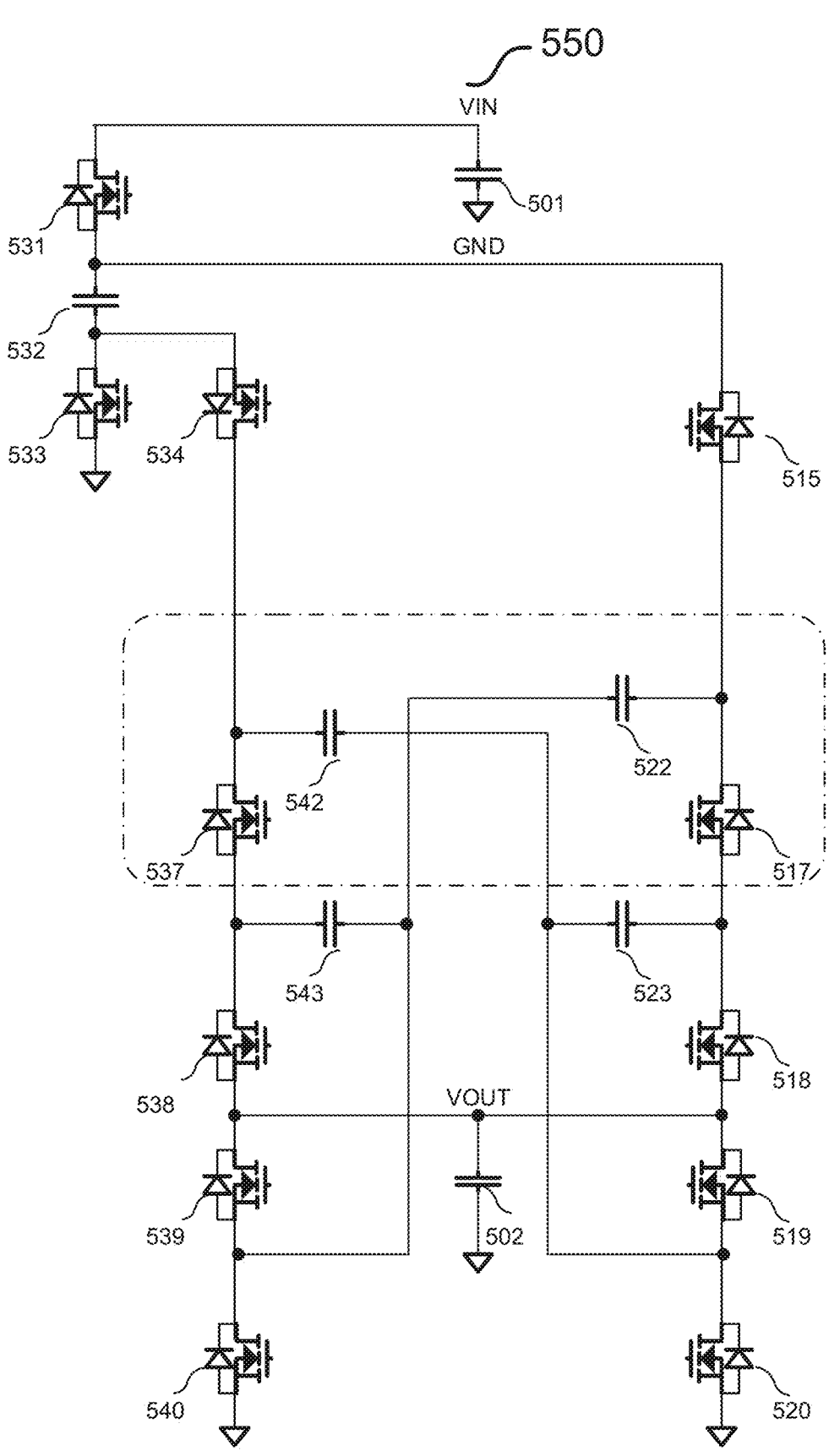
FIG. 18 illustrates a schematic diagram of a 6:1 single-phase switched capacitor converter in accordance with various embodiments of the present disclosure.

FIG. 18 illustrates a schematic diagram of a 6:1 single-phase switched capacitor converter in accordance with various embodiments of the present disclosure. The operating principle of the single-phase switched capacitor converter has been described above with respect to FIG. 13, and hence is not discussed again herein.

As shown in FIG. 18, a first switch 540, a second switch 539, a third switch 538, a fourth switch 537 and a fifth switch 534 of the first leg are connected in series between ground and a first voltage node (a common node of 533 and 532). A first switch 520, a second switch 519, a third switch 518, a fourth switch 517 and a fifth switch 515 of the second leg are connected in series between ground and a second voltage node (a common node of 531 and 532).

The first flying capacitor 543 is connected between the common node of the first switch 540 and the second switch 539 of the first leg, and the common node of the third switch 538 and the fourth switch 537 of the first leg. The second flying capacitor 523 is connected between the common node of the first switch 520 and the second switch 519 of the second leg, and the common node of the third switch 518 and the fourth switch 517 of the second leg.

The third flying capacitor 532 is connected between the first voltage node and the second voltage node. The fourth flying capacitor 542 is connected between a common node of the fourth switch 537 and the fifth switch 534 of the first leg, and the common node of the first switch 520 and the second switch 519 of the second leg. The fifth flying capacitor 522 is connected between a common node of the fourth switch 517 and the fifth switch 515 of the second leg, and the common node of the first switch 540 and the second switch 539 of the first leg. The first upper switch 533 is connected between the first voltage node and ground. The second upper switch 531 connected between the second voltage node and the input terminal.

Referring back to FIG. 17, the 6:1 dual-phase switched capacitor converter 500 further comprises a sixth flying capacitor 512 connected between a third voltage node (a common node of 512 and 513) and a fourth voltage node (a common node of 512 and 511), a third upper switch 513 connected between the third voltage node and ground, a fourth upper switch 511 connected between the fourth voltage node and the input terminal, a fifth upper switch 535 connected between the common node of the fourth switch 537 and the fifth switch 534 of the first leg, and the fourth voltage node, and a sixth upper switch 514 connected between the common node of the fourth switch 517 and the fifth switch 515 of the second leg, and the third voltage node.

Figure 19:
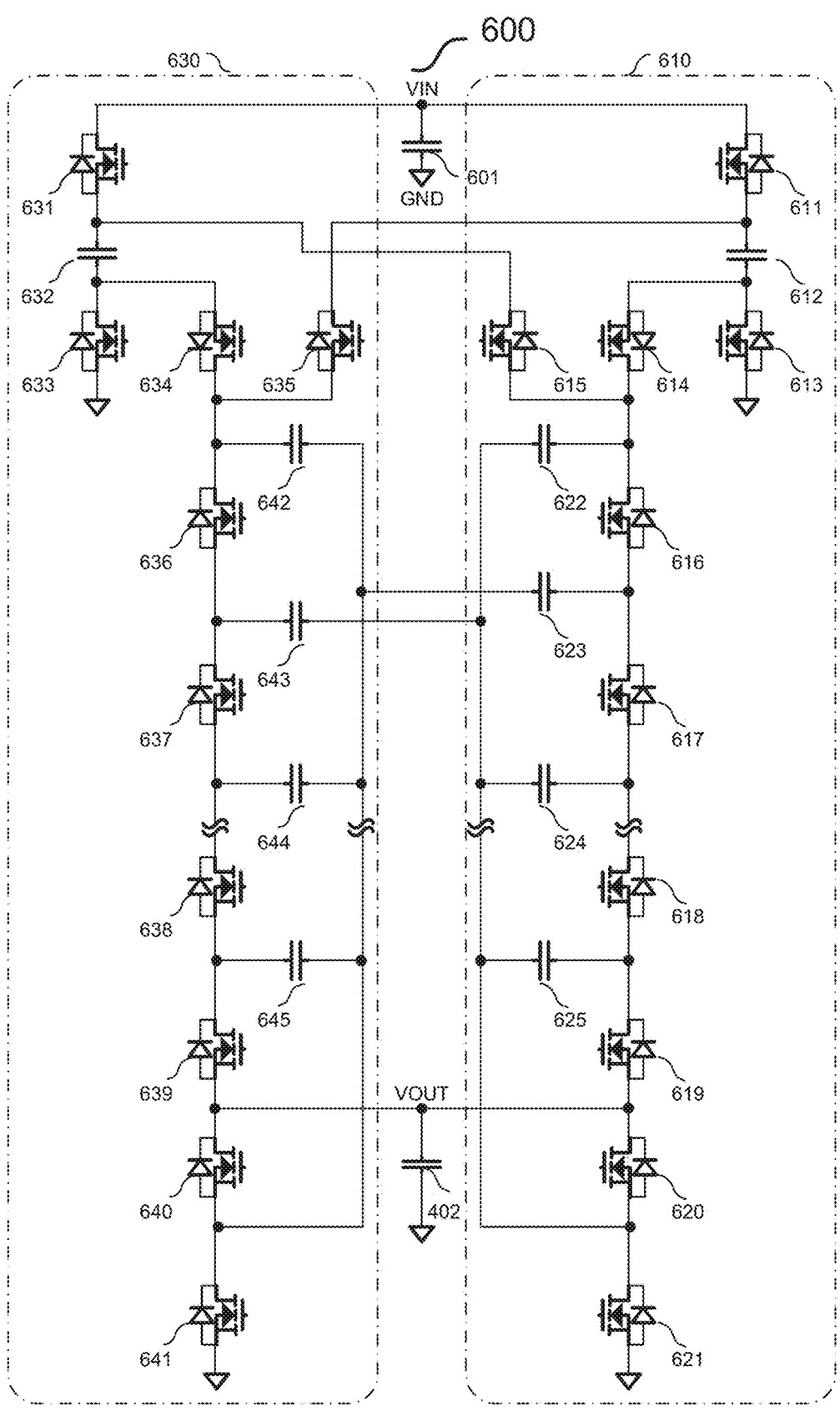
FIG. 19 illustrates a schematic diagram of a 2×N:1 dual-phase switched capacitor converter in accordance with various embodiments of the present disclosure.

FIG. 19 illustrates a schematic diagram of a 2×N:1 dual-phase switched capacitor converter in accordance with various embodiments of the present disclosure. After a given integer N, the number of switches and flying capacitors required by the circuit of the present invention is determined. In the 2×N:1 dual-phase switched capacitor converter 600, the number of switches is equal to 2×N+10. The number of flying capacitors is equal to 2×N.

Throughout the description, a first leg of the 2×N:1 dual-phase switched capacitor converter is a switch leg comprising switches 634, 636, 637, 638, 639, 640 and 641. A second leg of the 2×N:1 dual-phase switched capacitor converter is a switch leg comprising switches 615, 616, 617, 618, 619, 620 and 621. Switch 633 may be referred to as a first upper switch. Switch 631 may be referred to as a second upper switch. Switch 613 may be referred to as a third upper switch. Switch 611 may be referred to as a fourth upper switch. Switch 635 may be referred to as a fifth upper switch. Switch 614 may be referred to as a sixth upper switch.

Figure 20:
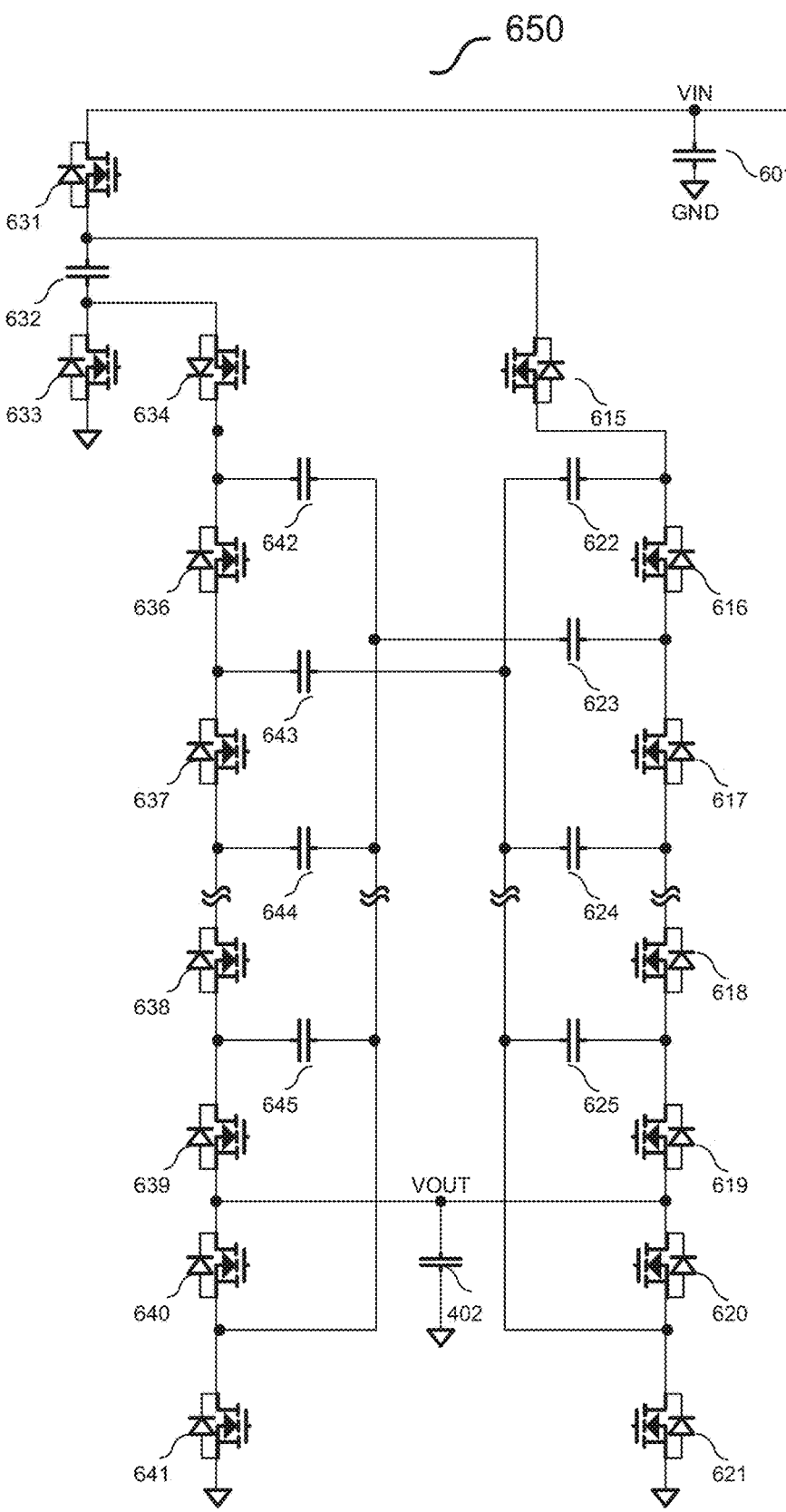
FIG. 20 illustrates a schematic diagram of a 2×N:1 single-phase switched capacitor converter in accordance with various embodiments of the present disclosure.

FIG. 20 illustrates a schematic diagram of a 2×N:1 single-phase switched capacitor converter in accordance with various embodiments of the present disclosure. The operating principle of the single-phase switched capacitor converter has been described above with respect to FIG. 13, and hence is not discussed again herein.

As shown in FIG. 20, (N+2) switches of the first leg are connected in series between ground and a first voltage node (a common node of 632 and 633). (N+2) switches of the second leg are connected in series between ground and a second voltage node (a common node of 632 and 631).

A first flying capacitor 645 of the (2×N−1) flying capacitors is connected between the common node of the first switch 641 and the second switch 640 of the first leg, and the common node of the third switch 639 and the fourth switch 638 of the first leg. A second flying capacitor 625 of the (2×N−1) flying capacitors is connected between the common node of the first switch 621 and the second switch 620 of the second leg, and the common node of the third switch 619 and the fourth switch 618 of the second leg.

A third flying capacitor 632 is connected between the first voltage node and the second voltage node. Let M represent an integer between 2 and N−1. One terminal of a (2×M)th flying capacitor is connected to a common node of an (M+2)th switch and an (M+3)th switch of the first leg, and the other terminal of the (2×M)th flying capacitor is connected to the common node of the first switch and the second switch of either the second leg when M is an even number, or the first leg when M is an odd number.

One terminal of a (2×M+1)th flying capacitor is connected between a common node of an (M+2)th switch and an (M+3)th switch of the second leg, and the other terminal of the (2×M)th flying capacitor is connected to the common node of the first switch and the second switch of either first leg when M is an even number, or the second leg when M is an odd number.

As a result of this arrangement, when M is 2, a fourth flying capacitor is connected between a common node of the fourth switch and the fifth switch of the first leg, and the common node of the first switch and the second switch of the second leg. A fifth flying capacitor is connected between a common node of the fourth switch and the fifth switch of the second leg, and the common node of the first switch and the second switch of the first leg.

Similarly, when M is equal to N−2, and N is an even number, a (2×N−4)th flying capacitor 643 is connected between a common node of an Nth switch 637 and an (N+1)th switch 636 of the first leg, and the common node of the first switch 621 and the second switch 620 of the second leg. A (2×N−3)th flying capacitor 623 is connected between a common node of an Nth switch 617 and an (N+1)th switch 616 of the second leg, and the common node of the first switch 641 and the second switch 640 of the first leg.

When M is equal to N−1, and N is an even number, N−1 is an odd number. A (2×N−2)th flying capacitor 642 is connected between a common node of the (N+1)th switch 636 and an (N+2)th switch 634 of the first leg, and the common node of the first switch 641 and the second switch 640 of the first leg. A (2×N−1)th flying capacitor 622 is connected between a common node of the (N+1)th switch 616 and an (N+2)th switch 615 of the second leg, and the common node of the first switch 621 and the second switch 620 of the second leg. The first upper switch 633 is connected between the first voltage node and ground. The second upper switch 631 is connected between the second voltage node and the input terminal.

Referring back to FIG. 19, the 2×N:1 dual-phase switched capacitor converter 600 further comprises a (2×N)th flying capacitor 612 connected between a third voltage node (a common node of 612 and 613) and a fourth voltage node (a common node of 612 and 611), a third upper switch 613 connected between the third voltage node and ground, a fourth upper switch 611 connected between the fourth voltage node and the input terminal, a fifth upper switch 635 connected between the common node of the (N+1)th switch 636 and the (N+2)th switch 634 of the first leg, and the fourth voltage node, and a sixth upper switch 614 connected between the common node of the (N+1)th switch 616 and the (N+2)th switch 615 of the second leg, and the third voltage node.

The switched capacitor converter shown in FIG. 19 is able to achieve a voltage conversion ratio of equal to 2×N:1 as described above with respect to FIG. 19. In some embodiments, 2×N is equal to the number of flying capacitors of the switched capacitor converter. In some embodiments, the switched capacitor converter shown in FIG. 19 is able to achieve a N:1 conversion ratio through configuring the first upper switch (e.g., switch 633), the second upper switch (e.g., switch 631), the third upper switch (e.g., switch 613), the fourth upper switch (e.g., switch 611) as always-on switches and configuring the fifth upper switch (e.g., switch 635) and the sixth upper switch (e.g., switch 614) as always-off switches.

In some embodiments, the dual-phase switched capacitor converter shown in FIG. 3 and the single-phase switched capacitor converter shown in FIG. 13 can also be extended to a 2N:1 step-down ratio, where N is an integer. When N is equal to three, the switched capacitor converter is an 8:1 dual-phase switched capacitor converter or an 8:1 single-phase switched capacitor converter, which are discussed below with respect to FIGS. 21 and 22, respectively.

Figure 21:
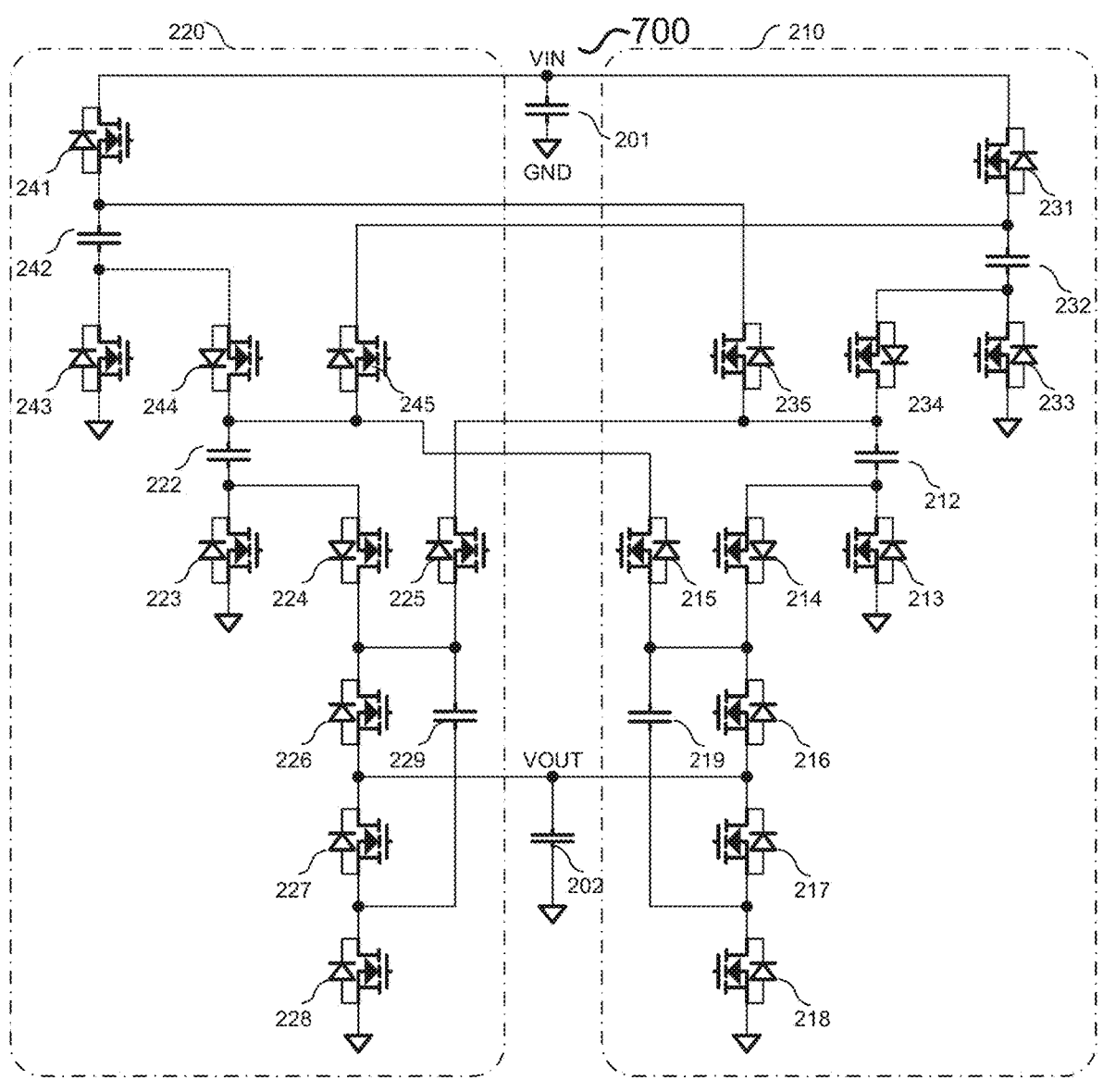
FIG. 21 illustrates an alternative schematic diagram of an 8:1 dual-phase switched capacitor converter in accordance with various embodiments of the present disclosure.

FIG. 21 illustrates an alternative schematic diagram of an 8:1 dual-phase switched capacitor converter in accordance with various embodiments of the present disclosure. The 8:1 dual-phase switched capacitor converter 700 comprises twenty switches, six flying capacitors, one input capacitor and one output capacitor. A first phase 210 includes switches 231, 233, 234, 235, 213, 214, 215, 216, 217 and 218, and flying capacitors 232, 212 and 219. A second phase 220 includes switches 241, 243, 244, 245, 223, 224, 225, 226, 227 and 228, and flying capacitors 242, 222, and 229. The two phases share the input capacitor 201, which is connected between the input terminal VIN and the ground GND. The two phases share the output capacitor 202, which is connected between the output terminals VOUT and the ground GND.

Throughout the description, a first leg of the 8:1 dual-phase switched capacitor converter is a switch leg comprising switches 228, 227, 226 and 224. A second leg of the 8:1 dual-phase switched capacitor converter is a switch leg comprising switches 218, 217, 216, and 214. Switch 223 may be referred to as a first upper switch. Switch 244 may be referred to as a second upper switch. Switch 213 may be referred to as a third upper switch. Switch 234 may be referred to as a fourth upper switch. Switch 225 may be referred to as a fifth upper switch. Switch 214 may be referred to as a sixth upper switch. Switch 243 may be referred to as a seventh upper switch. Switch 241 may be referred to as an eighth upper switch. Switch 235 may be referred to as a ninth upper switch. Switch 233 may be referred to as a tenth upper switch. Switch 231 may be referred to as an eleventh upper switch. Switch 245 may be referred to as a twelfth upper switch.

As shown in FIG. 21, a first switch 228, a second switch 227, a third switch 226, and a fourth switch 224 of the first leg are connected in series between ground and a first voltage node (a common node of 223 and 224). A first switch 218, a second switch 217, a third switch 216 and a fourth switch 215 of the second leg are connected in series between ground and a second voltage node (a common node of 214 and 213).

The first flying capacitor 229 is connected between the common node of the first switch 228 and the second switch 227 of the first leg, and the common node of the third switch 226 and the fourth switch 224 of the first leg. The second flying capacitor 219 is connected between the common node of the first switch 218 and the second switch 217 of the second leg, and the common node of the third switch 216 and the fourth switch 215 of the second leg.

The third flying capacitor 222 is connected between the first voltage node and the second voltage node. The fourth flying capacitor 212 is connected between a third voltage node (a common node of 213 and 214) and a fourth voltage node (a common node of 212 and 234). The first upper switch 223 is connected between the first voltage node and ground. The second upper switch 244 is connected between the second voltage node and a fifth voltage node. The third upper switch 213 is connected between the third voltage node and ground. The fourth upper switch 234 is connected between the fourth voltage node and a sixth voltage node. The fifth upper switch 225 is connected between the common node of the third switch 226 and the fourth switch 224 of the first leg, and the fourth voltage node. The sixth upper switch 214 is connected between the common node of the third switch 216 and the fourth switch 215 of the second leg, and the third voltage node.

The seventh upper switch 243 is connected between the fifth voltage node and ground. A fifth flying capacitor 242 is connected between the fifth voltage node and a seventh voltage node. The eighth upper switch 241 is connected between the seventh voltage node and the input terminal (VIN). The ninth upper switch 235 is connected between the seventh voltage node and the fourth voltage node. A sixth flying capacitor 232 is connected between the sixth voltage node and an eighth voltage node. The tenth upper switch 233 is connected between the sixth voltage node and ground. The eleventh upper switch 231 is connected between the eighth voltage node and the input terminal VIN. The twelfth upper switch 245 is connected between the second voltage node and the eighth voltage node.

In operation, all the switches switch alternately with a 50% duty cycle at a specific operating frequency. Among them, the operating principle of the circuit formed by the switches 231, 233, 234, 235, 241, 243, 244, 245, the flying capacitors 232, 242 and the input capacitor 201 is the same as that of the corresponding parts in FIG. 3. Therefore, the average voltages across the flying capacitors 232 and 242 are equal to one half of the input voltage (VIN/2). The operating principle of the circuit formed by the switches 216, 217, 218, 226, 227, 228, the flying capacitors 229, 219, and output capacitor 202 is the same as the corresponding parts in FIG. 3. Therefore, the average voltages across the flying capacitors 219 and 229 are equal to the output voltage VOUT.

In a first half cycle, the switches 231, 234, 235, 214, 215 and 217 of the first phase 210 are turned on, and the switches 233, 213, 216, and 218 are turned off. The switches 243, 223, 226 and 228 of the second phase 220 are turned on, and the switches 241, 244, 245, 224, 225 and 227 are turned off. The flying capacitors 232, 212, 219 and the output capacitor 202 are connected in series. VIN charges the flying capacitors 232, 212, 219 and the output capacitor 202 through the switches 231, 234, 214 and 217. In addition, VIN supplies power to the output terminal VOUT. At this time, the flying capacitors 232, 212 and 219 are connected in series with the output capacitor 202. The sum of the average voltages on the flying capacitors 232, 212, 219 and the output capacitor 202 is equal to the input voltage VIN. Because the voltage on the flying capacitor 232 is equal to one half of the input voltage, the sum of the voltages on the flying capacitors 212, 219 and the output capacitor 202 is equal to one half of the input voltage VIN.

Also, in the first half cycle, the flying capacitor 219 and the output capacitor 202 are connected in series. The flying capacitor 222 charges the flying capacitor 219 and the output capacitor 202 through the switches 223, 215, and 217. In addition, the flying capacitor 222 supplies power to the output terminal VOUT. Because the voltage on the flying capacitor 219 is equal to the output voltage VOUT, the average voltage on the flying capacitor 222 is equal to twice the output voltage (2×VOUT).

Also, in the first half cycle, the flying capacitor 242, 212, 219 and the output capacitor 202 are connected in series. The flying capacitor 242 charges the flying capacitor 212, 219 and the output capacitor 202 through the switches 243, 235, 214 and 217. In addition, the flying capacitor 242 supplies power to the output terminal VOUT. The voltage on the flying capacitor 242 is equal to the sum of the average voltages on the flying capacitor 212, 219 and the output capacitor 202. Since the voltage on the flying capacitor 219 is equal to the output voltage VOUT, the average voltage on the flying capacitor 242 is equal to four times the output voltage (4×VOUT). Also, since the average voltage on flying capacitor 242 is also equal to VIN/2, the ratio of VIN to VOUT is 8:1. The flying capacitor 229 also charges the output capacitor 202 through the switches 226 and 228, and supplies power to the output terminal VOUT.

In a second half cycle, the switches 233, 213, 216, and 218 of the first phase 210 are turned on, and the switches 231, 234, 235, 214, 215 and 217 are turned off. The switches 241, 244, 245, 224, 225 and 227 of the second phase 220 are turned on, and the switches 223, 243, 226, and 228 are turned off. The flying capacitors 242, 222, 229 and the output capacitor 202 are connected in series. VIN charges the flying capacitors 242, 222, 229 and the output capacitor 202 through the switches 241, 244, 224 and 227, and supplies power to the output terminal VOUT. Because the voltage on the flying capacitor 242 is equal to one half of the input voltage VIN, the sum of the average voltages on the flying capacitor 222, 229 and the output capacitor 202 is equal to one half of the input voltage (VIN/2).

Also, in the second half cycle, the flying capacitor 229 and the output capacitor 202 are connected in series. The flying capacitor 212 charges the flying capacitor 229 and the output capacitor 202 through the switches 213, 225, and 227. In addition, the flying capacitor 212 supplies power to the output terminal VOUT. Because the voltage on the flying capacitor 229 is equal to the output voltage VOUT, the average voltage on the flying capacitor 212 is equal to twice the output voltage (2×VOUT).

Also, in the second half cycle, the flying capacitor 232, 222, 229 and the output capacitor 202 are connected in series. The flying capacitor 232 charges the flying capacitor 222, 229 and the output capacitor 202 through the switches 233, 245, 224 and 227. In addition, the flying capacitor 232 supplies power to the output terminal VOUT. The voltage on the flying capacitor 232 is equal to the sum of the average voltages on the flying capacitor 222, 229 and the output capacitor 202. Since the voltage on the flying capacitor 229 is equal to the output voltage VOUT, the average voltage on the flying capacitor 232 is equal to four times the output voltage (4×VOUT). Also, since the average voltage on flying capacitor 232 is also equal to VIN/2, the ratio of VIN to VOUT is 8:1. The flying capacitor 219 also charges the output capacitor 202 through the switches 216 and 218, and supplies power to the output terminal VOUT.

In this configuration, when the switching frequency is fast enough, the voltages on the flying capacitors 232, 242, 212, 222, 219, 229 and the output capacitor 402 fluctuate around a constant value with each switching state. The power conversion ratio of the dual-phase switched capacitor converter shown in FIG. 21 is equal to 8:1.

In some embodiments, the voltages on the flying capacitors 242 and 232 are equal to one half of the input voltage or four times the output voltage (VIN/2 or 4×VOUT). The voltages on the flying capacitors 212 and 222 are equal to twice the output voltage (2×VOUT). The voltages on the flying capacitors 219 and 229 are equal to the output voltage (VOUT).

Figure 22:
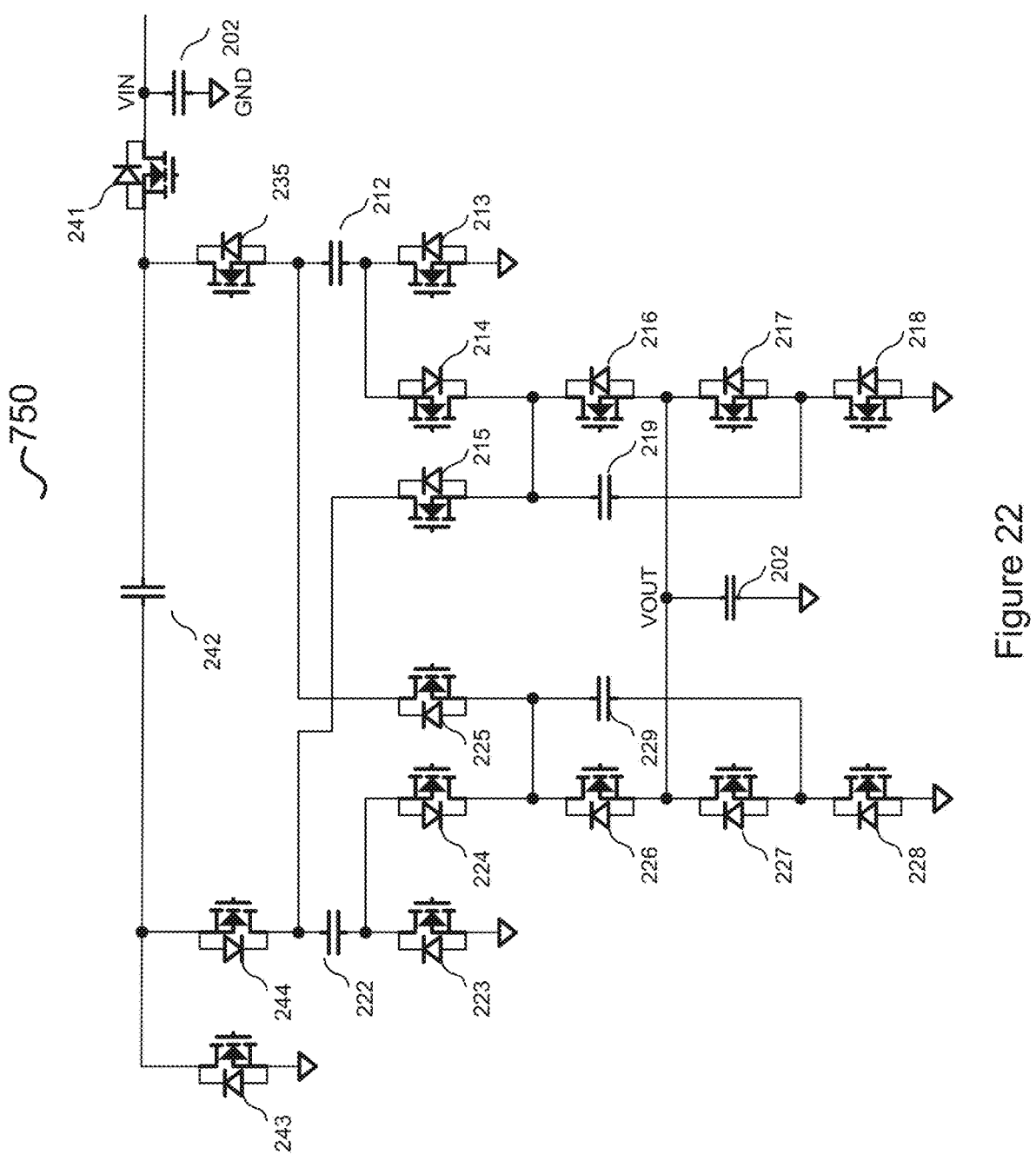
FIG. 22 illustrates a schematic diagram of an 8:1 single-phase switched capacitor converter in accordance with various embodiments of the present disclosure.

FIG. 22 illustrates a schematic diagram of an 8:1 single-phase switched capacitor converter in accordance with various embodiments of the present disclosure. The operating principle of the single-phase switched capacitor converter has been described above with respect to FIG. 13, and hence is not discussed again herein.

As shown in FIG. 22, a first switch 228, a second switch 227, a third switch 226, and a fourth switch 224 of the first leg are connected in series between ground and a first voltage node (a common node of 223 and 224). A first switch 218, a second switch 217, a third switch 216 and a fourth switch 215 of the second leg are connected in series between ground and a second voltage node (a common node of 214 and 213).

The first flying capacitor 229 is connected between the common node of the first switch 228 and the second switch 227 of the first leg, and the common node of the third switch 226 and the fourth switch 224 of the first leg. The second flying capacitor 219 is connected between the common node of the first switch 218 and the second switch 217 of the second leg, and the common node of the third switch 216 and the fourth switch 215 of the second leg.

The third flying capacitor 222 is connected between the first voltage node and the second voltage node. The fourth flying capacitor 212 is connected between a third voltage node (a common node of 213 and 214) and a fourth voltage node (a common node of 212 and 234). The first upper switch 223 is connected between the first voltage node and ground. The second upper switch 244 is connected between the second voltage node and a fifth voltage node. The third upper switch 213 is connected between the third voltage node and ground. The fourth upper switch 235 is connected between the fourth voltage node and a sixth voltage node. The fifth upper switch 225 is connected between the common node of the third switch 226 and the fourth switch 224 of the first leg, and the fourth voltage node. The sixth upper switch 214 is connected between the common node of the third switch 216 and the fourth switch 215 of the second leg, and the third voltage node. The seventh upper switch 243 is connected between the fifth voltage node and ground. A fifth flying capacitor 242 is connected between the fifth voltage node and the sixth voltage node. The eighth upper switch 241 is connected between the sixth voltage node and the input terminal (VIN).

The major advantage of the 8:1 switched capacitor converters illustrated in FIGS. 21 and 22 is that the 8:1 switched capacitor converters only require six and five flying capacitors to reach an 8:1 conversion ratio. In comparison with the switched capacitor converters shown in FIGS. 15 and 16, the switched capacitor converters illustrated in FIGS. 21 and 22 save two flying capacitors. It is more advantageous for some applications where it is critical to use less passive components.

Similar to the cascading converter configuration shown in FIG. 11, the 8:1 voltage converters shown in FIGS. 21 and 22 also can be used as a front stage in a multi-stage DC/DC conversion system to achieve a high-efficiency fixed-ratio voltage conversion.

Figure 23:
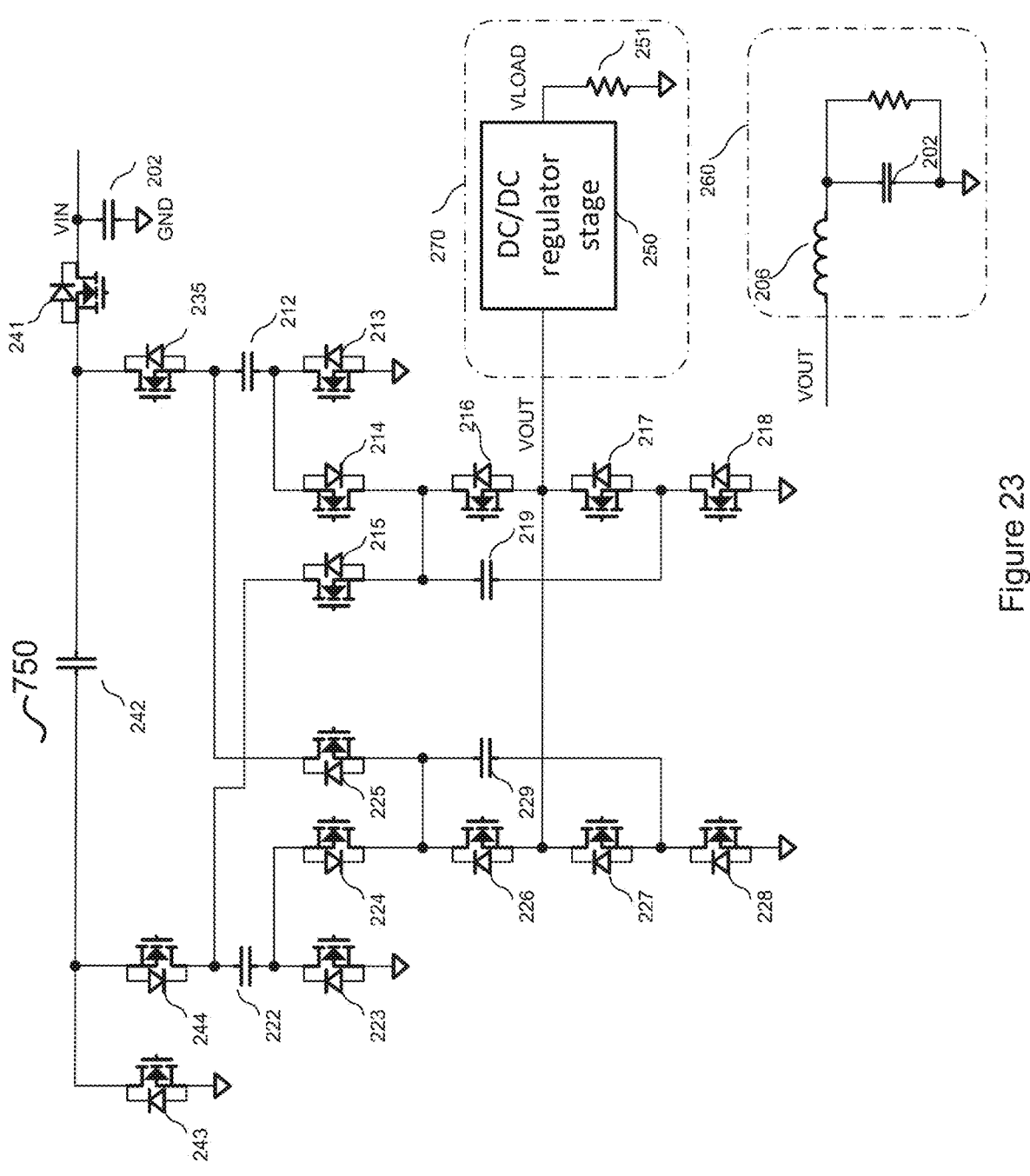
FIG. 23 illustrates a power conversion system including the 8:1 single-phase switched capacitor converter as a front stage and a DC/DC regulator stage or an LC liter as a second stage in accordance with various embodiments of the present disclosure.

FIG. 23 illustrates a power conversion system including the 8:1 single-phase switched capacitor converter as a front stage and a DC/DC regulator stage or an LC liter as a second stage in accordance with various embodiments of the present disclosure. Using the 8:1 single-phase switched capacitor converter shown in FIG. 22 as an example, as shown in FIG. 23, the power conversion system 750 comprises the 8:1 single-phase switched capacitor converter shown in FIG. 22 and a DC/DC regulator stage 250. The 8:1 single-phase switched capacitor converter and the DC/DC regulator stage 250 are connected in cascade between VIN and VLOAD.

The DC/DC regulator stage 250 is employed to achieve dynamic voltage regulation. In this system, the output capacitor for the 8:1 single-phase switched capacitor converter can be very small, or the output capacitor can be removed. The small output capacitor is used only to filter out very high frequency components of VOUT, while allowing VOUT to vary in a frequency approximately equal to twice the switching frequency. The variations of VOUT allow soft charging and discharging of flying capacitors, which reduces the charge sharing loss caused by current spikes when charge transferring occurs between capacitors.

Similar to FIG. 12, an LC filter can be connected to VOUT. As shown in FIG. 23, the LC filter comprises an inductor 206 and a capacitor 202. The capacitor 202 is connected in parallel with a load resistor 204. Similar to the configuration of connecting switched capacitor converter and the DC/DC regulator 250 in cascade, the inductor at the output of the 8:1 single-phase switched capacitor converter allows the voltage at VOUT to vary and limits the current spike when the output capacitor 202 is charged, which in turn allows soft charging and discharging of flying capacitors, which reduces the charge sharing loss caused by current spikes when charge transferring occurs between capacitors.

Along the same line of inserting inductive elements to reduce current spikes during charge sharing between flying capacitors, inductors can also be added in series with the third flying capacitor of the single phase 4:1 switched capacitor converter shown in FIG. 13.

Figure 24:
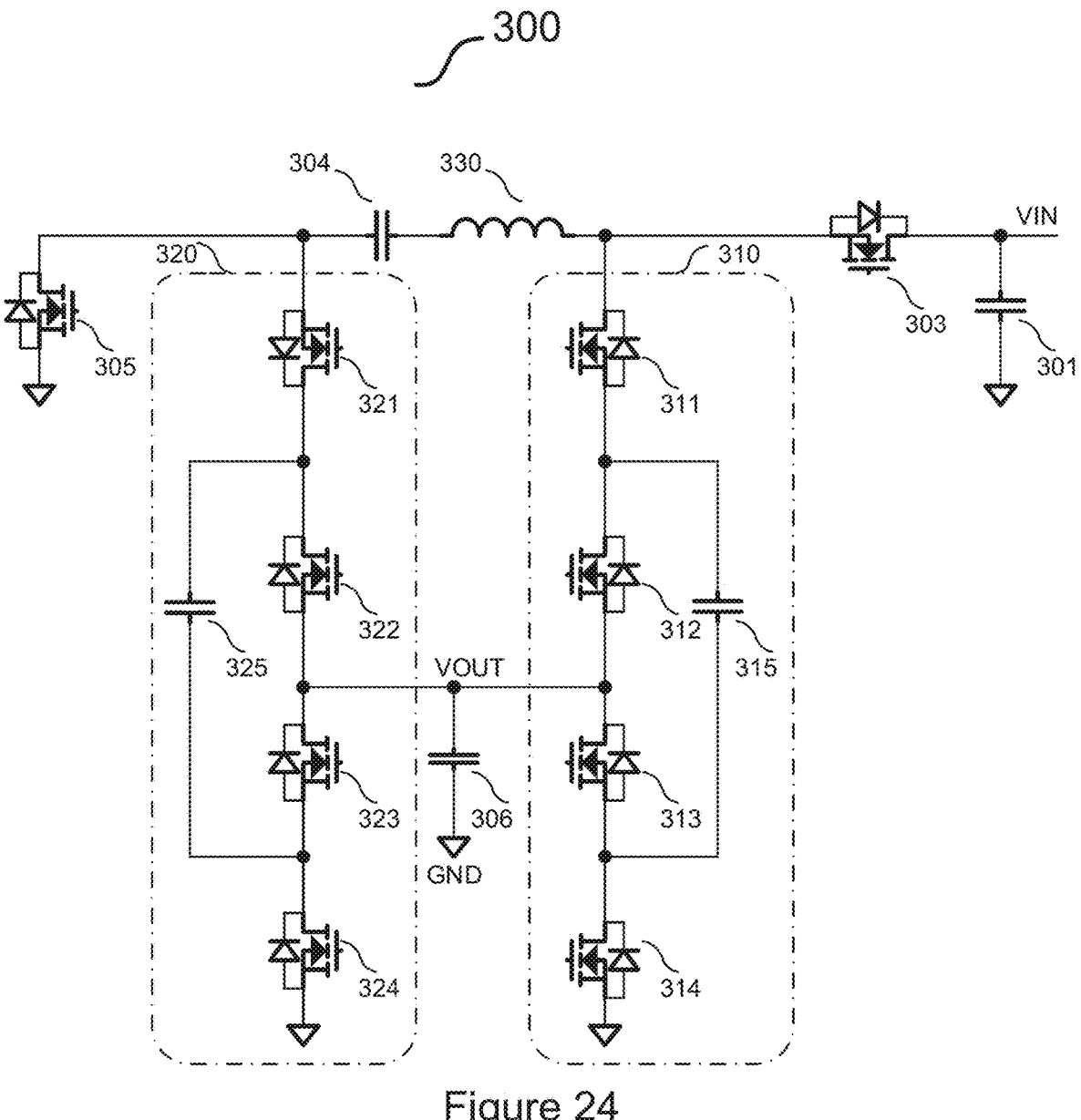
FIG. 24 illustrates a schematic diagram of a 4:1 single-phase switched capacitor converter with one inductive element in accordance with various embodiments of the present disclosure.

FIG. 24 illustrates a schematic diagram of a 4:1 single-phase switched capacitor converter with one inductive element in accordance with various embodiments of the present disclosure. As shown in FIG. 24, an inductor 330 is added in series with the third flying capacitor 304 between the first voltage node and the second voltage node of the 4:1 single-phase switched capacitor converter shown in FIG. 13.

In operation, the inductor 330 is able to limit the current spike along the charging and discharging path of the third flying capacitor 304, which reduces the charge sharing loss between the flying capacitors. In some embodiments the value of the inductor 330 can be selected to resonate with the series capacitance of the charging and discharging path of the third flying capacitor 304 at the switching frequency of the switches. Such an arrangement helps to achieve zero-voltage-switching and zero-current switching of some of the switches in the circuit, thereby further reducing the switching losses of the switched capacitor converter.

Figure 25:
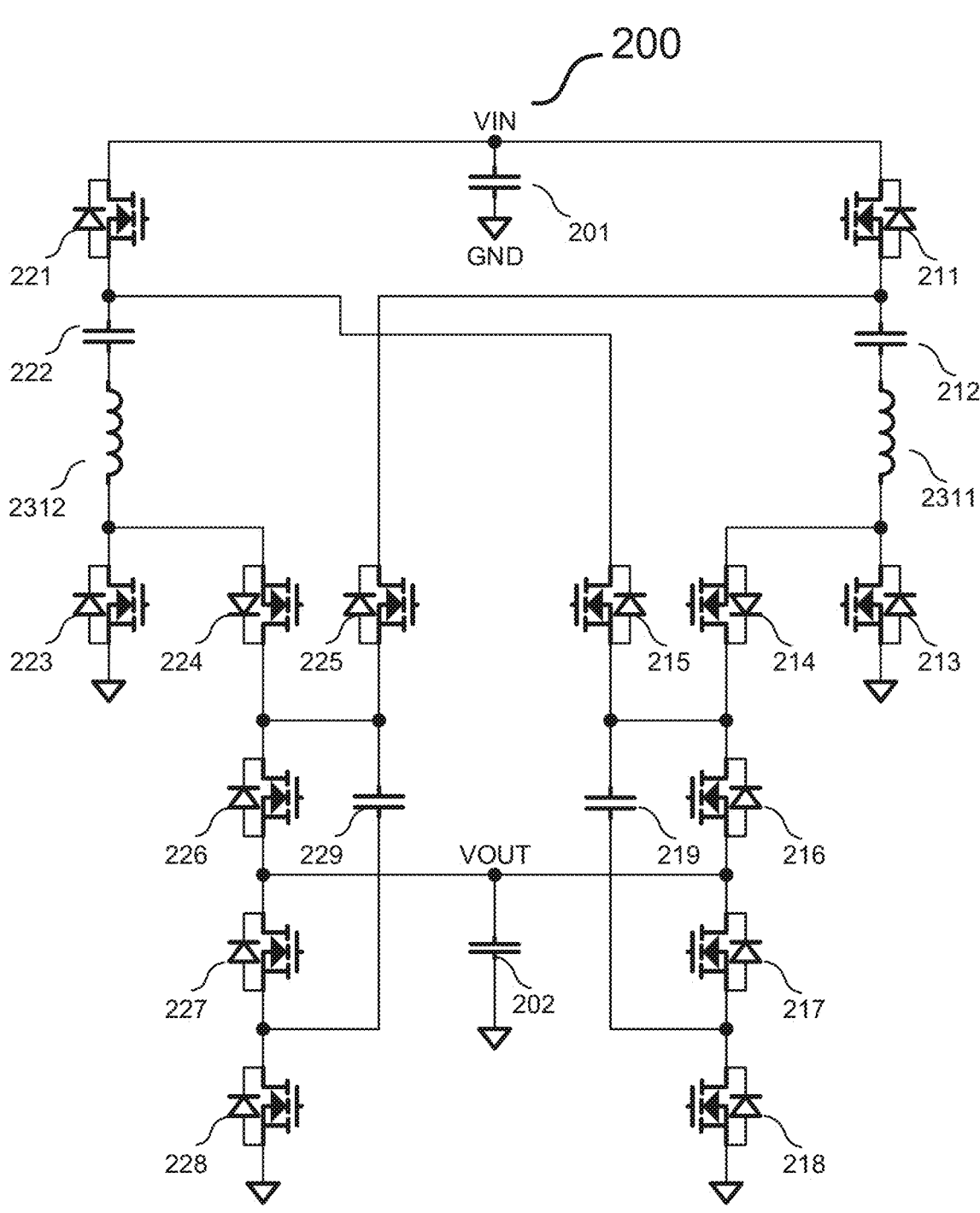
FIG. 25 illustrates a schematic diagram of a 4:1 dual-phase switched capacitor converter with two inductive elements in accordance with various embodiments of the present disclosure.

FIG. 25 illustrates a schematic diagram of a 4:1 dual-phase switched capacitor converter with two inductive elements in accordance with various embodiments of the present disclosure. Similarly, inductors can also be added in series with both the third flying capacitor and the fourth flying capacitor of the 4:1 dual-phase switched capacitor converter shown in FIG. 3.

As shown in FIG. 25, inductors 2312 and 2311 are added in series with the third flying capacitor 222 and the fourth flying capacitor 212 respectively. In operation, both inductors 2311 and 2312 are able to limit the current spikes along the charging and discharging path of the flying capacitors 212 and 222, thereby reducing the charge sharing loss between the flying capacitors.

In some embodiments, the value of the inductor 2312 and 2311 can be selected to resonate with the series capacitance of the charging and discharging path of the third flying capacitor 222 and fourth flying capacitor 212 respectively at the switching frequency of the switches. Such an arrangement helps to achieve zero-voltage-switching and zero-current switching of some of the switches in the circuit, thereby further reducing the switching losses of the switched capacitor converter.

Figure 26:
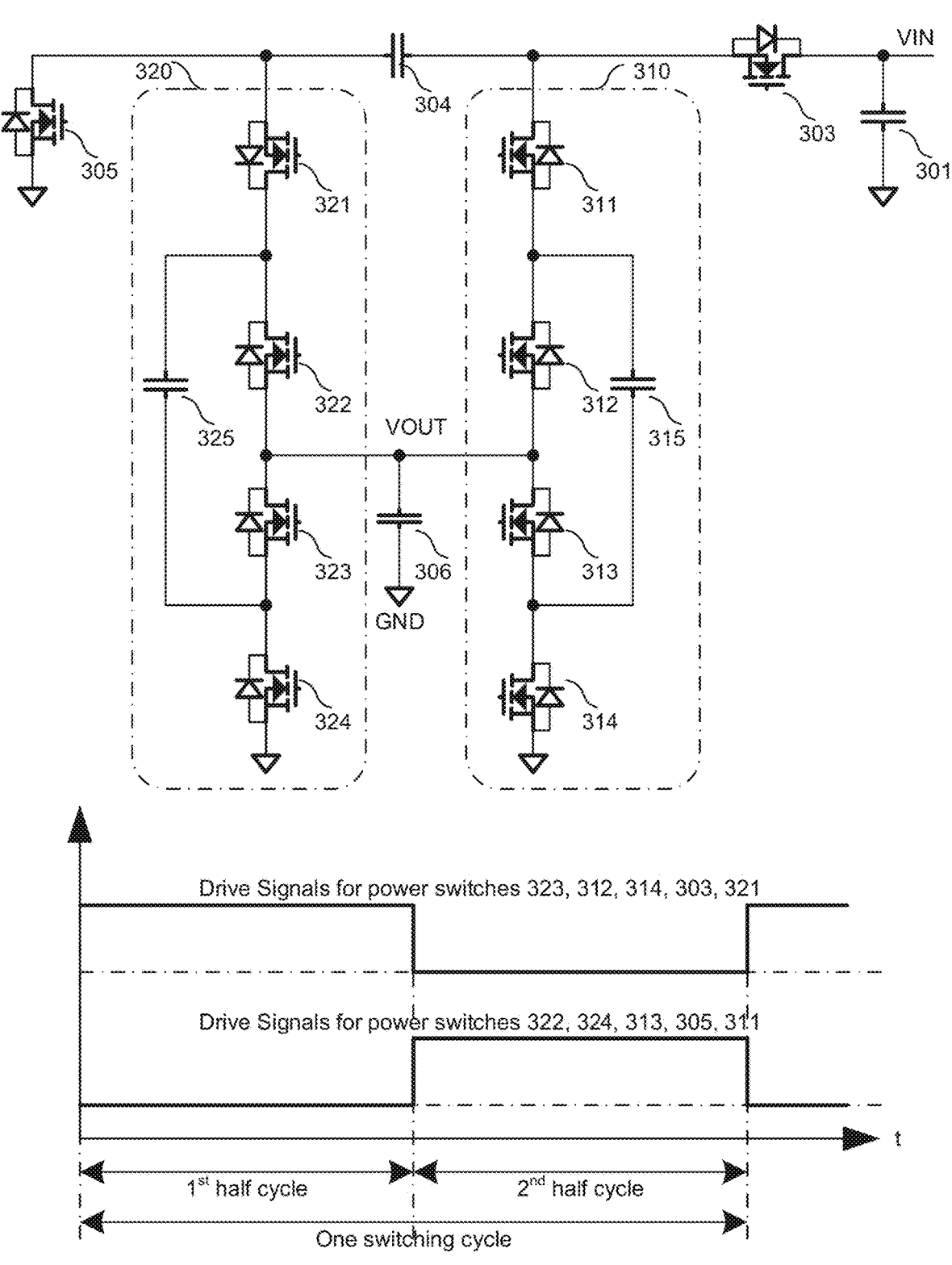
FIG. 26 illustrates the gate drive signals of the 4:1 single-phase switched capacitor converter shown in FIG. 13 in accordance with various embodiments of the present disclosure.

FIG. 26 illustrates the gate drive signals of the 4:1 single-phase switched capacitor converter shown in FIG. 13 in accordance with various embodiments of the present disclosure. As shown in FIG. 26, in a first half cycle, the switches 323, 312, 314, 303 and 321 are turned on, and the switches 322, 324, 313, 305 and 311 are turned off. In a second half cycle, the switches 323, 312, 314, 303 and 321 are turned off, and the switches 322, 324, 313, 305 and 311 are turned on.

Figure 27:
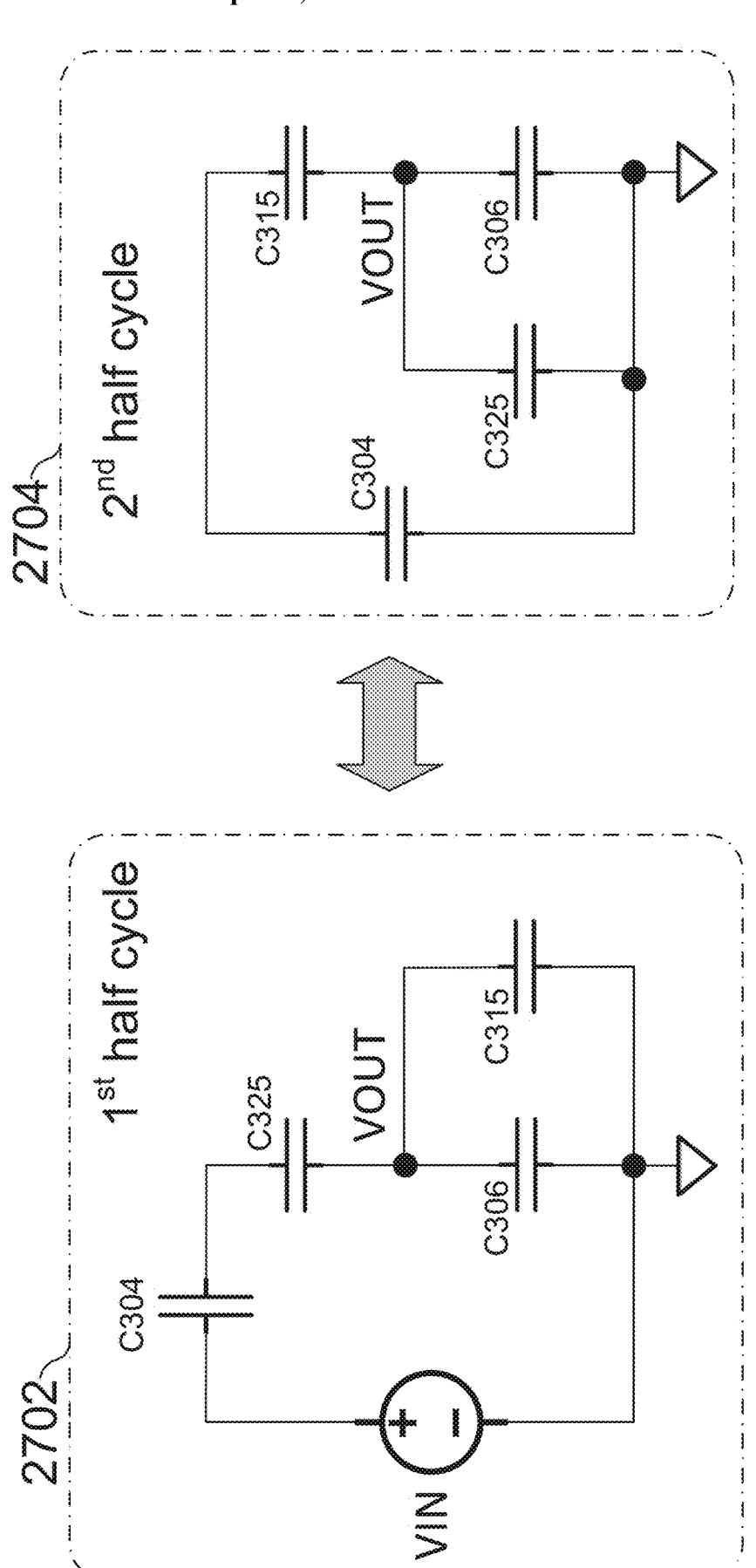
FIG. 27 illustrates two equivalent circuit diagrams for operating in two different half cycles in accordance with various embodiments of the present disclosure.

FIG. 27 illustrates two equivalent circuit diagrams for operating in two different half cycles in accordance with various embodiments of the present disclosure. Circuit 2702 is the equivalent circuit of the single-phase switched capacitor converter shown in FIG. 13 configured to operate in the first half cycle. Circuit 2704 is the equivalent circuit of the single-phase switched capacitor converter shown in FIG. 13 configured to operate in the second half cycle.

In the first half cycle, as indicated by the equivalent circuit 2702, VIN charges C306 through a conductive path formed by C304 and C325. Through this conductive path, VIN also provides power to a load coupled to VOUT. The flying capacitor C315 and C306 are connected in parallel. The flying capacitor C315 charges C306 and provides power to the load coupled to VOUT.

In the second half cycle, as indicated by the equivalent circuit 2704, the flying capacitor C304 charges C306 through C315. C304 also provides power to the load coupled to VOUT. The flying capacitor C325 and C306 are connected in parallel. The flying capacitor C325 charges C306 and provides power to the load coupled to VOUT.

As indicated by the two equivalent circuits 2702 and 2704, the charging and discharging paths of the flying capacitors in the two half cycles are not symmetrical. Due to the voltage difference between these two current supplying paths, charge transferring may occur between the capacitors on the two current supplying paths, thereby causing corresponding losses. The power losses can be avoided through using similar control mechanisms described below with respect to FIGS. 9-10.

Figure 28:
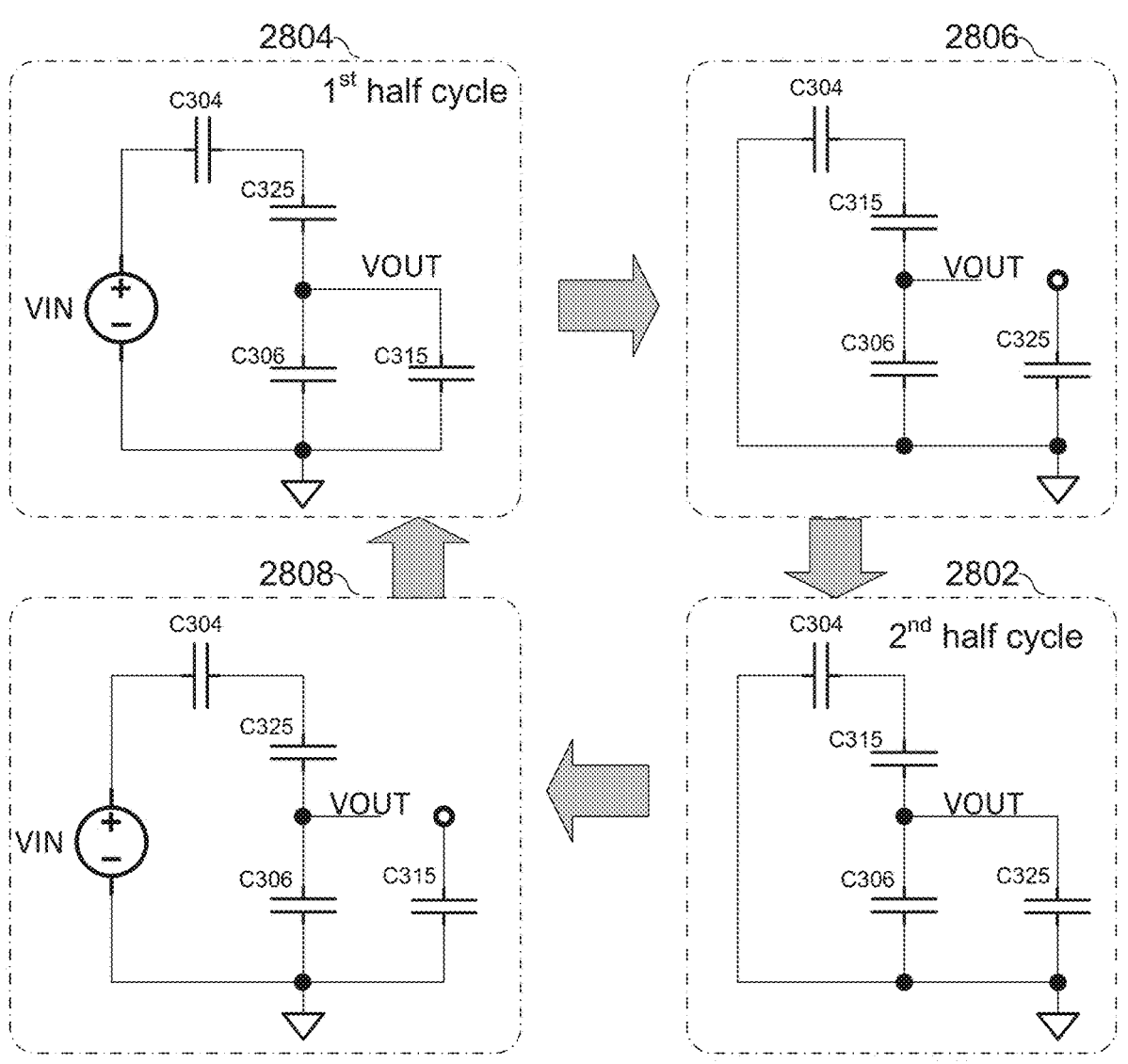
FIG. 28 illustrates four equivalent circuit diagrams for operating in two different operating modes in accordance with various embodiments of the present disclosure.

FIG. 28 illustrates four equivalent circuit diagrams for operating in two different operating modes in accordance with various embodiments of the present disclosure. In order to avoid the power loss caused by charge transferring, two transition periods have been added. A first transition period shown in the dashed rectangle 2808 is added during the transition from the second half cycle to the first half cycle. A second transition period shown in the dashed rectangle 2806 is added during the transition from the first half cycle to the second half cycle.

In the first transition period (2808), C315 is disconnected from C306. The voltage across C315 is maintained until the voltage of the charging path (VIN-VC304-VC325) is equal to the voltage on C315. Once the voltage (VIN-VC304-VC325) is equal to the voltage on C315, C315 is connected in parallel with C306 to supply power to the output capacitor C306 and the load. The delayed connection of C315 can effectively reduce or eliminate the charge transferring, thereby reducing the power loss caused by the charge transferring between the flying capacitors.

In the second transition period (2806), C325 is disconnected from C306. The voltage across C325 is maintained until the voltage of the charging path (VC304-VC315) is equal to the voltage on C325. Once the voltage (VC304-VC315) is equal to the voltage on C325, C325 is connected in parallel with C306 to supply power to the output capacitor C306 and the load. The delayed connection of C325 can effectively reduce or eliminate the charge transferring, thereby reducing the power loss caused by the charge transferring between the flying capacitors.

Figure 29:
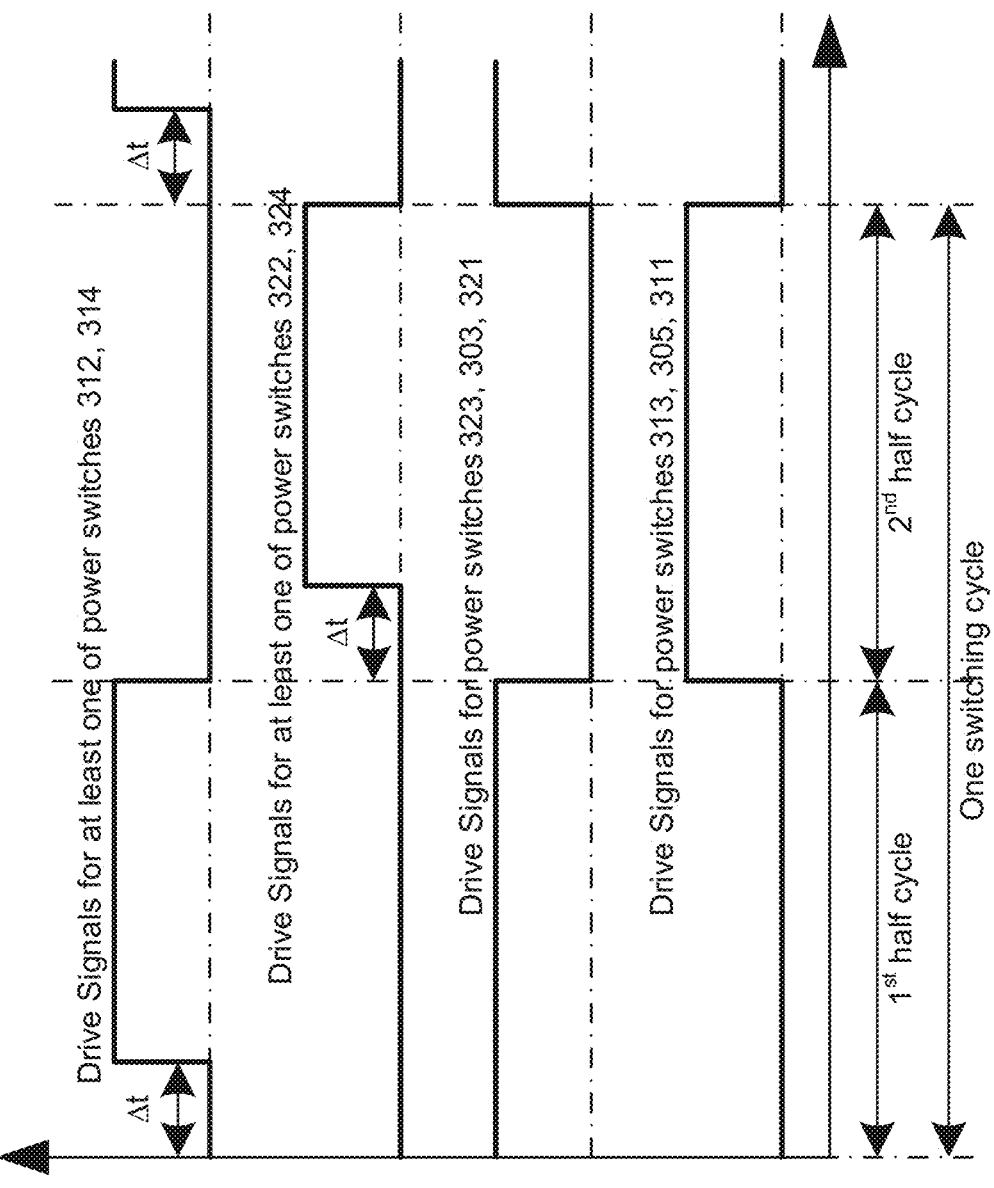
FIG. 29 illustrates the gate drive signals of the 4:1 single-phase switched capacitor converter shown in FIG. 13 in accordance with various embodiments of the present disclosure.

FIG. 29 illustrates the gate drive signals of the 4:1 single-phase switched capacitor converter shown in FIG. 13 in accordance with various embodiments of the present disclosure. As shown in FIG. 29, in a first half cycle, the switches 323, 303 and 321 are turned on, and the switches 313, 305, 311, 322 and 324 are turned off. The switches 312 and 314 are turned on after a first delay. The first delay is added according to the operating principle shown in the dashed rectangle 2808 in FIG. 28. In a second half cycle, the switches 323, 303, 321, 312 and 314 are turned off, and the switches 313, 305 and 311 are turned on. The switches 322 and 324 are turned on after a second delay. The second delay is added according to the operating principle shown in the dashed rectangle 2806 in FIG. 28.

It should be noted the control mechanism described above with respect to FIG. 29 is applied to the 4:1 single-phase switched capacitor converter, but it is understood that the control mechanism may be implemented using other types of switched capacitor converters described in the present disclosure.

FIG. 30 illustrates a flow chart of a method for controlling the switched capacitor converter shown in FIGS. 3 and 13 in accordance with various embodiments of the present disclosure. This flowchart shown in FIG. 30 is merely an example, which should not unduly limit the scope of the claims. One of ordinary skill in the art would recognize many variations, alternatives, and modifications. For example, various steps illustrated in FIG. 30 may be added, removed, replaced, rearranged, and repeated.

At step 3002, a switched capacitor converter is provided. The switched capacitor converter comprises a first leg comprising a plurality of first leg switches and a second leg comprising a plurality of second leg switches, a first flying capacitor connected to the first leg, a second flying capacitor connected to the second leg, and a third flying capacitor connected between the first leg and the second leg, and a first upper switch and a second upper switch connected to two terminals of the third flying capacitor respectively.

At step 3004, in a first half cycle, the plurality of first switches, the plurality of second leg switches, the first upper switch and the second upper switch are configured such that the third flying capacitor, the first flying capacitor and an output capacitor are connected in series, and the second flying capacitor and the output capacitor are connected in parallel.

At step 3006, in a second half cycle, the plurality of first leg switches, the plurality of second leg switches, the first upper switch and the second upper switch are configured such that the first flying capacitor and the output capacitor are connected in parallel, and the third flying capacitor, the second flying capacitor and the output capacitor are connected in series.

Referring back to FIG. 13, the switched capacitor converter is a single-phase switched capacitor converter. The switched capacitor converter comprises a first switch, a second switch, a third switch and a fourth switch of the first leg connected in series between ground and a first voltage node, a first switch, a second switch, a third switch and a fourth switch of the second leg connected in series between ground and a second voltage node, the first flying capacitor connected between a common node of the first switch and the second switch of the first leg, and a common node of the third switch and the fourth switch of the first leg, the second flying capacitor connected between a common node of the first switch and the second switch of the second leg, and a common node of the third switch and the fourth switch of the second leg, the third flying capacitor connected between the first voltage node and the second voltage node, the first upper switch connected between the first voltage node and ground, and the second upper switch connected between the second voltage node and the input terminal.

The method further comprises in the first half cycle, configuring the second switch and the fourth switch of the first leg, and the second upper switch to be turned on, and configuring the first switch and the third switch of the second leg to be turned on after a first delay, and in the second half cycle, configuring the second switch and the fourth switch of the second leg, and the first upper switch to be turned on, and configuring the first switch and the third switch of the first leg to be turned on after a second delay.

The first delay is determined based upon a comparison between a voltage across the second flying capacitor and a first charging voltage equal to an input voltage minus a sum of a voltage across the first flying capacitor and a voltage across the third flying capacitor, and wherein the first switch and the third switch of the second leg are both turned on once the voltage across the second flying capacitor is equal to the first charging voltage.

The second delay is determined based upon a comparison between a voltage across the first flying capacitor and a second charging voltage equal to the voltage across the third flying capacitor minus the voltage across the second flying capacitor, and wherein the first switch and the third switch of the first leg are both turned on once the voltage across the first flying capacitor is equal to the second charging voltage.

Referring back to FIG. 24, the switched capacitor converter is a single-phase switched capacitor converter similar to that shown in FIG. 13, but with an inductor 330 connected in series with the third flying capacitor 304, where the method further comprises in the first half cycle, configuring the second switch and the fourth switch of the first leg, the first switch and the third switch of the second leg, and the second upper switch to be turned on with a 50% duty cycle, and in the second half cycle, configuring the second switch and the fourth switch of the second leg, the first switch and the third switch of the first leg, and the first upper switch to be turned on with a 50% duty cycle.

Referring back to FIG. 3, the switched capacitor converter is a dual-phase switched capacitor converter. The switched capacitor converter comprises a first switch, a second switch, a third switch and a fourth switch of the first leg connected in series between ground and a first voltage node, a first switch, a second switch, a third switch and a fourth switch of the second leg connected in series between ground and a second voltage node, the first flying capacitor connected between a common node of the first switch and the second switch of the first leg, and a common node of the third switch and the fourth switch of the first leg, the second flying capacitor connected between a common node of the first switch and the second switch of the second leg, and a common node of the third switch and the fourth switch of the second leg, the third flying capacitor connected between the first voltage node and the second voltage node, the first upper switch connected between the first voltage node and ground, the second upper switch connected between the second voltage node and the input terminal, a fourth flying capacitor connected between a third voltage node and a fourth voltage node, a third upper switch connected between the third voltage node and ground, a fourth upper switch connected between the fourth voltage node and the input terminal, a fifth upper switch connected between the common node of the third switch and the fourth switch of the first leg and the fourth voltage node, and a sixth upper switch connected between the common node of the third switch and the fourth switch of the second leg and the third voltage node.

The method further comprises in the first half cycle, configuring the fifth upper switch, the third upper switch, the second switch and the fourth switch of the first leg, the first switch and the third switch of the second leg, and the second upper switch to be turned on with a 50% duty cycle, and in the second half cycle, configuring the sixth upper switch, the fourth upper switch, the second switch and the fourth switch of the second leg, the first switch and the third switch of the first leg, and the first upper switch to be turned on with a 50% duty cycle.

The method further comprises in the first half cycle, configuring the fifth upper switch, the third upper switch, the second switch and the fourth switch of the first leg, and the second upper switch to be turned on, and configuring the first switch and the third switch of the second leg to be turned on after a first delay, and in the second half cycle, configuring the sixth upper switch, the fourth upper switch, the second switch and the fourth switch of the second leg, and the first upper switch to be turned on, and configuring the first switch and the third switch of the first leg to be turned on after a second delay.

The first delay is determined based upon a comparison between a voltage across the second flying capacitor and a first charging voltage equal to an input voltage minus a sum of a voltage across the first flying capacitor and a voltage across the third flying capacitor, and wherein the first switch and the third switch of the second leg are both turned on once the voltage across the second flying capacitor is equal to the first charging voltage.

The second delay is determined based upon a comparison between a voltage across the first flying capacitor and a second charging voltage equal to an input voltage minus a sum of a voltage across the fourth flying capacitor and the voltage across the second flying capacitor, and wherein the first switch and the third switch of the first leg are both turned on once the voltage across the first flying capacitor is equal to the second charging voltage.

Referring back to FIG. 25, the switched capacitor converter is a dual-phase switched capacitor converter similar to that shown in FIG. 3, but with an inductor 2312 connected in series with the third flying capacitor 222 and an inductor 2311 connected in series with the fourth flying capacitor, where the method further comprises in the first half cycle, configuring the fifth upper switch, the third upper switch, the second switch and the fourth switch of the first leg, the first switch and the third switch of the second leg, and the second upper switch to be turned on with a 50% duty cycle, and in the second half cycle, configuring the sixth upper switch, the fourth upper switch, the second switch and the fourth switch of the second leg, the first switch and the third switch of the first leg, and the first upper switch to be turned on with a 50% duty cycle.

Referring back to FIGS. 22 and 23, the switched capacitor converter is a single-phase switched capacitor converter comprising a first switch, a second switch, a third switch and a fourth switch of the first leg connected in series between ground and the first voltage node, a first switch, a second switch, a third switch and a fourth switch of the second leg connected in series between ground and the second voltage node, the first flying capacitor connected between the common node of the first switch and the second switch of the first leg, and the common node of the third switch and the fourth switch of the first leg, the second flying capacitor connected between the common node of the first switch and the second switch of the second leg, and the common node of the third switch and the fourth switch of the second leg, the third flying capacitor connected between the first voltage node and the second voltage node, the first upper switch connected between the first voltage node and ground, the second upper switch connected between the second voltage node and a fifth voltage node, a fourth flying capacitor connected between a third voltage node and a fourth voltage node, a third upper switch connected between the third voltage node and ground, a fourth upper switch connected between the fourth voltage node and a sixth voltage node, a fifth upper switch connected between the fourth voltage node, and the common node of the third switch and the fourth switch of the first leg, a sixth upper switch connected between the third voltage node, and the common node of the third switch and the fourth switch of the second leg, a fifth flying capacitor connected between the fifth voltage node and the sixth voltage node and an eighth upper switch connected between the sixth voltage node and the input terminal.

The method further comprises in the first half cycle, configuring the second switch and the fourth switch of the first leg, and the second upper switch, the third upper switch, the fifth upper switch and the eighth upper switch to be turned on, and configuring the first switch and the third switch of the second leg to be turned on after a first delay, and in the second half cycle, configuring the second switch and the fourth switch of the second leg, and the first upper switch, the fourth upper switch, the sixth upper switch and the seventh upper switch to be turned on, and configuring the first switch and the third switch of the first leg to be turned on after a second delay.

In some embodiments, the first delay is determined based upon a comparison between a voltage across the second flying capacitor and a first charging voltage equal to an input voltage minus a sum of a voltage across the first flying capacitor, a voltage across the third flying capacitor and a voltage across the fifth flying capacitor, and wherein the first switch and the third switch of the second leg are both turned on once the voltage across the second flying capacitor is equal to the first charging voltage. The second delay is determined based upon a comparison between a voltage across the first flying capacitor and a second charging voltage equal to the voltage across the fifth flying capacitor minus a sum of a voltage across the fourth flying capacitor and the voltage across the second flying capacitor, and wherein the first switch and the third switch of the first leg are both turned on once the voltage across the first flying capacitor is equal to the second charging voltage.

Figure 31:
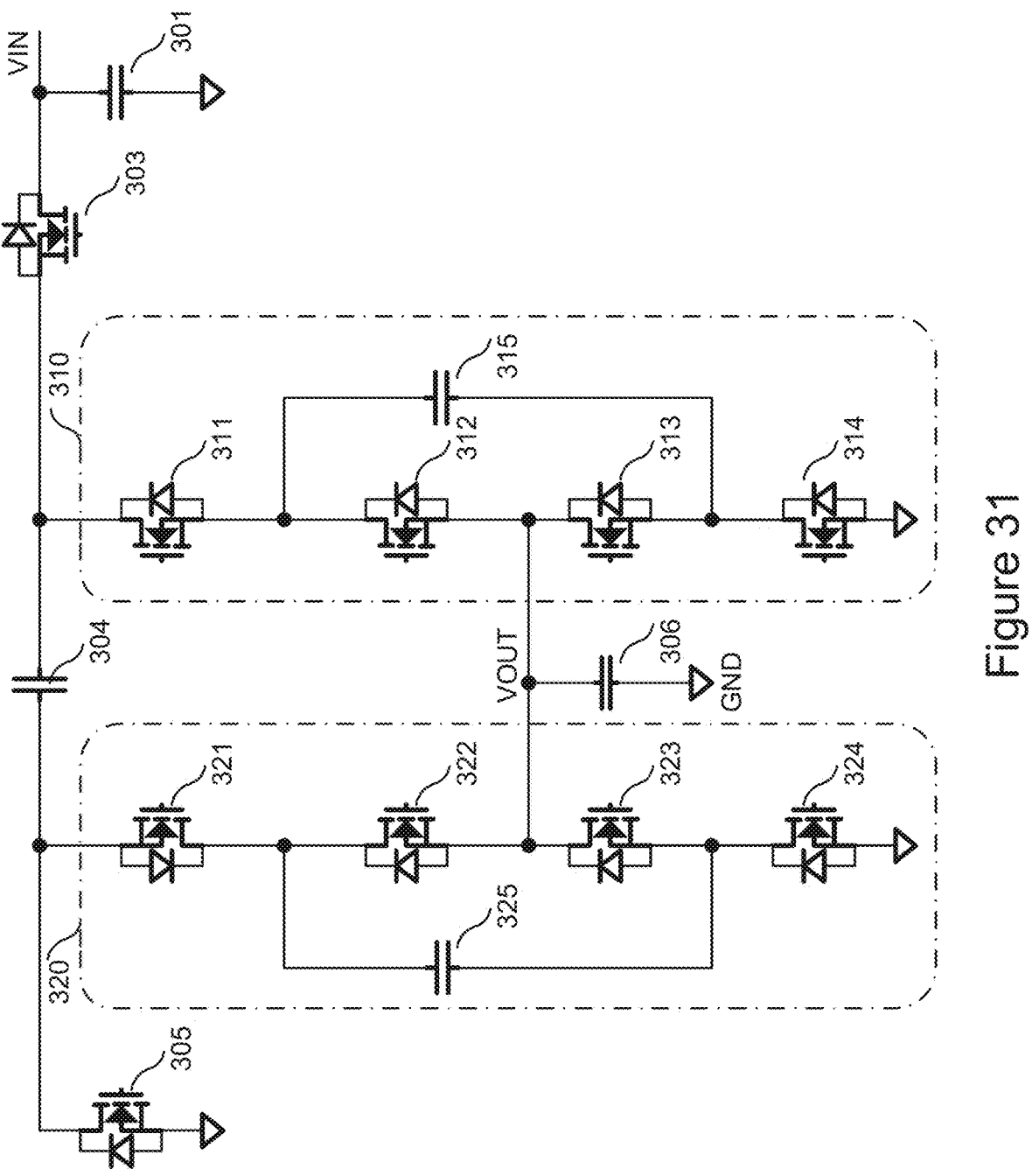
FIGS. 31-35 illustrate a process of generating a 4:1 dual-phase switched capacitor converter based on two 4:1

FIGS. 31-35 illustrate a process of generating a 4:1 dual-phase switched capacitor converter based on two 4:1 single-phase switched capacitor converters in accordance with various embodiments of the present disclosure. FIG. 31 illustrates a schematic diagram of a 4:1 single-phase switched capacitor converter in accordance with various embodiments of the present disclosure. The switched capacitor converter shown in FIG. 31 is the same as that shown in FIG. 13, and hence is not discussed again to avoid repetition.

Figure 32:
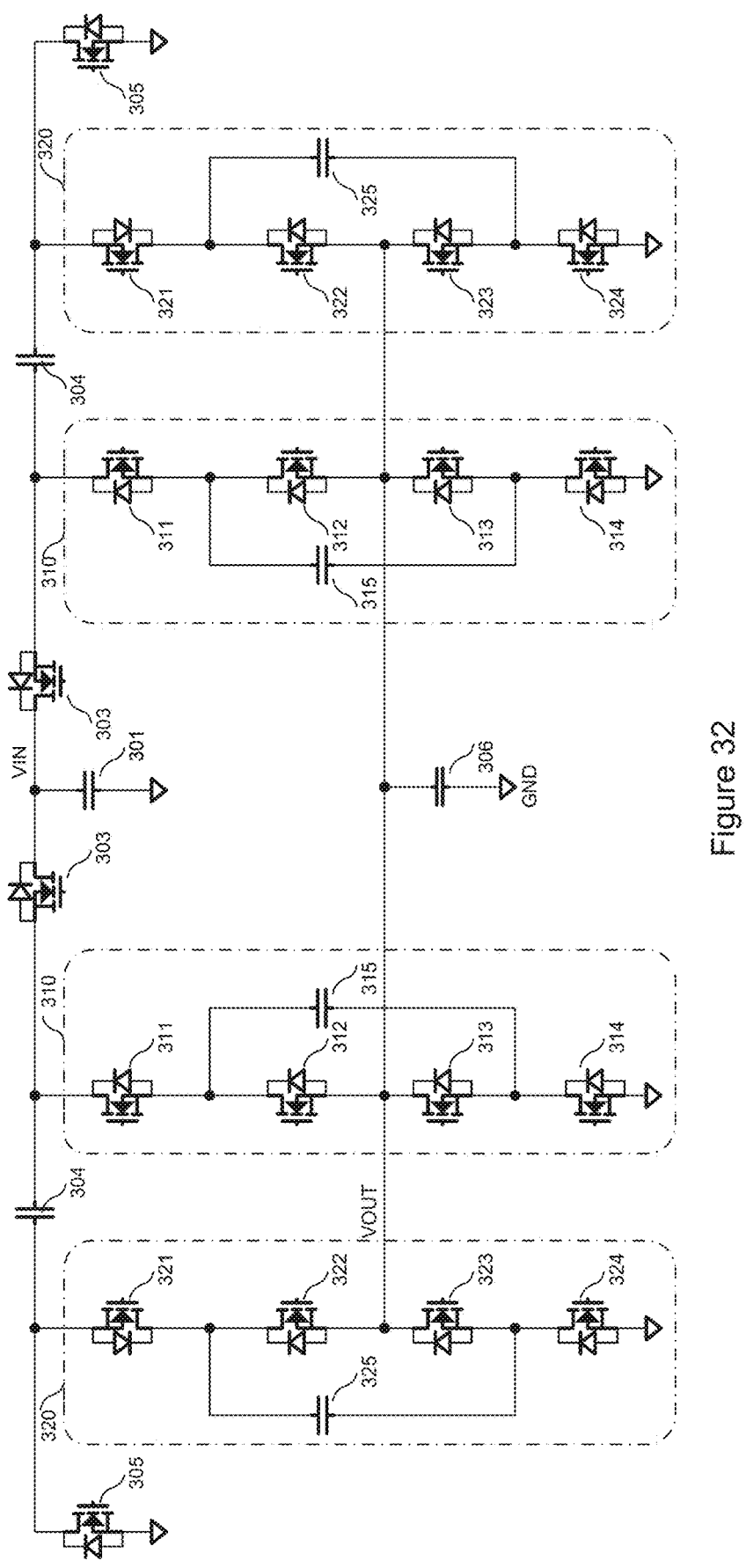
Figure 33:
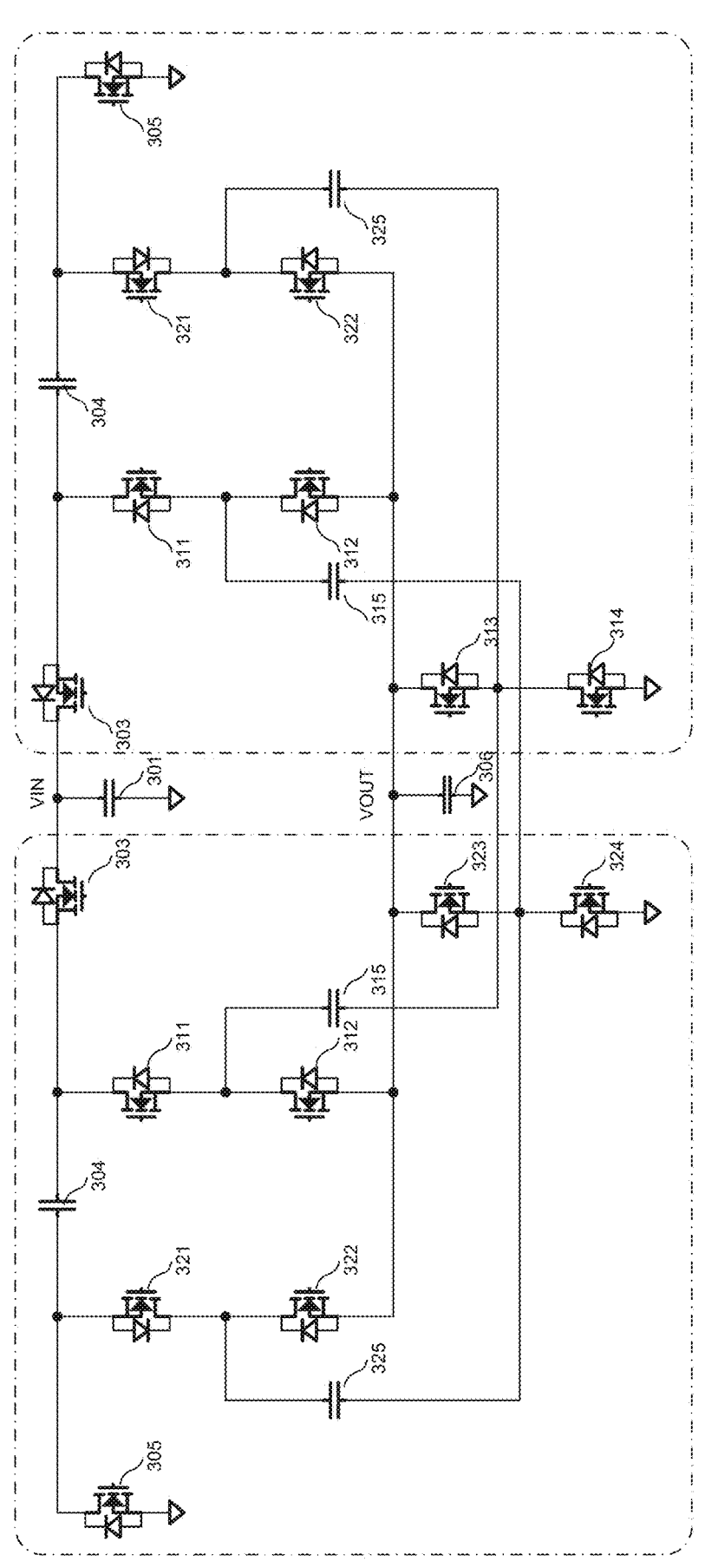

FIG. 32 illustrates a schematic diagram of a switched capacitor converter after two 4:1 single-phase switched capacitor converters are combined. These two 4:1 single-phase switched capacitor converters are arranged in a symmetrical manner as shown in FIG. 32. The control signals of the left side and the control signals of the right side are of a phase shift of 180 degrees. The bottom four switches including switches 314 and 324 on the left side, and switches 314 and 324 on the right side can be combined into two switches because the connections of these four switches are the same. FIG. 33 illustrates a schematic diagram of a switched capacitor converter after the four bottom switches of FIG. 32 have been combined into two switches.

Figure 34:
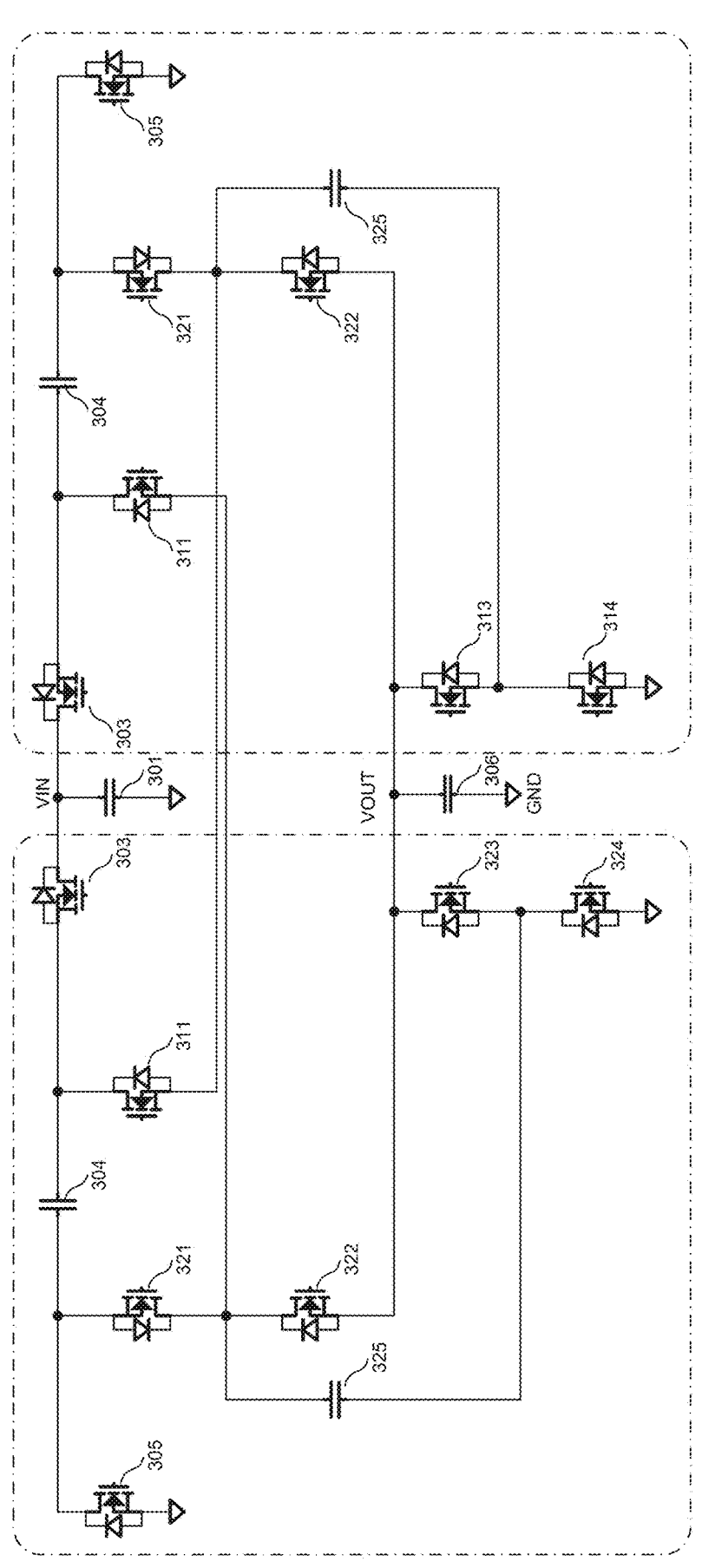
Figure 35:
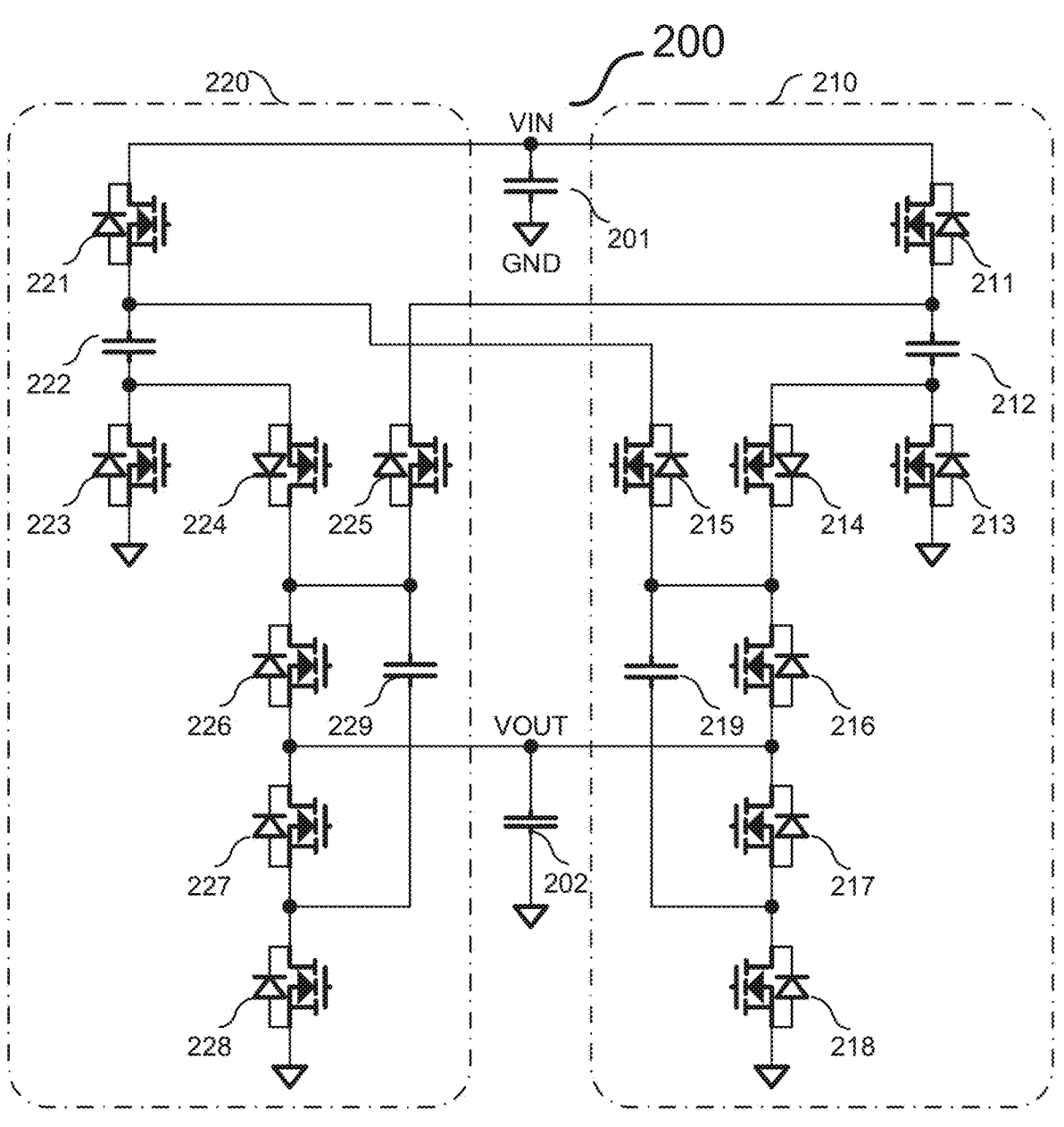

As shown in FIG. 33, the middle four switches including switches 312 and 322 on the left side, and switches 312 and 322 on the right side can be combined into two switches because the connections of these four switches are the same. After the four middle switches have been combined into two switches, the corresponding flying capacitors can be simplified. FIG. 34 illustrates a schematic diagram of a switched capacitor converter after the four middle switches shown in FIG. 33 have been combined into two switches. FIG. 35 illustrated a 4:1 dual-phase switched capacitor converter after the components of FIG. 34 have been rearranged. The switched capacitor converter shown in FIG. 35 is the same as that shown in FIG. 3.

FIG. 36 illustrates a schematic diagram of a 4:1 single-phase switched capacitor converter in accordance with various embodiments of the present disclosure. FIG. 36 is reproduced based on FIG. 13 with different partitioning of circuit branches. As shown in FIG. 36, this switched capacitor converter comprises an input terminal VIN, an output terminal VOUT, a first energy storage branch 10, a second energy storage branch 20, a third energy storage branch 30 and a control branch (not shown).

The first energy storage branch 10 comprises a first capacitor C1, a first switch Q1, a second switch Q2 and a third switch Q3. The second energy storage branch 20 comprises a second capacitor C2, a fourth switch Q4, a fifth switch Q5 and a sixth switch Q6. The third energy storage branch 30 comprises a third capacitor C3, a seventh switch Q7, an eighth switch Q8, a ninth switch Q9 and a tenth switch Q10.

The third terminal of the first switch Q1 is connected to the first terminal of the first capacitor C1. The second terminal of the first switch Q1 and the third terminal of the second switch Q2 are connected to the output terminal VOUT. The second terminal of the second switch Q2 is connected to the third terminal of the third switch Q3. The second terminal of the first capacitor C1 is connected to the common node of Q2 and Q3. The second terminal of the third switch Q3 is grounded.

The third terminal of the fourth switch Q4 is connected to the first terminal of the second capacitor C2. The second terminal of the fourth switch Q4 is connected to the third terminal of the fifth switch Q5. The third terminal of the fifth switch Q5 is connected to the output terminal VOUT. The second terminal of the fifth switch Q5 is connected to the third terminal of the sixth switch Q6. The second terminal of the second capacitor C2 is connected to the common node of Q5 and Q6. The second terminal of the sixth switch Q6 is grounded.

The third terminal of the seventh switch Q7 is connected to the second terminal of the ninth switch Q9 and the first terminal of the third capacitor C3. The second terminal of the third capacitor C3 is connected to the third terminal of the tenth switch Q10 and the second terminal of the eighth switch Q8. The third terminal of the eighth switch Q8 is connected to the input terminal VIN. The second terminal of the seventh switch Q7 is grounded. The third terminal of the ninth switch Q9 is connected to the third terminal of the first switch Q1. The second terminal of the tenth switch Q10 is connected to the third terminal of the fourth switch Q4.

The control branch is connected to the first terminal of each switch in the first energy storage branch 10, the second energy storage branch 20 and the third energy storage branch 30. These three branches comprise the first switch Q1, the second switch Q2, the third switch Q3, the fourth switch Q4, the fifth switch Q5, the sixth switch Q6, the seventh switch Q7, the eighth switch Q8, the ninth switch Q9 and the tenth switch Q10.

The control branch is used to control each switch to be switched on and off periodically in two phases, so that the ratio of the voltage (VI) of the input terminal VIN to the voltage (VO) of the output terminal VOUT is 2N:1. N is a positive integer. The plurality of switches that is turned on or turned off in the same time period (including a first half cycle or a second half of an operating cycle) belongs to the same phase. For example, in an embodiment, in the first half of an operating cycle, the seventh switch Q7 and the tenth switch Q10 are all driven to conduct. Then, the seventh switch Q7 and the tenth switch Q10 belong to the same phase. Since the operating cycle is divided into the first half cycle and the second half cycle, there are two phases. The switches are divided into two groups. One group is turned on in a first phase. The other group is turned on in a second phase.

In this embodiment, only 10 switches (the first switch Q1, the second switch Q2, the third switch Q3, the fourth switch Q4, the fifth switch Q5, the sixth switch Q6, the seventh switch Q7, the eighth switch Q8, the ninth switch Q9 and the tenth switch Q10) and three flying capacitors (the first capacitor C1, the second capacitor C2 and the third capacitor C3) are required to realize that the ratio of the voltage of the input terminal VIN to the voltage of the output terminal VOUT is 4:1.

It should be noted that in the embodiment of the present application, each switch is a MOSFET as an example. In other embodiments, each switch may also be any controllable switch, such as an insulated-gate bipolar transistor (IGBT) device, an integrated gate-commutated thyristor (IGCT) device, a gate turn-off thyristor (GTO) device, a silicon-controlled rectifier (SCR) device, a junction gate field-effect transistor (JFET) device, a MOS-controlled thyristor (MCT) device, a gallium nitride (GaN)-based power device, a silicon carbide (SIC)-based power device, and the like.

At the same time, taking the first switch Q1 as an example, when the first switch Q1 is a MOSFET switch, the gate of the MOSFET switch is the first terminal of the first switch Q1. The source of the MOSFET switch is the second terminal of the first switch Q1, and the drain of the MOSFET switch is the third terminal of the first switch Q1. The application of other switches is the same as that of the first switch Q1, and it is within the scope that is easy to understand by those skilled in the art, so it will not be repeated here.

In an embodiment, the voltage conversion circuit may also comprise a first filter capacitor CT1 and a second filter capacitor CT2. The first terminal of the first filter capacitor CT1 is connected to the output terminal VOUT, and the second terminal of the first filter capacitor CT1 is grounded. The first terminal of the second filter capacitor CT2 is connected to the input terminal VIN, and the second terminal of the second filter capacitor CT2 is grounded.

FIG. 37 illustrates a first control method applicable to the 4:1 single-phase switched capacitor converter shown in FIG. 36 in accordance with various embodiments of the present disclosure. In FIG. 37, the curve L32 is the control signal of the second switch Q2, the fourth switch Q4, the sixth switch Q6, the eighth switch Q8 and the ninth switch Q9. The curve L31 is the control signal of the first switch Q1, the third switch Q3, the fifth switch Q5, the seventh switch Q7 and the tenth switch Q10. The duration T3 represents an operating cycle. The duration T31 represents the first half of the operating cycle. The duration T32 represents the second half of the operating cycle. T3M is the middle time instant of the operating cycle. It should be understood that the control signals in any embodiment of the present application are output by the control branch.

It should be understood that in the embodiment of the present application, the high level signal in FIG. 37 indicates the corresponding switch is turned on, and the low level signal indicates the corresponding switch is turned off. For example, in the duration T31, the curve L32 is a high-level signal. Correspondingly, the first switch Q1, the third switch Q3, the fifth switch Q5, the seventh switch Q7 and the tenth switch Q10 are turned on.

In this embodiment, the control branch is further used to do the following: from the curve L31, it can be seen that at the beginning of an operating cycle (time instant T3S, the moment when T31 begins), the first switch Q1, the third switch Q3, the fifth switch Q5, the seventh switch Q7 and the tenth switch Q10 are turned on, and the other switches are controlled to turn off. That is, in the first half of this operating cycle, the first switch Q1, the third switch Q3, the fifth switch Q5, the seventh switch Q7 and the tenth switch Q10 are kept on, and the other switches are turned off.

At the middle of an operating cycle (time instant T3M, the moment when T32 begins), the second switch Q2, the fourth switch Q4, the sixth switch Q6, the eighth switch Q8 and the ninth switch Q9 are turned on, and the other switches are turned off. That is, in the second half of this operating cycle, the second switch Q2, the fourth switch Q4, the sixth switch Q6, the eighth switch Q8 and the ninth switch Q9 are kept on, and the other switches are turned off.

Specifically, in the first half of an operating cycle, the second capacitor C2 and the first filter capacitor CT1 are connected in series, and then connected in parallel with the third capacitor C3. Then the average voltage on the third capacitor C3 is equal to the sum of the average voltages on the second capacitor C2 and the first filter capacitor CT1. That is, the voltage on C3 is twice the voltage on the output terminal VOUT. At the same time, the first capacitor C1 charges the first filter capacitor CT1 through the first switch Q1 and the third switch Q3, and supplies power to the output terminal VOUT. Because the first capacitor C1 is connected in parallel with the first filter capacitor CT1, the average voltage on the first capacitor C1 is equal to the voltage on the output terminal VOUT. In the second half of an operating cycle, the third capacitor C3, the first capacitor C1 and the first filter capacitor CT1 are connected in series. The sum of the average voltages on the third capacitor C3, the first capacitor C1, and the first filter capacitor CT1 is equal to the voltage at the input terminal VIN. At the same time, the second capacitor C2 charges the first filter capacitor CT1 through the fourth switch Q4 and the sixth switch Q6, and supplies power to the output terminal VOUT. Because the second capacitor C2 is connected in parallel with the first filter capacitor CT1, the average voltage on the second capacitor C2 is equal to the voltage on the output terminal VOUT.

As mentioned above, the sum of the average voltages on the first capacitor C1, the third capacitor C3 and the first filter capacitor CT1 is equal to the voltage on the input terminal VIN. The average voltage on the third capacitor C3 is equal to one half of the voltage on the input terminal VIN.

In the operating mode above, when the switching frequency of each switch is fast enough, the voltages at both terminals of the first capacitor C1, the second capacitor C2, the third capacitor C3 and the first filter capacitor CT1 will fluctuate around an average value. The average voltage on the third capacitor C3 is equal to one half of the voltage at the input terminal VIN. The average voltage on the first capacitor C1, the second capacitor C2 and the first filter capacitor CT1 is equal to the voltage on the output terminal VOUT. The voltage on the output terminal VOUT is the average voltage on the first filter capacitor CT1, and is also equal to one half of the average voltage on the third capacitor C3. That is, it is equal to one fourth of the voltage on the input terminal VIN. In other words, the ratio of the voltage of the input terminal VIN to the voltage of the output terminal VOUT is 4:1.

As shown in FIG. 37, the first switch Q1, the second switch Q2, the third switch Q3, the fourth switch Q4, the fifth switch Q5, the sixth switch Q6, the seventh switch Q7, the eighth switch Q8, the ninth switch Q9 and the tenth switch Q10 all alternately turn on and off with a duty cycle of 50%, so that the ratio of the voltage of the input terminal VIN to the voltage of the output terminal VOUT is 4:1.

When the switched capacitor converter shown in FIG. 36 operates in the 4:1 step-down mode, the first switch Q1, the third switch Q3, the fifth switch Q5, the seventh switch Q7 and the tenth switch Q10 form one phase of the switched capacitor converter. These switches are turned on in the first half of the operating cycle. The second switch Q2, the fourth switch Q4, the sixth switch Q6, the eighth switch Q8 and the ninth switch Q9 form the other phase of the voltage conversion circuit. These switches are turned on in the second half of the operating cycle.

It should be noted that although the switches in the same phase are all turned on in the same half cycle, their on-times are not necessarily the same, and the operation of the switched capacitor converter can be optimized by configuring the conduction sequence of each switch in the same phase circuit. For example, in a practical application, because there may be a short dead time, the first switch Q1, the second switch Q2, the third switch Q3, the fourth switch Q4, the fifth switch Q5, the sixth switch Q6, the seventh switch Q7, the eighth switch Q8, the ninth switch Q9 and the tenth switch Q10 all alternately turn on and off with a duty cycle close to 50% (e.g., in a range from about 49% to about 50%), such as 49.5%.

As shown in FIG. 37, the curve L33 is the voltage waveform at the third terminal (drain) of the tenth switch Q10. The curve L34 is the voltage waveform at the second terminal (source) of the tenth switch Q10, and the curve L35 is the drain-source voltage difference of the tenth switch Q10. In the first half of an operating cycle (e.g., T31), the tenth switch Q10 is turned on, and the voltage at its drain and the voltage at its source are one half of the voltage VI on the input terminal VIN. In the second half of the operating cycle (e.g., T32), the tenth switch Q10 is turned off. Because the eighth switch Q8 is turned on, the voltage of the third terminal (drain) of the tenth switch Q10 is equal to the voltage VI on the VIN of the input terminal, and the voltage of the second terminal (source) of the tenth switch Q10 is equal to the voltage VO on the output terminal VOUT, which is ¼ of the voltage VI on the input terminal VIN. That is to say, in the second half of each operating cycle, the drain-source voltage difference of the tenth switch Q10 is ¾ of the voltage VI on the input terminal VIN. Therefore, in the circuit design, the tenth switch Q10 needs to use a switching device with a rating voltage of 3VI/4.

At the same time, it can be seen that before the start of each operating cycle (such as time instants T3S and T3E), that is, before the tenth switch Q10 is turned on, the drain and source voltage difference of the tenth switch Q10 is equal to 3VI/4. Even if the tenth switch Q10 can withstand a steady-state voltage of 3VI/4, the high voltages can easily cause the carriers in the tenth switch Q10 to accelerate and collide with the lattice atoms in the semiconductor material to cause damage to the crystal structure. This phenomenon is called hot carrier injection. Over time, the recurrence of hot carrier injection can lead to damage to the semiconductor material, resulting in a decrease in the performance of the switching device, an increase in leakage current, and eventually the failure of the device (e.g., the tenth switch Q10).

Based on this, the embodiment of the present application provides a new control method applicable to the switched capacitor converter shown in FIG. 36. This control method can reduce the drain and source voltage difference of the tenth switch Q10 before the conduction of the tenth switch Q10 to avoid the condition of the high drain and source voltage difference, thereby reducing the possibility of hot carrier injection, which can not only improve the reliability and longevity of the tenth switch Q10, but also improve the efficiency of the switched capacitor converter.

Specifically, in each operating cycle, at least one switch in phase with the tenth switch Q10 (such as the seventh switch Q7) in the third energy storage branch 30 is controlled such that the drain-source voltage difference of the tenth switch Q10 is reduced when the tenth switch Q10 is being turned on. For example, in the embodiment shown in FIG. 36, by making the seventh switch Q7 turn on earlier than the tenth switch Q10, the voltage difference between the third terminal and the second terminal of the tenth switch Q10 can be made not more than one half of the voltage at the input terminal VIN when the tenth switch Q10 is turned on. The drain and source voltage difference of the tenth switch Q10 at the turn-on moment is effectively reduced, thereby improving the reliability and longevity of the tenth switch Q10, and improving the efficiency of the switched capacitor converter.

It should be noted that in the embodiment of the present application, each switch is controlled to conduct in either the first half of an operating cycle or the second half of the operating cycle, which means that the switch is turned on at least once in the corresponding time period (in other words, the switch does not remain off all the time in the corresponding time period of the operating cycle). For example, in the first half of an operating cycle, the seventh switch Q7 and the tenth switch Q10 are controlled to be conducted, and the seventh switch Q7 and the tenth switch Q10 can be controlled to be on at any time in the first half cycle (for example, the seventh switch Q7 and the tenth switch Q10 can both be controlled to turn on at the beginning of the first half cycle, or the seventh switch Q7 can be controlled to turn on at the beginning of the first half cycle and the tenth switch Q10 can be controlled to turn on after the seventh switch Q7 is turned on).

FIG. 38 illustrates a second control method applicable to the 4:1 single-phase switched capacitor converter shown in FIG. 36 in accordance with various embodiments of the present disclosure. In FIG. 38, the curve L42 is the control signal of the second switch Q2, the fourth switch Q4, the sixth switch Q6, the eighth switch Q8 and the ninth switch Q9. The curve L41 is the control signal of the first switch Q1, the third switch Q3, the fifth switch Q5 and the tenth switch Q10. The curve L40 is the control signal of the seventh switch Q7. The curve L43 is the voltage waveform on the third terminal (the drain) of the tenth switch Q10. The curve L44 is the voltage waveform on the second terminal (the source) of the tenth switch Q10. The curve L45 is the waveform of the drain and source voltage difference of the tenth switch Q10. The duration T4 represents an operating cycle. The duration T41 represents the first half in the operating cycle. The duration T42 represents the second half in the operating cycle. The time instant t41 represents any time in the duration T41, and time instant t41 is neither the beginning of duration T41 nor the end of duration T41. T4S represents the beginning of the operating cycle. T4M is the middle time instant of the operating cycle. T4E is the end time of the duration T4 and the duration T42.

In this embodiment, the control branch is further used to do the following: at the beginning moment of an operating cycle (e.g., T4S), the seventh switch Q7 is turned on. The first switch Q1, the second switch Q2, the third switch Q3, the fourth switch Q4, the fifth switch Q5, the sixth switch Q6, the eighth switch Q8, the ninth switch Q9 and the tenth switch Q10 are turned off.

After a first preset duration counting from the beginning of an operating cycle, that is, at any moment between T4S (the beginning of an operating cycle) and the intermediate moment T4M (i.e., time t41), the first switch Q1, the third switch Q3, the fifth switch Q5 and the tenth switch Q10 is turned on. The seventh switch Q7 is kept on. The second switch Q2, the fourth switch Q4, the sixth switch Q6, the eighth switch Q8, the ninth switch Q9 are turned off.

In the first half of the operating cycle (the time period between T4S and T4M), the second switch Q2, the fourth switch Q4, the sixth switch Q6, the eighth switch Q8, the ninth switch Q9 are turned off. The first switch Q1, the third switch Q3, the fifth switch Q5, the seventh switch Q7 and the tenth switch Q10 are turned on. The seventh switch Q7 is turned on earlier than the tenth switch Q10.

In the middle moment of the operating cycle (T4M, the moment when the long T42 begins), the second switch Q2, the fourth switch Q4, the sixth switch Q6, the eighth switch Q8, the ninth switch Q9 are turned on. The first switch Q1, the third switch Q3, the fifth switch Q5, the seventh switch Q7 and the tenth switch Q10 are turned off.

In the second half of the operating cycle (the time period between T4M and T4E), the second switch Q2, the fourth switch Q4, the sixth switch Q6, the eighth switch Q8, the ninth switch Q9 are kept on. The first switch Q1, the third switch Q3, the fifth switch Q5, the seventh switch Q7 and the tenth switch Q10 are turned off.

In this embodiment, the second switch Q2, the fourth switch Q4, the sixth switch Q6, the seventh switch Q7, the eighth switch Q8 and the ninth switch Q9 are alternately turned on and off with a duty cycle of 50%. The first switch Q1 and the third switch Q3, the fifth switch Q5 and the tenth switch Q10 are alternately turned on with a duty cycle of less than 50%, so that the ratio of the voltage of the input terminal VIN to the voltage of the output terminal VOUT is 4:1.

It is understandable that, in practical applications, due to the possibility of a short dead time, the second switch Q2, the fourth switch Q4, the sixth switch Q6, the seventh switch Q7, the eighth switch Q8 and the ninth switch Q9 are all switched on and off alternately with a duty cycle of close to 50% (e.g., in a range from about 49% to about 50%).

Specifically, it can be seen from FIG. 38 that before the beginning moment T4S of an operating cycle, the drain voltage of the tenth switch Q10 is maintained at the voltage at the end of the previous operating cycle, that is, the drain voltage of the tenth switch Q10 is equal to the voltage VI of the input terminal VIN. The source voltage of the tenth switch Q10 is maintained at the voltage at the end of the previous operating cycle. That is, the source voltage of the tenth switch Q10 is the voltage VO of the output terminal VOUT (which is equal to one quarter of the voltage VI of the input terminal VIN, that is, VI/4). It can be seen that the drain and source voltage difference of the tenth switch Q10 is equal to 3VI/4. Although the tenth switch Q10 can withstand the drain-source voltage of 3VI/4 in the off state, if the tenth switch Q10 is turned on at this moment, the higher drain and source voltage is likely to accelerate the carriers to generate hot carriers during the conduction process of the tenth switch Q10, and inject them into the gate to cause irreversible damage. Therefore, in this embodiment, at the beginning moment of each operating cycle T4S, the seventh switch Q7 is first turned on when all other switches are turned off, and after the first preset duration Δt, the first switch Q1, the third switch Q3, the fifth switch Q5 and the tenth switch Q10 are turned on at time t41.

The advantage of this operation is that when the seventh switch Q7 is turned on, the voltage at the first terminal of the third capacitor C3 (i.e., the drain of the seventh switch Q7) is pulled down to the ground potential. Since the voltage difference between the two terminals of the third capacitor C3 is VI/2, the voltage on the second terminal of the third capacitor C3 (i.e., the drain of the tenth switch Q10) is also pulled down from VI to VI/2. At the same time, the source voltage of the tenth switch Q10 is maintained at VI/4. In this way, at the time t40, the drain and source voltage difference of the tenth switch Q10 is pulled down from 3VI/4 to VI/4 until the time t41, when the tenth switch Q10 is turned on. In this way, the tenth switch Q10 can be turned on at a lower drain and source voltage difference, which can significantly reduce the risk of hot carrier injection.

In this embodiment, the value of the first preset duration Δt is set such that it is sufficient for the drain voltage of the tenth switch Q10 to be pulled down. Because the eighth switch Q8, the ninth switch Q9 and the tenth switch Q10 are all in the off state when the seventh switch Q7 is turned on, the pull-down of the voltage on the drain of the tenth switch Q10 only needs to discharge the parasitic capacitance coupled between the third terminal of the seventh switch Q7 and ground. As such, the first preset duration Δt can be very short. In some alternative embodiments, the first preset duration Δt may be less than the dead-time of the switched capacitor converter. In some other embodiments, the early turn-on of the seventh switch Q7 can be completed within the dead time.

In the embodiment above, the risk of hot carrier injection caused by the high drain and source voltage difference of the tenth switch Q10 in the turn-on process of the tenth switch Q10 can be effectively reduced by turning on the seventh switch Q7 in advance, and the longevity of the switching device and the reliability of the switched capacitor converter can be improved. This is especially important for the switched capacitor converter shown in FIG. 36. Because in the switched capacitor converter in FIG. 36, the steady-state drain-source voltage that the tenth switch Q10 needs to withstand is the highest among all switches, it is susceptible to failure due to hot carrier injection. As the reliability of the tenth switch Q10 is improved, the reliability of the entire switched capacitor converter is improved.

In another alternative embodiment, the control timing of the switched capacitor converter shown in FIG. 36 can be further changed to further reduce the drain-source voltage difference between the tenth switch Q10 and/or the first switch Q1 before turn-on, so that it realizes zero voltage switching (ZVS), thereby reducing switching losses and improving the efficiency of the switched capacitor converter.

FIG. 39 illustrates a third control method applicable to the 4:1 single-phase switched capacitor converter shown in FIG. 36 in accordance with various embodiments of the present disclosure. As shown in FIG. 39, the curve L52 is the control signal of the sixth switch Q6. The curve L51 is the control signal of the first switch Q1 and the tenth switch Q10. The curve L50 is the control signal of the third switch Q3, the fifth switch Q5 and the seventh switch Q7. The curve L56 is the control signal of the second switch Q2, the fourth switch Q4, the eighth switch Q8 and the ninth switch Q9. The curve L53 is the voltage waveform on the third terminal (the drain) of the tenth switch Q10. The curve L54 is the voltage waveform on the second terminal (the source) of the tenth switch Q10. The curve L55 is the waveform of the drain and source voltage difference of the tenth switch Q10. The curve L57 is the waveform of the drain and source voltage difference of the first switch Q1. The curve L58 is the waveform of the drain and source voltage difference of the fourth switch Q4. The duration T5 represents an operating cycle. The duration T51 represents the first half of the operating cycle. The duration T52 represents the second half of the operating cycle. The time t51 indicates any time in T51, and the time t51 is neither the beginning time of T51 nor the end of T51. The time T5S represents the beginning time of the operating cycle. The time T5M is the middle time instant of the operating cycle. The time T5E is the end time of T5 and T52.

In this embodiment, the control branch is further used to do the following: at the beginning moment of an operating cycle (i.e., T5S), the seventh switch Q7 is turned on, and the third switch Q3, the fifth switch Q5 are both turned on simultaneously. The other switches are turned off.

After a first preset duration counting from the beginning of an operating cycle, that is, at any moment (i.e., t51) between T5S and the middle time instant T5M, the first switch Q1 and the tenth switch Q10 are turned on. The seventh switch Q7, the third switch Q3, the fifth switch Q5 are kept on, and the second switch Q2, the fourth switch Q4, the sixth switch Q6, the eighth switch Q8, and the ninth switch Q9 are kept off.

In the first half of the operating cycle (the time period between T5S and T5M), the second switch Q2, the fourth switch Q4, the sixth switch Q6, the eighth switch Q8, the ninth switch Q9 are turned off. The first switch Q1, the third switch Q3, the fifth switch Q5, the seventh switch Q7 and the tenth switch Q10 are turned on. The third switch Q3, the fifth switch Q5 and the seventh switch Q7 are turned on earlier than the tenth switch Q10. In other embodiments, at least one of the first switch Q1, the third switch Q3, the fifth switch Q5 and the seventh switch Q7 is turned on earlier than the tenth switch Q10.

At T5M, the sixth switch Q6 is turned on. The other switches are turned off.

After a first preset duration counting from the middle moment T5M, that is, at any moment (i.e., time t53) between T5M and T5E, the fourth switch Q4, the second switch Q2, the eighth switch Q8 and the ninth switch Q9 are turned on. The sixth switch Q6 is kept on. The first switch Q1, the third switch Q3, the fifth switch Q5, the seventh switch Q7, and the tenth switch Q10 are kept off.

In the second half of the operating cycle (the time period between T5M and T5E), the first switch Q1, the third switch Q3, the fifth switch Q5, the seventh switch Q7 and the tenth switch Q10 are kept off. The second switch Q2, the fourth switch Q4, the sixth switch Q6, the eighth switch Q8 and the ninth switch Q9 are turned on. The sixth switch Q6 is turned on earlier than the other switches in the same phase. In other embodiments, it is also possible that at least one of the fourth switch Q4 and the sixth switch Q6 is turned on earlier than the other switches in the same phase.

In this embodiment, the first switch Q1, the third switch Q3, the fifth switch Q5, the seventh switch Q7, the tenth switch Q10 form one phase of the switched capacitor converter shown in FIG. 36, and these switches are turned on in the first half of the operating cycle. The second switch Q2, the fourth switch Q4, the sixth switch Q6, the eighth switch Q8 and the ninth switch Q9 form the other phase of the switched capacitor converter, and these switches are turned on in the second half of the operating cycle. The control branch is configured such that the two phases are turned on and off in an alternating manner. As a result, the ratio of the voltage of the input terminal VIN to the voltage of the output terminal VOUT is 4:1.

Similarly, it is understandable that, in practical applications, due to the possibility of a short dead time, the first switch Q1, the third switch Q3, the fourth switch Q4, the fifth switch Q5, the sixth switch Q6 and the seventh switch Q7 are all switched on and off alternately with a duty cycle of close to 50% (e.g., in a range from about 49% to about 50%).

Specifically, it can be seen from FIG. 39 that before T5S of an operating cycle, the drain voltage of the tenth switch Q10 is maintained at the voltage at the end of the previous operating cycle. That is, the drain voltage of the tenth switch Q10 is equal to the voltage VI of the input terminal VIN. The source voltage of the tenth switch Q10 is maintained at the voltage at the end of the previous operating cycle. That is, the source voltage of the tenth switch Q10 is equal to the voltage VO of the output terminal VOUT (VO is equal to VI/4). In this way, the drain and source voltage difference of the tenth switch Q10 is equal to 3VI/4. On top of the embodiment shown in FIG. 38, in this embodiment, at the beginning moment of each operating cycle, T5S, in addition to the seventh switch Q7, the third switch Q3 and/or the fifth switch Q5 are turned on when the other switches are off, and after the first preset duration Δt, the first switch Q1 and the tenth switch Q10 are turned on at t51. In the embodiment shown in FIG. 39, the case of the third switch Q3, the fifth switch Q5 and the seventh switch Q7 are turned on in advance is shown as an example.

The advantage of this operation is that when the seventh switch Q7 is turned on, the voltage at the first terminal of the third capacitor C3 (the drain of the seventh switch Q7) is pulled down to the ground potential. Since the voltage difference between the two terminals of the third capacitor C3 is VI/2, the voltage of the second terminal of the third capacitor C3 (the drain of the tenth switch Q10) is also pulled down from VI to VI/2. At the same time, when the fifth switch Q5 is turned on, the voltage at the second terminal of the second capacitor (the source of the fifth switch Q5) is pulled up to the voltage at the output terminal VOUT (VI/4). Since the voltage difference between the two terminals of the second capacitor C2 is VI/4 at this time, the voltage at the first terminal of the second capacitor C2 (the source of the tenth switch Q10) is also pulled up from VI/4 to VI/2. In this way, at the time t50, the drain and source voltage difference of the tenth switch Q10 is pulled down from 3VI/4 to 0. Up to the time t51, when the tenth switch Q10 is turned on, zero voltage switching (ZVS) can be realized, which significantly reduces the risk of hot carrier injection and also reduces the switching loss of the tenth switch Q10.

In the same way, since the third switch Q3 is turned on earlier than the first switch Q1, the voltage at the second terminal of the first capacitor C1 (the drain of the third switch Q3) is pulled down to the ground potential. At this time, the voltage difference between the two terminals of the first capacitor C1 is VI/4, and the voltage at the first terminal of the first capacitor C1 (the drain of the first switch Q1) is also pulled down from VI/2 to VI/4. At the same time, the source voltage of the first switch Q1 is always kept at the voltage VO (VI/4) at the output terminal VOUT. In this way, at time t50, the drain-source voltage of the first switch Q1 is pulled down from VI/4 to 0. At the time t51, when the first switch Q1 is turned on, zero voltage switching (ZVS) can be realized. As a result, the switching loss of the first switch Q1 is reduced.

It should be noted that, in addition to the early conduction of the seventh switch Q7, the fifth switch Q5 and/or the third switch Q3 can be turned on in advance to realize the zero voltage switching (ZVS) of the tenth switch Q10 and/or the first switch Q1 respectively. The specific combination of the early conduction of the switches can be selected according to the actual needs of the application.

In the same way, at T5M, because the sixth switch Q6 is turned on earlier than the fourth switch Q4, the voltage at the second terminal of the second capacitor C2 (the drain of the sixth switch Q6) is pulled down to the ground potential. At this time, the voltage difference between the two terminals of the second capacitor C2 is VI/4, and the voltage at the first terminal of the second capacitor C2 (the drain of the fourth switch Q4) is also pulled down from VI/2 to VI/4. At the same time, the voltage at the source of the fourth switch Q4 is always kept at the voltage VO (VI/4) at the output terminal VOUT. In this way, at time t52, the drain-source voltage of the fourth switch Q4 is pulled down from VI/4 to 0. At the time t53, when the fourth switch Q4 is turned on, zero voltage switching (ZVS) can be realized. As a result, the switching loss of the fourth switch Q4 is reduced.

Alternatively, at T5M, the fourth switch Q4 is turned on earlier than the sixth switch Q6. Then, the voltage of the first terminal of the second capacitor C2 (the drain of the fourth switch Q4) is pulled down to the voltage (VI/4) of the output terminal VOUT. At this time, the voltage difference between the two terminals of the second capacitor C2 is equal to VI/4, and the voltage at the second terminal of the second capacitor C2 (the drain of the sixth switch Q6) is also pushed down from VI/4 to the ground potential. At the same time, the source of the sixth switch Q6 is grounded. In this way, at t52, the drain-source voltage of the sixth switch Q6 is pulled down from VI/4 to 0. At t53, when the sixth switch Q6 is turned on, zero voltage switching (ZVS) can be realized. As a result, the switching loss of the sixth switch Q6 is reduced.

In this embodiment, the value of the first preset duration Δt is set so that it is sufficient for the drain voltage of the tenth switch Q10 to be pulled down. The first preset time Δt can be less than the dead time of the switched capacitor converter. In some other embodiments, the early conduction of the seventh switch Q7 can be completed within dead time.

In addition, it should be noted that in the embodiment of the present application, the duration for each switch to be turned on in advance is set to the first preset time, but the corresponding first preset time for different switches may be the same or different, and the embodiment of the present application does not make specific restrictions on this. For example, the specific time that the seventh switch Q7 is turned on before the tenth switch Q10 and the specific time that the sixth switch Q6 is turned on before the fourth switch Q4 can be the same or different.

FIG. 40 illustrates a schematic diagram of a first implementation of a 6:1 single-phase switched capacitor converter in accordance with various embodiments of the present disclosure. FIG. 40(A) illustrates a schematic diagram of a second implementation of a 6:1 single-phase switched capacitor converter in accordance with various embodiments of the present disclosure. As shown in FIG. 40, the first energy storage branch 10 further comprises a twelfth switch Q12 and a fourth capacitor C4. The second energy storage branch 20 further comprises a thirteenth switch Q13 and a fifth capacitor C5.

The second terminal of the twelfth switch Q12 is connected to the third terminal of the first switch Q1, and the third terminal of the twelfth switch Q12 is connected to the first terminal of the fourth capacitor C4 and the third terminal of the ninth switch Q9. The second terminal of the fourth capacitor C4 is connected to a common node of the fifth switch Q5 and the sixth switch Q6 (i.e. the second terminal of the second capacitor C2 as shown in FIG. 40).

The second terminal of the thirteenth switch Q13 is connected to the third terminal of the fourth switch Q4, and the third terminal of the thirteenth switch Q13 is connected to the first terminal of the fifth capacitor C5 and the second terminal of the tenth switch Q10. The second terminal of the fifth capacitor C5 is connected to a common node of the second switch Q2 and the third switch Q3 (i.e. the second terminal of the first capacitor C1 as shown in FIG. 40). The control branch (not shown) is connected to the first terminal of the twelfth switch Q12 and the first terminal of the thirteenth switch Q13 respectively.

The second implementation of the 6:1 single-phase switched capacitor converter shown in FIG. 40(A) is similar to that shown in FIG. 40 except that the second terminal of the fourth capacitor C4 is connected to a common node of the fourth switch Q4 and the thirteenth switch Q13 (i.e. the first terminal of the second capacitor C2), and the second terminal of the fifth capacitor C5 is connected to a common node of the first switch Q1 and the twelfth switch Q12 (i.e. the first terminal of the first capacitor C1).

In an embodiment, a first control method applicable to the switched capacitor converters shown in FIG. 40 and FIG. 40(A) comprises the following: in the first half of an operating cycle, the first switch Q1, the third switch Q3, the fifth switch Q5, the eighth switch Q8, the ninth switch Q9, the thirteenth switch Q13 are turned off. The second switch Q2, the fourth switch Q4, the sixth switch Q6, the seventh switch Q7, the tenth switch Q10 and the twelfth switch Q12 are turned on. The seventh switch Q7 is turned on earlier than the tenth switch Q10. In the second half of the operating cycle, the first switch Q1, the third switch Q3, the fifth switch Q5, the eighth switch Q8, the ninth switch Q9, the thirteenth switch Q13 are turned on. The second switch Q2, the fourth switch Q4, the sixth switch Q6, the seventh switch Q7, the tenth switch Q10 and the twelfth switch Q12 are turned off.

In a specific embodiment, the first control method can be realized as follows: at the beginning moment of an operating cycle, the seventh switch Q7 is turned on, and the other switches are turned off. After the first preset duration counting from the beginning of an operating cycle, the second switch Q2, the fourth switch Q4, the sixth switch Q6, the tenth switch Q10, the twelfth switch Q12 are turned on. The seventh switch Q7 remains on. The other switches are kept off. At the middle moment of the operating cycle, the first switch Q1, the third switch Q3, the fifth switch Q5, the eighth switch Q8, the ninth switch Q9, the thirteenth switch Q13 are turned on. The other switches are off.

The second switch Q2, the fourth switch Q4, the sixth switch Q6, the seventh switch Q7, the tenth switch Q10 and the twelfth switch Q12 form one phase of the converters shown in FIG. 40 and FIG. 40(A). These switches are turned on in the first half of the operating cycle. The first switch Q1, the third switch Q3, the fifth switch Q5, the eighth switch Q8, the ninth switch Q9 and the thirteenth switch Q13 form the other phase of the converter. These switches are turned on in the second half of the operating cycle. The control branch is configured such that the two phases are turned on and off in an alternating manner. As a result, the ratio of the voltage of the input terminal VIN to the voltage of the output terminal VOUT is 6:1.

It should be noted that although the switches in the same phase are all turned on in the same half cycle, their conduction time is not necessarily the same, and the operation of the converter can be optimized by configuring the conduction sequence of each switch in the same phase circuit by a method similar to the one shown in FIG. 38.

Specifically, in each operating cycle, at least one switch in the third energy storage branch 30, which belongs to a same phase as the tenth switch (such as the seventh switch Q7), is turned on earlier than the tenth switch Q10. This configuration prevents the tenth switch Q10 from being turned on at a high drain and source voltage difference. For example, in the embodiments shown in FIG. 40 and FIG. 41, by making the seventh switch Q7 turn on earlier than the tenth switch Q10, the voltage difference between the third terminal and the second terminal of the tenth switch Q10 can be made not more than one half of the voltage at the input terminal VIN when the tenth switch Q10 is turned on. As a result, the drain and source voltage difference of the tenth switch Q10 at the turn-on moment is effectively reduced, thereby improving the reliability and longevity of the tenth switch Q10, and improving the efficiency of the converter. The specific principle is similar to the control method shown in FIG. 38, and hence is not repeated herein.

In another embodiment, a second control method applicable to the switched capacitor converters shown in FIG. 40 and FIG. 40(A) comprises the following: in the first half of an operating cycle, the first switch Q1, the third switch Q3, the fifth switch Q5, the thirteenth switch Q13, the eighth switch Q8 and the ninth switch Q9 are turned off. The second switch Q2, the fourth switch Q4, the sixth switch Q6, the seventh switch Q7, the twelfth switch Q12 and the tenth switch Q10 are turned on. The seventh switch Q7, and at least one of the second switch Q2 and the sixth switch Q6 are turned on earlier than the tenth switch Q10. In the second half of the operating cycle, the second switch Q2, the fourth switch Q4, the sixth switch Q6, the seventh switch Q7, the twelfth switch Q12 and the tenth switch Q10 are turned off. The first switch Q1, the third switch Q3, the fifth switch Q5, the thirteenth switch Q13, the eighth switch Q8 and the ninth switch Q9 are turned on. At least one of the first switch Q1 and the third switch Q3 is turned on earlier than the other switches in the same phase.

In a specific embodiment, the control method above can be realized as follows: at the beginning moment of an operating cycle, the seventh switch Q7 is turned on. At least one of the second switch Q2 and the sixth switch Q6 are turned on. The other switches are turned off. After a first preset duration counting from the beginning moment of an operating cycle, the second switch Q2, the fourth switch Q4, the sixth switch Q6, the twelfth switch Q12 and the tenth switch Q10 are turned on. The seventh switch Q7 remains on. The other switches are turned off. At the middle moment of the operating cycle, at least one of the third switch Q3 and the fifth switch Q5 is turned on, and the other switches are turned off. After a first preset duration counting from the middle moment, the first switch Q1, the third switch Q3, the fifth switch Q5, the thirteenth switch Q13, the eighth switch Q8 and the ninth switch Q9 are turned on, and the other switches are turned off.

The second switch Q2, the fourth switch Q4, the sixth switch Q6, the seventh switch Q7, the tenth switch Q10 and the twelfth switch Q12 form one phase of the converter shown in FIG. 40. There switches are turned on in the first half of the operating cycle. The first switch Q1, the third switch Q3, the fifth switch Q5, the eighth switch Q8, the ninth switch Q9 and the thirteenth switch Q13 form the other phase of the converter. These switches are turned on in the second half of the operating cycle. The control branch is configured such that the two phases are turned on and off in an alternating manner. As a result, the ratio of the voltage of the input terminal VIN to the voltage of the output terminal VOUT is 6:1.

Similarly, it is understandable that in practical applications, due to the possibility of a short dead time, the second switch Q2, the third switch Q3, the fifth switch Q5, the sixth switch Q6 and the seventh switch Q7 are all switched on and off alternately with a duty cycle of close to 50% (e.g., in a range from about 49% to about 50%).

Similar to the control method shown in FIG. 39, the early turn on of the seventh switch Q7 and the second switch Q2 can help the tenth switch Q10 realize zero voltage switching (ZVS). The early turn on of the sixth switch Q6 can help the fourth switch Q4 and the twelfth switch Q12 realize the zero voltage switching (ZVS), thereby improving the voltage conversion efficiency. In the same way, in the second half of the operating cycle, the first switch Q1 is turned on in advance. As a result, the third switch Q3 can realize zero voltage switching (ZVS). Likewise, the third switch Q3 can be turned on in advance. As a result, the first switch Q1 can realize the zero voltage switching (ZVS), thereby improving the voltage conversion efficiency. The specific principle is similar to the control method shown in FIG. 39, and hence is not repeated herein. It should be noted that in the second half of the operating cycle, if the fifth switch Q5 is selected to be turned on in advance, although the zero voltage switching (ZVS) of the thirteenth switch Q13 can be realized, it will also lead to the increase of the drain and source voltage difference of the ninth switch Q9, thereby increasing the risk of hot carrier injection and overvoltage. Therefore, in the circuit structures shown in FIG. 40 and FIG. 40(A), it is not desirable to turn on the fifth switch Q5 earlier than the other switches in the same phase.

FIG. 41 illustrates a schematic diagram of a first implementation of an 8:1 single-phase switched capacitor converter in accordance with various embodiments of the present disclosure. FIG. 41(A) illustrates a schematic diagram of a second implementation of an 8:1 single-phase switched capacitor converter in accordance with various embodiments of the present disclosure. In an embodiment, as shown in FIG. 41, the first energy storage branch 10 further comprises a fourteenth switch Q14 and a sixth capacitor C6. The second energy storage branch 20 further comprises a fifteenth switch Q15 and a seventh capacitor C7.

The second terminal of the fourteenth switch Q14 is connected to the third terminal of the twelfth switch Q12. The third terminal of the fourteenth switch Q14 is connected to the first terminal of the sixth capacitor C6 and the third terminal of the ninth switch Q9. The second terminal of the sixth capacitor C6 is connected to the common node of the second switch Q2 and the third switch Q3 (i.e. the second terminal of the fifth capacitor C5 as shown in FIG. 41).

The second terminal of the fifteenth switch Q15 is connected to the third terminal of the thirteenth switch Q13. The third terminal of the fifteenth switch Q15 and the first terminal of the seventh capacitor C7 are connected to the second terminal of the tenth switch Q10. The second terminal of the seventh capacitor C7 is connected to the common node of the fifth switch Q5 and the sixth switch Q6 (i.e. the second terminal of the fourth capacitor C4 as shown in FIG. 41). The control branch is connected to the first terminal of the fourteenth switch Q14 and the first terminal of the fifteenth switch Q15 respectively.

The second implementation of the 8:1 single-phase switched capacitor converter shown in FIG. 41(A) is similar to that shown in FIG. 41 except the following: the second terminal of the fourth capacitor C4 is connected to a common node of the fourth switch Q4 and the thirteenth switch Q13. The second terminal of the fifth capacitor C5 is connected to a common node of the first switch Q1 and the twelfth switch Q12. The second terminal of the sixth capacitor C6 is connected to a common node of the fifteenth switch Q15 and the thirteenth switch Q13 (i.e. the first terminal of the fifth capacitor C5). The second terminal of the seventh capacitor C7 is connected to a common node of the fourteenth switch Q14 and the twelfth switch Q12 (i.e. the first terminal of the fourth capacitor C4).

In an embodiment, a first control method applicable to the switched capacitor converters shown in FIG. 41 and FIG. 41(A) comprises the following: in the first half of an operating cycle, the second switch Q2, the fourth switch Q4, the sixth switch Q6, the eighth switch Q8, the ninth switch Q9, the twelfth switch Q12 and the fifteenth switch Q15 are turned off. The first switch Q1, the third switch Q3, the fifth switch Q5, the seventh switch Q7, the tenth switch Q10, the thirteenth switch Q13 and the fourteenth switch Q14 are turned on. The seventh switch Q7 is turned on earlier than the tenth switch Q10. In the second half of the operating cycle, the second switch Q2, the fourth switch Q4, the sixth switch Q6, the eighth switch Q8, the ninth switch Q9, the twelfth switch Q12 and the fifteenth switch Q15 are turned on. The first switch Q1, the third switch Q3, the fifth switch Q5, the seventh switch Q7, the tenth switch Q10, the thirteenth switch Q13 and the fourteenth switch Q14 are turned off.

In a specific embodiment, the control mode can be realized as follows: at the beginning moment of an operating cycle, the seventh switch Q7 is turned on, and the other switches are turned off. After the first preset duration counting from the beginning of the operating cycle, the first switch Q1, the third switch Q3, the fifth switch Q5, the tenth switch Q10, the thirteenth switch Q13 and the fourteenth switch Q14 are turned on, and the seventh switch Q7 remains on. The other switches are turned off. At the middle point of the operating cycle, the second switch Q2, the fourth switch Q4, the sixth switch Q6, the eighth switch Q8, the ninth switch Q9, the twelfth switch Q12 and the fifteenth switch Q15 are turned on. The other switches are turned off.

The first switch Q1, the third switch Q3, the fifth switch Q5, the seventh switch Q7, the tenth switch Q10, the thirteenth switch Q13 and the fourteenth switch Q14 form one phase of the converters shown in FIG. 41 and FIG. 41(A), and these switches are turned on in the first half of the operating cycle. The second switch Q2, the fourth switch Q4, the sixth switch Q6, the eighth switch Q8, the ninth switch Q9, the twelfth switch Q12 and the fifteenth switch Q15 form the other phase of the converter, and these switches are turned on in the second half of the operating cycle. The control branch is configured such that the two phases are turned on and off in an alternating manner. As a result, the ratio of the voltage of the input terminal VIN to the voltage of the output terminal VOUT is 8:1.

Specifically, in each operating cycle, at least one switch (such as the seventh switch Q7) in the third energy storage branch, which belongs to the same phase as the tenth switch Q10, is turned on earlier than the tenth switch Q10. This configuration prevents the tenth switch Q10 from being turned on at a high drain-source voltage difference. For example, in the embodiments shown in FIG. 41 and FIG. 41(A), by making the seventh switch Q7 turn on earlier than the tenth switch Q10, the voltage difference between the third terminal and the second terminal of the tenth switch Q10 is not greater than one half of the VIN voltage at the input terminal when the tenth switch Q10 is turned on. As a result, the drain and source voltage difference of the tenth switch Q10 at the turn-on moment is effectively reduced, thereby improving the reliability and longevity of the tenth switch Q10, and improving the efficiency of the converter. The specific principle is similar to the control method shown in FIG. 38, and hence is not repeated herein.

In another embodiment, a second control method applicable to the switched capacitor converter shown in FIG. 41 comprises the following: in the first half of an operating cycle, the second switch Q2, the fourth switch Q4, the sixth switch Q6, the eighth switch Q8, the ninth switch Q9, the twelfth switch Q12 and the fifteenth switch Q15 are turned off. The first switch Q1, the third switch Q3, the fifth switch Q5, the seventh switch Q7, the tenth switch Q10, the thirteenth switch Q13 and the fourteenth switch Q14 are turned on. At least one of the third switch Q3, the fifth switch Q5 and the seventh switch Q7 is turned on earlier than the tenth switch Q10. In the second half of the operating cycle, the first switch Q1, the third switch Q3, the fifth switch Q5, the seventh switch Q7, the tenth switch Q10, the thirteenth switch Q13 and the fourteenth switch Q14 are turned off. The second switch Q2, the fourth switch Q4, the sixth switch Q6, the eighth switch Q8, the ninth switch Q9, the twelfth switch Q12 and the fifteenth switch Q15 are turned on. At least one of the fourth switch Q4 and the sixth switch Q6 is turned on earlier than the other switches in the same phase.

In a specific embodiment, the control mode can be realized as follows: at the beginning moment of an operating cycle, the seventh switch Q7 is turned on. At least one of the fifth switch Q5 and the third switch Q3 is turned on. The other switches are turned off. After the first preset duration counting from the beginning moment of the operating cycle, the first switch Q1, the third switch Q3, the fifth switch Q5, the tenth switch Q10, the thirteenth switch Q13 and the fourteenth switch Q14 are turned on. The seventh switch Q7 remains on. The other switches are turned off. At the middle moment of the operating cycle, at least one of the second switch Q2 and the sixth switch Q6 is turned on, and the other switches are turned off. After the first preset duration passes counting from the middle moment, the second switch Q2, the fourth switch Q4, the sixth switch Q6, the eighth switch Q8, the ninth switch Q9, the twelfth switch Q12 and the fifteenth switch Q15 are turned on, and the other switches are turned off.

The first switch Q1, the third switch Q3, the fifth switch Q5, the seventh switch Q7, the tenth switch Q10, the thirteenth switch Q13 and the fourteenth switch Q14 form one phase of the converters shown in FIG. 41 and FIG. 41(A), and these switches are turned on in the first half of the operating cycle. The second switch Q2, the fourth switch Q4, the sixth switch Q6, the eighth switch Q8, the ninth switch Q9, the twelfth switch Q12 and the fifteenth switch Q15 form the other phase of the converter, and these switches are turned on in the second half of the operating cycle. The control branch is configured such that the two phases are turned on and off in an alternating manner. As a result, the ratio of the voltage at the input terminal VIN to the voltage at the output terminal VOUT is 8:1.

Similarly, it is understandable that in practical applications, due to the possibility of a short dead time, the second switch Q2, the third switch Q3, the fifth switch Q5, the sixth switch Q6 and the seventh switch Q7 are all switched on and off alternately with a duty cycle of close to 50% (e.g., in a range from about 49% to about 50%).

In summary, two switches (including the twelfth switch Q12 and the thirteenth switch Q13) and two capacitors (including the fourth capacitor C4 and the fifth capacitor C5) are added to the circuit structure shown in FIG. 36 to obtain the circuit structures shown in FIG. 40 and FIG. 40(A), so that the ratio of the voltage of the input terminal VIN to the voltage of the output terminal VOUT can be increased from 4:1 to 6:1.

Then, by adding two switches (including the fourteenth switch Q14 and the fifteenth switch Q15) and two capacitors (including the sixth capacitor C6 and the seventh capacitor C7) to the circuit structures shown in FIG. 40 and FIG. 40(A), the ratio of the voltage at the input terminal VIN to the voltage at the output terminal VOUT can be increased from 6:1 to 8:1. By analogy, if the ratio of the voltage of the input terminal VIN to the voltage of the output terminal VOUT is 10:1, two switches and two capacitors should be added to the circuit structures shown in FIG. 41 and FIG. 41(A). The two switches and the two capacitors are connected according to the arrangement of the twelfth switch Q12, the thirteenth switch Q13, the fourth capacitor C4 and the fifth capacitor C5. If the ratio of the voltage of the input terminal VIN to the voltage of the output terminal VOUT is 12:1, two switches and two capacitors should be added to the circuit structure of the converter having a ratio of 10:1. The two switches and the two capacitors are connected according to the arrangement of the fourteenth switch Q14, the fifteenth switch Q15, the sixth capacitor C6 and the seventh capacitor C7. Therefore, in the way, the ratio of the voltage of the input terminal VIN to the voltage of the output terminal VOUT can be extended to 2N:1. N is a positive integer.

At the same time, the circuits shown in FIG. 40 and FIG. 40(A) can be controlled according to the control method shown in FIG. 38 or FIG. 39. For example, when the control is carried out by a control method similar to that shown in FIG. 39, by turning on the seventh switch Q7 earlier at the beginning of an operating cycle, and turning on at least one of the second switch Q2 and the sixth switch Q6 earlier, the tenth switch Q10 and/or the fourth switch Q4 can achieve zero voltage switching (ZVS). In addition, at the beginning of the second half of the operating cycle, by turning on the third switch Q3 earlier, the first switch Q1 can achieve zero voltage switching (ZVS), thereby reducing the switching loss of the voltage conversion circuit to improve efficiency.

It should be noted that, for the voltage conversion circuits shown in FIG. 40 and FIG. 40(A), at the beginning of the operating cycle, the second switch Q2 and the sixth switch Q6 are turned on before the twelfth switch Q12 is turned on. This turn-on sequence can reduce the drain-source voltage of the twelfth switch Q12 from twice the voltage at the output terminal VOUT to zero, so that the zero voltage switching (ZVS) of the twelfth switch Q12 can be realized. As a result, the switching loss of the voltage conversion circuit is reduced, so as to improve efficiency.

Similarly, the circuits shown in FIG. 41 and FIG. 41(A) can be controlled according to the control method shown in FIG. 38 or FIG. 39. For example, when the control is carried out by a control method similar to that shown in FIG. 39, the zero voltage switching (ZVS) of the tenth switch Q10 and/or the first switch Q1 can be realized by turning on the seventh switch Q7 earlier at the beginning of the operating cycle, and turning on at least one of the third switch Q3 and the fifth switch Q5 earlier. Similarly, the zero voltage switching (ZVS) of the fourth switch Q4 can be realized by turning on the sixth switch Q6 earlier at the beginning of the second half cycle, and the zero voltage switching (ZVS) of the sixth switch Q6 can be realized by turning on the fourth switch Q4 earlier at the beginning of the second half cycle, so as to reduce the switching loss of the voltage conversion circuit, thereby reducing the switching loss of the voltage conversion circuit to improve efficiency.

It should be noted that, for the voltage conversion circuits shown in FIG. 41 and FIG. 41(A), at the beginning of the operating cycle, the third switch Q3 and the fifth switch Q5 are turned on before the thirteenth switch Q13 and the fourteenth switch Q14 are turned on. Because of this turn-on configuration, and the drain-source voltage of the thirteenth switch Q13 and the fourteenth switch Q14 is reduced to zero from twice the voltage at the output terminal VOUT, so that zero voltage switching (ZVS) can be realized, and then the switching loss of the voltage conversion circuit is reduced, so as to improve efficiency.

FIG. 42 illustrates a schematic diagram of a 4:1 dual-phase switched capacitor converter in accordance with various embodiments of the present disclosure. The third energy storage branch 30 further comprises an eighth capacitor C8, a sixteenth switch Q16, a seventeenth switch Q17, an eighteenth switch Q18 and a nineteenth switch Q19. The third terminal of the sixteenth switch Q16 is connected to the second terminal of the eighteenth switch Q18 and the first terminal of the eighth capacitor C8. The second terminal of the eighth capacitor C8 is connected to the third terminal of the nineteenth switch Q19 and the second terminal of the seventeenth switch Q17. The third terminal of the seventeenth switch Q17 is connected to the input terminal VIN. The second terminal of the sixteenth switch Q16 is grounded. The third terminal of the eighteenth switch Q18 is connected to the third terminal of the fourth switch Q4. The second terminal of the nineteenth switch Q19 is connected to the third terminal of the first switch Q1. The control branch is connected to the first terminal of the sixteenth switch Q16, the first terminal of the seventeenth switch Q17, the first terminal of the eighteenth switch Q18 and the first terminal of the nineteenth switch Q19.

FIG. 43 illustrates a first control method applicable to the 4:1 dual-phase switched capacitor converter shown in FIG. 42 in accordance with various embodiments of the present disclosure. As shown in FIG. 43, the curve L72 is the control signal of the sixteenth switch Q16. The curve L71 is the control signal of the first switch Q1, the third switch Q3, the fifth switch Q5, the tenth switch Q10, the seventeenth switch Q17 and the eighteenth switch Q18. The curve L70 is the control signal of the seventh switch Q7. The curve L76 is the control signal of the second switch Q2, the fourth switch Q4, the sixth switch Q6, the eighth switch Q8, the ninth switch Q9 and the nineteenth switch Q19. The curve L73 is the voltage waveform on the third terminal (the drain) of the tenth switch Q10. The curve L75 is the voltage waveform of the drain and source voltage difference of the tenth switch Q10. The duration T7 represents an operating cycle. The duration T71 represents the first half of the operating cycle.

The duration T72 represents the second half of the operating cycle. The time instant t71 represents any time in the duration T71. The time instant t71 is neither the moment when the duration T71 begins, nor the moment when the duration T71 ends. The time instant T7S represents the beginning time of the operating cycle. T7M is the middle point of the operating cycle. The time instant T7E is the end time of the duration T7.

In this embodiment, the control branch is further used to do the following: at the beginning moment of an operating cycle (i.e., T7S), the seventh switch Q7 is turned on, and the other switches are turned off.

After the first preset duration counting from the beginning of the operating cycle, that is, at any moment between T7S and the intermediate moment T7M (i.e., t71), the first switch Q1, the third switch Q3, the fifth switch Q5, the seventeenth switch Q17, the eighteenth switch Q18 and the tenth switch Q10 are turned on. The seventh switch Q7 remains on. The other switches are turned off.

In the first half of an operating cycle (the time period between T7S and T7M), the second switch Q2, the fourth switch Q4, the sixth switch Q6, the eighth switch Q8, the ninth switch Q9, the sixteenth switch Q16 and the nineteenth switch Q19 are turned off. The first switch Q1, the third switch Q3, the fifth switch Q5, the seventh switch Q7, the tenth switch Q10, the seventeenth switch Q17 and the eighteenth switch Q18 are turned on. The seventh switch Q7 is turned on earlier than the tenth switch Q10. In other embodiments, at least one of the seventh switch Q7 and the seventeenth switch Q17 can be turned on earlier than the tenth switch Q10.

At the middle point (T7M) of an operating cycle, the sixteenth switch Q16 is turned on, and the other switches are turned off.

After the first preset duration counting from the middle point of the operating cycle, that is, at any moment between T7M and T7E in the middle of an operating cycle (i.e., t73), the second switch Q2, the fourth switch Q4, the sixth switch Q6, the eighth switch Q8, the ninth switch Q9, the nineteenth switch Q19 are turned on. The sixteenth switch Q16 remains on. The other switches are turned off.

In the second half of the operating cycle (the time period between T7M and T7E), the first switch Q1, the third switch Q3, the fifth switch Q5, the seventh switch Q7, the tenth switch Q10, the seventeenth switch Q17 and the eighteenth switch Q18 are turned off. The second switch Q2, the fourth switch Q4, the sixth switch Q6, the eighth switch Q8, the ninth switch Q9, the sixteenth switch Q16 and the nineteenth switch Q19 are turned on. The sixteenth switch Q16 is turned on earlier than the nineteenth switch Q19. In other embodiments, at least one of the eighth switch Q8 and the sixteenth switch Q16 can also be turned on earlier than the nineteenth switch Q19.

In this embodiment, the first switch Q1, the third switch Q3, the fifth switch Q5, the seventh switch Q7, the tenth switch Q10, the seventeenth switch Q17 and the eighteenth switch Q18 form one phase of the converter, and these switches are turned on in the first half of the operating cycle. The second switch Q2, the fourth switch Q4, the sixth switch Q6, the eighth switch Q8, the ninth switch Q9, the sixteenth switch Q16 and the nineteenth switch Q19 form the other phase of the converter, and these switches are turned on in the second half of the operating cycle. The switches of these two phases turn on and off in an alternating manner so that the ratio of the voltage at the input terminal VIN to the voltage at the output terminal VOUT is 4:1.

It should be noted that although the switches in the same phase are all turned on in the same half cycle, their on-time is not necessarily the same. The operation of the voltage conversion circuit can be optimized by configuring the conduction sequence of each switch in the same phase.

Similarly, it is understandable that, in practical applications, due to the possibility of a short dead time, the seventh switch Q7 and the sixteenth switch Q16 alternately turn on and off with a duty cycle close to 50% (e.g., in a range from about 49% to about 50%).

Specifically, as shown in FIG. 43, the drain voltage of the tenth switch Q10 is maintained at the voltage at the end of the previous operating cycle. Because the eighth switch Q8 is in the conduction state before the end of the previous operating cycle, the drain voltage of the tenth switch Q10 is equal to the voltage VI of the input terminal VIN. The source voltage of the tenth switch Q10 is also maintained at the voltage at the end of the previous operating cycle. Because the fourth switch Q4 is in the conduction state before the end of the previous operating cycle, the source voltage of the tenth switch Q10 is equal to the voltage VO of the output terminal VOUT (VO is equal to one fourth of VI). In this way, the drain and source voltage difference of the tenth switch Q10 is equal to 3VI/4. Although the tenth switch Q10 can withstand the drain-source voltage of 3VI/4 in the turn-off state, if the tenth switch Q10 is turned on at this moment, the higher drain-source voltage is likely to accelerate the carriers to generate hot carriers during the turn-on process of the tenth switch Q10, and inject them into the gate to cause irreversible damage. Therefore, in this embodiment, at the beginning moment of each operating cycle (T7S), the seventh switch Q7 is turned on when all other switches are turned off. After the first preset duration Δt counting from the beginning of the operating cycle, the tenth switch Q10 is turned on at time t71.

The advantage of this operation is that when the seventh switch Q7 is turned on, the voltage at the first terminal of the third capacitor C3 (i.e., the drain of the seventh switch Q7) is pulled down to the ground potential. Since the voltage difference between the two terminals of the third capacitor C3 is VI/2, the voltage of the second terminal of the third capacitor C3 (i.e., the drain of the tenth switch Q10) is also pulled down from VI to VI/2. At the same time, the source voltage of the tenth switch Q10 is maintained at VI/4. In this way, at the moment t70, the drain-source voltage of the tenth switch Q10 is reduced down from 3VI/4 to VI/4. At t71, when the tenth switch Q10 is turned on, the lower drain-source voltage of the tenth switch Q10 significantly reduces the risk of hot carrier injection.

In the same way, before T7M, the drain voltage of the nineteenth switch Q19 is maintained at the voltage at the end of the first half of the operating cycle. Because the seventeenth switch Q17 is in the conduction state before the end of the first half of the operating cycle, the drain voltage of the nineteenth switch Q19 is equal to the voltage VI at the input terminal VIN. The source voltage of the nineteenth switch Q19 is also maintained at the voltage at the end of the first half of the operating cycle. Because the first switch Q1 is in the conduction state before the end of the first half of the operating cycle, the source voltage of the nineteenth switch Q19 is equal to the voltage VO at the output terminal VOUT (VO is equal to VI/4). In this way, the drain and source voltage difference of the nineteenth switch Q19 is equal to 3VI/4. Although the nineteenth switch Q19 can withstand the drain-source voltage of 3VI/4 in the off state, if the nineteenth switch Q19 is turned on at this moment, the higher drain-source voltage is likely to accelerate the carriers to generate hot carriers during the turn-on process of the nineteenth switch Q19, and inject them into the gate to cause irreversible damage. Therefore, in this embodiment, at T7M of each operating cycle, the sixteenth switch Q16 is first turned on when all other switches are turned off. After the first preset time Δt counting from T7M, the nineteenth switch Q19 is turned on at time t73.

The advantage of this control method is that when the sixteenth switch Q16 is turned on, the voltage at the first terminal of the eighth capacitor C8 (the drain of the sixteenth switch Q16) is pulled down to the ground potential. Since the voltage difference between the two terminals of the eighth capacitor C8 is VI/2, the voltage of the second terminal of the eighth capacitor C8 (the drain of the nineteenth switch Q19) is also pulled down from VI to VI/2. At the same time, the source voltage of the nineteenth switch Q19 is maintained at VI/4. In this way, at t72, the drain-source voltage of the nineteenth switch Q19 is reduced down from 3VI/4 to VI/4. At t73, when the nineteenth switch Q19 is turned on, the lower drain-source voltage of the nineteenth switch Q19 can significantly reduce the risk of hot carrier injection.

Similarly, in this embodiment, the value of the first preset duration Δt is set so that it is sufficient for the drain voltage of the tenth switch Q10 or the nineteenth switch Q19 to be pulled down. In some optional embodiments, the first preset duration Δt may be less than the dead time in the converter. In some other optional embodiments, the earlier turn-on of the seventh switch Q7 and the sixteenth switch Q16 can be completed within dead time.

In this embodiment, the risk of hot carrier injection caused by the tenth switch Q10 and the nineteenth switch Q19 in the turn-on process can be effectively reduced by turning on the seventh switch Q7 and the sixteenth switch Q16 earlier in the first half cycle and the second half cycle respectively, thereby increasing the longevity of the switching device and improving the reliability of the voltage conversion circuit.

It should be noted that, in the first half of the operating cycle, although turning on the seventh switch Q7 earlier than the tenth switch Q10 can effectively reduce the drain and source voltage difference of the tenth switch Q10 when the tenth switch Q10 is turned on, such an operation can cause increased voltage stress on the ninth switch Q9. In the first half of the operating cycle, after the seventh switch Q7 is turned on and before the first switch Q1 and the third switch Q3 are turned on, the drain-source voltage of the ninth switch Q9 is increased. The ninth switch Q9 must have a higher voltage rating to satisfy the increased drain-source voltage. In order to solve this problem, a second control method (FIG. 44) and a third control method (FIG. 45) can be adopted.

FIG. 44 illustrates a second control method applicable to the 4:1 dual-phase switched capacitor converter shown in FIG. 42 in accordance with various embodiments of the present disclosure. In FIG. 44, the curve L82 is the control signal of the eighth switch Q8. The curve L81 is the control signal of the first switch Q1, the third switch Q3, the fifth switch Q5, the seventh switch Q7, the tenth switch Q10 and the eighteenth switch Q18. The curve L80 is the control signal of the seventeenth switch Q17. The curve L86 is the control signal of the second switch Q2, the fourth switch Q4, the sixth switch Q6, the ninth switch Q9, the sixteenth switch Q16 and the nineteenth switch Q19. The curve L83 is the voltage waveform on the third terminal (drain) of the tenth switch Q10. The curve L87 is the voltage waveform on the second terminal (source) of the tenth switch Q10. The curve L85 is the voltage waveform of the drain and source voltage difference of the tenth switch Q10. The duration T8 represents an operating cycle. The duration T81 represents the first half of the operating cycle. The duration T82 represents the second half of the operating cycle. The time instant t81 represents any time in the duration T81, and the time instant t81 is neither the time when the duration T81 begins, nor the time when the duration T81 ends. T8M is the middle time of the operating cycle. T8E is the end time of the duration T8.

In this embodiment, the control branch is used to do the following: at the beginning moment of an operating cycle (i.e., T8S), the seventeenth switch Q17 is turned on, and the other switches are turned off.

After the first preset duration counting from the beginning of an operating cycle, the first switch Q1, the third switch Q3, the fifth switch Q5, the seventh switch Q7, the eighteenth switch Q18 and the tenth switch Q10 are turned on. The seventeenth switch Q17 remains on. The other switches are turned off.

In the first half of an operating cycle (the time period between T7S and T7M), the second switch Q2, the fourth switch Q4, the sixth switch Q6, the eighth switch Q8, the ninth switch Q9, the sixteenth switch Q16 and the nineteenth switch Q19 are turned off. The first switch Q1, the third switch Q3, the fifth switch Q5, the seventh switch Q7, the tenth switch Q10, the seventeenth switch Q17 and the eighteenth switch Q18 are turned on. The seventeenth switch Q17 is turned on earlier than the tenth switch Q10.

At the middle of an operating cycle, T8M, the eighth switch Q8 is turned on. The other switches are turned off. After the first preset duration counting from T8M, at any moment between T8S and T8E (i.e., t83), the second switch Q2, the fourth switch Q4, the sixth switch Q6, the ninth switch Q9, the sixteenth switch Q16 and the nineteenth switch Q19 are turned on. The eighth switch Q8 remains on. The other switches are turned off.

In the second half of the operating cycle (the time period between T7M and T7E), the first switch Q1, the third switch Q3, the fifth switch Q5, the seventh switch Q7, the tenth switch Q10, the seventeenth switch Q17 and the eighteenth switch Q18 are turned off. The second switch Q2, the fourth switch Q4, the sixth switch Q6, the eighth switch Q8, the ninth switch Q9, the sixteenth switch Q16 and the nineteenth switch Q19 are turned on. The eighth switch Q8 is turned on earlier than the nineteenth switch Q19.

The first switch Q1, the third switch Q3, the fifth switch Q5, the seventh switch Q7, the tenth switch Q10, the seventeenth switch Q17 and the eighteenth switch Q18 form one phase of the voltage conversion circuit, and these switches are turned on in the first half of the operating cycle. The second switch Q2, the fourth switch Q4, the sixth switch Q6, the eighth switch Q8, the ninth switch Q9, the sixteenth switch Q16 and the nineteenth switch Q19 form the other phase of the voltage conversion circuit, and these switches are turned on in the second half of the operating cycle. The switches of these two phases turn on and off in an alternating manner so that the ratio of the voltage at the input terminal VIN to the voltage at the output terminal VOUT is 4:1.

It should be noted that although the switches in the same phase are all turned on in the same half cycle, their turn on time is not necessarily the same, and the operation of the voltage conversion circuit can be optimized by configuring the conduction sequence of each switch in the same phase.

Similarly, it is understandable that in practical applications, due to the possibility of a short dead time, the eighth switch Q8 and the seventeenth switch Q17 alternately turn on and off with a duty cycle close to 50% (e.g., in a range from about 49% to about 50%).

Specifically, as shown in FIG. 44, the drain voltage of the tenth switch Q10 is maintained at the voltage at the end of the previous operating cycle before the start of an operating cycle (T8S). Because the eighth switch Q8 is in the conduction state before the end of the previous operating cycle, the drain voltage of the tenth switch Q10 is equal to the voltage VI at the input terminal VIN. The source voltage of the tenth switch Q10 is also maintained at the voltage at the end of the previous operating cycle. Because the fourth switch Q4 is in the conduction state before the end of the previous operating cycle, the source voltage of the tenth switch Q10 is equal to the voltage VO at the output terminal VOUT (VO is equal to VI/4). In this way, the drain and source voltage difference of the tenth switch Q10 is equal to 3VI/4. Although the tenth switch Q10 can withstand the drain-source voltage of 3VI/4 in the off state, if the tenth switch Q10 is turned on at this moment, the higher drain-source voltage is likely to accelerate the carriers to generate hot carriers during the turn-on process of the tenth switch Q10, and inject them into the gate to cause irreversible damage. Therefore, in this embodiment, at the beginning moment of each operating cycle T8S, the seventeenth switch Q17 is turned on when all other switches are turned off. After the first preset duration Δt counting from the beginning of the operating cycle, the tenth switch Q10 is turned on at t81.

The advantage of this control method is that when the seventeenth switch Q17 is turned on, the voltage at the second terminal of the eighth capacitor C8 (the source of the seventeenth switch Q17) is pulled up to the voltage VI of the input terminal VIN. Since the voltage difference between the two terminals of the eighth capacitor C8 is equal to VI/2, the voltage at the first terminal of the eighth capacitor C8 (the source of the eighteenth switch Q18) is also pulled up from zero to VI/2. At the same time, because the voltage of the source of the tenth switch Q10 (the drain of the eighteenth switch Q18) is maintained at VI/4, the body diode of the eighteenth switch Q18 is turned on. In this way, at t80, the source voltage of the tenth switch Q10 is pulled up to a level close to VI/2. At this time, the drain source voltage of the tenth switch Q10 is reduced from 3VI/4 to VI/2. At t81, when the tenth switch Q10 is turned on, the reduced drain-source voltage can significantly reduce the risk of hot carrier injection.

In the same way, before T8M, the drain voltage of the nineteenth switch Q19 is maintained at the voltage at the end of the first half cycle. Because the seventeenth switch Q17 is in the conduction state before the end of the first half cycle, the drain voltage of the nineteenth switch Q19 is equal to the voltage VI at the input terminal VIN. The source voltage of the nineteenth switch Q19 is also maintained at the voltage at the end of the first half of the operating cycle. Because the first switch Q1 is in the conduction state before the end of the first half of the operating cycle, the source voltage of the nineteenth switch Q19 is equal to the voltage VO of the output terminal VOUT (VO is equal to VI/4). In this way, the drain and source voltage difference of the nineteenth switch Q19 is equal to 3VI/4. Although the nineteenth switch Q19 can withstand the drain-source voltage of 3VI/4 in the off state, if the nineteenth switch Q19 is turned on at this moment, the higher drain-source voltage is likely to accelerate the carriers to generate hot carriers during the turn-on process of the nineteenth switch Q19, and inject them into the gate to cause irreversible damage. Therefore, in this embodiment, at T8M, the eighth switch Q8 is turned on when all other switches are turned off. After the first preset duration Δt counting from T8M, the nineteenth switch Q19 is turned on at time t83.

The advantage of this control method is that when the eighth switch Q8 is turned on, the voltage at the second terminal of the third capacitor C3 (the source of the eighth switch Q8) is pulled up to the voltage VI of the input terminal VIN. Since the voltage difference between the two terminals of the third capacitor C3 is VI/2 at this time, the voltage at the first terminal of the third capacitor C3 (the source of the ninth switch Q9) is also pulled up from zero to VI/2. At the same time, the drain voltage of the ninth switch Q9 is maintained at VI/4. In this way, at t82, the body diode of the ninth switch Q9 is turned on, and then the source voltage of the nineteenth switch Q19 is increased to a level close to VI/2. At this time, the drain-source voltage of the nineteenth switch Q19 is reduced from 3VI/4 to VI/2. At t83, when the nineteenth switch Q19 is turned on, the reduced drain-source voltage of the nineteenth switch Q19 can significantly reduce the risk of hot carrier injection.

Similarly, in this embodiment, the value of the first preset duration Δt is set so that it is sufficient for the source voltage of the tenth switch Q10 or the nineteenth switch Q19 to be pulled up. In some optional embodiments, the first preset duration Δt may be less than the dead time in the voltage conversion circuit. In some other optional embodiments, the earlier turn on of the seventeenth switch Q17 and the eighth switch Q8 can be completed within the dead time.

In this embodiment, the risk of hot carrier injection caused by the tenth switch Q10 and the nineteenth switch Q19 in the turn-on process can be effectively reduced by turning on the seventeenth switch Q17 and the eighth switch Q8 earlier in the first half and the second half of the operating cycle respectively, thereby increasing the longevity of the switching device and improving the reliability of the voltage conversion circuit.

It should be noted that, in the first half of the operating cycle, the drain and source voltage difference of the tenth switch Q10 can be reduced by turning on the seventeenth switch Q17 earlier than the tenth switch Q10. This will not produce a higher voltage rating requirement for the ninth switch Q9. However, such an operation can also make the parasitic diode of the ninth switch Q9 conduct for a period of time after the seventeenth switch Q17 is turned on in the first half of the operating cycle, thereby increasing the loss of the ninth switch Q9. In order to solve this problem, it is desirable to reduce the interval between the turn-on time of the seventeenth switch Q17 and the turn-on time of the ninth switch Q9.

In another optional embodiment, the control timing of the voltage conversion circuit shown in FIG. 42 can be further improved by combining the advantages of the first two control methods, so that the drain-source voltage difference of the tenth switch Q10 before turning on Q10 can be further reduced. As a result, the zero-voltage switching (ZVS) can be realized, thereby reducing the switching loss and improving the efficiency of the voltage conversion circuit. At the same time, it avoids the higher voltage rating requirement for the ninth switch Q9.

FIG. 45 illustrates a third control method applicable to the 4:1 dual-phase switched capacitor converter shown in FIG. 42 in accordance with various embodiments of the present disclosure. As shown in FIG. 45, the curve L90 is the control signal of the seventeenth switch Q17 and the control signal of at least one of the first switch Q1 and the third switch Q3. The curve L91 is the control signal of the eighth switch Q8 and the control signal of at least one of the fourth switch Q4 and the sixth switch Q6. The curve L92 is the control signal of the seventh switch Q7 and the eighteenth switch Q18. The curve L93 is the control signal of the ninth switch Q9 and the sixteenth switch Q16. The curve L94 is the control signal of the tenth switch Q10 and the fifth switch Q5. The curve L95 is the control signal of the nineteenth switch Q19 and the second switch Q2. The curve L96 is the voltage waveform on the third terminal (the drain) of the tenth switch Q10. The curve L97 is the voltage waveform on the second terminal (the source) of the tenth switch Q10. The curve L98 is the voltage waveform of the drain and source voltage difference of the tenth switch Q10. The curve L99 is the voltage waveform of the drain and source voltage difference of the ninth switch Q9. The duration T9 represents an operating cycle. The duration T91 represents the first half of the operating cycle. The duration T92 represents the second half of the operating cycle. The time instants t90 and t91 represent any time in duration T91, and t90 is earlier than t91. In addition, t91 is neither the beginning of duration T91 nor the end of duration T91. T9S represents the beginning of the operating cycle. T9M is the middle time of the operating cycle. T9E is the end time of duration T9.

In this embodiment, the control branch is further configured to do the following: at the beginning moment of an operating cycle (i.e., T8S), the seventeenth switch Q17 is turned on, and at least one of the third switch Q3 and the first switch Q1 is turned on at the same time (in this embodiment, the control three switch Q3 is taken as an example), and the other switches are turned off.

After the first preset duration counting from the beginning of the operating cycle, that is, at any moment between T8S and T8M (i.e., t90), the first switch Q1, the seventh switch Q7 and the eighteenth switch Q18 are turned on. The seventeenth switch Q17 and the third switch Q3 remain on. The second switch Q2, the fourth switch Q4, the sixth switch Q6, the eighth switch Q8, the ninth switch Q9, the sixteenth switch Q16 and the nineteenth switch Q19 are kept off.

In the first half of the operating cycle, after a second preset duration Δs (i.e., t91) counting from t90, the fifth switch Q5 and the tenth switch Q10 are turned on. The seventeenth switch Q17, the third switch Q3, the first switch Q1, the seventh switch Q7 and the eighteenth switch Q18 remain on. The second switch Q2, the fourth switch Q4, the sixth switch Q6, the eighth switch Q8, the ninth switch Q9, the sixteenth switch Q16 and the nineteenth switch Q19 remain off.

At T9M, the eighth switch Q8 is turned on, and at least one of the fourth switch Q4 and the sixth switch Q6 is turned on at the same time (in this embodiment, the sixth switch Q6 is turned on as an example), and the other switches are turned off.

After the first preset duration counting from T9M (i.e., t92), the fourth switch Q4, the ninth switch Q9 and the sixteenth switch Q16 are turned on. The eighth switch Q8 and the sixth switch Q6 remain on. The first switch Q1, the third switch Q3, the fifth switch Q5, the seventh switch Q7, the tenth switch Q10, the seventeenth switch Q17 and the eighteenth switch Q18 remain off.

In the second half of the operating cycle, after the second preset duration (i.e., t93) counting from t92, the second switch Q2 and the nineteenth switch Q19 are turned on. The fourth switch Q4, the sixth switch Q6, the eighth switch Q8, the ninth switch Q9 and the sixteenth switch Q16 remain on. The first switch Q1, the third switch Q3, the fifth switch Q5, the seventh switch Q7, the tenth switch Q10, the seventeenth switch Q17 and the eighteenth switch Q18 remain off.

The first switch Q1, the third switch Q3, the fifth switch Q5, the seventh switch Q7, the tenth switch Q10, the seventeenth switch Q17 and the eighteenth switch Q18 form one phase of the voltage conversion circuit, and these switches are turned on in the first half of the operating cycle. The second switch Q2, the fourth switch Q4, the sixth switch Q6, the eighth switch Q8, the ninth switch Q9, the sixteenth switch Q16 and the nineteenth switch Q19 form the other phase of the voltage conversion circuit, and these switches are turned on in the second half of the operating cycle. The switches of these two phases turn on and off in an alternating manner so that the ratio of the voltage at the input terminal VIN to the voltage at the output terminal VOUT is 4:1.

It should be noted that although the switches in the same phase are all turned on in the same half cycle, their on-time is not necessarily the same, and the operation of the voltage conversion circuit can be optimized by configuring the conduction sequence of each switch in the same phase.

Similarly, it is understandable that in practical applications, due to the possibility of a short dead time, the first switch Q1, the third switch Q3, the fourth switch Q4, the sixth switch Q6, the eighth switch Q8 and the seventeenth switch Q17 alternately turn on and off with a duty cycle close to 50% (e.g., in a range from about 49% to about 50%).

Specifically, as shown in FIG. 45, the advantages of the first two control methods are combined in the control method of this embodiment. At T9S, the seventeenth switch Q17 is turned on when the tenth switch Q10 is turned off, so that the source voltage of the tenth switch Q10 is increased from VI/4 to VI/2. As a result, the drain and source voltage difference of the tenth switch Q10 is reduced from 3VI/4 to VI/2. Then, after the first preset duration Δt, the seventh switch Q7 is turned on at t90 so that the drain voltage of the tenth switch Q10 is reduced from VI to VI/2, thereby reducing its drain and source voltage difference from VI/2 to 0. Finally, after the second preset time Δs counting from t90. The tenth switch Q10 is turned on at t91 to realize the zero voltage switching (ZVS) of the tenth switch Q10, so as to eliminate the risk of hot carrier injection and reduce the loss generated during switching.

At the same time, in this embodiment, the third switch Q3 and the seventeenth switch Q17 are turned on at T9S so that the second terminal of the first capacitor C1 (the drain of the third switch Q3) is grounded. Since the voltage difference between the two terminals of the first capacitor C1 is VI/4 at this time, the voltage at the first terminal of the first capacitor C1 (the drain of the ninth switch Q9) is also pulled down from VI/2 to VI/4. At the same time, the voltage at the source of the ninth switch Q9 (the drain of the seventh switch Q7) is maintained at the voltage VI/2 at the end of the previous operating cycle. The body diode of the ninth switch Q9 is turned on. In this way, at T9S, the drain-source voltage of the ninth switch Q9 is reduced from 0 to −VD, where VD is the conduction voltage of the body diode of the ninth switch Q9. At t90, when the seventh switch Q7 is turned on, the source voltage of the ninth switch Q9 is pulled down to ground, so that the drain and source voltage difference of the ninth switch Q9 is maintained at VI/4. It can be seen that in the control method of the present embodiment, in the process of the turn-on of the switch (i.e., the switch that is turned on in the first half cycle) in the first phase, the drain and source voltage difference of the ninth switch Q9 is always kept below VI/4, and the risk of overvoltage is effectively reduced. In some applications, the ninth switch Q9 can be implemented as a low voltage switch, thereby achieving a lower circuit cost.

It should be noted that, in the control method of the present embodiment, in addition to the tenth switch Q10, the first switch Q1 and the fifth switch Q5 can also achieve zero voltage switching (ZVS), thereby reducing the switching losses.

In the same way, at T9M, the eighth switch Q8 is turned on when the nineteenth switch Q19 is off, so that the source voltage of the nineteenth switch Q19 is increased from VI/4 to VI/2. As a result, the drain and source voltage difference of the nineteenth switch Q19 is reduced from 3VI/4 to VI/2. Then, after the first preset duration Δt counting from T9M, the sixteenth switch Q16 is turned on at t92 so that the drain voltage of the nineteenth switch Q19 is reduced from VI to VI/2, thereby reducing its drain and source voltage difference of the nineteenth switch Q19 from VI/2 to 0. Finally, after the second preset time Δs counting from t92, the nineteenth switch Q19 is turned on at t93 to realize the zero voltage switching (ZVS) of the nineteenth switch Q19, so as to eliminate the risk of hot carrier injection and reduce the loss generated during switching.

At the same time, in this embodiment, the sixth switch Q6 and the eighth switch Q8 are turned on at T9M, so that the second terminal of the second capacitor C2 (the drain of the sixth switch Q6) is grounded. Since the voltage difference between the two terminals of the second capacitor C2 is equal to VI/4 at this time, the voltage at the first terminal of the second capacitor C2 (the drain of the eighteenth switch Q18) is also pulled down from VI/2 to VI/4. At the same time, the voltage at the source of the eighteenth switch Q18 (the drain of the sixteenth switch Q16) is maintained at the voltage VI/2 at the end of the first half of the operating cycle. The body diode of the eighteenth switch Q18 is turned on. In this way, at T9M, the drain-source voltage of the eighteenth switch Q18 is reduced from 0 to −VD. VD is the body diode conduction voltage of the eighteenth switch Q18. At t92, when the sixteenth switch Q16 is turned on, the source voltage of the eighteenth switch Q18 is pulled down to the ground, so that the drain and source voltage difference of the eighteenth switch Q18 is maintained at VI/4. It can be seen that in the control method of the present embodiment, in the process of the turn-on of the switch (i.e., the switch that is turned on in the second half cycle) in the second phase, the drain and source voltage difference of the eighteenth switch Q18 is always kept below VI/4, and the risk of overvoltage is effectively reduced. In some applications, the eighteenth switch Q18 can be implemented as a low voltage switch, thereby achieving a lower circuit cost.

It should be noted that, in the control method of the present embodiment, in addition to the nineteenth switch Q19, the second switch Q2 and the fourth switch Q4 can also achieve zero voltage switching (ZVS), thereby reducing the switching losses.

Similarly, in this embodiment, the values of the first preset duration Δt and the second preset duration Δs are set so that they are sufficient for the source voltages of the tenth switch Q10 or the nineteenth switch Q19 to be pulled up, and the drain voltages of the tenth switch Q10 or the nineteenth switch Q19 to be pulled down. In some optional embodiments, the first preset duration Δt and the second preset duration Δs can be less than the dead time in the voltage conversion circuit. In some other optional embodiments, the early turn-on of the first switch Q1, the third switch Q3, the fourth switch Q4, the sixth switch Q6, the seventh switch Q7, the eighth switch Q8, the ninth switch Q9, the sixteenth switch Q16, the seventeenth switch Q17 and the eighteenth switch Q18 can be completed within the dead time.

In this embodiment, the risk of hot carrier injection caused by the turn on process of the tenth switch Q10 and the nineteenth switch Q19 can be effectively reduced by turning on the seventeenth switch Q17, the seventh switch Q7 earlier in the first half, and turning on the sixteenth switch Q16 and the eighth switch Q8 earlier in the second half, thereby increasing the longevity of the switching device and improving the reliability of the voltage conversion circuit.

At the same time, in the first half of the operating cycle, at least one of the first switch Q1 and the third switch Q3 is turned on before the seventh switch Q7 is turned on, and at least one of the fourth switch Q4 and the sixth switch Q6 is turned on before the sixteenth switch Q16 is turned on in the second half of the operating cycle. This control arrangement can reduce the voltage rating requirement of the ninth switch Q9 and the eighteenth switch Q18 respectively.

In consideration with the three control methods applicable to the circuit shown in FIG. 42, it can be concluded that if it is necessary to reduce or eliminate the risk of hot carrier injection in the turn-on process of the tenth switch Q10, the tenth switch Q10 is turned on later than the seventh switch Q7 and/or the seventeenth switch Q17 in each first half of the operating cycle. The seventh switch Q7 and the seventeenth switch Q17 are the switches in the same phase as the tenth switch Q10 in the third energy storage branch. Moreover, if it is necessary to reduce the voltage rating requirement of the ninth switch Q9 when the seventh switch Q7 is turned on earlier, at least one of the first switch Q1 and the third switch Q3 in each first half cycle needs to be turned on earlier than the seventh switch Q7.

Similarly, if it is necessary to reduce or eliminate the risk of hot carrier injection in the turn on process of the nineteenth switch Q19, the nineteenth switch Q19 is turned on later than the sixteenth switch Q16 and/or the eighth switch Q8 in the second half of each operating cycle. The sixteenth switch Q16 and the eighth switch Q8 are the switches in the same phase as the nineteenth switch Q19 in the third energy storage branch. Moreover, if it is necessary to reduce the voltage rating requirement of the eighteenth switch Q18 when the sixteenth switch Q16 is turned on earlier, at least one of the fourth switch Q4 and the sixth switch Q6 needs to be turned on earlier than the sixteenth switch Q16 in each second half cycle.

In some applications, the 4:1 power conversion circuit shown in FIG. 42 needs to be configured to operate in a 2:1 step-down mode. In order to maintain the advantages of reducing the voltage rating requirements of the ninth switch Q9 and the eighteenth switch Q18 brought by the aforesaid operating sequence at the same time, a new control method is applied to the circuit shown in FIG. 42 when the circuit is configured to operate in the 2:1 step-down mode.

Specifically, the control branch can be used to do the following: the eighth switch Q8 and the seventeenth switch Q17 are kept on, and the seventh switch Q7 and the sixteenth switch Q16 are kept off throughout an operating cycle. In the first half of an operating cycle, the second switch Q2, the fourth switch Q4, the sixth switch Q6, the eighteenth switch Q18 and the nineteenth switch Q19 are turned off. The first switch Q1, the third switch Q3, the fifth switch Q5, the ninth switch Q9, the tenth switch Q10 are turned on. In the second half of the operating cycle, the second switch Q2, the fourth switch Q4, the sixth switch Q6, the eighteenth switch Q18 and the nineteenth switch Q19 are turned on. The first switch Q1, the third switch Q3, the fifth switch Q5, the ninth switch Q9, the tenth switch Q10 are turned off. The ratio of the voltage of the input terminal VIN to the voltage of the output terminal VOUT is 2:1.

The advantage of this operation is that, since the seventh switch Q7 is always turned off, the voltage of the source of the ninth switch Q9 is kept as the difference between the voltage VI of the input terminal VIN and the voltage across the third capacitor C3. The voltage across two terminals of the third capacitor C3 is charged shared with the second capacitor C2 in the first half of each operating cycle, so that the voltage across two terminals of the third capacitor C3 is maintained at the voltage VO at the output terminal VOUT. In this way, the voltage at the source of the ninth switch Q9 is maintained at the difference between the voltage of the input terminal VIN and the voltage of the output terminal VOUT (i.e., VI-VO), so that no matter how the drain voltage of the ninth switch Q9 changes, the difference of the drain voltage and source voltage of the ninth switch Q9 will not exceed VO. In the same way, in the second half of each operating cycle, the drain-source voltage difference of the eighteenth switch Q18 will not exceed VO. The voltage rating requirements of these two switches are maintained.

FIG. 46 illustrates a schematic diagram of a first implementation of a 6:1 dual-phase switched capacitor converter in accordance with various embodiments of the present disclosure. FIG. 47 illustrates a schematic diagram of a second implementation of a 6:1 dual-phase switched capacitor converter in accordance with various embodiments of the present disclosure.

As shown in FIG. 46 and FIG. 47, the first energy storage branch 10 further comprises the twentieth switch Q20 and the ninth capacitor C9. The second energy storage branch 20 further comprises the twenty-first switch Q21 and the tenth capacitor C10.

The second terminal of the twentieth switch Q20 is connected to the third terminal of the first switch Q1, and the third terminal of the twentieth switch Q20 is connected to the first terminal of the ninth capacitor C9 and the third terminal of the ninth switch Q9. The second terminal of the ninth capacitor C9 is connected to the first terminal of the second capacitor C2 (as shown in FIG. 47), or the second terminal of the ninth capacitor C9 is connected to the second terminal of the second capacitor C2 (as shown in FIG. 46).

The second terminal of the twenty-first switch Q21 is connected to the third terminal of the fourth switch Q4, and the third terminal of the twenty-first switch Q21 is connected to the first terminal of the tenth capacitor C10 and the second terminal of the tenth switch Q10. The second terminal of the tenth capacitor Q10 is connected to the first terminal of the first capacitor C1 (as shown in FIG. 47), or the second terminal of the tenth capacitor Q10 is connected to the second terminal of the first capacitor C1 (as shown in FIG. 46).

The control branch is connected to the first terminal of the twentieth switch Q20 and the first terminal of the twenty-first switch Q21 respectively.

In the first embodiment, under a first control method, the control branch is used to do the following: in the first half of an operating cycle, the first switch Q1, the third switch Q3, the fifth switch Q5, the eighth switch Q8, the ninth switch Q9, the sixteenth switch Q16, the nineteenth switch Q19 and the twenty-first switch Q21 are turned off. The second switch Q2, the fourth switch Q4, the sixth switch Q6, the seventh switch Q7, the tenth switch Q10, the seventeenth switch Q17, the eighteenth switch Q18 and the twentieth switch Q20 are turned on. At least one of the seventh switch Q7 and the seventeenth switch Q17 is turned on earlier than the tenth switch Q10. In the second half of the operating cycle, the second switch Q2, the fourth switch Q4, the sixth switch Q6, the seventh switch Q7, the tenth switch Q10, the seventeenth switch Q17, the eighteenth switch Q18 and the twentieth switch Q20 are turned off. The first switch Q1, the third switch Q3, the fifth switch Q5, the eighth switch Q8, the ninth switch Q9, the sixteenth switch Q16, the nineteenth switch Q19 and the twenty-first switch Q21 are turned on. At least one of the eighth switch Q8 and the sixteenth switch Q16 is turned on earlier than the nineteenth switch Q19.

In a specific embodiment, the control method above can be realized as follows: at the beginning moment of an operating cycle, the seventh switch Q7 is turned on, and the other switches remain off. After the first preset duration counting from the beginning of the operating cycle, the second switch Q2, the fourth switch Q4, the sixth switch Q6, the tenth switch Q10, the seventeenth switch Q17, the eighteenth switch Q18 and the twentieth switch Q20 are turned on. The seventh switch Q7 is kept on and the other switches are kept off. In the middle of the operating cycle, the sixteenth switch Q16 is turned on, and the other switches are turned off. After the first preset duration counting from the middle of the operating cycle, the first switch Q1, the third switch Q3, the fifth switch Q5, the eighth switch Q8, the ninth switch Q9, the nineteenth switch Q19 and the twenty-first switch Q21 are turned on. The sixteenth switch Q16 is kept on, and the other switches are kept off.

In this embodiment, the risk of hot carrier injection caused by the tenth switch Q10 and the nineteenth switch Q19 in the turn on processes can be effectively reduced by turning on the seventh switch Q7 and the sixteenth switch Q16 earlier in the first half cycle and the second half cycle respectively, thereby increasing the longevity of the switching device and improving the reliability of the voltage conversion circuit.

In another specific embodiment, the control method above can also be realized as follows: at the beginning moment of an operating cycle, the seventeenth switch Q17 is turned on. At least one of the fourth switch Q4 and the sixth switch Q6 is turned. The other switches are turned off. After the first preset duration counting from the beginning of the operating cycle, the seventh switch Q7 and the eighteenth switch Q18 are turned on, and the seventeenth switch Q17, the fourth switch Q4 and the sixth switch Q6 are kept on. The other switches are kept off. After the second preset time, the second switch Q2, the tenth switch Q10 and the twentieth switch Q20 are turned on. The seventh switch Q7, the eighteenth switch Q18, the seventeenth switch Q17, the fourth switch Q4 and the sixth switch Q6 remain on, and the other switches are kept off. At the middle moment of the operating cycle, the eighth switch Q8 is turned on. At least one of the third switch Q3 and the first switch Q1 is turned on. The other switches are turned off. After the first preset duration counting from the middle of the operating cycle, the ninth switch Q9 and the sixteenth switch Q16 are turned on. The eighth switch Q8, the third switch Q3 and the first switch Q1 remain on. The other switches are kept off. After the second preset time counting from the end of the first preset duration, the fifth switch Q5, the twenty-first switch Q21 and the nineteenth switch Q19 are turned on. The ninth switch Q9, the sixteenth switch Q16, the eighth switch Q8, the third switch Q3 and the first switch Q1 remain on. The other switches are kept off.

In this embodiment, through turning on the seventeenth switch Q17, the seventh switch Q7 and the sixteenth switch Q16 and the eighth switch Q8 earlier, the control method can effectively reduce the risk of hot carrier injection in the turn on process of the tenth switch Q10 and the nineteenth switch Q19. At the same time, at least one of the fourth switch Q4 and the sixth switch Q6 is turned on before the seventh switch Q7 is turned on in the first half cycle. At least one of the first switch Q1 and the third switch Q3 is turned on before the sixteenth switch Q16 is turned on in the second half of the operating cycle. This configuration can reduce the voltage rating requirement of the ninth switch Q9 and the eighteenth switch Q18 respectively. The control method provided in this embodiment can also realize zero voltage switching (ZVS) for the tenth switch Q10, the nineteenth switch Q19, the twentieth switch Q20, the twenty-first switch Q21, the second switch Q2 and the fifth switch Q5, thereby reducing the switching losses and increasing the voltage conversion efficiency.

In the two embodiments above, the second switch Q2, the fourth switch Q4, the sixth switch Q6, the seventh switch Q7, the tenth switch Q10, the seventeenth switch Q17, the eighteenth switch Q18 and the twentieth switch Q20 form one phase of the voltage conversion circuit, and these switches are turned on in the first half of the operating cycle. The first switch Q1, the third switch Q3, the fifth switch Q5, the eighth switch Q8, the ninth switch Q9, the sixteenth switch Q16, the nineteenth switch Q19 and the twenty-first switch Q21 form the other phase of the voltage conversion circuit, and these switches are turned on in the second half of the operating cycle. The switches of these two phases turn on and off in an alternating manner so that the ratio of the voltage at the input terminal VIN to the voltage at the output terminal VOUT is 6:1.

Similarly, it is understandable that in practical applications, due to the possibility of a short dead time, the first switch Q1, the third switch Q3, the fourth switch Q4, the sixth switch Q6, the eighth switch Q8 and the seventeenth switch Q17 alternately turn on and off with a duty cycle close to 50% (e.g., in a range from about 49% to about 50%).

Combining the two control methods applicable to the circuits shown in FIG. 46 and FIG. 47, it can be concluded that in order to reduce or eliminate the risk of hot carrier injection during the turn on process of the tenth switch Q10, the tenth switch Q10 is configured to be turned on later than the seventh switch Q7 and/or the seventeenth switch Q17. The seventh switch Q7 and the seventeenth switch Q17 are switches in the third energy storage branch. The seventh switch Q7 and the seventeenth switch Q17 are in the same phase as the tenth switch Q10. Moreover, in order to reduce the voltage rating requirement of the ninth switch Q9 when the seventh switch Q7 is turned on earlier, at least one of the fourth switch Q4 and the sixth switch Q6 needs to be turned on earlier than the seventh switch Q7 in each first half cycle.

Similarly, in order to reduce or eliminate the risk of hot carrier injection during the turn on process of the nineteenth switch Q19, the nineteenth switch Q19 is turned on later than the sixteenth switch Q16 and/or the eighth switch Q8 in each second half of the operating cycle. Among them, the sixteenth switch Q16 and the eighth switch Q8 are switches in the third energy storage branch. The sixteenth switch Q16 and the eighth switch Q8 are in the same phase as the nineteenth switch Q19. Moreover, in order to reduce the voltage rating requirement of the eighteenth switch Q18 when the sixteenth switch Q16 is turned on earlier, at least one of the first switch Q1 and the third switch Q3 needs to be turned on earlier than the sixteenth switch Q16 in each second half of the operating cycle.

There are two connection methods of the second terminal of the ninth capacitor C9 and the second terminal of the tenth capacitor C10. The difference between the two connection methods is as follows: when the second terminal of the ninth capacitor C9 is connected to the second terminal of the second capacitor C2, and when the second terminal of the tenth capacitor C10 is connected to the second terminal of the first capacitor C1, and the 6:1 voltage circuit shown in FIG. 46 operates in a steady state, the steady-state voltages on the ninth capacitor C9 and the tenth capacitor C10 are equal to twice the voltage of the output terminal VOUT (i.e. 2×VO), or equal to ⅓ of the voltage of the input terminal VIN (i.e. ⅓VI). When the second terminal of the ninth capacitor C9 is connected to the first terminal of the second capacitor C2, and the second terminal of the tenth capacitor C10 is connected to the first terminal of the first capacitor C1, as shown in FIG. 47, and the 6:1 buck circuit operates in a steady state, the steady-state voltages on the ninth capacitor C9 and the tenth capacitor C10 are equal to the voltage of the output terminal VOUT (i.e. VO), or equal to ⅙ of the voltage of the input terminal VIN. (i.e. ⅙VI). Lower capacitor voltage requirements bring about an increase in the current flowing through the capacitor. Designers can make the choice that best suits the application based on specific routing requirements and capacitor characteristics and cost.

In some applications, it is necessary to configure the 6:1 power conversion circuits shown in FIG. 46 and FIG. 47 to operate in a 3:1 step-down mode. In order to maintain the advantage of reducing the voltage rating requirements of the ninth switch Q9 and the eighteenth switch Q18 brought by the aforementioned operating sequence, the present disclosure proposes a new control method to configure the circuits shown in FIG. 46 and FIG. 47 to operate in a 3:1 step-down mode.

Specifically, the control branch may be used to do the following: the eighth switch Q8 and the seventeenth switch Q17 are kept on, and the seventh switch Q7 and the sixteenth switch Q16 are turned kept off throughout an operating cycle. In the first half of an operating cycle, the first switch Q1, the third switch Q3, the fifth switch Q5, the eighteenth switch Q18, the nineteenth switch Q19 and the twenty-first switch Q21 are turned off. The second switch Q2, the fourth switch Q4, the sixth switch Q6, the ninth switch Q9, the tenth switch Q10 and the twentieth switch Q20 are turned on. In the second half of the operating cycle, the first switch Q1, the third switch Q3, the fifth switch Q5, the eighteenth switch Q18, the nineteenth switch Q19 and the twenty-first switch Q21 are turned on. The second switch Q2, the fourth switch Q4, the sixth switch Q6, the ninth switch Q9, the tenth switch Q10 and the twentieth switch Q20 are turned off.

The advantage of this operation is that since the seventh switch Q7 is always turned off, the voltage at the source of the ninth switch Q9 is equal to the difference between the voltage VI of the input terminal VIN and the voltage across the third capacitor C3. In the first half of each operating cycle, the voltage across the third capacitor C3 is connected in series with the second capacitor C2 and further in parallel with the ninth capacitor C9 for charge balancing, so that the voltage across the third capacitor C3 is maintained at the voltage VO of the output terminal VOUT. In this way, the voltage at the source of the ninth switch Q9 is maintained at the difference between the voltage VI of the input terminal VIN and the voltage VO of the output terminal VOUT (that is, VI−VO). In this way, no matter how the drain voltage of the ninth switch Q9 changes, the drain and source voltage difference of the ninth switch Q9 does not exceed VO. In the same way, the drain and source voltage difference of the eighteenth switch Q18 does not exceed VO. The voltage rating requirements of these two switches are maintained.

FIG. 48 illustrates a schematic diagram of a first implementation of an 8:1 dual-phase switched capacitor converter in accordance with various embodiments of the present disclosure. FIG. 49 illustrates a schematic diagram of a second implementation of an 8:1 dual-phase switched capacitor converter in accordance with various embodiments of the present disclosure.

In one embodiment, as shown in FIGS. 48 and 49, the first energy storage branch 10 further includes a twenty-second switch Q22 and an eleventh capacitor C11. The second energy storage branch 20 further includes a twenty-third switch Q23 and a twelfth capacitor C12.

The second terminal of the twenty-second switch Q22 is connected to the third terminal of the twentieth switch Q20. The third terminal of the twenty-second switch Q22 is connected to the first terminal of the eleventh capacitor C11 and the third terminal of the ninth switch Q9. As shown in FIG. 48, the second terminal of the ninth capacitor C9 is connected to the second terminal of the second capacitor C2. The second terminal of the eleventh capacitor C11 is connected to the second terminal of the first capacitor C1. As shown in FIG. 49, the second terminal of the ninth capacitor C9 is connected to the first terminal of the second capacitor C2. The second terminal of the eleventh capacitor C11 is connected to the first terminal of the tenth capacitor C10.

The second terminal of the twenty-third switch Q23 is connected to the third terminal of the twenty-first switch Q21, and the third terminal of the twenty-third switch Q23 is connected to the first terminal of the twelfth capacitor C12 and the third terminal of the tenth switch Q10. When the second terminal of the tenth capacitor C10 is connected to the second terminal of the first capacitor C1, the second terminal of the twelfth capacitor C12 is connected to the second terminal of the second capacitor C2 as shown in FIG. 48. When the second terminal of the tenth capacitor C10 is connected to the first terminal of the first capacitor C1, the second terminal of the twelfth capacitor C12 is connected to the first terminal of the ninth capacitor C9 as shown in FIG. 49.

The control branches are respectively connected to the first terminal of the twenty-second switch Q22 and the first terminal of the twenty-third switch Q23. In one embodiment, the control methods applicable to the circuit structures shown in FIGS. 48 and 49 are used to do the following: in the first half of an operating cycle, the second switch Q2, the fourth switch Q4, the sixth switch Q6, the eighth switch Q8, the ninth switch Q9, the sixteenth switch Q16, the nineteenth switch, the switch Q19, the twentieth switch Q20, and the twenty-third switch Q23 are turned off. The first switch Q1, the third switch Q3, the fifth switch Q5, the seventh switch Q7, the tenth switch Q10, and the seventeenth switch Q17, the eighteenth switch Q18, the twenty-first switch Q21 and the twenty-second switch Q22 are turned on. At least one of the seventh switch Q7 and the seventeenth switch Q17 is turned on earlier than the tenth switch Q10. In the second half of the operating cycle, the first switch Q1, the third switch Q3, the fifth switch Q5, the seventh switch Q7, the tenth switch Q10, the seventeenth switch Q17, the eighteenth switch Q18, the twentieth-first switch Q21 and the twenty-second switch Q22 are turned off. The second switch Q2, the fourth switch Q4, the sixth switch Q6, the eighth switch Q8, the ninth switch Q9, the sixteenth switch Q16, the ninth switch Q19, the twentieth switch Q20, and the twenty-third switch Q23 are turned on. At least one of the eighth switch Q8 and the sixteenth switch Q16 is turned on earlier than the nineteenth switch Q19.

In a specific implementation, the control method above can be implemented such that the control branch is used to do the following: at the beginning of an operating cycle, the seventh switch Q7 is turned on. The other switches are turned off. After the first preset time period counting from the beginning of the operating cycle, the first switch Q1, the third switch Q3, the fifth switch Q5, the tenth switch Q10, the seventeenth switch Q17, the eighteenth switch Q18, the twenty-first switch Q21 and the twenty-second switch Q22 are turned on. The seventh switch Q7 remains on. The other switches are turned off. At the middle moment of the operating cycle, the sixteenth switch Q16 is turned on, and the other switches are turned off. After the first preset time period counting from the middle of the operating cycle, the second switch Q2, the fourth switch Q4, the sixth switch Q6, the eighth switch Q8, the ninth switch Q9, the nineteenth switch Q19, the twentieth switch Q20 and the twenty-third switch Q23 are turned on. The sixteenth switch Q16 remains on. The other switches are kept off.

In this embodiment, by turning on the seventh switch Q7 and the sixteenth switch Q16 earlier in the first half and the second half of the operating cycle respectively, the hot carriers caused by the tenth switch Q10 and the nineteenth switch Q19 during the turn on processes can be effectively reduced, thereby extending the longevity of the switching devices and improving the reliability of the voltage conversion circuit.

In another specific implementation, the control method above can also be implemented as follows: at the beginning of an operating cycle, the seventeenth switch Q17 is turned on. At least one of the third switch Q3 and the first switch Q1 is turned on. The other switches are turned off. After the first preset time period counting from the beginning of the operating cycle, the seventh switch Q7 and the eighteenth switch Q18 are turned on. The seventeenth switch Q17, the third switch Q3 and the first switch Q1 remains on. The other switches are kept off. After the second preset time period counting from the end of the first preset time period, the fifth switch Q5, the tenth switch Q10, the twenty-first switch Q21 and the twenty-second switch Q22 are turned on. The seventh switch Q7, the eighteenth switch Q18, the seventeenth switch Q17, the third switch Q3 and the first switch Q1 remain on. The other switches are kept off at the same time. At the middle moment of the operating cycle, the eighth switch Q8 is turned on. At least one of the fourth switch Q4 and the sixth switch Q6 is turned on, and the other switches are turned off. After the first preset time period counting from the middle of the operating cycle, the ninth switch Q9 and the sixteenth switch Q16 are turned on. The eighth switch Q8, the fourth switch Q4 and the sixth switch Q6 remain on. The other switches are kept off. After the second preset time period counting from the end of the first preset time period, the second switch Q2, the nineteenth switch Q19, the twentieth switch Q20 and the twenty-third switch Q23 are turned on. The ninth switch Q9, the sixteenth switch Q16, the eighth switch Q8, the fourth switch Q4, and the sixth switch Q6 remain on. The other switches are turned off.

In this embodiment, by turning on the seventeenth switch Q17 and the seventh switch Q7, the sixteenth switch Q16 and the eighth switch Q8 earlier in the first half cycle and the second half cycle respectively, the risk of hot carrier injection during the turn on processes of the tenth switch Q10 and the eighth switch Q8 can be effectively reduced, thereby prolonging the longevity of the switching device and improving the reliability of the voltage conversion circuit. At the same time, at least one of the first switch Q1 and the third switch Q3 is turned on before the seventh switch Q7 is turned on in the first half of the operating cycle. At least one of the fourth switches Q4 and the sixth switch Q6 is turned on before the sixteenth switch Q16 is turned on during the second half of the operating cycle. This configuration reduces the voltage rating requirements of the ninth switch Q9 and the eighteenth switch Q18. The control method of this embodiment can be applicable to the tenth switch Q10, the nineteenth switch Q19, the twentieth switch Q20, the twenty-first switch Q21, the twenty-second switch Q22, the twenty-third switch Q23, and the second switch Q2 and the fifth switch Q5 to achieve zero voltage switching (ZVS), thereby reducing switching losses and improving the efficiency of the voltage conversion circuit.

In the two embodiments above, the first switch Q1, the third switch Q3, the fifth switch Q5, the seventh switch Q7, the tenth switch Q10, the seventeenth switch Q17, the eighteenth switch Q18, the twenty-first switch Q21 and the twenty-second switch Q22 form one phase of the voltage conversion circuit, and these switches are turned on in the first half of the operating cycle. The second switch Q2, the fourth switch Q4, the sixth switch Q6, the eighth switch Q8, the ninth switch Q9, the sixteenth switch Q16, the nineteenth switch Q19, the twentieth switch Q20 and the twenty-third switch Q23 form the other phase of the voltage conversion circuit, and these switches are turned on during the second half of the operating cycle. The switches of these two phases turn on and off in an alternating manner so that the ratio of the voltage at the input terminal VIN to the voltage at the output terminal VOUT is 8:1.

Similarly, it can be understood that in practical applications, due to the possible existence of a short dead time, the first switch Q1, the third switch Q3, the fourth switch Q4, the sixth switch Q6, and the eighth switch Q8 and the seventeenth switch Q17 alternately turn on and off with a duty cycle close to 50% (e.g., in a range from about 49% to about 50%).

Combining the two control methods applied to the circuits shown in FIG. 48 and FIG. 49, it can be concluded that in order to reduce or eliminate the risk of hot carrier injection during the turn on process of the tenth switch Q10, the tenth switch Q10 is configured to be turned on later than the seventh switch Q7 and/or the seventeenth switch Q17. Among them, the seventh switch Q7 and the seventeenth switch Q17 are switches in the third energy storage branch. The seventh switch Q7 and the seventeenth switch Q17 are in the same phase as the tenth switch Q10. Moreover, in order to reduce the voltage rating requirement of the ninth switch Q9 when the seventh switch Q7 is turned on earlier, at least one of the first switch Q1 and the third switch Q3 needs to be turned on earlier than the seventh switch Q7 in each first half of the operating cycle.

Similarly, in order to reduce or eliminate the risk of hot carrier injection during the turn on process of the nineteenth switch Q19, the nineteenth switch Q19 is turned on later than the sixteenth switch Q16 and/or the eighth switch Q8 in each second half of the operating cycle. Among them, the sixteenth switch Q16 and the eighth switch Q8 are switches in the third energy storage branch. The sixteenth switch Q16 and the eighth switch Q8 are in the same phase as the nineteenth switch Q19. Moreover, in order to reduce the voltage rating requirement of the eighteenth switch Q18 when the sixteenth switch Q16 is turned on earlier, at least one of the fourth switch Q4 and the sixth switch Q6 needs to be turned on earlier than the sixteenth switch Q16 in each second half of the operating cycle.

There are two connection methods of the second terminal of the eleventh capacitor C11 and the second terminal of the twelfth capacitor C12. The difference between the two connection modes is as follows: when the second terminal of the eleventh capacitor C11 and the second terminal of the tenth capacitor C10 are both connected to the second terminal of the first capacitor C1, and the second terminal of the twelfth capacitor C12 and the second terminal of the ninth capacitor C9 are both connected to the second terminal of the second capacitor C2, as shown in FIG. 48, when the 8:1 step-down circuit operates in a steady state, the steady-state voltages on the eleventh capacitor C11 and the twelfth capacitor C12 are equal to three times the voltage of the output terminal VOUT (3×VO). The steady-state voltages on the ninth capacitor C9 and the tenth capacitor C10 are both twice the voltage of the output terminal VOUT (2×VO), or ⅓ of the voltage of the input terminal VIN (⅓VI). When the second terminal of the eleventh capacitor C11 is connected to the first terminal of the tenth capacitor C10, the second terminal of the tenth capacitor C10 is connected to the first terminal of the first capacitor C1, and the second terminal of the twelfth capacitor C12 is connected to the first terminal of the ninth capacitor C9, and the second terminal of the ninth capacitor C9 is connected to the first terminal of the second capacitor C2, as shown in FIG. 49, when the 8:1 step-down circuit operates in a steady state, the steady-state voltages on the ninth capacitor C9, the tenth capacitor C10, the eleventh capacitor C11 and the twelfth capacitor C12 are all equal to the voltage of the output terminal VOUT (VO), or ⅛ of the voltage of the input terminal VIN (⅛VI). Lower capacitor voltage requirements bring about an increase in the current flowing through the capacitor. Designers can make the choice that best suits the application based on specific routing requirements, capacitor characteristics and cost.

In summary, in the circuit structure shown in FIG. 42, two switches (including the twentieth switch Q20 and the twenty-first switch Q21) are added, and two capacitors (including the ninth capacitor C9 and the tenth capacitor C10) are added in two ways to obtain the circuit structure shown in FIG. 46 or FIG. 47, thereby increasing the ratio of the voltage of the input terminal VIN to the voltage of the output terminal VOUT from 4:1 to 6:1. Then, two switches (including the twenty-second switch Q22 and the twenty-third switch Q23) and two capacitors (including the eleventh capacitor C11 and the twelfth capacitor C12) are added to the circuit structure shown in FIG. 46 or FIG. 47 to further increase the ratio of the voltage of the input terminal VIN to the voltage of the output terminal VOUT from 6:1 to 8:1. By analogy, in order to achieve a ratio of the voltage of the input terminal VIN to the voltage of the output terminal VOUT of 10:1, two switches and two capacitors are added to the circuit structure shown in FIG. 48 or FIG. 49, and follow the connection manner of the twentieth switch Q20, the twenty-first switch Q21, the ninth capacitor C9 and the tenth capacitor C10. In order to achieve a ratio of 12:1 of the voltage of the input terminal VIN to the voltage of the output terminal VOUT, two switches and two capacitors are added. The connection of these two switches and the two capacitors follows the connection manner of the twenty-second switch Q22, the twenty-third switch Q23, the eleventh capacitor C11 and the twelfth capacitor C12. Therefore, through the method above, the ratio of the voltage of the input terminal VIN to the voltage of the output terminal VOUT can be 2N:1, where N is a positive integer.

When the circuit is expanded according to the connection method shown in FIG. 42, FIG. 46 or FIG. 48, the voltage rating required for the newly added capacitor is N−1 times the output voltage Vo. For example, when expanding from an 8:1 step-down circuit structure to a 10:1 step-down circuit structure, the steady-state voltage rating values of the two newly added capacitors need to be at least four times the voltage Vo of the output terminal VOUT. When the circuit is expanded as shown in FIG. 42, FIG. 47, or FIG. 49, the voltage rating required for the newly added capacitor is always equal to the output voltage Vo. However, as the voltage step-down ratio increases, the current flowing capacity required by the capacitor in the original circuit is increased. For example, when the 8:1 step-down circuit structure shown in FIG. 49 is expanded to a 10:1 step-down circuit structure, the steady-state current flowing capabilities of the eleventh capacitor C11 and the twelfth capacitor C12 need to be doubled. Designers can choose between these two capacitor expansion methods that best suits the application based on specific wiring and board requirements, the characteristics and cost of the capacitor.

It can be understood that in the embodiment of the present application, the ratio of the voltage of the input terminal VIN to the voltage of the output terminal VOUT is 2N:1 as an example. In other embodiments, the input terminal VIN in the embodiment of the present application can also be used as one terminal of the output voltage, and the output terminal VOUT in the embodiment of the present application can be used as one terminal of the input voltage. The same control method can achieve a ratio of input voltage to output voltage of 1:2N.

An embodiment of the present application also provides a charger, which includes a voltage conversion circuit as in any of the above embodiments.

In accordance with an embodiment, a switched capacitor converter comprises a first energy storage branch comprising a first capacitor, a first switch, a second switch and a third switch, a second energy storage branch comprising a second capacitor, a fourth switch, a fifth switch and a sixth switch, wherein an output terminal is one of common nodes of the first energy storage branch and the second energy storage branch, a third energy storage branch comprising a third capacitor, a seventh switch, an eighth switch, a ninth switch and a tenth switch, wherein a third terminal of the seventh switch and a second terminal of the ninth switch is connected to a first terminal of the third capacitor, a second terminal of the third capacitor is connected to a third terminal of the tenth switch and a second terminal of the eighth switch, a third terminal of the eighth switch is connected to an input terminal, a second terminal of the seventh switch is grounded, a third terminal of the ninth switch is coupled to the first switch, and a second terminal of the tenth switch is coupled to the fourth switch, and a control branch connected to a first terminal of each switch in the first energy storage branch, the second energy storage branch and the third energy storage branch respectively, wherein the control branch is configured to control each switch to alternately turn on and off periodically in two phases, so that a ratio of a voltage at the input terminal to a voltage at the output terminal is 2N:1, where N is an integer greater than 1.

In each operating cycle, the tenth switch is turned on later than at least one switch in the third energy storage branch, and wherein the at least one switch and the tenth switch are in a same phase.

In the switched capacitor converter, a third terminal of the first switch is connected to the first terminal of the first capacitor, a second terminal of the first switch is connected to a third terminal of the second switch and further connected to the output terminal, a second terminal of the second switch is connected to a third terminal of the third switch and a second terminal of the first capacitor, a second terminal of the third switch is grounded, a third terminal of the fourth switch is connected to a first terminal of the second capacitor, a second terminal of the fourth switch is connected to a third terminal of the fifth switch, and further connected to the output terminal, a second terminal of the fifth switch is connected to a third terminal of the sixth switch and a second terminal of the second capacitor, a second terminal of the sixth switch is grounded, and the control branch is configured to: in a first half of an operating cycle, control the second switch, the fourth switch, the sixth switch, the eighth switch and the ninth switch to be turned off, and control the first switch, the third switch, the fifth switch, the seventh switch and the tenth switch to be turned on, and wherein the seventh switch is turned on earlier than the tenth switch, and in a second half of the operating cycle, control the second switch, the fourth switch, the sixth switch, the eighth switch and the ninth switch to be turned on, and control the first switch, the third switch, the fifth switch, the seventh switch and the tenth switch to be turned off, and wherein, the ratio of the voltage at the input terminal to the voltage at the output terminal is 4:1.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A switched capacitor converter comprising:
a first energy storage branch comprising a first capacitor, a first switch, a second switch and a third switch;
a second energy storage branch comprising a second capacitor, a fourth switch, a fifth switch and a sixth switch, wherein an output terminal is one of common nodes of the first energy storage branch and the second energy storage branch;
a third energy storage branch comprising a third capacitor, a seventh switch, an eighth switch, a ninth switch and a tenth switch, wherein:
a third terminal of the seventh switch and a second terminal of the ninth switch is connected to a first terminal of the third capacitor;
a second terminal of the third capacitor is connected to a third terminal of the tenth switch and a second terminal of the eighth switch;
a third terminal of the eighth switch is connected to an input terminal;
a second terminal of the seventh switch is grounded;
a third terminal of the ninth switch is coupled to the first switch; and
a second terminal of the tenth switch is coupled to the fourth switch; and
a control branch connected to a first terminal of each switch in the first energy storage branch, the second energy storage branch and the third energy storage branch respectively, wherein the control branch is configured to control each switch to alternately turn on and off periodically in two phases, so that a ratio of a voltage at the input terminal to a voltage at the output terminal is 2N:1, where N is an integer greater than 1.

2. The switched capacitor converter of claim 1, wherein:
in each operating cycle, the tenth switch is turned on later than at least one switch in the third energy storage branch, and wherein the at least one switch and the tenth switch are in a same phase.

3. The switched capacitor converter of claim 1, wherein:
a third terminal of the first switch is connected to the first terminal of the first capacitor;
a second terminal of the first switch is connected to a third terminal of the second switch and further connected to the output terminal;
a second terminal of the second switch is connected to a third terminal of the third switch and a second terminal of the first capacitor;
a second terminal of the third switch is grounded;
a third terminal of the fourth switch is connected to a first terminal of the second capacitor;
a second terminal of the fourth switch is connected to a third terminal of the fifth switch, and further connected to the output terminal;
a second terminal of the fifth switch is connected to a third terminal of the sixth switch and a second terminal of the second capacitor; and
a second terminal of the sixth switch is grounded.

4. The switched capacitor converter of claim 3, wherein: the control branch is configured to:
in a first half of an operating cycle, control the second switch, the fourth switch, the sixth switch, the eighth switch and the ninth switch to be turned off, and control the first switch, the third switch, the fifth switch, the seventh switch and the tenth switch to be turned on, and wherein the seventh switch is turned on earlier than the tenth switch; and
in a second half of the operating cycle, control the second switch, the fourth switch, the sixth switch, the eighth switch and the ninth switch to be turned on, and control the first switch, the third switch, the fifth switch, the seventh switch and the tenth switch to be turned off, and wherein, the ratio of the voltage at the input terminal to the voltage at the output terminal is 4:1.

5. The switched capacitor converter of claim 4, wherein the control branch is further configured to:
in the first half of the operating cycle, control at least one of the first switch, the third switch and the fifth switch to be turned on earlier than the tenth switch; and
in the second half of the operating cycle, control at least one of the fourth switch and the sixth switch to be turned on earlier than the other switches in the same phase, and wherein the ratio of the voltage at the input terminal to the voltage at the output terminal is 4:1.

6. The switched capacitor converter of claim 1, wherein:
a third terminal of the first switch is connected to the first terminal of the first capacitor;
a second terminal of the first switch is connected to a third terminal of the second switch and further connected to the output terminal;
a second terminal of the second switch is connected to a third terminal of the third switch and a second terminal of the first capacitor;
a second terminal of the third switch is grounded;
a third terminal of the fourth switch is connected to a first terminal of the second capacitor;

a second terminal of the fourth switch is connected to a third terminal of the fifth switch, and further connected to the output terminal;

a second terminal of the fifth switch is connected to a third terminal of the sixth switch and a second terminal of the second capacitor; and a second terminal of the sixth switch is grounded, and wherein:

the first energy storage branch further includes a twelfth switch and a fourth capacitor; and the second energy storage branch further includes a thirteenth switch and a fifth capacitor, and wherein:

a second terminal of the twelfth switch is connected to a third terminal of the first switch;

a third terminal of the twelfth switch is connected to a first terminal of the fourth capacitor and the third terminal of the ninth switch;

a second terminal of the fourth capacitor is connected to a terminal of the second capacitor;

a second terminal of the thirteenth switch is connected to a third terminal of the fourth switch;

a third terminal of the thirteenth switch is connected to a first terminal of the fifth capacitor and the third terminal of the tenth switch; and a second terminal of the fifth capacitor is connected to a terminal of the first capacitor.

7. The switched capacitor converter of claim 6, wherein the control branch is further configured to:

in a first half of an operating cycle, control the first switch, the third switch, the fifth switch, the eighth switch, the ninth switch and the thirteenth switch to be turned off, and control the second switch, the fourth switch, the sixth switch, the seventh switch, the tenth switch and the twelfth switch to be turned on, wherein the seventh switch is turned on earlier than the tenth switch; and in a second half of the operating cycle, control the first switch, the third switch, the fifth switch, the eighth switch, the ninth switch and the thirteenth switch to be turned on, and control the second switch, the fourth switch, the sixth switch, the seventh switch, the tenth switch and the twelfth switch to be turned off, and wherein, the ratio of the voltage at the input terminal to the voltage at the output terminal is 6:1.

8. The switched capacitor converter of claim 7, wherein the control branch is further configured to:

in the first half of the operating cycle, control at least one of the second switch and the sixth switch to be turned on earlier than the tenth switch; and in the second half of the operating cycle, control at least one of the first switch and the third switch to be turned on earlier than the other switches of the same phase, and wherein the ratio of the voltage at the input terminal to the voltage at the output terminal is 6:1.

9. The switched capacitor converter of claim 1, wherein:

a third terminal of the first switch is connected to the first terminal of the first capacitor;

a second terminal of the first switch is connected to a third terminal of the second switch and further connected to the output terminal;

a second terminal of the second switch is connected to a third terminal of the third switch and a second terminal of the first capacitor;

a second terminal of the third switch is grounded;

a third terminal of the fourth switch is connected to a first terminal of the second capacitor;

a second terminal of the fourth switch is connected to a third terminal of the fifth switch, and further connected to the output terminal;

a second terminal of the fifth switch is connected to a third terminal of the sixth switch and a second terminal of the second capacitor; and a second terminal of the sixth switch is grounded, and wherein:

the first energy storage branch further includes a twelfth switch, a fourth capacitor, a fourteenth switch and a sixth capacitor; and the second energy storage branch further includes a thirteenth switch, a fifth capacitor, a fifteenth switch and a seventh capacitor, and wherein:

a second terminal of the twelfth switch is connected to a third terminal of the first switch;

a third terminal of the twelfth switch is connected to a first terminal of the fourth capacitor;

a second terminal of the fourth capacitor is connected to a terminal of the second capacitor;

a second terminal of the thirteenth switch is connected to a third terminal of the fourth switch;

a third terminal of the thirteenth switch is connected to a first terminal of the fifth capacitor;

a second terminal of the fifth capacitor is connected to a terminal of the first capacitor;

a second terminal of the fourteenth switch is connected to the third terminal of the twelfth switch;

a third terminal of the fourteenth switch is connected to a first terminal of the sixth capacitor and the third terminal of the ninth switch;

a second terminal of the sixth capacitor is connected to a terminal of the fifth capacitor;

a second terminal of the fifteenth switch is connected to the third terminal of the thirteenth switch;

a third terminal of the fifteenth switch and a first terminal of the seventh capacitor are connected to the third terminal of the tenth switch; and a second terminal of the seventh capacitor is connected to a terminal of the fourth capacitor.

10. The switched capacitor converter of claim 9, wherein the control branch is further configured to:

in a first half of an operating cycle, control the second switch, the fourth switch, the sixth switch, the twelfth switch, the fifteenth switch, the eighth switch and the ninth switches to be turned off, and control the first switch, the third switch, the fifth switch, the seventh switch, the thirteenth switch, the fourteenth switch and the tenth switch to be turned on, and wherein the seventh switch is turned on earlier than the tenth switch; and in a second half of the operating cycle, control the second switch, the fourth switch, the sixth switch, the eighth switch, the twelfth switch, the fifteenth switch and the ninth switch to be turned on, and control the first switch, the third switch, the fifth switch, the seventh switch, the thirteenth switch, the fourteenth switch and the tenth switch to be turned off, and wherein the ratio of the voltage at the input terminal to the voltage at the output terminal is 8:1.

11. The switched capacitor converter of claim 10, wherein the control branch is further configured to:

in the first half of the operating cycle, at least one of the third switch and the fifth switch is turned on earlier than the tenth switch; and in the second half of the operating cycle, at least one of the fourth switch and the sixth switch is turned on earlier than the other switches of the same phase, and wherein the ratio of the voltage at the input terminal to the voltage of the output terminal is 8:1.

12. The switched capacitor converter of claim 1, wherein:

a third terminal of the first switch is connected to the first terminal of the first capacitor;

a second terminal of the first switch is connected to a third terminal of the second switch and further connected to the output terminal;

a second terminal of the second switch is connected to a third terminal of the third switch and a second terminal of the first capacitor;

a second terminal of the third switch is grounded;

a third terminal of the fourth switch is connected to a first terminal of the second capacitor;

a second terminal of the fourth switch is connected to a third terminal of the fifth switch, and further connected to the output terminal;

a second terminal of the fifth switch is connected to a third terminal of the sixth switch and a second terminal of the second capacitor; and a second terminal of the sixth switch is grounded, and wherein:

the third energy storage branch also includes an eighth capacitor, a sixteenth switch, a seventeenth switch, an eighteenth switch and a nineteenth switch, and wherein:

a third terminal of the sixteenth switch is connected to a second terminal of the eighteenth switch and a first terminal of the eighth capacitor;

a second terminal of the eighth capacitor is connected to a third terminal of the nineteenth switch and a second terminal of the seventeenth switch;

a third terminal of the seventeenth switch is connected to the input terminal;

a second terminal of the sixteenth switch is grounded;

a third terminal of the eighteenth switch is coupled to a third terminal of the fourth switch; and a second terminal of the nineteenth switch is coupled to a third terminal of the first switch.

13. The switched capacitor converter of claim 12, wherein the control branch is further configured to:

in a first half of an operating cycle, control the second switch, the fourth switch, the sixth switch, the eighth switch, the ninth switch, the sixteenth switch and the nineteenth switch to be turned off, and control the first switch, the third switch, the fifth switch, the seventh switch, the tenth switch, the seventeenth switch and the eighteenth switch to be turned on, and wherein at least one of the seventh switch and the seventeenth switch is turned on earlier than the tenth switch; and in a second half of the operating cycle, control the first switch, the third switch, the fifth switch, the seventh switch, the tenth switch, the seventeenth switch and the eighteenth switch to be turned off, and control the second switch, the fourth switch, the sixth switch, the eighth switch, the ninth switch, the sixteenth switch and the nineteenth switch to be turned on, wherein at least one of the eighth switch and the sixteenth switch is turned on earlier than the nineteenth switch, and wherein the ratio of the voltage at the input terminal to the voltage at the output terminal is 4:1.

14. The switched capacitor converter of claim 12, wherein the control branch is further configured to:

in a first half of an operating cycle, control the second switch, the fourth switch, the sixth switch, the eighth switch, the ninth switch, the sixteenth switch and the nineteenth switch to be turned off, and control the first switch, the third switch, the fifth switch, the seventh switch, the tenth switch, the seventeenth switch and the eighteenth switch to be turned on, and wherein at least one of the seventh switch and the seventeenth switch is turned on earlier than the tenth switch, and at least one of the first switch and the third switch is turned on earlier than the seventh switch; and in a second half of the operating cycle, control the first switch, the third switch, the fifth switch, the seventh switch, the tenth switch, the seventeenth switch and the eighteenth switch to be turned off, and control the second switch, the fourth switch, the sixth switch, the eighth switch, the ninth switch, the sixteenth switch and the nineteenth switch to be turned on, wherein at least one of the eighth switch and the sixteenth switch is turned on earlier than the nineteenth switch, and at least one of the second switch and the sixth switch is turned on earlier than the sixteenth switch, and wherein the ratio of the voltage at the input terminal to the voltage at the output terminal is 4:1.

15. The switched capacitor converter of claim 12, wherein the control branch is further configured to:

control the eighth switch and the seventeenth switch to be turned on, and control the seventh switch and the sixteenth switch to be turned off;

in a first half of an operating cycle, control the second switch, the fourth switch, the sixth switch, the eighteenth switch and the nineteenth switch to be turned off, and control the first switch, the third switch, the fifth switch, the ninth switch and the tenth switch to be turned on; and in a second half of the operating cycle, control the second switch, the fourth switch, the sixth switch, the eighteenth switch and the nineteenth switch to be turned on, and control the first switch, the third switch, the fifth switch, the ninth switch and the tenth switch to be turned off, and wherein the switched capacitor converter is reconfigured such that the ratio of the voltage at the input terminal to the voltage at the output terminal is 2:1.

16. The switched capacitor converter of claim 12, wherein:

the first energy storage branch further includes a twentieth switch and a ninth capacitor; and the second energy storage branch further includes a twenty-first switch and a tenth capacitor, and wherein:

a second terminal of the twentieth switch is connected to the third terminal of the first switch;

a third terminal of the twentieth switch is connected to a first terminal of the ninth capacitor and the third terminal of the ninth switch;

a second terminal of the ninth capacitor is connected to the first terminal of the second capacitor or the second terminal of the second capacitor;

a second terminal of the twenty-first switch is connected to the third terminal of the fourth switch;

a third terminal of the twenty-first switch is connected to a first terminal of the tenth capacitor and the second terminal of the tenth switch; and a second terminal of the tenth capacitor is connected to the first terminal of the first capacitor or the second terminal of the first capacitor.

17. The switched capacitor converter of claim 16, wherein the control branch is further configured to:

in a first half of an operating cycle, control the first switch, the third switch, the fifth switch, the eighth switch, the ninth switch, the sixteenth switch, the nineteenth switch and the twenty-first switch to be turned off, and control the second switch, the fourth switch, the sixth switch, the seventh switch, the tenth switch, the seventeenth switch, the eighteenth switch and the twentieth switch to be turned on, and wherein at least one of the seventh switch and the seventeenth switch is turned on earlier than the tenth switch; and in a second half of the operating cycle, control the second switch, the fourth switch, the sixth switch, the seventh switch, the tenth switch, the seventeenth switch, the eighteenth switch and the twentieth switch to be turned off, and control the first switch, the third switch, the fifth switch, the eighth switch, the ninth switch, the sixteenth switch, the nineteenth switch and the twenty-first switch to be turned on, and wherein at least one of the eighth switch and the sixteenth switch is turned on earlier than the nineteenth switch, and wherein, the ratio of the voltage at the input terminal to the voltage at the output terminal is 6:1.

18. The switched capacitor converter of claim 16, wherein the control branch is further configured to:

in a first half of an operating cycle, control the first switch, the third switch, the fifth switch, the eighth switch, the ninth switch, the sixteenth switch, the nineteenth switch and the twenty-first switch to be turned off, and control the second switch, the fourth switch, the sixth switch, the seventh switch, the tenth switch, the seventeenth switch, the eighteenth switch and the twentieth switch to be turned on, and wherein at least one of the seventh switch and the seventeenth switch is turned on earlier than the tenth switch, and at least one of the second switch and the sixth switch is turned on earlier than the seventh switch; and in a second half of the operating cycle, control the second switch, the fourth switch, the sixth switch, the seventh switch, the tenth switch, the seventeenth switch, the eighteenth switch and the twentieth switch to be turned off, and control the first switch, the third switch, the fifth switch, the eighth switch, the ninth switch, the sixteenth switch, the nineteenth switch and the twenty-first switch to be turned on, and wherein at least one of the eighth switch and the sixteenth switch is turned on earlier than the nineteenth switch, and at least one of the first switch and the third switch is turned on earlier than the sixteenth switch, and wherein, the ratio of the voltage at the input terminal to the voltage at the output terminal is 6:1.

19. The switched capacitor converter of claim 16, wherein the control branch is further configured to:

control the eighth switch and the seventeenth switch to be turned on, and control the seventh switch and the sixteenth switch to be turned off;

in a first half of an operating cycle, control the first switch, the third switch, the fifth switch, the eighteenth switch, the nineteenth switch and the twenty-first switch to be turned off, and control the second switch, the fourth switch, the sixth switch, the ninth switch, the tenth switch and the twentieth switch to be turned on; and in a second half of the operating cycle, control the first switch, the third switch, the fifth switch, the eighteenth switch, the nineteenth switch and the twenty-first switch to be turned on, and control the second switch, the fourth switch, the sixth switch, the ninth switch, the tenth switch and the twentieth switch to be turned off, and wherein the ratio of the voltage at the input terminal to the voltage at the output terminal is 3:1.

20. The switched capacitor converter of claim 16, wherein:

the first energy storage branch further includes a twenty-second switch and an eleventh capacitor; and the second energy storage branch further includes a twenty-third switch and a twelfth capacitor, and wherein:

a second terminal of the twenty-second switch is connected to the third terminal of the twentieth switch;

a third terminal of the twenty-second switch is connected to a first terminal of the eleventh capacitor and the third terminal of the ninth switch, and wherein:

when the second terminal of the ninth capacitor is connected to the second terminal of the second capacitor, a second terminal of the eleventh capacitor is connected to the second terminal of the first capacitor; and when the second terminal of the ninth capacitor is connected to the first terminal of the second capacitor, the second terminal of the eleventh capacitor is connected to the first terminal of the tenth capacitor;

a second terminal of the twenty-third switch is connected to the third terminal of the twenty-first switch; and a third terminal of the twenty-third switch is connected to a first terminal of the twelfth capacitor and the second terminal of the tenth switch, and wherein:

when the second terminal of the tenth capacitor is connected to the second terminal of the first capacitor, a second terminal of the twelfth capacitor is connected to the second terminal of the second capacitor; and when the second terminal of the tenth capacitor is connected to the first terminal of the first capacitor, the second terminal of the twelfth capacitor is connected to the first terminal of the ninth capacitor.

21. The switched capacitor converter of claim 20, wherein the control branch is further configured to:

in a first half of an operating cycle, control the second switch, the fourth switch, the sixth switch, the eighth switch, the ninth switch, the sixteenth switch, the nineteenth switch, the twentieth switch and the twenty-third switch to be turned off, and control the first switch, the third switch, the fifth switch, the seventh switch, the tenth switch, the seventeenth switch, the eighteenth switch, the twenty-first switch and the twenty-second switch to be turned on, and wherein at least one of the seventh switch and the seventeenth switch is turned on earlier than the tenth switch; and in a second half of the operating cycle, control the first switch, the third switch, the fifth switch, the seventh switch, the tenth switch, the seventeenth switch, the eighteenth switch, the twenty-first switch and the twenty-second switch to be turned off, and control the second switch, the fourth switch, the sixth switch, the eighth switch, the ninth switch, the sixteenth switch, the nineteenth switch, the twentieth switch and the twenty-third switch to be turned on, and wherein at least one of the eighth switch and the sixteenth switch is turned on earlier than the nineteenth switch, and wherein the ratio of the voltage at the input terminal to the voltage at the output terminal is 8:1.

22. The switched capacitor converter of claim 21, wherein the control branch is further configured to:

in the first half of the operating cycle, at least one of the first switch and the third switch is turned on earlier than the seventh switch; and in the second half of the operating cycle, at least one of the second switch and the sixth switch is turned on earlier than the sixteenth switch.

* * * * *